June 21, 1966     A. R. D'ANDREA ET AL     3,257,258
APPARATUS FOR MANUFACTURING FRANGIBLE CLOSURES FOR CONTAINERS
Filed Nov. 24, 1961     40 Sheets-Sheet 1

*INVENTORS*
ANGELO RALPH D'ANDREA, JAMES J. WALSH
& JOHN K. BROWNING, deceased
By Susan Jane Browning, administratrix Shoemaker and Mattare
ATTORNEYS

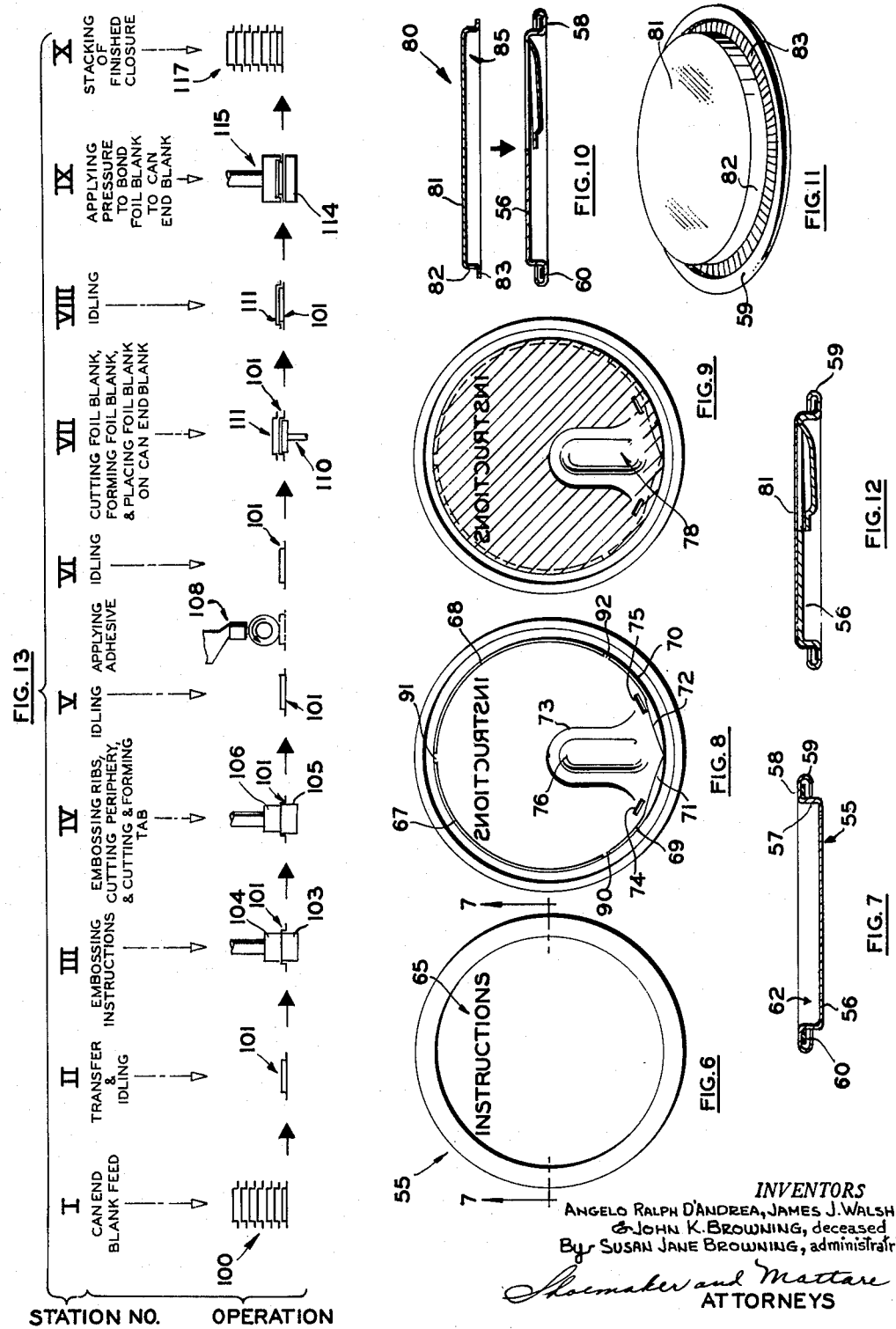

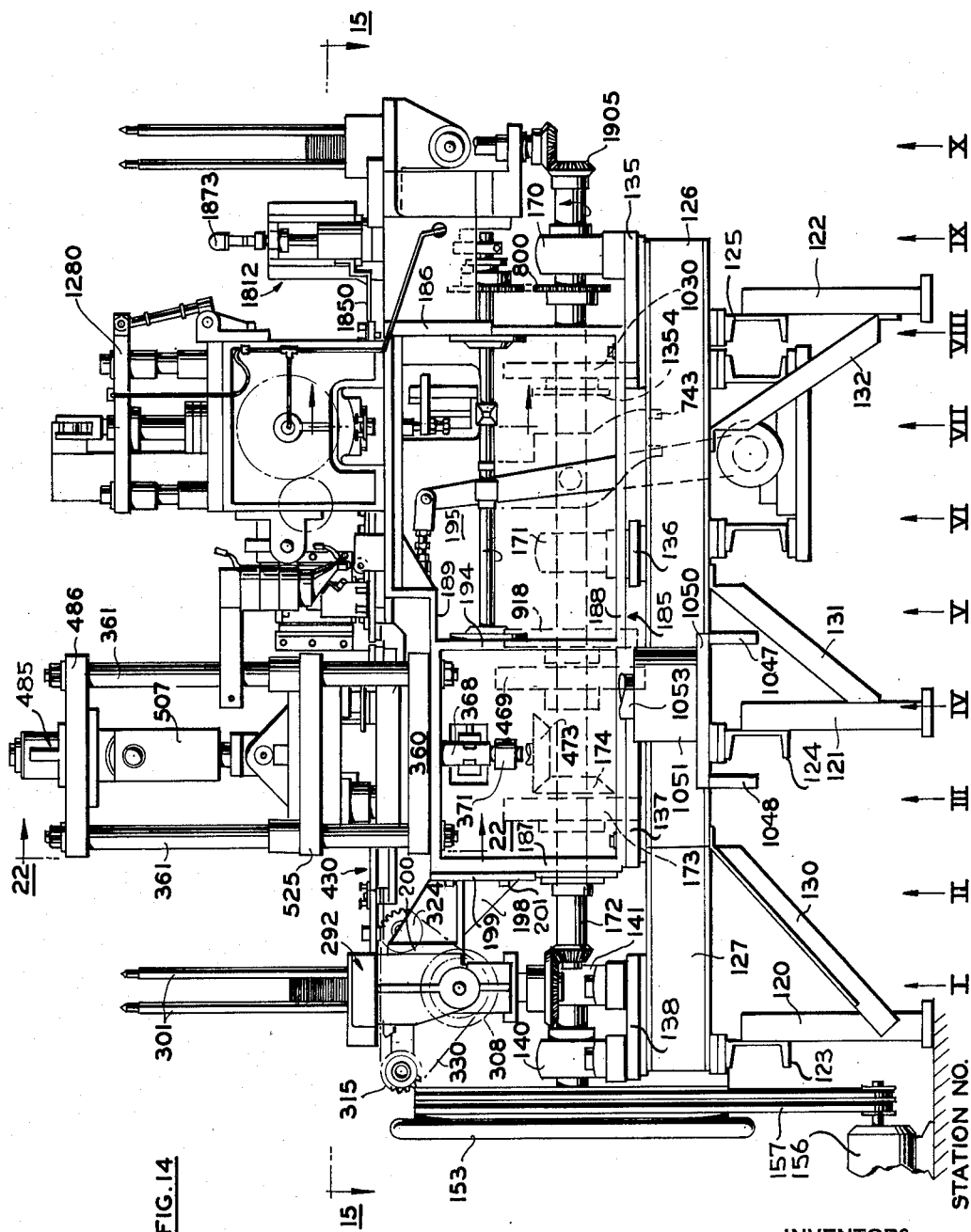

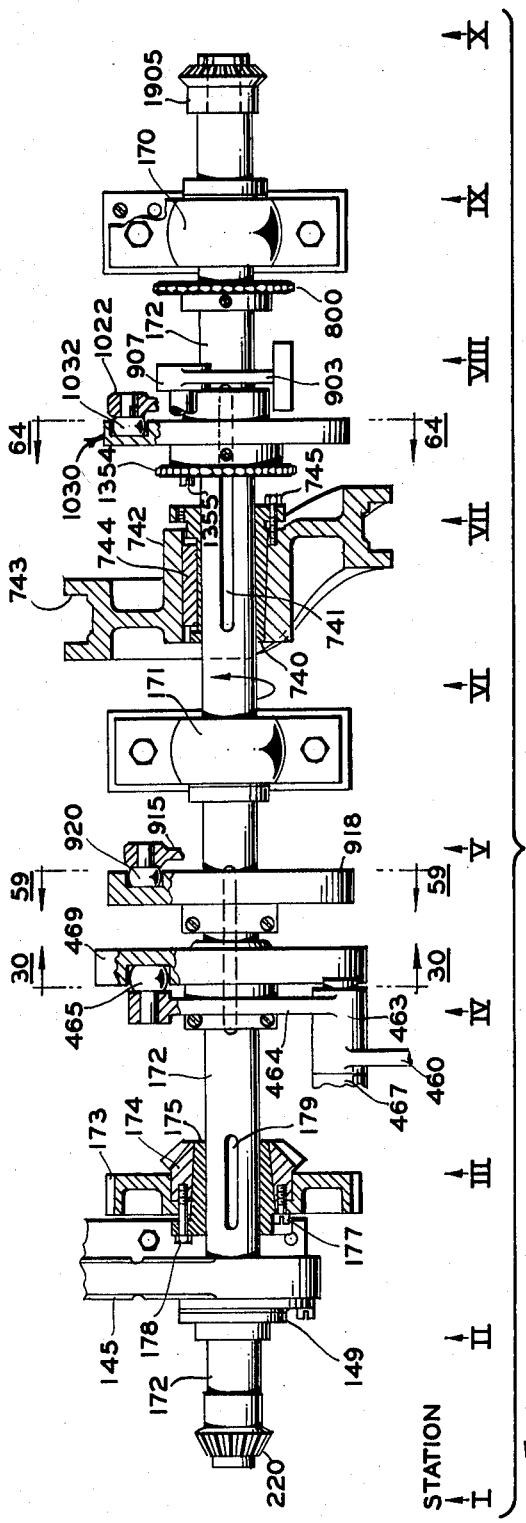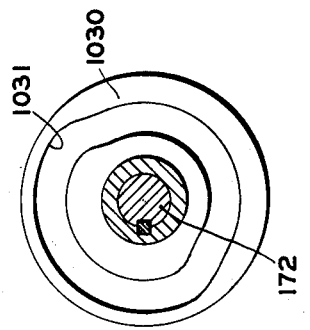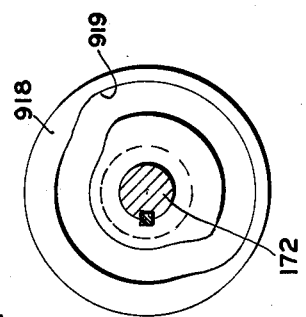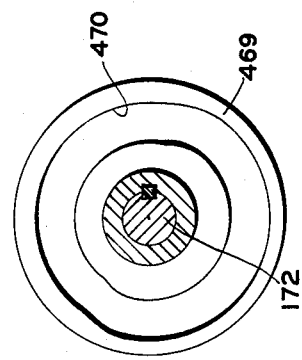

June 21, 1966    A. R. D'ANDREA ETAL    3,257,258
APPARATUS FOR MANUFACTURING FRANGIBLE CLOSURES FOR CONTAINERS
Filed Nov. 24, 1961    40 Sheets-Sheet 8

INVENTORS
ANGELO RALPH D'ANDREA,
JAMES J. WALSH
& JOHN K. BROWNING, deceased
By SUSAN JANE BROWNING, administratrix
BY
Shoemaker and Matteo
ATTORNEYS INVENTORS
ANGELO RALPH D'ANDREA, JAMES J. WALSH
& JOHN K. BROWNING, deceased
By SUSAN JANE BROWNING, administratrix Shoemaker and Mattare
ATTORNEYS

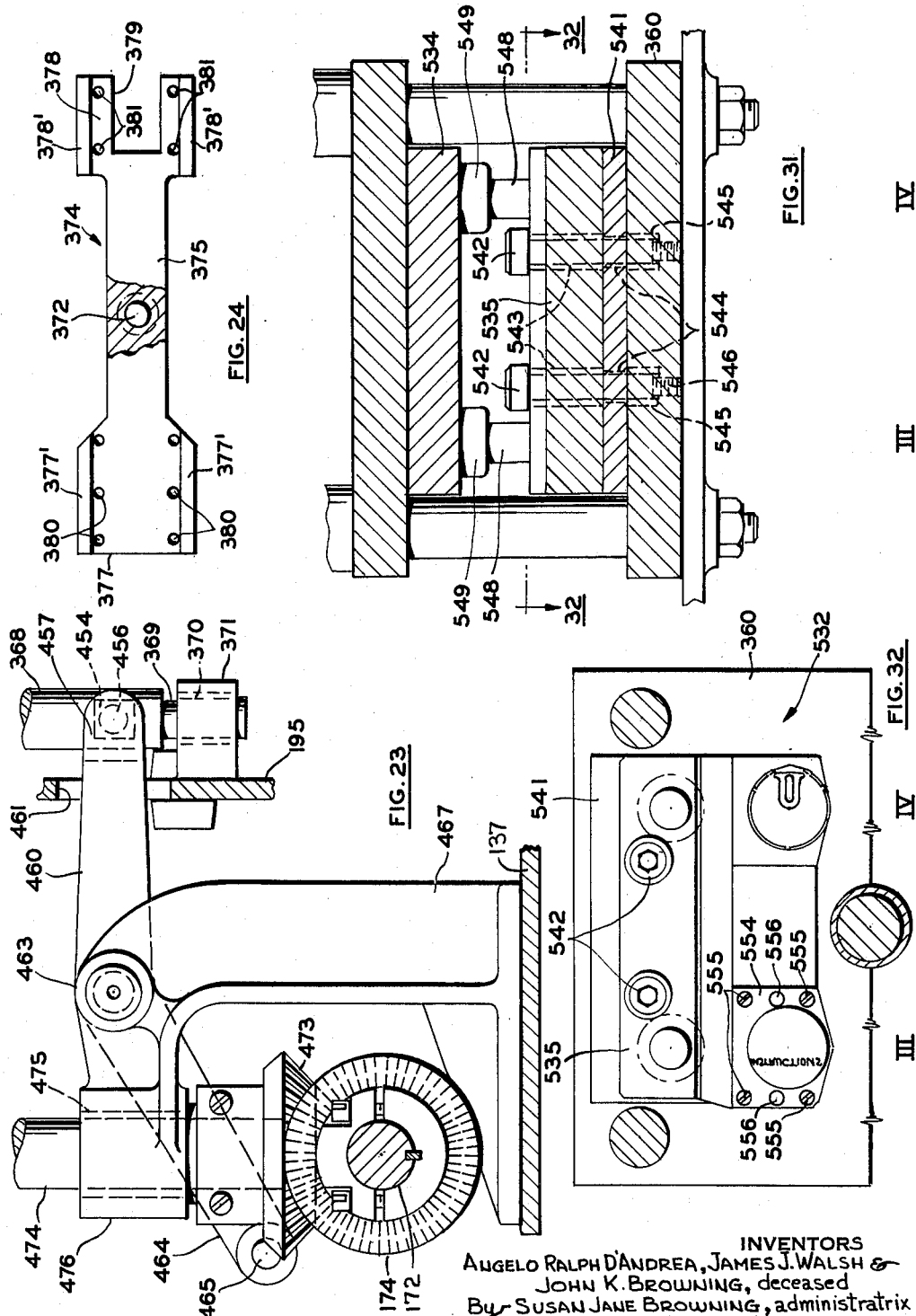

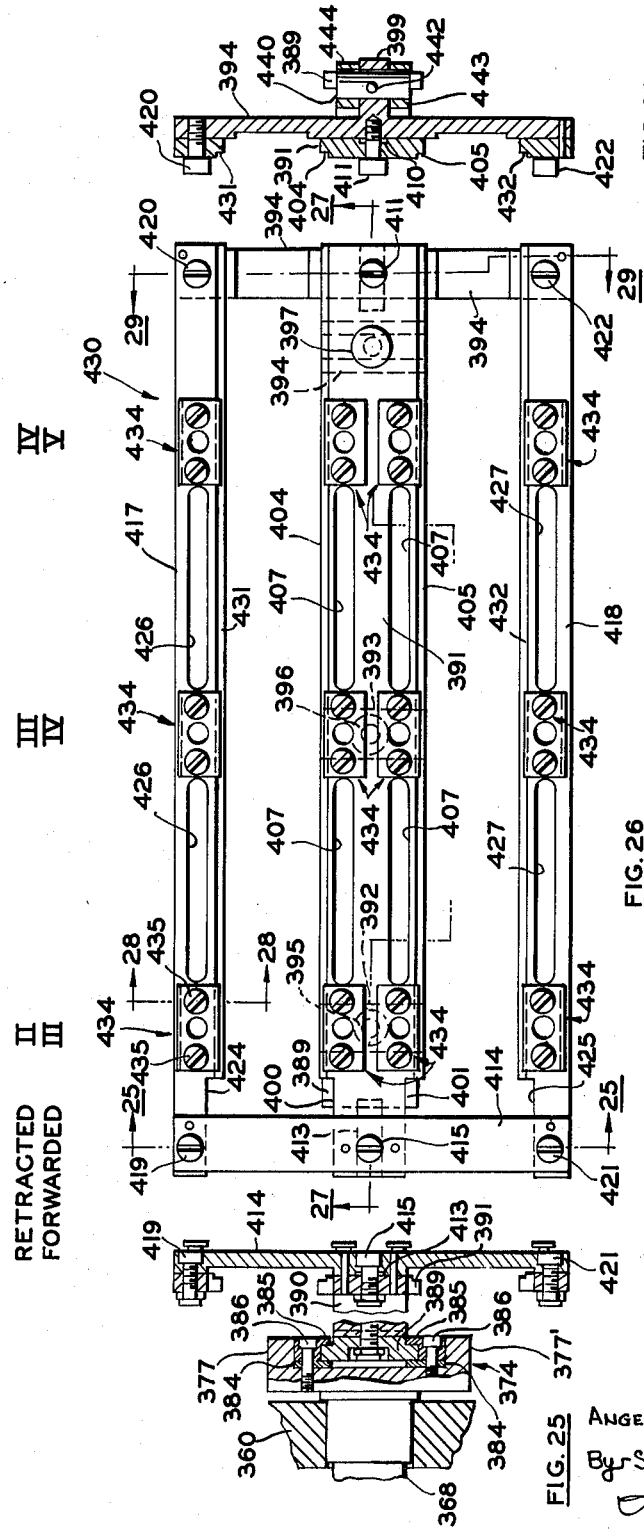

June 21, 1966  A. R. D'ANDREA ETAL  3,257,258
APPARATUS FOR MANUFACTURING FRANGIBLE CLOSURES FOR CONTAINERS
Filed Nov. 24, 1961  40 Sheets-Sheet 12

INVENTORS
ANGELO RALPH D'ANDREA, JAMES J. WALSH
& JOHN K. BROWNING, deceased
By SUSAN JANE BROWNING, administratrix

ATTORNEYS

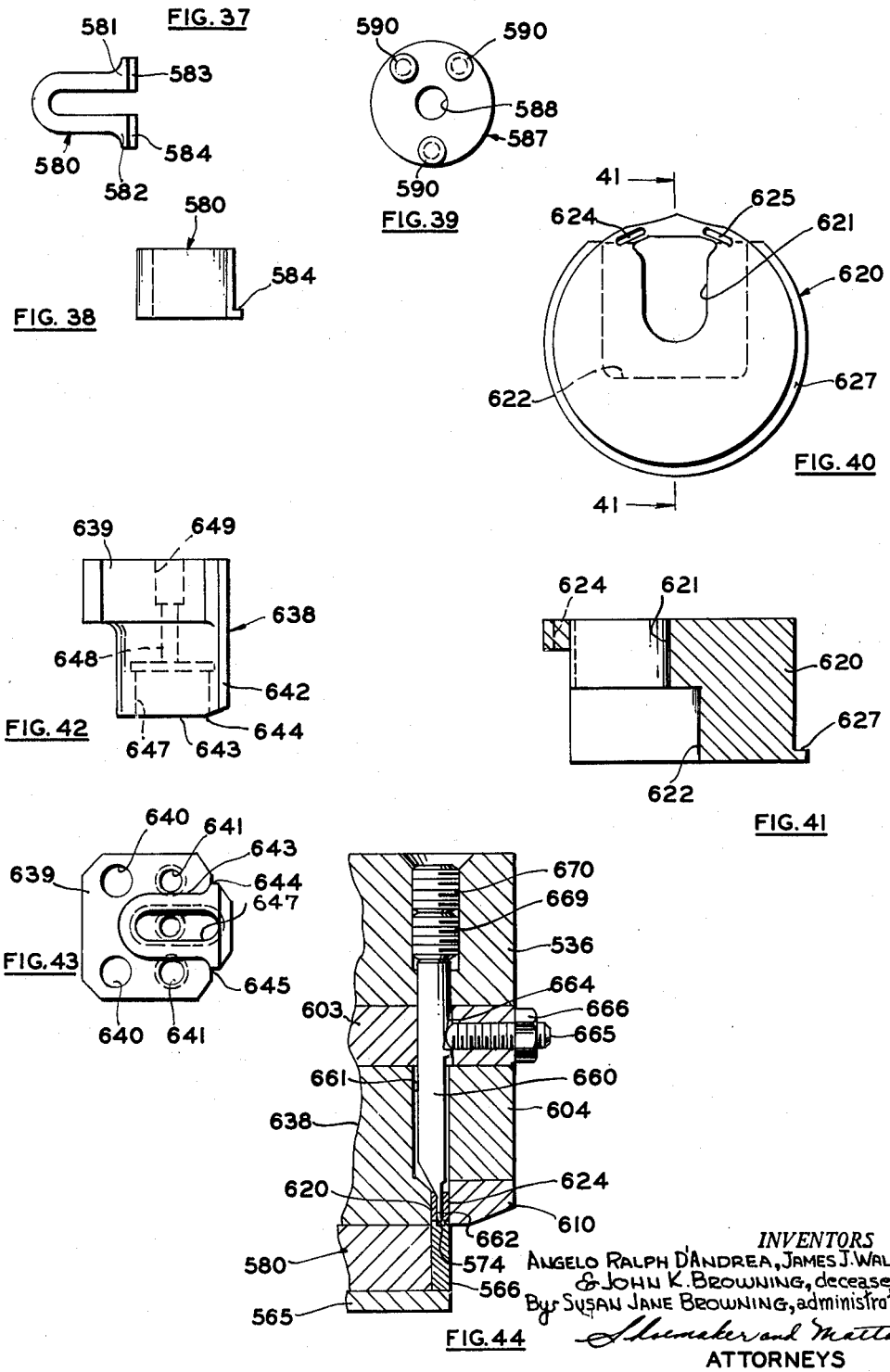

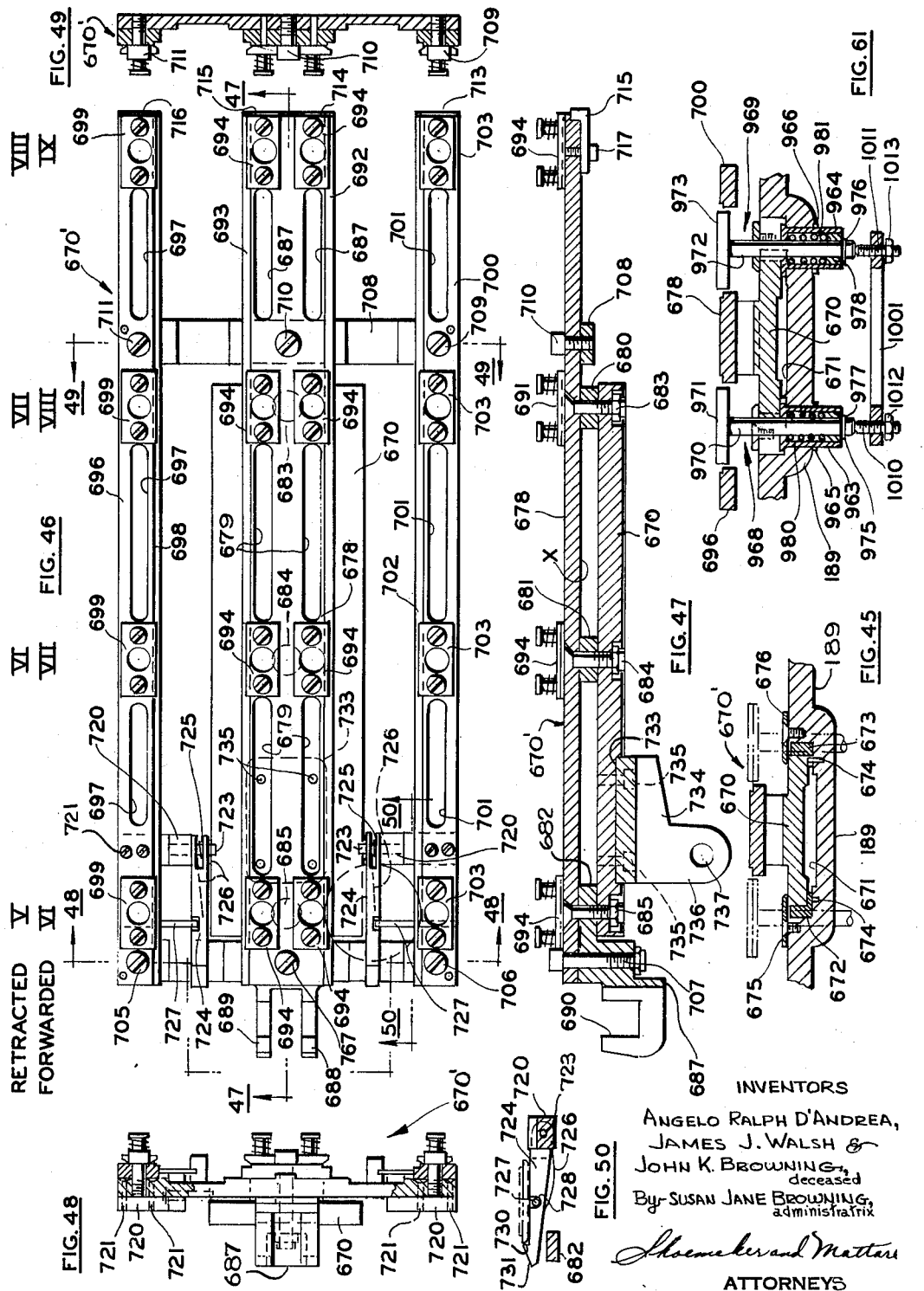

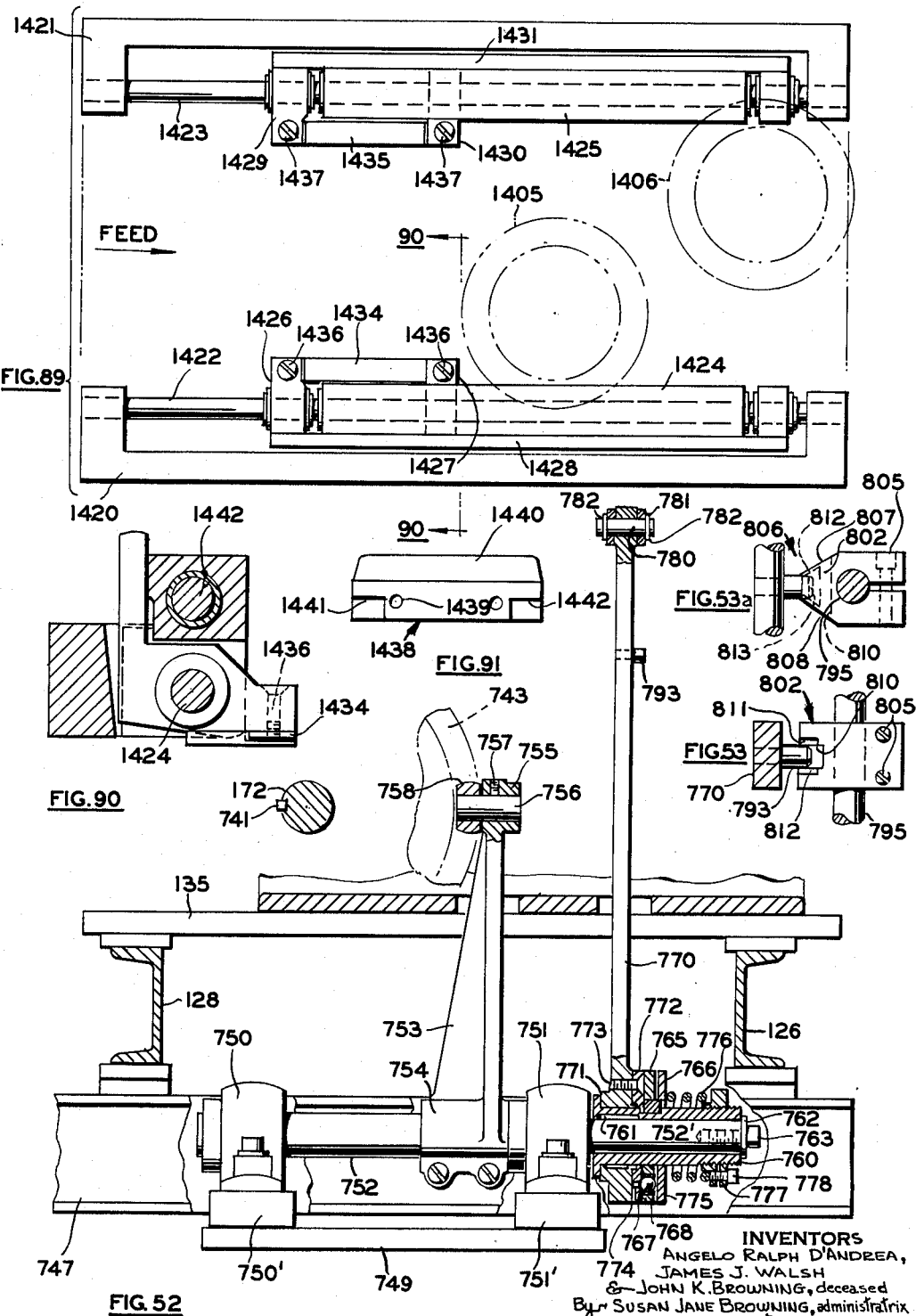

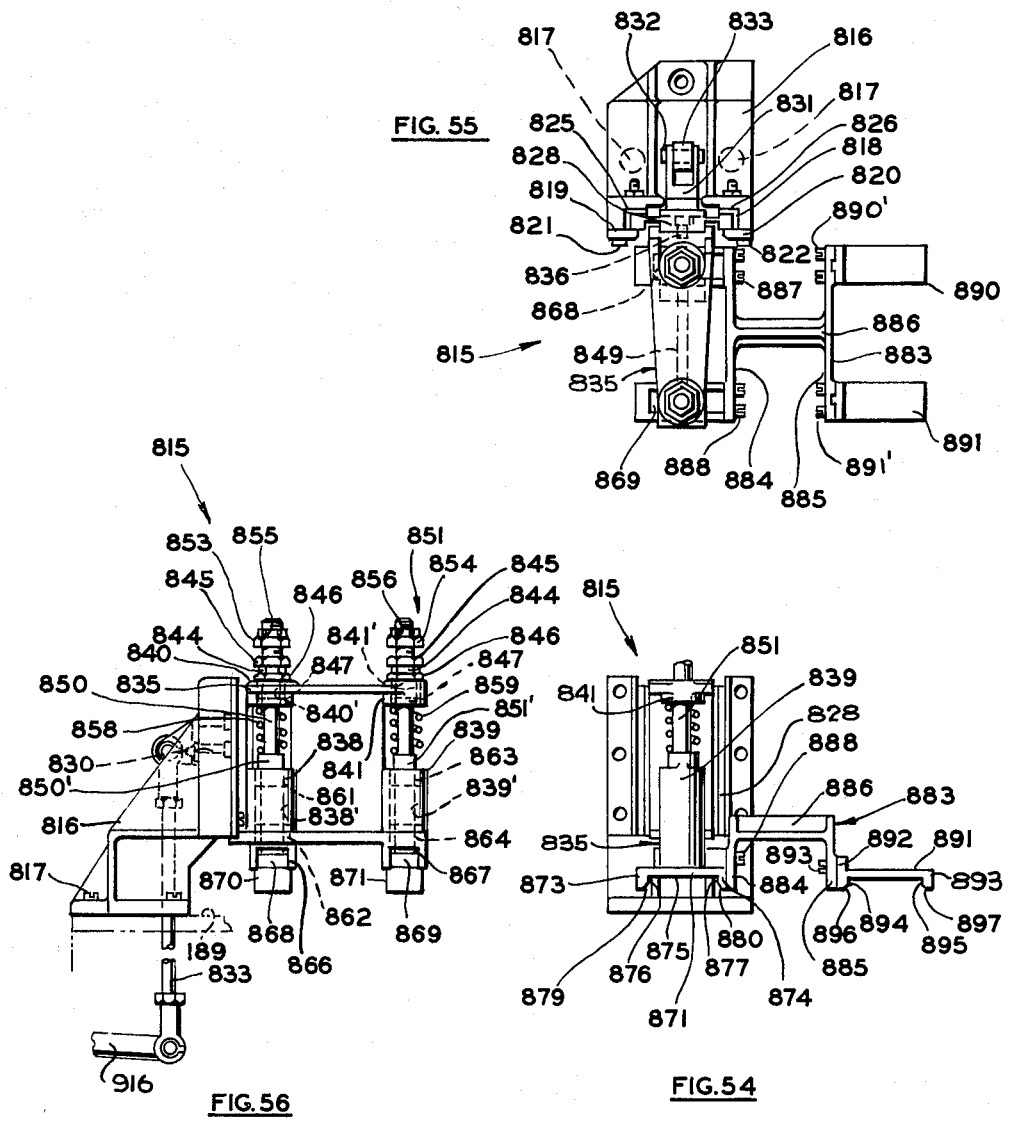

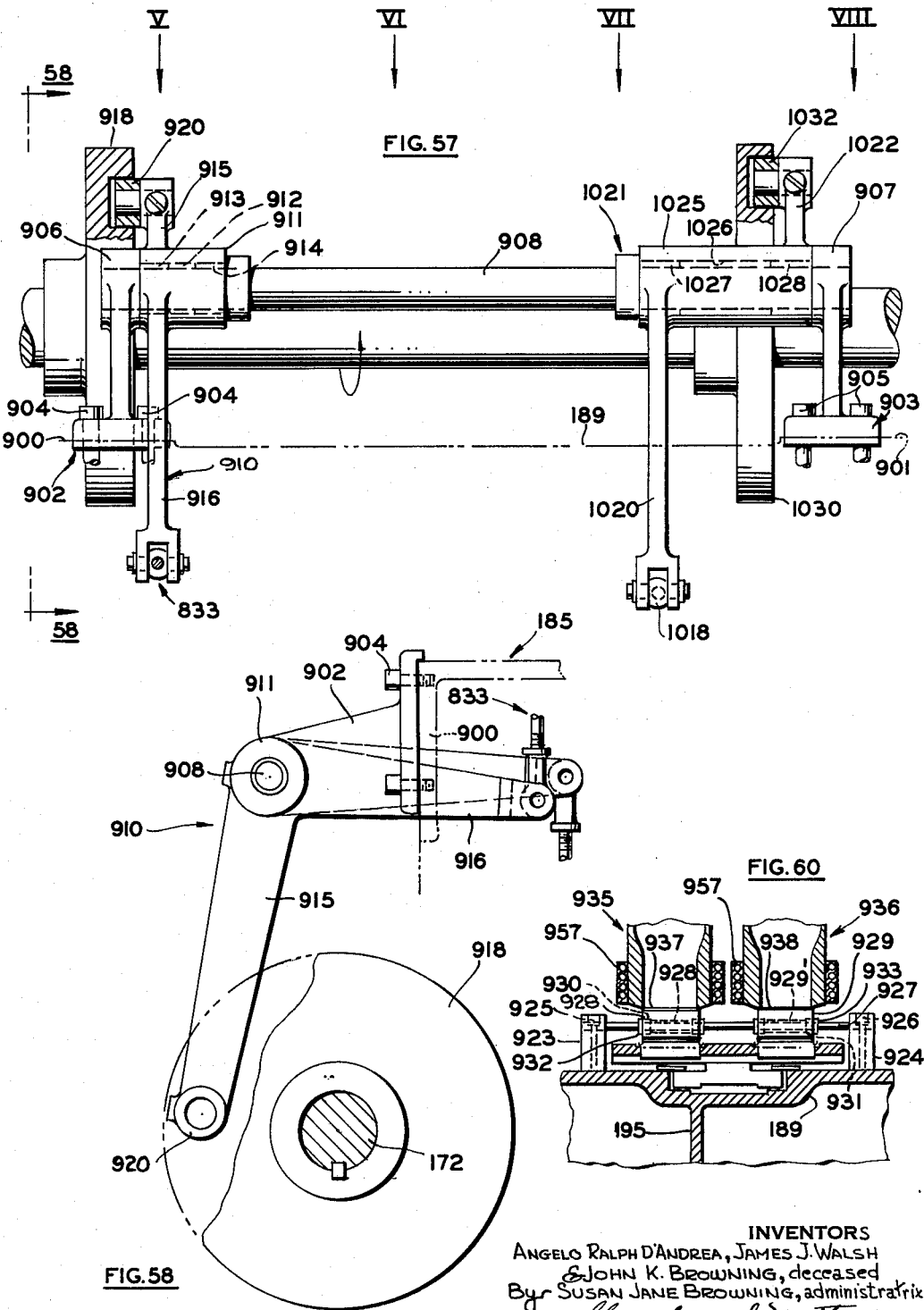

June 21, 1966  A. R. D'ANDREA ET AL  3,257,258
APPARATUS FOR MANUFACTURING FRANGIBLE CLOSURES FOR CONTAINERS
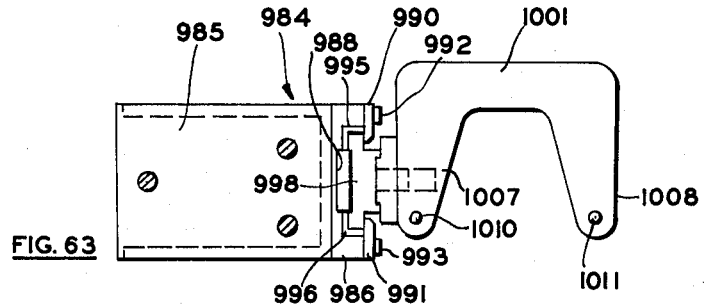
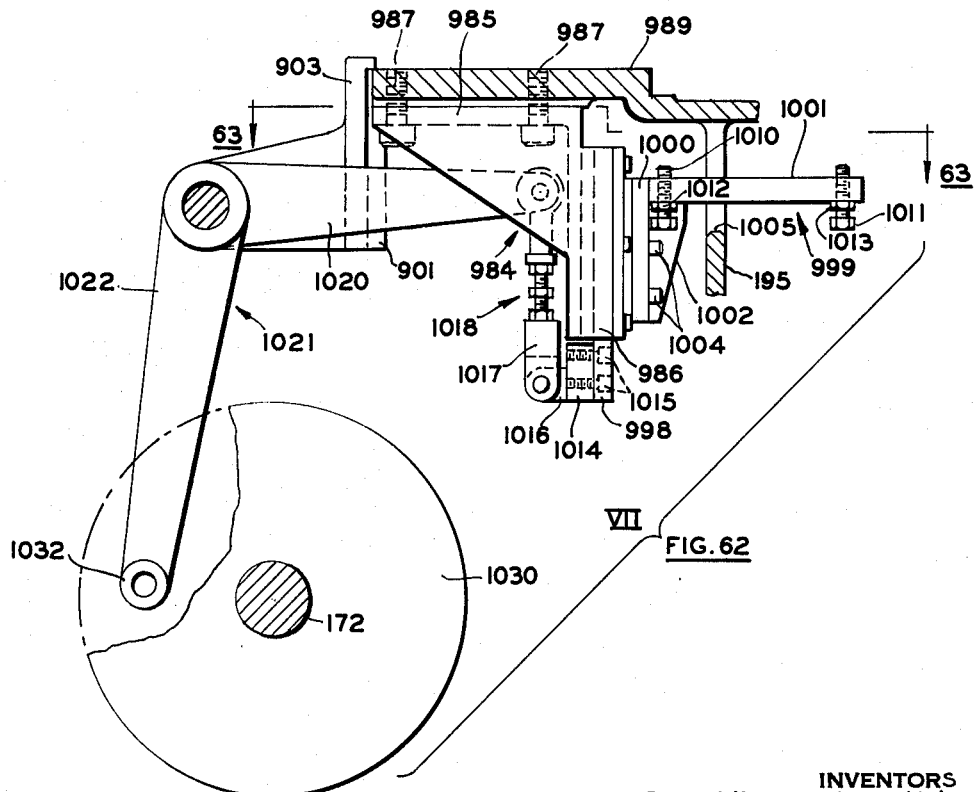

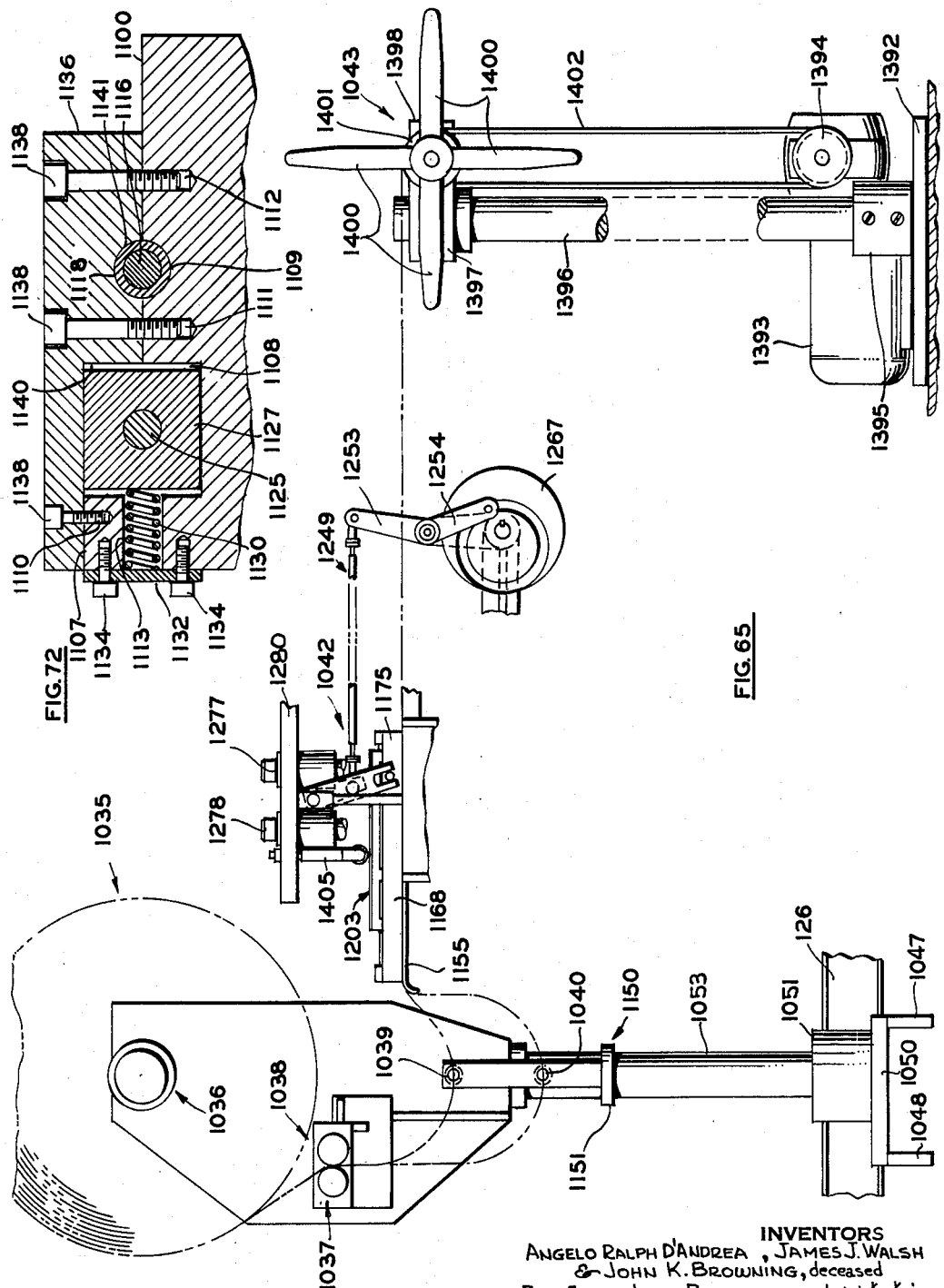

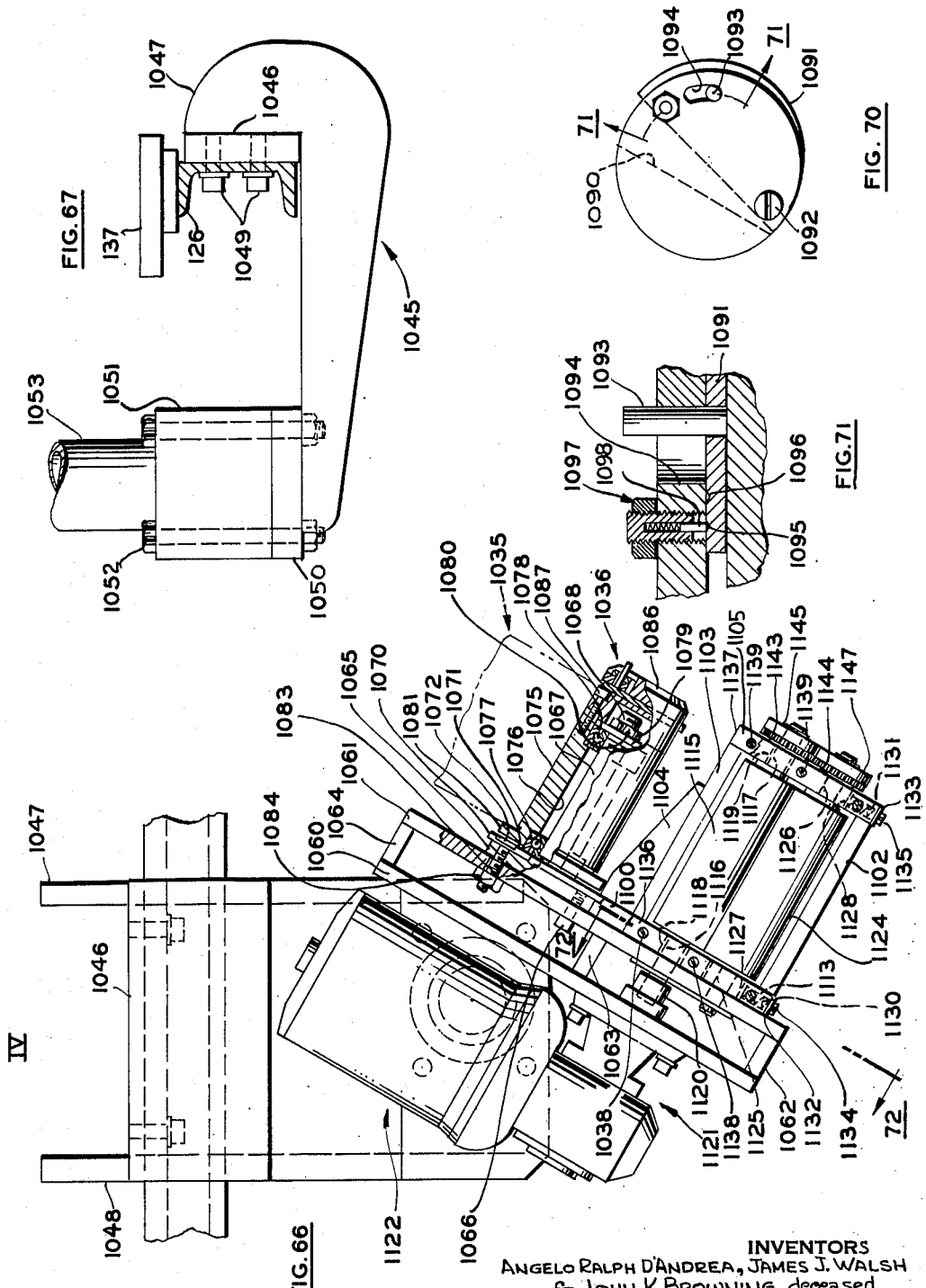

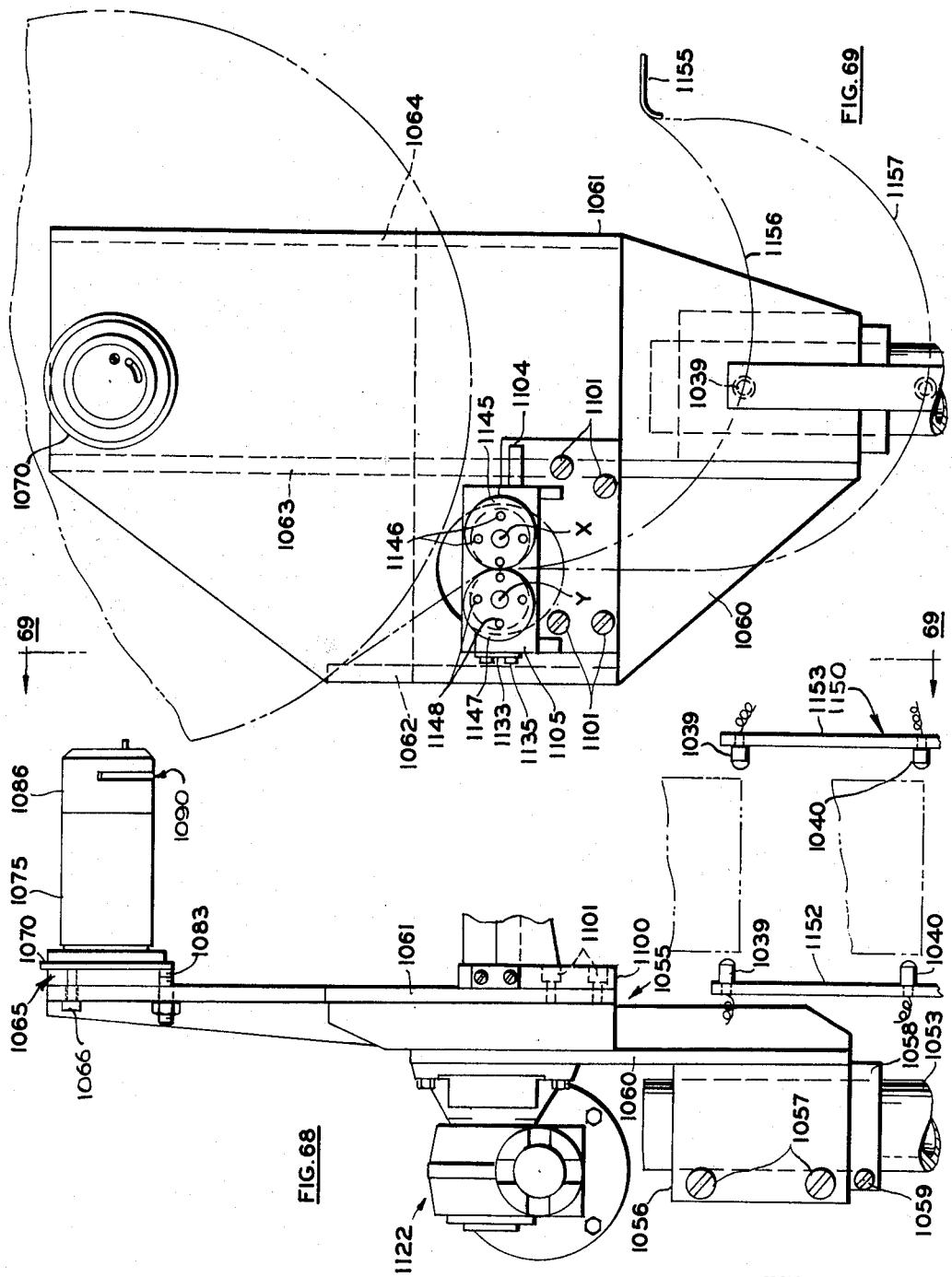

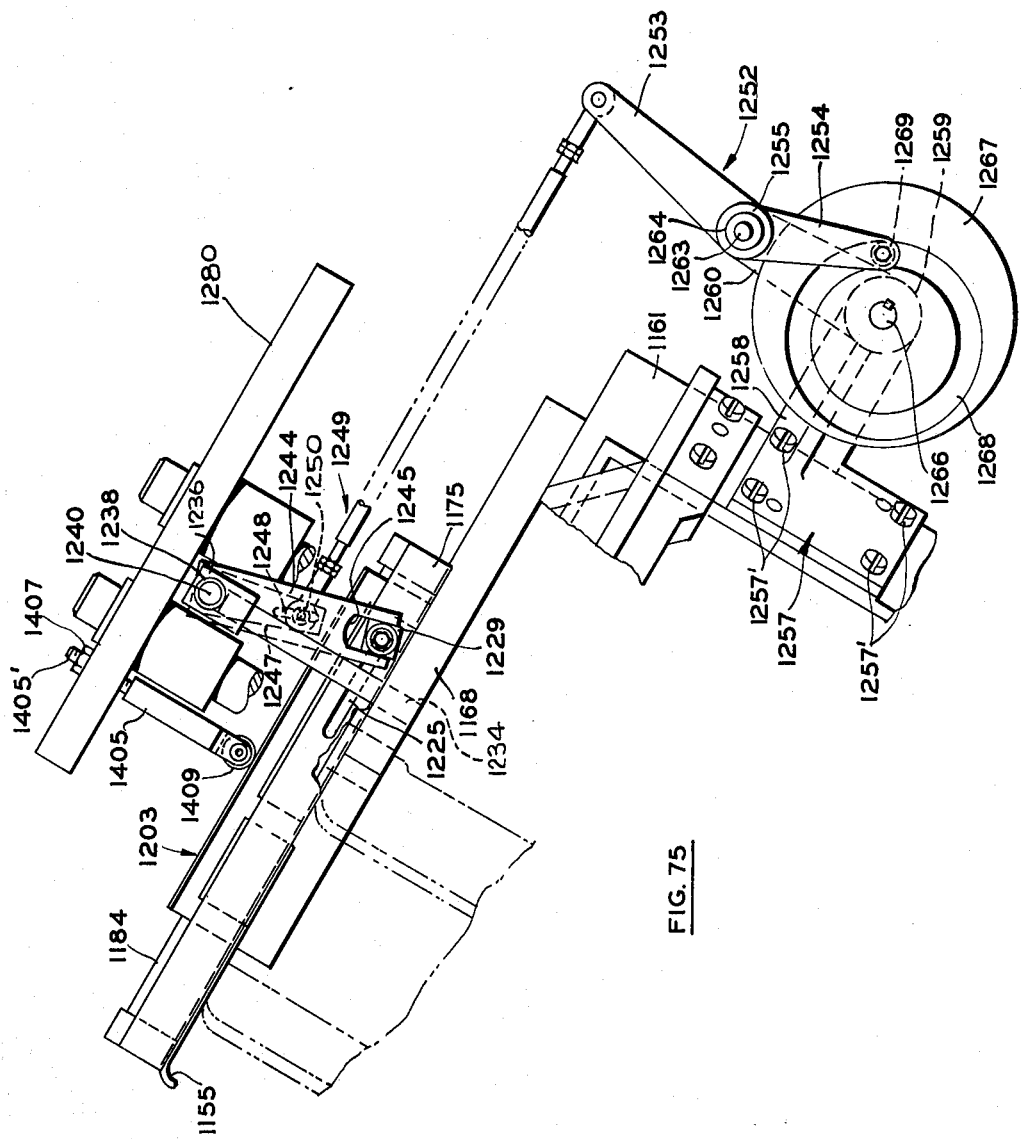

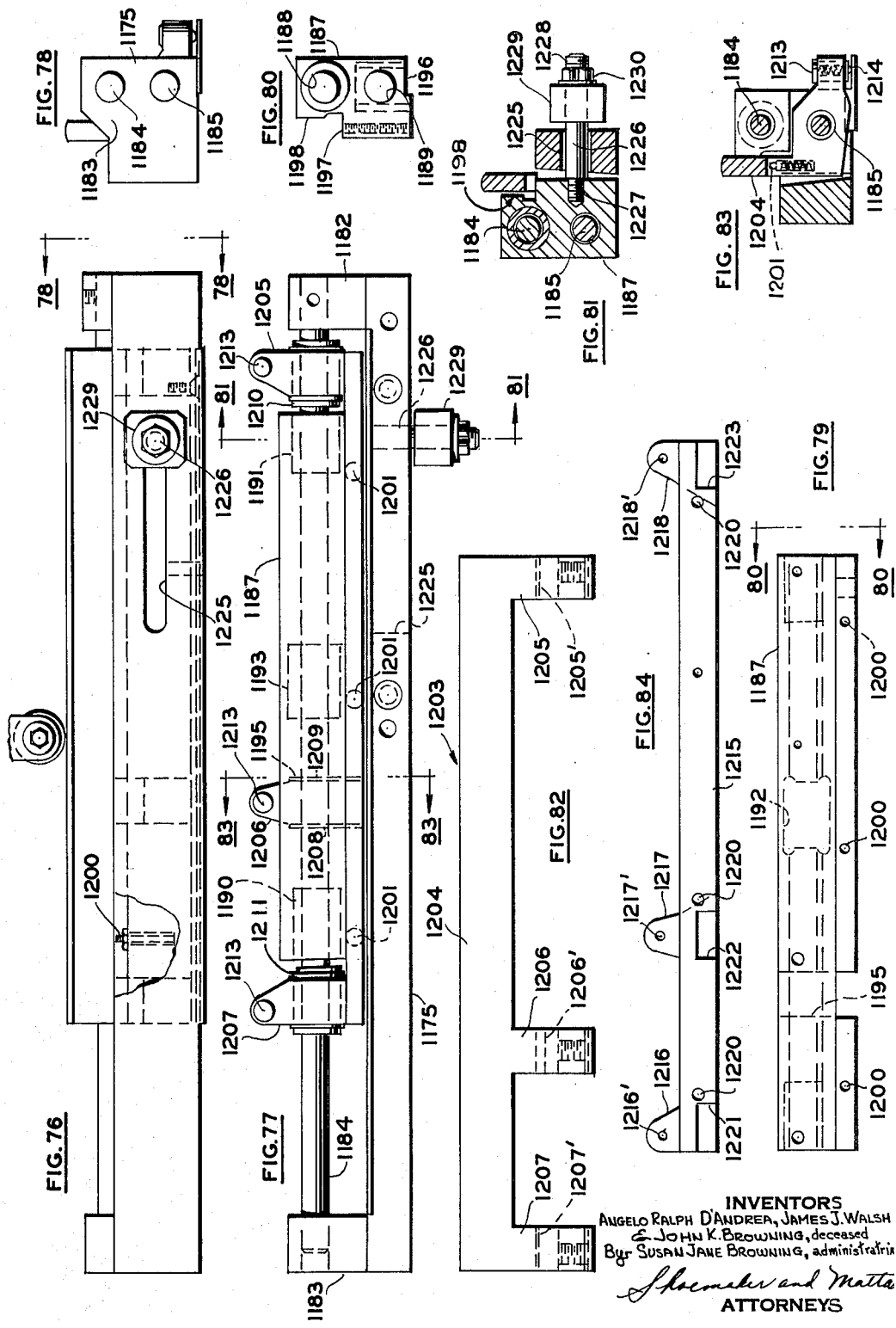

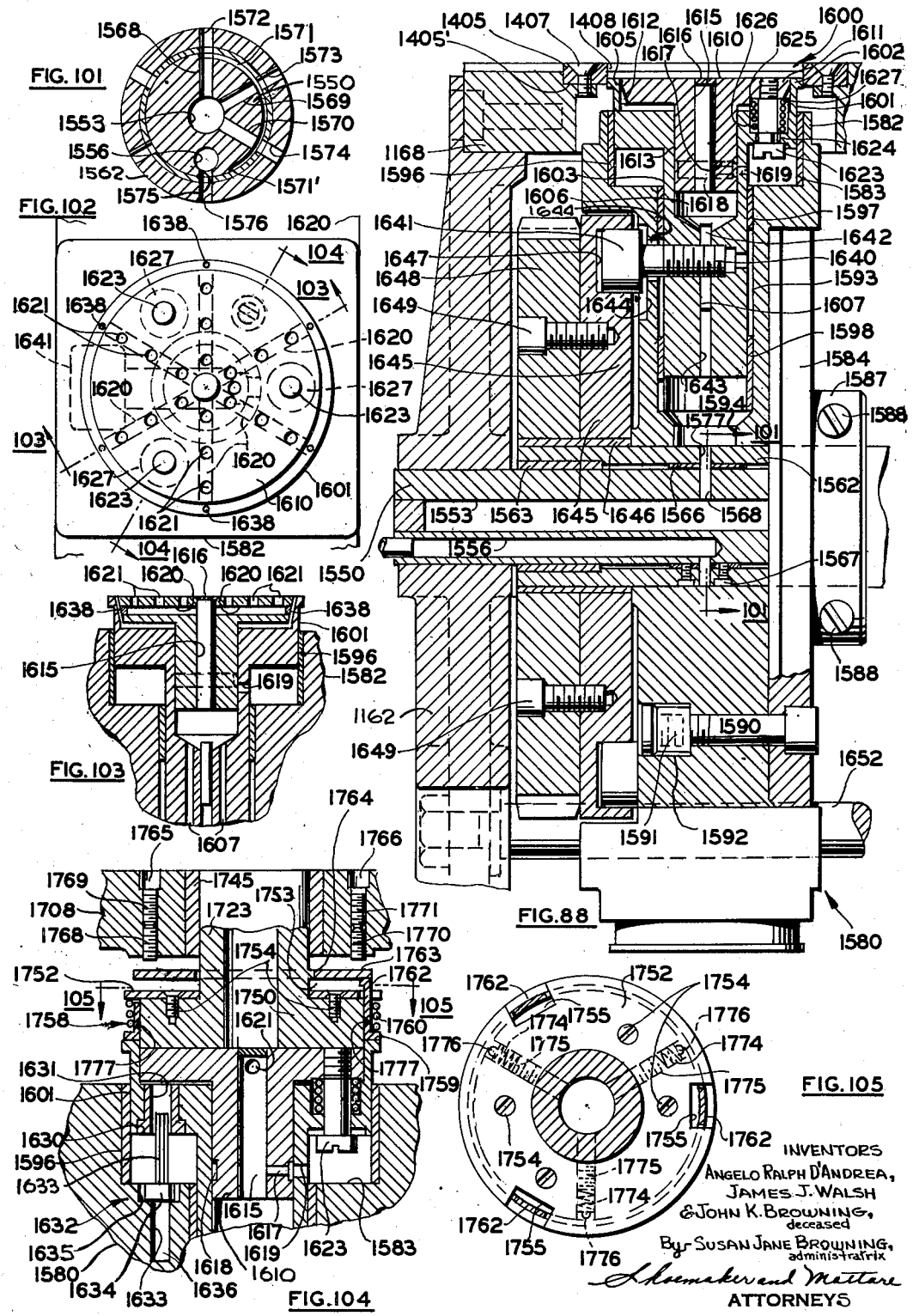

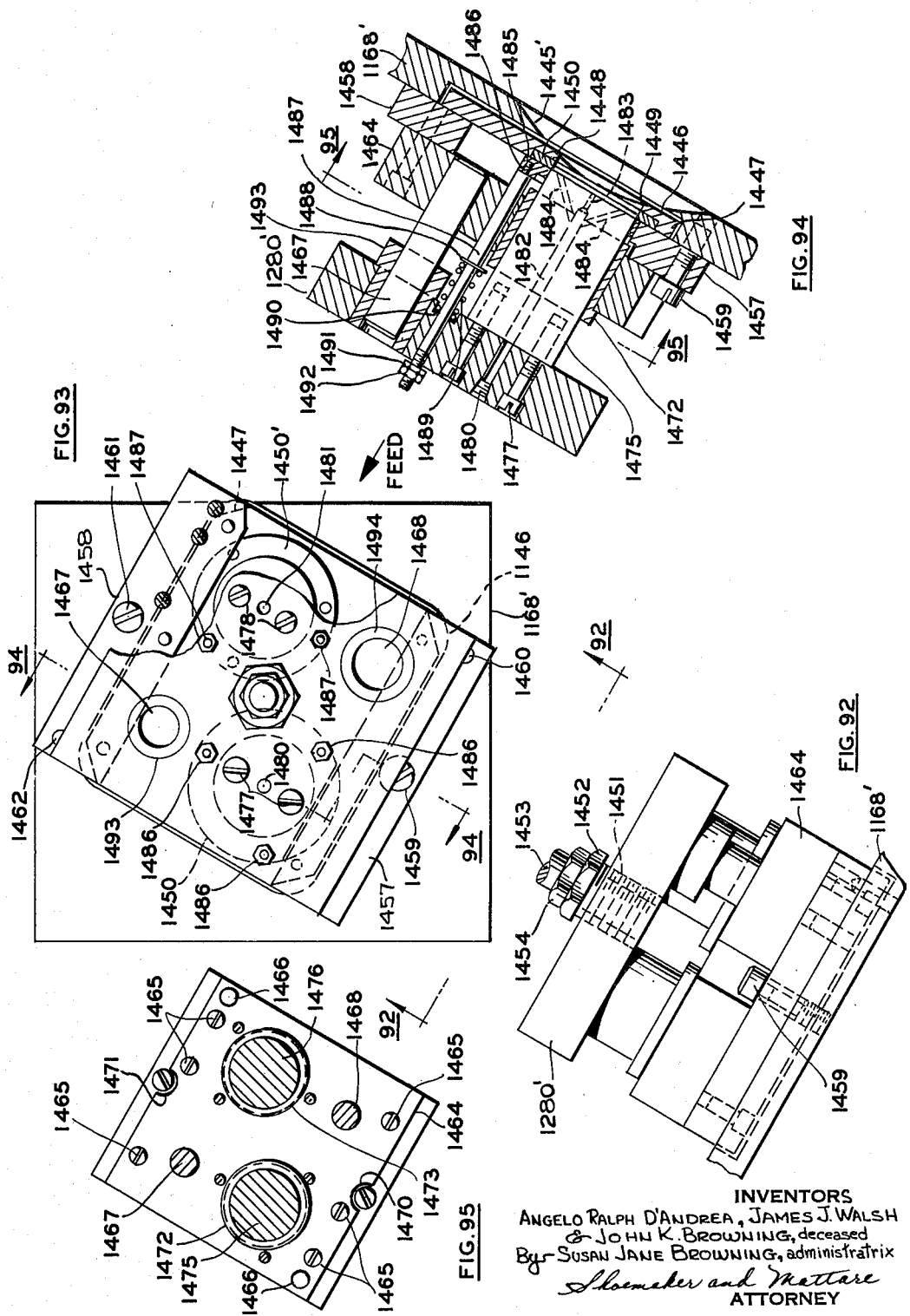

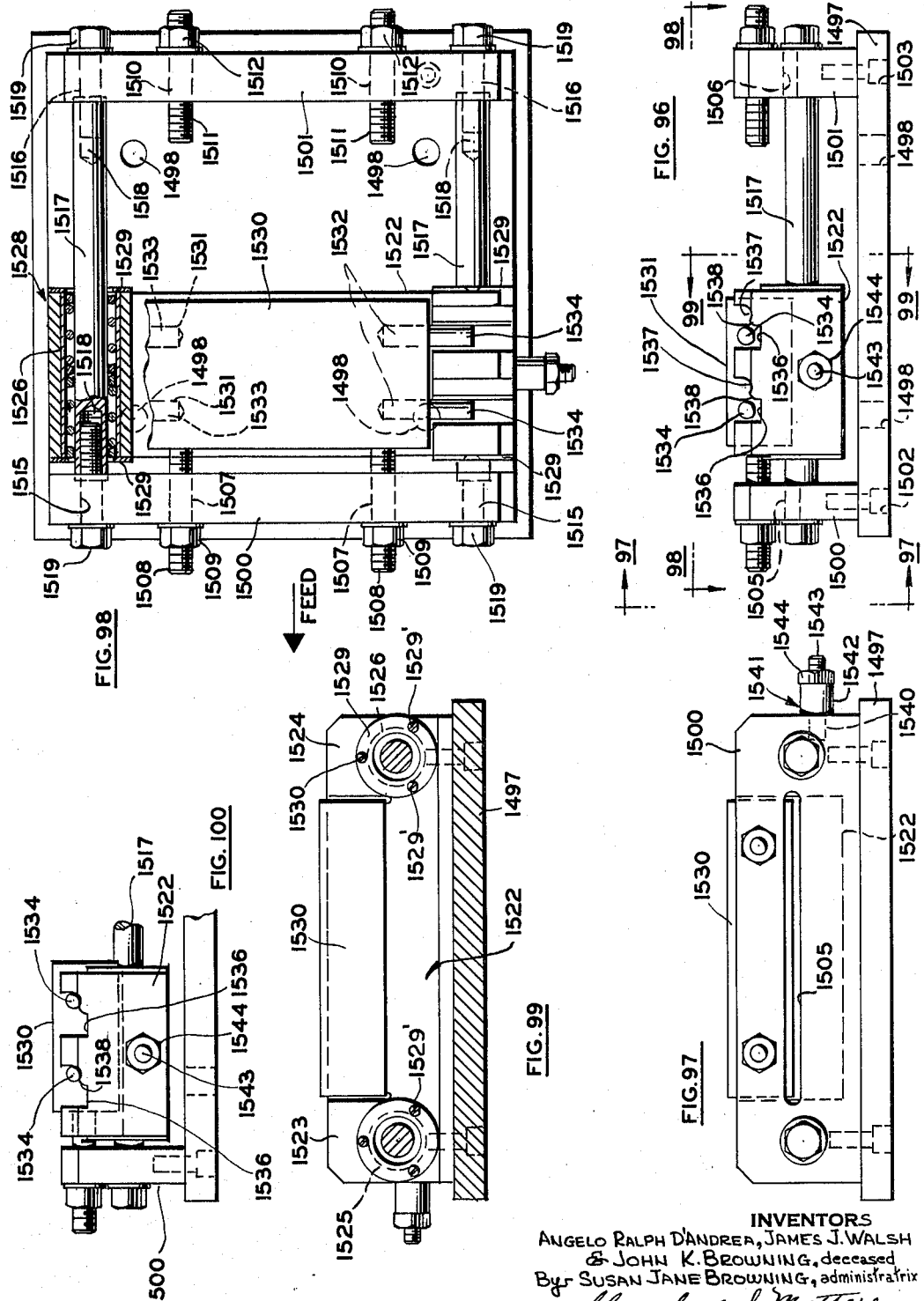

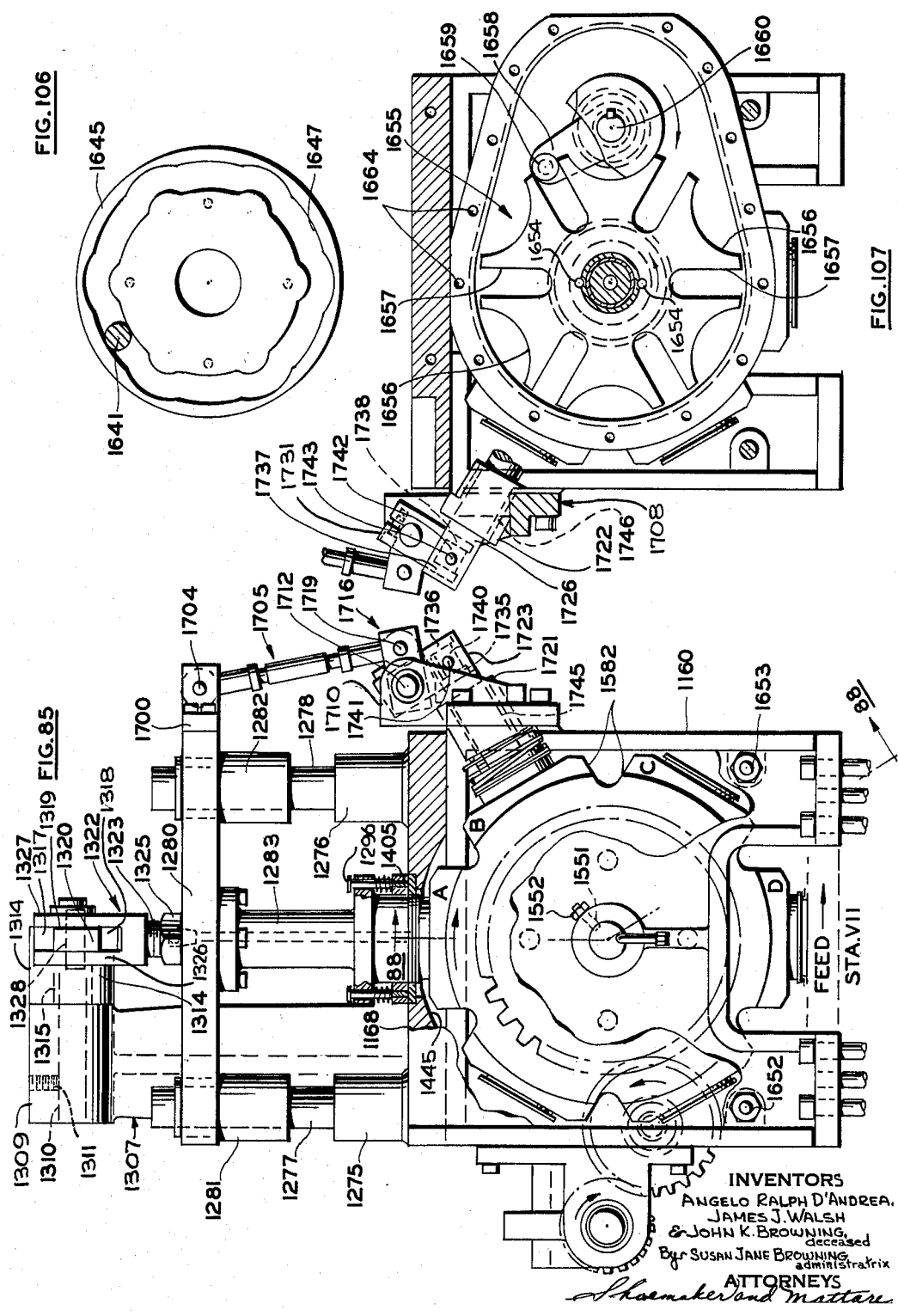

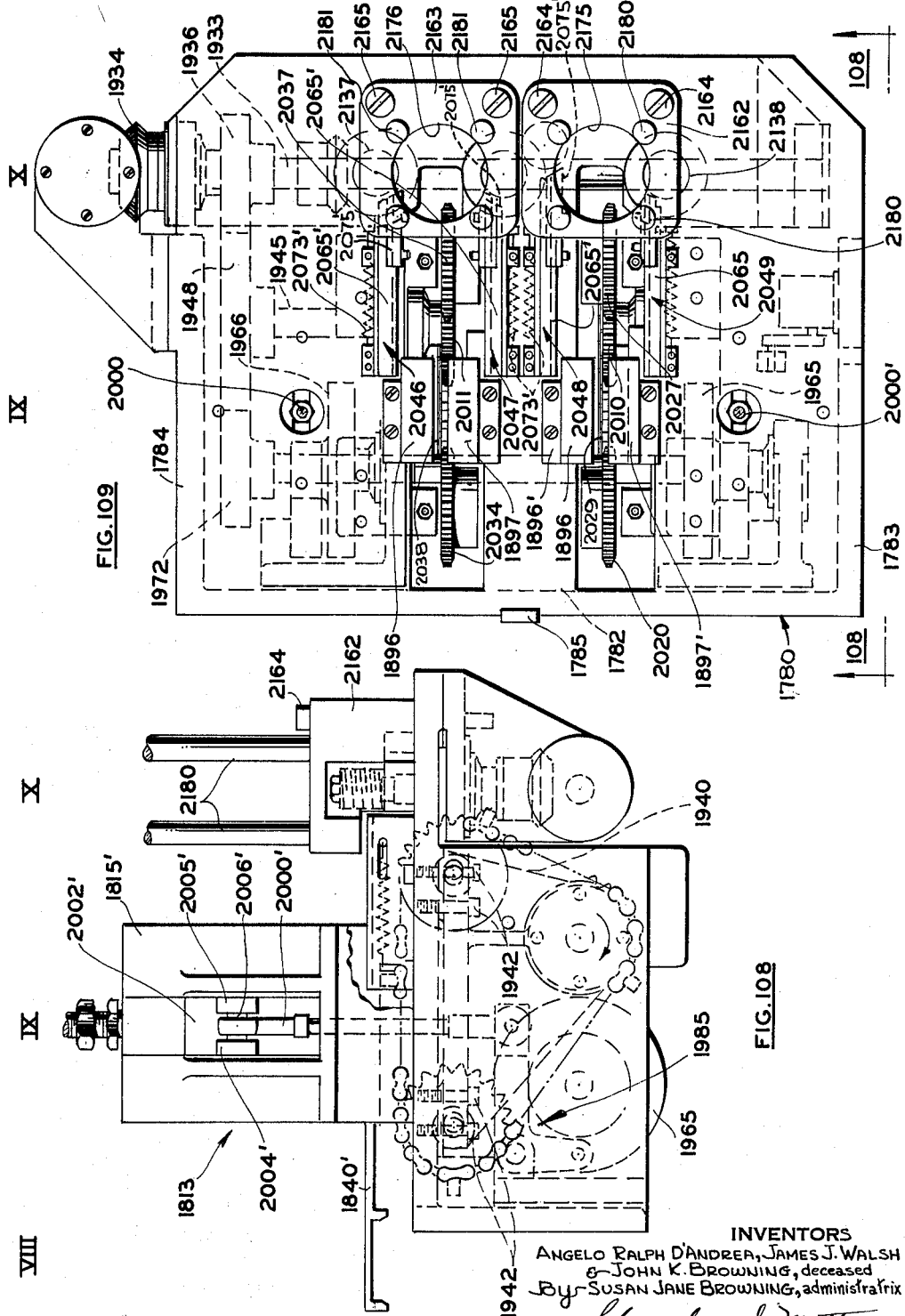

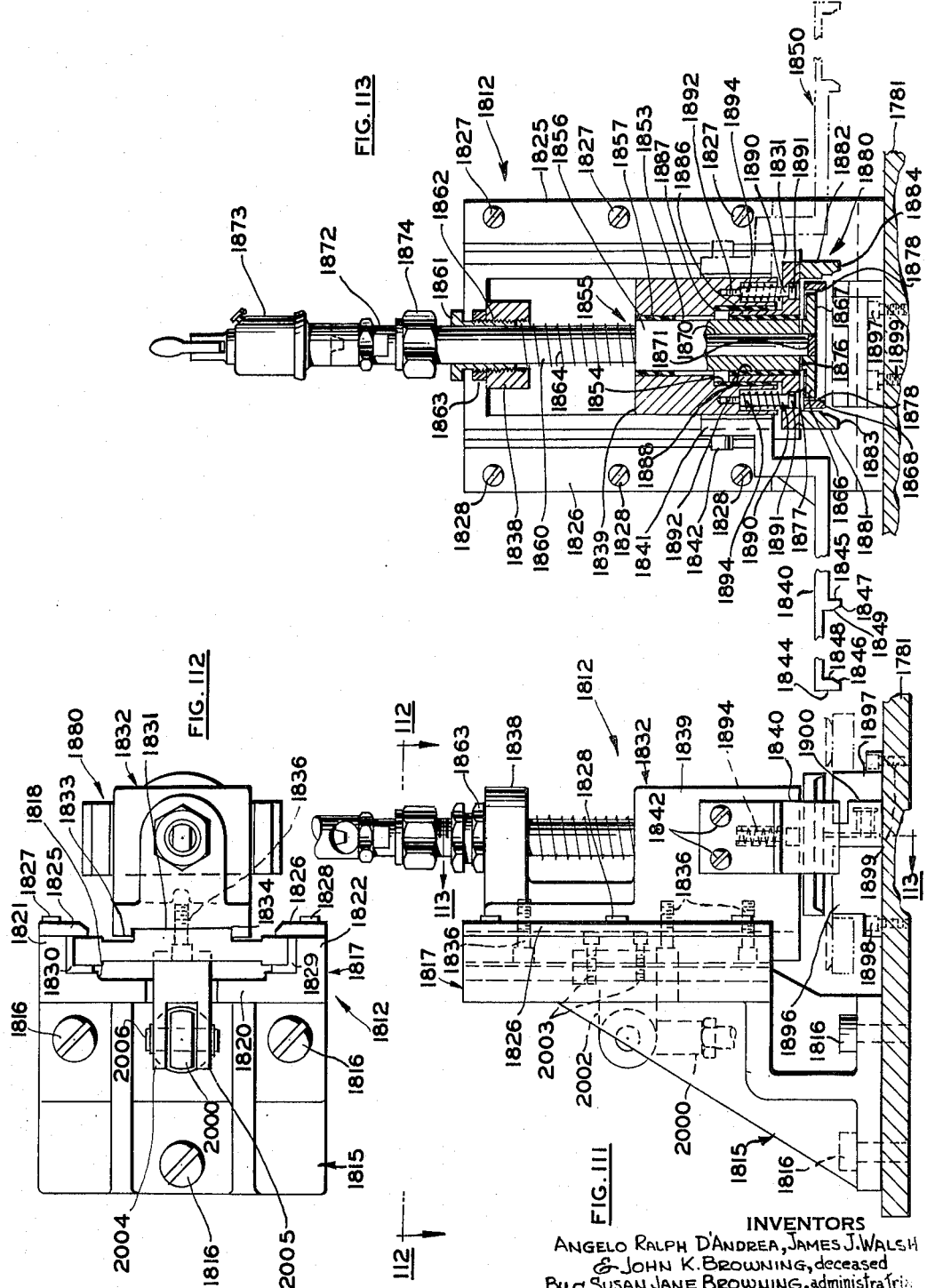

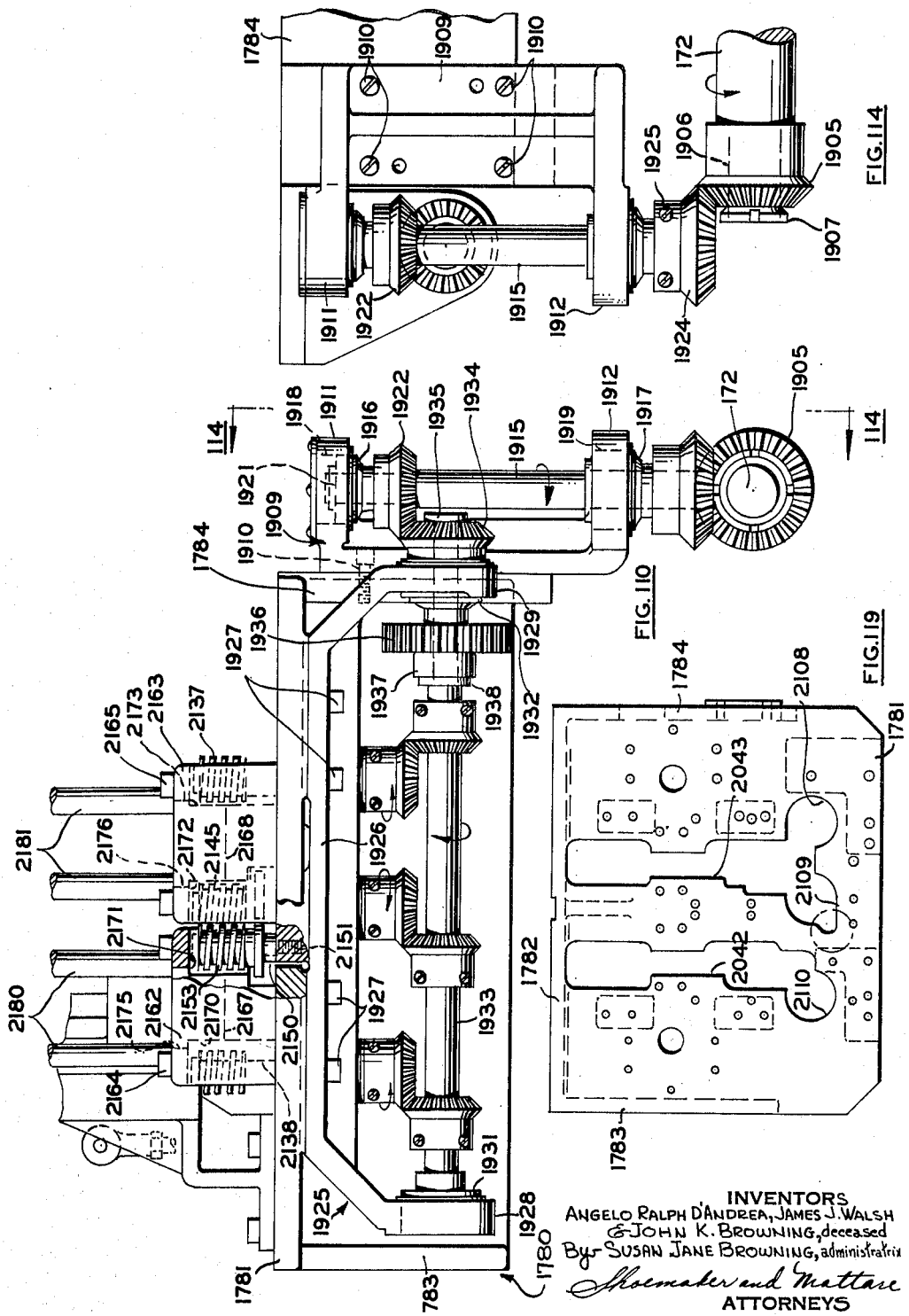

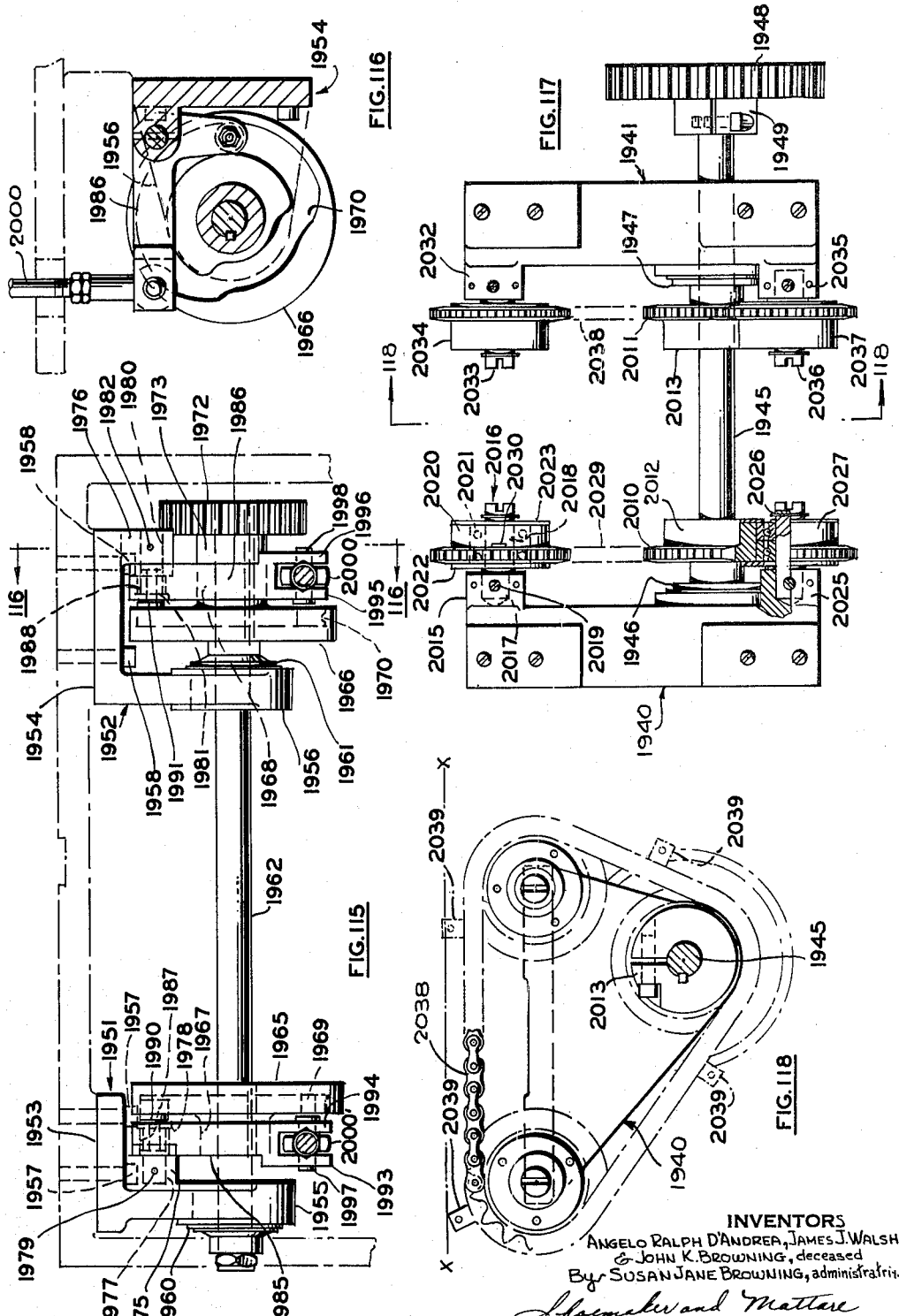

June 21, 1966   A. R. D'ANDREA ET AL   3,257,258
APPARATUS FOR MANUFACTURING FRANGIBLE CLOSURES FOR CONTAINERS
Filed Nov. 24, 1961   40 Sheets-Sheet 36

INVENTORS
ANGELO RALPH D'ANDREA, JAMES J. WALSH
& JOHN K. BROWNING, deceased
By SUSAN JANE BROWNING, administratrix

*Shoemaker and Mattare*
ATTORNEYS

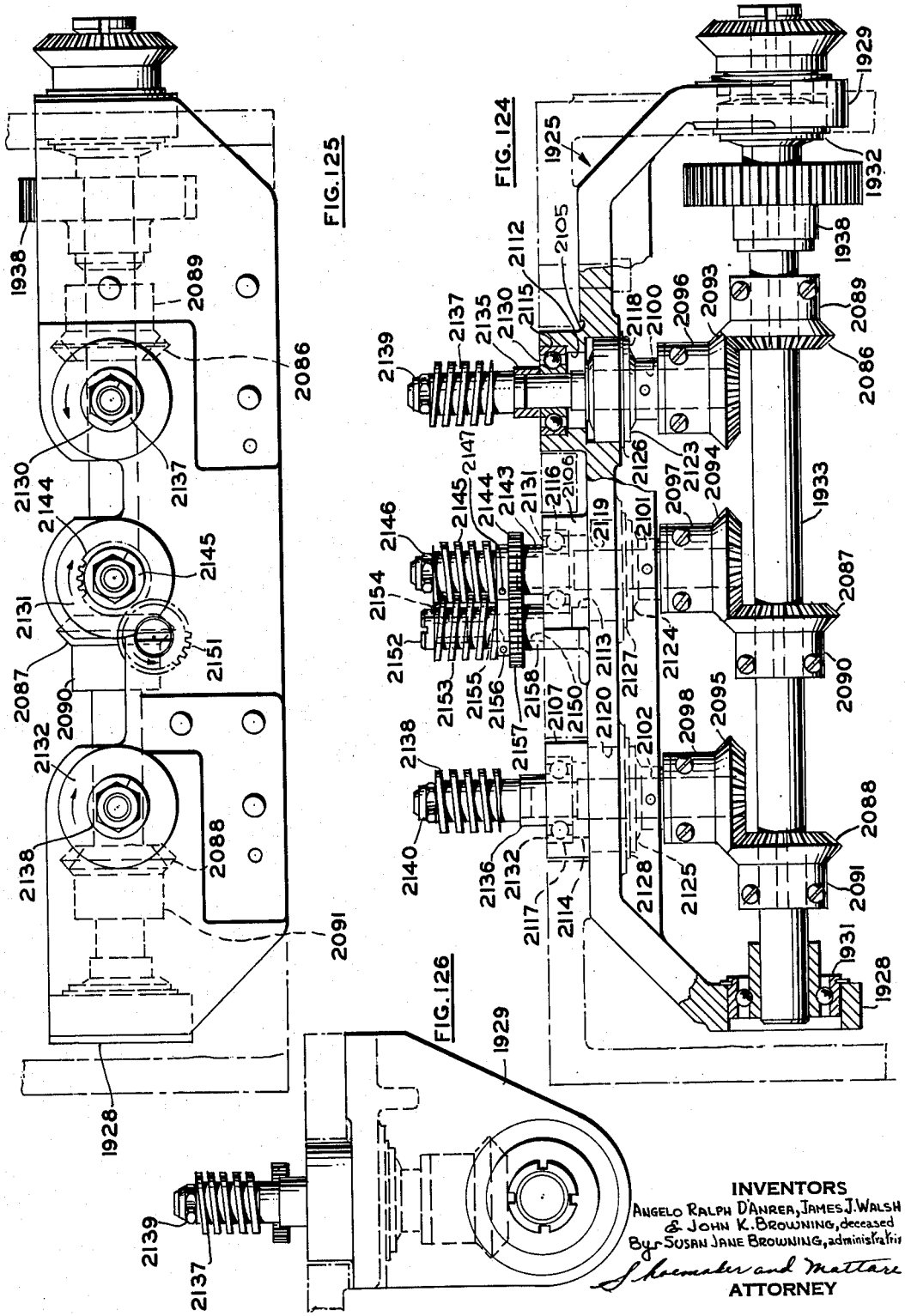

June 21, 1966    A. R. D'ANDREA ETAL    3,257,258
APPARATUS FOR MANUFACTURING FRANGIBLE CLOSURES FOR CONTAINERS
Filed Nov. 24, 1961    40 Sheets-Sheet 40
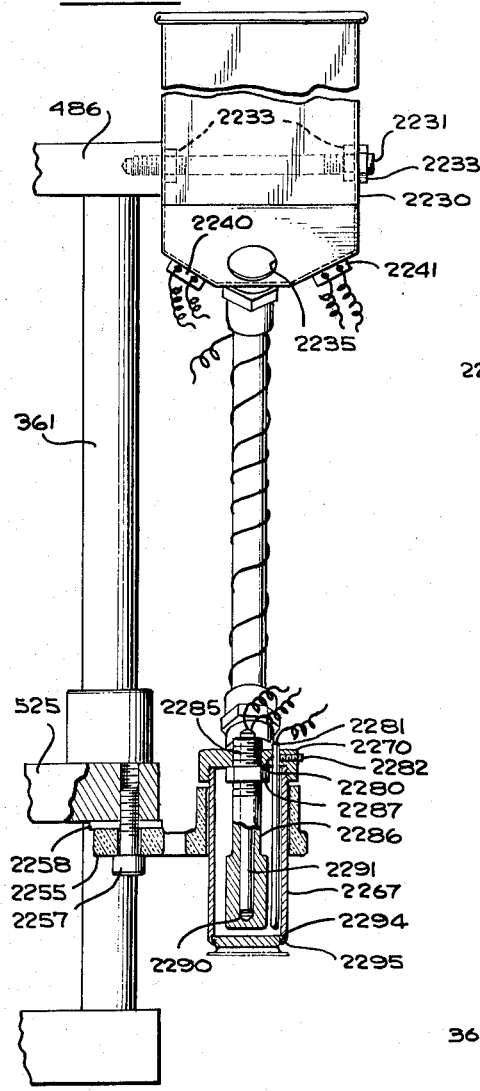
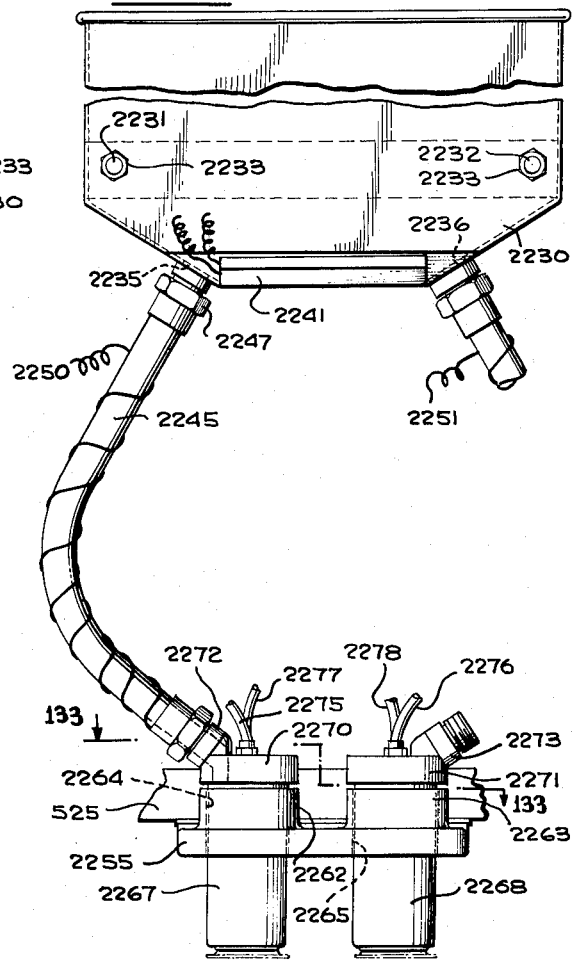
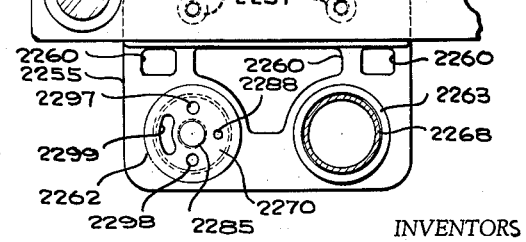
INVENTORS
ANGELO RALPH D'ANDREA, JAMES J. WALSH
JOHN K. BROWNING, deceased
By Susan Jane Browning, administratix
BY *Shoemaker and Mattare*
ATTORNEYS

United States Patent Office 3,257,258
Patented June 21, 1966

3,257,258
APPARATUS FOR MANUFACTURING FRANGIBLE CLOSURES FOR CONTAINERS
Angelo Ralph D'Andrea, 6357 Green St., Philadelphia, Pa.; James J. Walsh, 321 Casino Ave., Cranford, N.J.; and John K. Browning, deceased, late of Cincinnati, Ohio, by Susan Jane Browning, administratrix, 880 Phillips Road, Cincinnati, Ohio
Filed Nov. 24, 1961, Ser. No. 156,188
28 Claims. (Cl. 156—521)

The present invention relates to a machine for manufacturing frangible closures for containers, and more particularly to the manufacture of closures for containers, the closures including portions adapted to be manually removed without the necessity of utilizing separate implements for opening the container.

For many years, foodstuffs have been marketed in rigid containers formed of sheet metal, aluminum, paperboard with a metal or like foil on the inner walls and/or the outer walls, or such similar material, these containers generally being referred to as cans, and such cans have generally employed permanent wall portions at the sides and ends thereof which necessitate the utilization of some sort of mechanical device for puncturing or tearing the walls in order to gain access to the interior of the container for removing the contents thereof.

Can openers of various forms have been utilized for this purpose and are generally recognized as being undesirable since they require a considerable physical effort to operate, sometimes produce rough and jagged edges in the metal and the dropping off of metal dust or particles into the contents of the can due to cutting the metal during opening, and furthermore, such openers may not always be readily available. It is accordingly desirable to provide containers wherein a closure is provided of such a nature that it can be readily manually removed without utilizing any sort of opening implement, and wherein a portion of the closure can be manually grasped by human fingers to remove a certain portion of the closure without requiring an excessive amount of physical exertion.

The present invention relates to the manufacture of such a closure adaptable for application to the hereinbefore mentioned types of containers and other such containers wherein a non-frangible member which is exposed to the exterior of the container is provided with a removable portion, and an underlying layer of a relatively thin frangible material of plastic, metal or any other suitable material is disposed adjacent to the non-frangible exterior member. Means is provided for readily tearing the underlying layer of frangible material, and this layer of frangible material is permanently secured to the removable portion of the non-frangible member such that upon removal of the removable portion, the portion of the frangible material secured to this removable portion will also be simultaneously removed thereby enabling the formation of a relatively smooth and neat opening in the container through which the contents may be removed.

In the method of the present invention, a first blank of non-frangible material is provided with a removable portion and a manually graspable portion to be gripped by the fingers of one's hand. A second blank is formed of a frangible material and the first and second blanks are then secured to one another in operative relationship as discussed above.

In the method disclosed herein, the can end blank includes a base portion, and peripheral areas of this base portion are cut, scored or otherwise weakened at predetermined places so as to provide a readily removable portion. An intermediate portion of this base portion is also cut so as to provide a manually graspable tab for gripping by one's fingers. An adhesive substance is then applied to a part of the base portion of the can end blank.

In forming the second blank of frangible material, a sheet of material is provided, and a portion of this sheet is cut out. This cutout portion is then formed into a particular configuration such that the blank of frangible material is adapted to fit about the base portion of the blank of non-frangible material. The second blank is then placed on the base portion of the first blank and pressure is applied to the blanks to urge them toward one another to ensure that a secure and permanent bond is obtained between the two blanks through the inermediary of the adhesive substance or other such permanent bonding of the two blanks. Many obvious variations and modifications of these method steps for obtaining the same desired end result will become apparent as hereinafter set forth.

The machine of the present invention is particularly designed to carry out the various method steps in an automatic manner and employs a unique combination of novel mechanisms for accomplishing the desired end result.

The machine incorporates means for feeding the can end blanks through the machine in succession, the can end blanks being intermittently fed from one station to another. The feed means is so designed that the can end blanks are brought to rest at certain predetermined positions or stations in the machine in order that certain operations may be carried out at such positions.

The various operations of embossing ribs, cutting and forming a tab and cutting a periphery of a can end blank could, of course, be carried out separately, but in the interest of efficiency, compound die means is provided for substantially simultaneously performing these various functions on each can end blank to thereby reduce the number of operations involved.

In order to ensure that the portion of the layer of frangible material underlying the removable portion of the non-frangible portion of the closure means will be removed along with the removable portion, it is important to ensure that this portion of the layer of frangible material is securely bonded to the removable portion. Adhesive applying mechanism is accordingly provided for applying an adhesive substance to one of the blanks and pressing mechanism is provided for applying pressure to the can end blank and frangible material blank to ensure that the adhesive is uniformly distributed and that a good bond is obtained between the two contacting blanks.

A sheet feed system is provided for feeding the very thin strip of flexible and frangible material intermittently through the machine, and this system poses a particularly perplexing problem since it is difficult to effectively feed such a strip of material without tearing or otherwise damaging or distorting the material which, of course, would destroy the effectiveness of the closure.

The sheet feed system is therefore of a unique construction and employs several cooperating mechanisms which serve to effectively feed such a sheet of material in an efficient manner without damaging the material. The sheet feed system includes in general a spindle means for supporting a reel of material, driving roller means for feeding the sheet of material therethrough, a reciprocating and oscillating sheet feed means for advancing the sheet in step-by-step fashion, and a take-up mechanism for the scrap skeleton.

The spindle means includes means for rotatably supporting a reel of flexible and frangible material, and means is provided for selectively releasing the reel or locking the reel in operative position on the spindle means. The roller means is adapted to engage opposite faces of the strip of frangible material for feeding the strip between the rollers, and the driving rollers include means for ensuring that the sheet remains in a central position between the rollers. This is an important consideration since such a sheet of material often tends to move toward one end or the other of the rollers thereby impairing the function of the driving rollers.

The sheet feed means includes members adapted to grip the side edge portions of the sheet to advance the sheet intermittenty such that the sheet comes to rest periodically to permit pieces of the sheet to be punched out.

A photoelectric control means is associated with the driving means for the driving rollers for maintaining a loop of material of desired size between the driving rollers and the sheet feed means of the sheet feed system.

Die mechanism is provided for cutting out the pieces of frangible material, and this die mechanism incorporates fluid pressure means for assisting in removing the punched-out pieces from the punch members of the die mechanism.

A turret mechanism is utilized for transferring cutout pieces of frangible material to a forming means whereat the pieces of frangible material are formed into a particular configuration, and the turret mechanism then serves to further transfer these formed frangible material blanks into such a position that they may be disposed in contact with a can end blank. This turret mechanism includes chuck mechanisms incorporating means for holding the pieces of frangible material in place while the frangible material is being transferred and operated upon, these chuck mechanisms being further so constructed as to cooperate with the forming means to provide the finished configuration to the blanks of frangible material.

The forming means incorporated in the machine of the present invention cooperates with the outer end portions of the chuck mechanisms to form the frangible material blanks.

Slide rail mechanism of a novel construction is provided for supporting and guiding the can end blanks from one station of the machine while permitting a portion of the slide rail mechanism to alternately move toward and away from this station, thereby permitting transfer of the finished closures from the second shuttle bar means of the machine to the second chain conveyor means of the machine while constantly guiding and supporting the closures as will hereinafter fully appear.

An object of the present invention is to provide a new and novel method of manufacturing frangible closures for containers.

Another object of the invention is to provide a new and novel machine for manufacturing frangible closures for containers.

A further object of the invention is to provide a novel method of forming a first blank of non-frangible material with a removable portion and a manually graspable portion for gripping by one's fingers.

A still further object of the invention is to provide a novel method of securing a first blank of non-frangible material and a second blank of frangible material in operative relationship with respect to one another.

Another object of the invention is to provide a machine for manufacturing frangible closures for containers including means for advancing can end blanks through the machine and including means for intermittently advancing the can end blanks from station to station in the machine.

A further object of the invention is to provide a machine for manufacturing frangible closures for containers including compound die means for substantially simultaneously performing the functions of embossing ribs, cutting and forming a tab, and cutting or weakening the periphery of the base portion of a can end blank.

Another object of the invention is to provide a machine for manufacturing frangible closures for containers including adhesive applying mechanism for applying a uniform coating of adhesive substance to a portion of one of the blanks passing through the machine.

A further object of the invention is to provide a machine including pressing mechanism to ensure a good bond between the can end blank and the blank of frangible material.

Another object of the invention is to provide a machine for manufacturing frangible closures for containers including a sheet feed system suitable for efficiently feeding a very thin strip of frangible and flexible material intermittently through the machine.

A further object of the invention is to provide a machine for manufacturing frangible closures for containers including novel spindle means for rotatably supporting a reel of flexible material and incorporating means for selectively releasing the reel or locking the reel in operative position.

Another object of the invention is to provide a machine for manufacturing frangible closures for containers including driving roller means for feeding a sheet of material therethrough and including means for ensuring that the sheet remains in a centered position between the rollers.

A further object of the invention is to provide a machine for manufacturing frangible closures for containers including sheet feed means for advancing a sheet of flexible material in step-by-step fashion through the machine.

Another object of the invention is to provide a machine for manufacturing frangible closures for containers including die mechanism for cutting out pieces of material from the sheet of frangible material and including means for assisting in removing the cutout pieces from the punches of such die mechanism.

A further object of the invention is to provide a machine for manufacturing frangible closures for containers including turret mechanism for transferring pieces of frangible material to a forming means and thence to a position adjacent a can end blank and including chuck mechanisms for assisting in the formation of the formed blanks of frangible material.

Another object of the invention is to provide a machine for manufacturing frangible closures for containers including forming means to provide a finished configuration to the pieces of frangible material to provide formed frangible material blanks.

A further object of the invention is to provide a machine for manufacturing frangible closures for containers including slide rail mechanism adapted to engage a finished closure at one machine station and serve as a substantially continuous guiding and support means for the finished closures in their movement while permitting a portion of the slide rail mechanism to alternately move toward and away from said station.

Other objects and many attendant advantages of the invention will become more apparent when considered in connection with the specification and accompanying drawings, wherein:

FIG. 6 is a top view of a can end blank after it has been embossed with suitable instructions at station III of the apparatus;

FIG. 7 is a cross-sectional view taken along line 7—7 of FIG. 6 looking in the direction of the arrows;

FIG. 8 is a bottom view of a can end blank after the ribs have been embossed, the periphery has been cut, and the tab has been cut and formed, all of the operations occurring at station IV of the apparatus;

FIG. 9 is another bottom view of the can end blank after the application of adhesive thereto intermediate stations V and VI of the apparatus;

FIG. 10 illustrates the can end blank and the formed foil blank, the arrow indicating the manner in which the foil blank is adapted to be placed in superposed relationship to the can end blank;

FIG. 11 is a top perspective view of the finished closure after the application of pressure to the foil blank to bond it to the can end blank at station IX;

FIG. 12 is a cross-sectional view of the finished closure shown in the FIG. 11, FIG. 12 being taken along the center line of the tab portion of the closure;

FIG. 13 is a schematic flow diagram illustrating the various steps in the method of the present invention and also indicating the various stations of the apparatus for carrying out the invention;

FIG. 14 is a front elevation of the entire machine with certain portions of the sheet feed mechanism broken away for the sake of clarity;

FIG. 17 is an enlarged view partly in section illustrating the main driving shaft 172 and the components mounted thereon;

FIG. 23 is a broken away view partly in section illustrating the driving means for the elevating means associated with the first shuttle bar means;

FIG. 24 is a top view partly broken away of the elevating slide block of the first shuttle bar means;

FIG. 25 is a sectional view taken substantially along line 25—25 of FIG. 26 looking in the direction of the arrows;

FIG. 26 is a top view of the first shuttle bar means;

FIG. 27 is a view taken substantially along line 27—27 of FIG. 26 looking in the direction of the arrows;

FIG. 28 is a sectional view taken along line 28—28 of FIG. 26 looking in the direction of the arrows;

FIG. 29 is a sectional view taken substantially along line 29—29 of FIG. 26 looking in the direction of the arrows;

FIG. 30 is a sectional view taken substantially along the line 30—30 of FIG. 17 looking in the direction of the arrows with the cam follower mechanism removed;

FIG. 31 is a sectional view taken substantially along line 31—31 of FIG. 22 looking in the direction of the arrows;

FIG. 32 is a sectional view taken substantially along line 32—32 of FIG. 31 looking in the direction of the arrows, the lower embossing and compound die members being shown and the elevating slide member being removed;

FIG. 37 is a top view of the pressure pad member incorporated in the male die of the compound die;

FIG. 38 is a front view of the pressure pad member shown in FIG. 37;

FIG. 39 is a top view of a spring plate mounted in the lower die plate of the can end blank die mechanism;

FIG. 40 is a bottom view of the pressure pad member of the female die of the compound die;

FIG. 41 is a sectional view taken substantially along line 41—41 of FIG. 40 looking in the direction of the arrows;

FIG. 42 is a side elevation of a cutting and support member 638 of the female die of the compound die;

FIG. 43 is a bottom view of the cutting and support member shown in FIG. 42;

FIG. 44 is a sectional view through the closed die set of the compound die with the lower die plate removed and with the punch member shown revolved for the sake of illustration;

FIG. 45 is a broken-away sectional view taken substantially along line 45—45 of FIG. 51 looking in the direction of the arrows;

FIG. 46 is a top view of the second shuttle bar means;

FIG. 47 is a sectional view taken substantially along line 47—47 of FIG. 46 looking in the direction of the arrows;

FIG. 48 is a sectional view taken substantially along line 48—48 of FIG. 46 looking in the direction of the arrows;

FIG. 49 is a sectional view taken substantially along line 49—49 of FIG. 46, looking in the direction of the arrows;

FIG. 50 is a sectional view taken substantially along line 50—50 of FIG. 46 looking in the direction of the arrows;

FIG. 52 is a view partially broken away and partly in section illustrating the driving means for the shuttle bar means;

FIG. 53 is a sectional view taken substantially along line 53—53 of FIG. 51 looking in the direction of the arrows; and FIG. 53a is a side view of the structure as shown in FIG. 53;

FIG. 54 is a front view of the positioning means for stations V and VI;

FIG. 55 is a top view of the apparatus shown in FIG. 54;

FIG. 56 is a side view of the apparatus shown in FIG. 54;

FIG. 57 is a top view partially broken away and partly in section illustrating the operating means for the positioning means at stations V and VI and also the aligning means at station VII;

FIG. 58 is an end view partially broken away of the structure shown in FIG. 57;

FIG. 59 is a sectional view taken substantially along the line 59—59 of FIG. 17 looking in the direction of the arrows with cam follower removed;

FIG. 60 is a sectional view taken substantially along the line 60—60 of FIG. 15 looking in the direction of the arrows and illustrating the adhesive applying mechanism;

FIG. 61 is a sectional view taken substantially along line 61—61 of FIG. 51 looking in the direction of the arrows and illustrating the aligning means at station VII;

FIG. 62 is a view partially in section and partially broken away illustrating the actuating means for the aligning means at station VII;

FIG. 63 is a top view of the apparatus shown in FIG. 62, and looking down substantially along line 63—63 with certain components of the apparatus removed;

FIG. 64 is a sectional view taken substantially along line 64—64 of FIG. 17 looking in the direction of the arrows with the cam follower removed;

FIG. 65 is a somewhat schematic illustration of the over-all sheet feed system of the present invention;

FIG. 66 is a top view partially broken away of the supporting rotatable spindle and drive rollers of the sheet feed system;

FIG. 67 is a view partially broken away and in section illustrating the base support for the rotatable spindle and drive roller structure of the sheet feed system;

FIG. 68 is a side elevation of the upper part of the supporting structure for the rotatable spindle and driving rollers of the sheet feed system and also illustrates in a partially broken away portion the photoelectric cell supporting bracket;

FIG. 69 is a side view of the structure shown in FIG. 68 with the driving rollers shown;

FIG. 70 is an end view of the rotatable spindle illustrating the latching mechanism for retaining the reel thereon;

FIG. 71 is a sectional view taken substantially along line 71—71 of FIG. 70 looking in the direction of the arrows;

FIG. 72 is a sectional view taken substantially along lines 72—72 of FIG. 66 looking in the direction of the arrows;

FIG. 75 is a side view of the apparatus as shown in FIG. 74 as seen along the line 75—75 looking in the direction of the arrows and illustrates the means for reciprocating the sheet feed mechanism, the turret mechanism being removed for the sake of illustration;

FIG. 76 is an enlarged elevation of the support and gripper means of the first sheet feed modification;

FIG. 77 is a top view of the apparatus shown in FIG. 76;

FIG. 78 is an end view of the apparatus shown in FIG. 76;

FIG. 79 is a top view of the sliding block of the assembly shown in FIG. 77;

FIG. 80 is an end view of the sliding block shown in FIG. 79;

FIG. 81 is a sectional view taken substantially along line 81—81 of FIG. 77 looking in the direction of the arrows;

FIG. 82 is an elevation of the pressure bar means shown in FIGS. 76 and 77;

FIG. 83 is a sectional view taken substantially along line 83—83 of FIG. 77 looking in the direction of the arrows;

FIG. 84 is a top view of the bottom plate of the apparatus shown in FIG. 76 and FIG. 77;

FIG. 85 is a front view of the turret mechanism with the overlying frangible material die means, the sheet feed mechanism being removed and certain portions of the structure broken away for the purpose of illustration;

FIG. 88 is a sectional view taken substantially along the line 88—88 of FIG. 85 looking in the direction of the arrows;

FIG. 89 is a top view of the second sheet feed modification with the underlying die rings 1405 and 1406 shown in phantom to illustrate the orientation of the feed mechanism;

FIG. 90 is a sectional view taken substantially along line 90—90 of FIG. 89 looking in the direction of the arrows;

FIG. 91 is a top view of an underlying plate member of the apparatus shown in FIG. 89;

FIG. 92 is a side view of a modified form of frangible material die mechanism;

FIG. 93 is a top view of the modified die mechanism shown in FIG. 92;

FIG. 94 is a sectional view taken substantially along line 94—94 of FIG. 93 looking in the direction of the arrows;

FIG. 95 is a sectional view taken substantially along the line 95—95 of FIG. 94 looking in the direction of the arrows;

FIG. 96 is a side elevation of a third form of sheet feed mechanism;

FIG. 97 is an end view of the apparatus shown in FIG. 96;

FIG. 98 is a top view of the apparatus shown in FIG. 96 partially broken away for the purpose of illustration;

FIG. 99 is a sectional view taken substantially along line 99—99 of FIG. 96;

FIG. 100 is a view of a portion of the structure shown in FIG. 96 illustrating the block member in elevated position and spaced from the associated carriage;

FIG. 101 is a sectional view taken substantially along line 101—101 of FIG. 88 looking in the direction of the arrows;

FIG. 102 is a top view illustrating the outer portion of one of the chuck mechanisms supported within the turret;

FIG. 103 is a sectional view taken substantially along line 103—103 of FIG. 102 looking in the direction of the arrows;

FIG. 104 is a sectional view taken substantially along the line 104—104 of FIG. 102 looking in the direction of the arrows;

FIG. 105 is a sectional view taken substantially along line 105—105 of FIG. 104 looking in the direction of the arrows;

FIG. 106 is a view illustrating the cam for producing reciprocation of the chuck mechanisms within the turret mechanism;

FIG. 107 is a view taken substantially along line 107—107 of FIG. 73 looking in the direction of the arrows;

FIG. 108 is a side elevation of the forwardmost portion of the machine adjacent the stacking end portion thereof, certain components being broken away for the sake of clarity;

FIG. 109 is a top view of the portion of the apparatus shown in FIG. 108, the frangible material pressing mechanism having been removed for the sake of clarity;

FIG. 110 is a view of the forward end of the machine with certain portions broken away for the purpose of illustration;

FIG. 111 is an elevation of the frangible material pressing and locator mechanism for station member VIII;

FIG. 112 is a top view of the structure shown in FIG. 111 with the locator mechanism removed;

FIG. 113 is a side view of the structure shown in FIG. 111 and partially in section to illustrate the details of construction;

FIG. 114 is a side view of a portion of the structure shown in FIG. 110 with the stacking mechanism removed;

FIG. 115 is a top view showing a portion of the driving means for the frangible material pressing mechanism;

FIG. 116 is a sectional view taken substantially along line 116—116 of FIG. 115 looking in the direction of the arrows;

FIG. 117 is a top view of the driving mechanism for the second chain conveyor means;

FIG. 118 is a view taken along line 118—118 of FIG. 117 looking in the direction of the arrows;

FIG. 119 is a top view of a casting at the forward end of the machine illustrating the clearance cutouts formed therethrough;

FIG. 124 is an elevation of the driving means for the stacking mechanism partially broken away to illustrate certain details of construction and with the stacking blocks removed;

FIG. 125 is a top view of the structure shown in FIG. 124;

FIG. 126 is an end view of the structure shown in FIG. 124;

FIG. 131 is a view partly in longitudinal section illustrating a modified form of adhesive applying mechanism;

FIG. 132 is a side view of the structure shown in FIG. 131; and

FIG. 133 is a view taken substantially along line 133—133 of FIG. 132 looking in the direction of the arrows with certain components removed for the sake of clarity.

Figure 1:
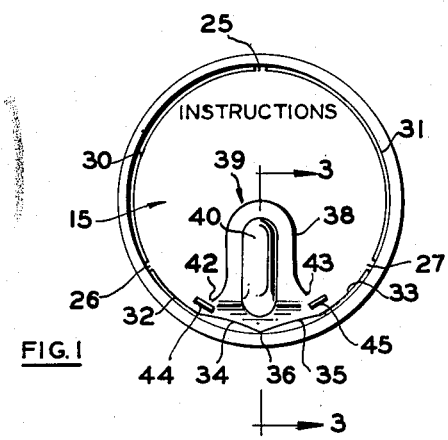
FIG. 1 is a top view of a container employing the novel closure means manufactured according to the present invention.
Figure 2:
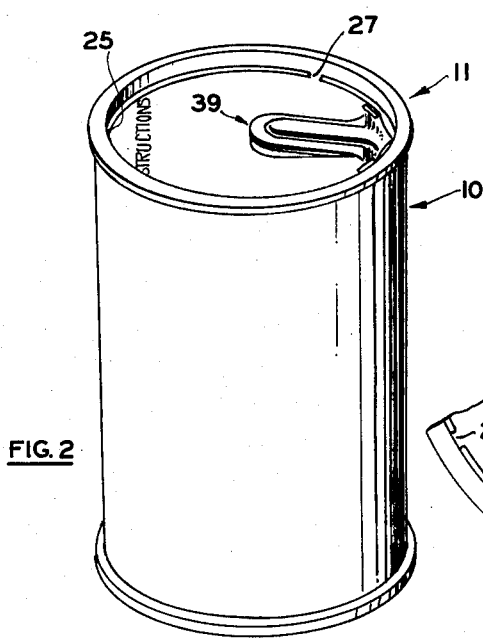
FIG. 2 is a top perspective view of the container shown in FIG. 1.
Figure 4:
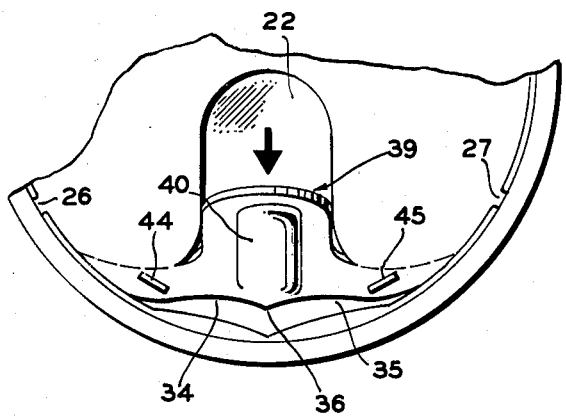
FIG. 4 is an enlarged top view of a portion of the container shown in FIG. 1, with the tab portion of the top closure lifted into its up position.

Referring now to the drawings wherein like reference characters designate corresponding parts throughout the several views, there is shown in FIGS. 1 and 2 a container incorporating the closure according to the present invention. The container shown is of the hermetically sealed type generally employed for preserving and storing foodstuffs and the like. This type of container is generally of metallic construction and includes a main body 10 and a closure 11 disposed at one end thereof. The opposite end of the body may be closed by conventional means while the closure 11 is of a new and novel construction. As shown, the main body 10 of the container is of substantially cylindrical configuration while the closure 11 is substantially disc-like in shape.

Figure 3:
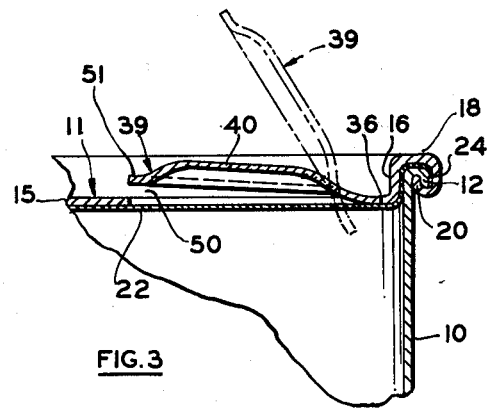
FIG. 3 is a cut-away enlarged sectional view taken along line 3—3 of FIG. 1 looking in the direction of the arrows.

As seen particularly in FIG. 3, the main body portion 10 which may be formed of aluminum or other suitable light-weight yet rigid material such as plastic or the like is provided with a turned-over outwardly extending bead 12 of conventional construction at the open upper end thereof.

The closure 11 as seen in FIG. 3 includes a central substantially flat circular base portion 15 having an upwardly extending annular flange 16 at the outer periphery thereof, flange 16 in turn being joined with an outwardly extending channel portion 18 which extends around the bead formed at the upper end of the body with the outermost terminal portion 20 of the channel portion being rolled into and clamped under the bead 12 formed on the main body.

A thin layer of frangible material 22 is adhesively secured to the under surface of the closure; and as seen in FIG. 3, this thin layer 22 extends completely across the central base portion of the closure and extends upwardly between the flange portion 16 and the interior of the main body portion and thence outwardly between the channel portion 18 and the bead on the main body, the outermost peripheral portion of layer 22 terminating along a line indicated by reference numeral 24 on the outer surface of the bead 12.

A suitable sealing compound is provided within the channel portion of the closure prior to its insertion on the main body of the can such that when the outer periphery of the closure is rolled into the clamped position as shown in FIG. 3, this sealing compound will serve to fill any voids adjacent the outer peripheral portions of the closure and the bead.

Since the closure of the present invention is particularly suitable for use with containers identified as cans in the industry, the terminology of this application will comprise that as commonly employed in the can art for the purpose of illustration. The portions 15 and 16, 18 and 20 as seen in FIG. 3 are all parts of an integral member which may be identified as a can end which is manufactured from a can end blank as hereinafter explained. The can end is formed of a suitable non-frangible material, and for example may comprise aluminum, plastic and similar substances. The material of layer 22 must be frangible or capable of being readily torn, and at the same time should have a high degree of strength when in its operative position as shown. In addition, the material of layer 22 should have a good shelf life and should be non-toxic to humans. Layer 22 may preferably comprise aluminum foil or thin gauge plastic and the like.

As seen particularly in FIG. 1, the main base portion 15 of closure 11 is connected to the flange portion 16 thereof by three equally angularly spaced tie point portions 25, 26 and 27 which comprise original portions of the can end blank. The peripheral portions of the base portion of the closure has been sheared or completely cut through between the tie point portions such that the base portion 15 is supported solely by the tie point portions from the flange 16.

Base portion 15 has been cut between tie point portions 25 and 26 along a cut line indicated by reference numeral 30 which the base portion has also been cut between tie point portions 25 and 27 along a cut line 31. Base portion 15 has also been cut between tie point portions 26 and 27 along cut lines 32, 33, 34 and 35. It will be noted that cut lines 34 and 35 are arcuate and extend in toward the central part of the base portion, the two arcuate cut lines 34 and 35 intersecting one another at a point 36. Point 36 comprises a lancing point the purpose of which will hereinafter appear.

Base portion 15 has also been cut along a cut line 38 to define a tab indicated generally by reference numeral 39. It will be noted that tab 39 is of generally U-shaped configuration and a drawn rib 40 is formed along the center line of the tab. Rib 40 is provided to increase the structural rigidity of the tab 39.

Cut line 38 terminates at its opposite ends at points 42 and 43. Spaced from these terminal ends of cut line 38 are a pair of reinforcing ribs 44 and 45. These reinforcing ribs are embossed in the material of the base portion 15 and are provided for the purpose of interrupting a tear which may start from either of the terminal ends 42 or 43 of the cut line 38. In this manner, a tear line is prevented from extending to the periphery of the base portion thereby preventing either side of the tab from tearing completely away from the base portion.

As seen in FIG. 3, the tab 39 extends upwardly out of the plane of the base portion 15 thereby defining a small space 50 under which a person may insert his fingernail for gripping and lifting the tab. When it is desired to open the container, the rear portion 51 of the tabl is lifted. This causes the entire tab to fulcrum about a line passing approximately through the reinforcing ribs 44 and 45 into the phantom line position as shown in FIG. 3. As the tab is thus pivoted into the phantom line position, the lancing point 36 thereof will move downwardly in an arc. As the lancing point moves downwardly, it lances the underlying layer of frangible material 22. Once the layer 22 has been torn by the lancing point 36, it is relatively easy to tear the remaining portions of the foil.

After the lifting tab has been lifted to the phantom line position shown in FIG. 3, the tab is pulled away from the main body of the container so as to pull the base portion 15 completely out of the container by breaking the base portion 15 away from the flange portion 16 at the tie point portions 25, 26 and 27. It will be apparent that since tie point portions 25, 26 and 27 are of relatively small dimension, they may be easily torn by pulling on the tab.

Since the layer 22 of frangible material is adhesively secured to the under surface of the base portion 15, the layer 22 will also be removed along with base portion 15. Layer 22 will be torn along the edges of the flange portion 16 of the closure defined by the cut lines formed between the flange portion 16 and the base portion 15 of the closure.

Figure 5:
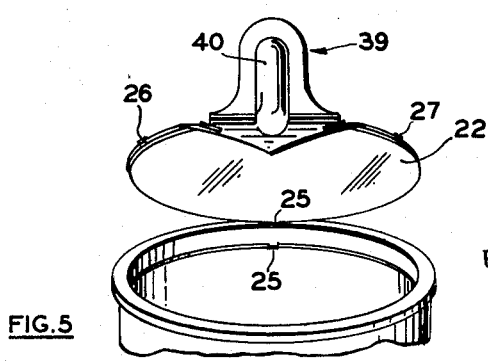
FIG. 5 is a broken-away top perspective view illustrating the manner in which the closure of the present invention is adapted to be completely removed from the associated container.

Referring now to FIG. 5, the base portion of the closure is shown immediately subsequent to being separated from the remainder of the closure. It will be noted that the layer 22 of frangible material is retained on the under surface of the base portion 15 and that the layer 22 will be neatly severed by the relatively sharp edges of the flnage portion 16. It will be noted that layer 22 is of course not bonded to the under surface of the tab portion which extends upwardly out of the plane of the remainder of the base portion 15 as seen in FIG. 3. Nevertheless, the entire central portion of layer 22 will be removed when the base portion 15 is torn away from the rest of the closure. It should also be understood that it is not necessary to remove the entire base portion of the can end blank, and in some instances, particularly where a flowable material is stored within the container, only a minor portion of the base portion need be removed, and for example, such minor portion may take the shape of a segment of a circle. This latter type of arragement is shown in copending patent application Ser. No. 81,445, filed Jan. 9, 1961, now U.S. Patent No. 3,089,609. In addition, it should be noted that the layer of frangible material is permanently secured only to the removable portion of the can end blank.

Referring now to FIGS. 6–12, the various steps involved in the method of manufacture of the closure according to the present invention will be more clearly understood. Firstly, a can end blank of conventional construction is provided. The can end blank is here given the reference numeral 55 and includes the central base portion 56, an annular flange portion 57, and the channel portion 58 extends outwardly from flange portion 57. Channel portion 58 terminates in its outermost peripheral portion in what is genrally termed the "curl" 59. An annular layer 60 of suitable sealing compound such as plastic or the like is disposed in channel portion 58. Base portion 56 and flange portion 57 define a countersink indicated generally by reference numeral 62, and this portion of the blank will be hereinafter referred to as the countersink.

FIG. 6 illustrates the first operation which is performed upon the can end blank. Firstly, suitable instructions as indicated by reference numeral 65 are embossed or debossed in the material of the base portion 56. These instructions may of course be of any suitable nature, and are embossed or debossed in the material by use of conventional dies as generally employed for this purpose. These dies may of course be operated either manually or in an automatic machine as hereinafter disclosed.

Referring now to FIG. 8, the next further method is illustrated wherein the central base portion of the blank is sheared and embossed to provide the cut lines 67, 68, 69, 70, 71, 72 and 73 as well as the embossed reinforcing ribs 74 and 75 and the drawn central reinforcing rib 76. The operations as illustrated as performed in FIG. 8 are preferably accomplished by means of a single stroke of a compound die in the machine hereinafter disclosed. However, it should also be understood that the various shearing, embossing and drawing steps could be carried out separately if desired either manually or with specially designed tools.

Referring now to FIG. 9, the next subsequent step of the method is illustrated wherein adhesive is applied to the inner surface of the base portion of the blank. The area upon which the adhesive is applied is shaded in FIG. 9, and it will be noted that the adhesive covers the entire under surface of the base portion with the exception of the under surface of the tab portion indicated by reference numeral 78. The adhesive employed in the present invention must have a high peel strength, should be non-toxic to humans, and should have a good shelf life. A resin base adhesive is a typical example of an adhesive which meets these requirements.

The adhesive may be applied to the under surface of the blank in a number of different manners. For example, the adhesive may be sprayed on, brushed on, or rolled on. The adhesive obviously may be applied manually if desired, or more preferably in an automatic manner as hereinafter disclosed.

As mentioned previously, various materials may be employed for the layer of frangible material of the closure. For simplicity of explanation, the material will hereinafter be referred to as foil, it being understood that other equivalent materials may also be utilized.

Referring now to FIG. 10, subsequent steps of the method are indicated. A foil blank 80 is formed by firstly cutting it out of a suitable sheet of stock and then shaping it into the substantially cup-shaped configuration shown in FIG. 10. It will be noted that the finally shaped foil blank as seen in FIG. 10 includes a base portion 81, a depending annular flange portion 82 and an outwardly extending peripheral flange portion 83.

Subsequent to forming the foil blank as seen in FIG. 10, the formed foil blank and can end blank may be suitably juxtaposed by placing the formed foil blank on the can end blank as indicated by the arrow in FIG. 10. It will be seen that a cavity 85 is defined in the under surface of the foil blank, and this cavity is of such a dimension that it is adapted to snugly receive the base portion 56 and annular flange portion 57 of the can end blank. Accordingly, the foil blank may be fitted over the can end blank such that the depending flange portion 82 is disposed in surrounding relation to the flange portion 57 of the can end blank with the lower peripheral flange portion 83 of the foil blank disposed within the channel portion 58 of the can end blank. The aforedescribed position of the foil blank on the can end blank is illustrated in FIGS. 11 and 12.

Here again it is evident that the foil blank may be manually placed in position on the can end blank, or may be automatically applied thereto as hereinafter disclosed.

It should also be noted that the foil blank 80 can of course be cut from stock and shaped into its finished form either by successive manual operations or by automatic machinery as hereinafter set forth.

Subsequent to juxtaposing the foil blank and the can end blank, pressure is applied so as to force the foil blank and the can end blank together thereby ensuring that the foil blank is firmly bonded to the base portion 56 of the can end blank along those portions of the can end blank to which the adhesive has been applied. In addition, pressure is applied to the peripheral flange portion 83 of the foil blank so as to force this peripheral flange portion down into the annular layer 60 of sealing compound disposed within the channel portion 58 of the can end blank. Pressure as discussed above is applied to the foil blank by means of a suitable pressing die and the pressure may of course be applied either manually or automatically.

At this point in the process, the closure has been completely manufactured. The closure may then be superimposed over the open end of a conventional can and the outermost curl portion of the closure can then be turned over and clamped into position relative to the bead of a can body in a well-known manner.

While the instructions formed on the can end blank have been described as being embossed or debossed therein, it should be understood that these instructions may as well be printed directly upon the material of the can end blank or alternatively a separate sheet of instructions formed on a piece of paper or the like may be adhesively secured to the base portion 56 of the can end blank.

When employing a light-weight relatively thin gauge material such as aluminum for the can end top, it is considered that the rib 76 as seen in FIG. 8 is necessary to provide the required degree of rigidity. On the other hand, if a heavier gauge aluminum or a material such as steel is employed in the can end blank, it may be possible to eliminate the reinforcing rib 76. It should also be understood that in place of the integral drawn rib 76, a separate reinforcing member may be suitably secured to the tab if desired.

Reinforcing ribs 74 and 75 which are designed to retard tearing out of the tab have been illustrated as formed by embossing. Other means such as punch slots may also be formed in the position of embossed rib 74 and 75 for accomplishing the same results.

The peripheral portions of the base portion of the can end blank have been shown as being completely cut through along lines 67–72 as seen in FIG. 8 to leave the three tie point portions 90, 91 and 92. Instead of entirely cutting through the material of the base portion along the cut lines as seen in FIG. 8, it is also contemplated that the peripheral edge of the base portion may be scored all the way around substantially along the same lines as the cut line shown in FIG. 8 leaving no tie points. With this arrangement, the base portion is secured to the flange portion 57 all the way around but along weakened lines such that when it is desired to open the container, the tab may be lifted and the entire base portion pulled away from its flange portion along the weakened score lines.

The can end blank as seen in FIGS. 6 and 7 is a readily obtainable commercial item. Accordingly, it is felt that the most economically feasible method of carrying out the present invention is to perform the operations as discussed above upon a conventional can end blank as now known. On the other hand, it is also quite possible that the can end blank may be formed and the operations as illustrated as completed in FIG. 8 may also be carried out substantially simultaneously in a compound die. This would, of course, eliminate the necessity of separately forming the can end blank and then subsequently forming the can end blank into the shape as seen in FIG. 8.

The adhesive has been shown as being applied to the under surface of the base portion of the can end blank. It should also be understood that the adhesive could as well be applied to the under surface of the base portion 81 of the foil blank as seen in FIG. 10 prior to the placing of the blank 80 over the can end blank. As a further modification, the under surface of the blank 80 as seen in FIG. 10 may be precoated during manufacture of the layer of material with a suitable thermo-plastic adhesive. In the latter case, the overlying blank 80 may be subjected to heat so as to cause the adhesive coated on the under surface thereof to melt and provide a good bond between the two blanks.

In certain instances, the nature of the material of the second blank 80 as seen in FIG. 10 may be such that the requirement for the application of a separate adhesive is eliminated. For example, the second blank may be formed of plastic or similar material which may be heated after the second blank has been placed on the first blank and thereby becomes firmly bonded to the first blank. When the two blanks are each formed of metallic material, it is also possible that they may be pressure welded together after having been placed together so as to provide the desired bond therebetween.

As discussed in connection with FIG. 10, the second blank 80 is preformed prior to being associated to the can end blank. It is also possible that the second blank may be formed into the desired configuration as shown in FIG. 10 by first superimposing a substantially disc-shaped layer of frangible material directly on the can end blank; and then using the can end blank as a male portion of the die, a female die may be employed for pressing the layer of material over the can end blank so as to form the disc-shaped blank into the desired configuration.

It is apparent that the method as described hereinbefore may be carried out with various forms of apparatus and many of the method steps may be carried out manually if desired. A preferred form of apparatus for manufacturing the novel closure of the present invention will now be described.

Referring now to FIG. 13 of the drawings, a flow diagram is illustrated wherein various stations of the apparatus have been given Roman numerals I through X and the operation performed by the apparatus at these various stations has been schematically illustrated.

Station I represents the can end blank feed. At this station, a stack of can end blanks is illustrated schematically by reference numeral 100. It will be understood that these can end blanks are of the construction as previously described in connection with FIGS. 6 and 7. It will be noted that the can end blanks are stacked in such a manner that the countersink portions thereof face downwardly while the base portions thereof are uppermost.

The lowermost blanks of the stack of blanks 100 are fed to the right by suitable conveying means hereinafter disclosed. The lowermost blank is first fed as indicated by the arrow to station II wherein a can end blank is indicated by reference numeral 101. At station II the can end blank remains at a particular position for a predetermined time with no work being done thereon, and accordingly this is referred to as idling.

The can end blank is then transferred to station III. At station III, a female die 103 and a male die 104 cooperate with one another to emboss instructions in the can end blank. After this embossing operation, the blank is then transferred to the right as indicated by the arrow to station IV. At station IV, a male die 105 and a female die 106 cooperate with one another to emboss the ribs in the base portion, cut the periphery of the base portion and cut and form the tab in the base portion.

The can end blank 101 is then moved to station V which is another idling station. The can end blank remains at rest at station V for a portion of cycle of operation of the machine, and then during the remainder of the cycle of operation it is transferred to station VI.

During the movement of the can end blank 101 from station V to station VI, the can end blank passes beneath an adhesive applying mechanism indicated generally by 108. As the can end blank passes beneath mechanism 108, an adhesive substance is applied to the upwardly facing surface of the base portion 56 of the can end blank. Upon arrival at station VI, the upper surface of the can end blank will have the appearance as shown in FIG. 9 wherein the shaded area indicates the adhesive applied thereto.

At station VI, the can end blank comes to rest for a complete cycle of the machine and accordingly this is a true idling station.

The can end blank is then moved again to the right as indicated by the arrow until it arrives at station VII. The can end blank is accurately positioned at station VII by means of a locating plunger 110 which moves upwardly into the downwardly facing countersink of the can end blank. At station VII, the second or foil blank is also cut from a suitable sheet of material and is then formed into the cup-shaped configuration as discussed in connection with FIG. 10. Also at station VII, the shaped foil blank 111 is placed on the can end blank as discussed previously.

The nested can end blank and foil blank are then moved to the right as indicated by the arrow to station VIII which is another idling station where the nested blanks remain for a major portion of the cycle of the machine, and during the remainder of the cycle of the machine, the nested blanks are moved further to station IX.

At station IX, the nested blanks come to rest on a suitable supporting surface 114, and a combined locater and pressing punch 115 moves downwardly to press the foil blank toward the can end blank to firmly secure the two blanks together as previously described.

The nested blanks as now securely bonded to one another are then moved to the right as shown by the arrow to station X. At station X, the finished closures are stacked vertically, with each newly arriving closure being placed at the bottom of the stack and suitable automatic mechanism serves to move the closures of the stack in an upward direction. The stack of finished closures is indicated generally by reference numeral 117 at station 10.

FIG. 13 illustrates in a schematic manner the various stations of the apparatus, and for convenience and clarity, these stations will be referred to throughout the detailed description of the apparatus to simplify identification of different portions of the machine. A detailed description of the structure of the apparatus follows:

*Base support means*

Figure 15:
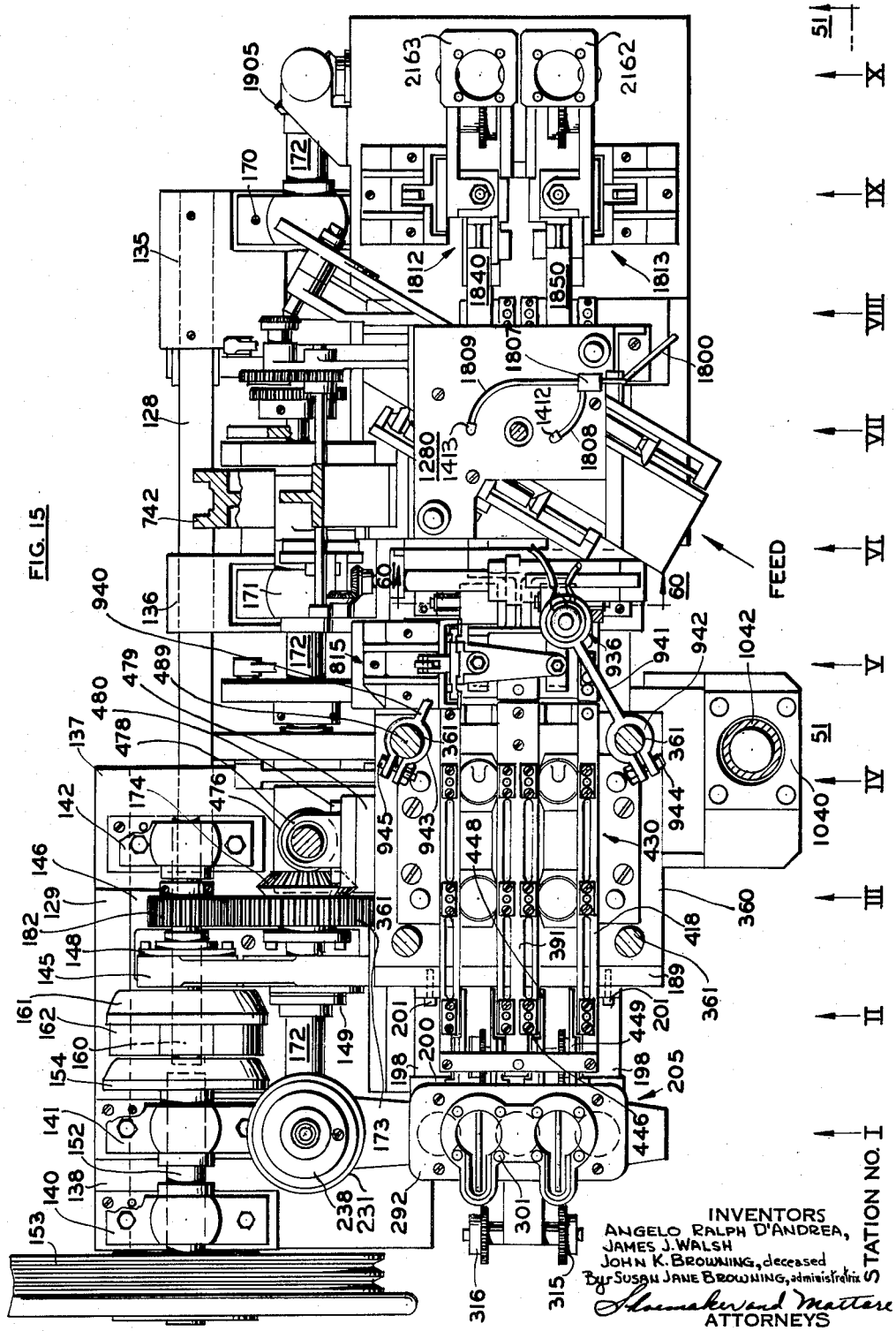
FIG. 15 is a top view of the entire apparatus with the upper portion of the can end blank mechanism removed, a portion of the foil feed mechanism removed, the actuating means for the foil die mechanisms removed, and certain other portions broken away for the sake of clarity.

Referring to FIGS. 14 and 15, the base support means may comprise any suitable supporting structure, and in the illustrated example includes a plurality of upstanding leg portions 120, 121 and 122. Cross beams 123, 124 and 125 are supported from the upstanding leg portions and in turn support longitudinally extending beams 126, 127 and 128 and 129.

As seen in FIG. 14, beam 126 is disposed in spanning relationship over cross beams 124 and 125. Beam 127 extends in spanning relationship between cross beams 123 and 124. Beam 128 extends in spanning relationship between cross beams 124 and 125, while beam 129 similar to beam 127 is disposed in spanning relationship between cross beams 123 and 124.

Suitable cross brace angles 130, 131 and 132 are provided between the upstanding leg portions 120, 121 and 122 and the longitudinally extending beams were necessary to provide the desired degree of structural strength and rigidity.

A pair of spaced supporting plates 135 and 136 extend in spanning relationship between longitudinally extending beams 126 and 128. A third supporting plate 137 extends in spanning relationship to all of the longitudinally extending beams 126–129. A fourth supporting plate 138 extends in spanning relationship to longitudinally extending beams 127 and 129.

As seen particularly in FIG. 15, a pair of spaced pillow block bearings 140 and 141 are mounted on plate 138. A further spaced pillow block bearing 142 is mounted upon plate 137. A support casting 145 is mounted on a plate 146 which is disposed in spanning relationship with the under portions of plate 137 and plate 138 and is suitably supported therefrom. Support casting 145 includes a pair of flange bearings 148 and 149.

*Driving means*

A drive shaft 152 is rotatably supported within pillow block bearings 140 and 141. A fly wheel 153 is fixed to one end of driving shaft 152, and a clutch driving member 154 is fixed to the opposite end of the driving shaft. As seen in FIG. 14, a suitable electric driving motor 156 is provided and is drivingly connected with fly wheel 153 through a conventional V-belt driving connection 157.

Referring again to FIG. 15, a driven shaft 160 is rotatably supported within bearings 142 and 148. The driven shaft 160 extends through the central portion of a fixed brake member 161 which is supported from the support casting 145.

A clutch and brake coupling member 162 is slidably keyed to the outer end of a driven shaft 160 and is movable between a driving position wherein it is coupled to the fixed brake member 161. Members 154, 161 and 162 comprise members of a conventional electro-magnetic clutch and brake assembly which may be selectively operated in a conventional manner to either drivingly connect the driven shaft 160 to the drive shaft 152 or to connect the driven shaft 160 to the fixed brake member 161.

A pillow block bearing 170 is mounted upon support plate 135 and a spaced pillow block bearing 171 is mounted upon support plate 136, these two spaced bearings cooperating with the flange bearing 149 in the support casting 145 to rotatably support a main shaft 172. As seen in FIG. 17, a spur gear 173 is fitted about a miter gear 174 having a tapered bore formed therethrough. The spur gear 173 also has a tapered bore formed therethrough which is complementary with the tapered bore formed in the miter gear such that a split tapered draw bushing 175 may be received within the tapered bores of the two gears. A first plurality of cap screws 177 are provided for securing the spur gear to the miter gear, and a second plurality of cap screws 178 are provided for drawing the draw bushing into the tapered bores. The draw bushing is split longitudinally thereof so that it can be drawn into position and thereby clamp tightly on the shaft, there being a key 179 provided for the purpose of drivingly connecting the draw bushing with the shaft 172.

Referring again to FIG. 15, a spur gear 182 is drivingly connected with the driven shaft 160, this spur gear being in meshing engagement with the spur gear 173 secured to main shaft 172. It is accordingly apparent that when the driven shaft 160 is drivingly connected with the driving mechanism of the apparatus, the main shaft 172 will be continuously rotated. Each rotation of the main shaft 172 through 360 degrees produces a single cycle of operation of the apparatus.

Referring now to FIG. 14, a main base casting 185 is mounted on the support structure and includes opposite end walls 186 and 187, a bottom wall 188 and a stepped top wall 189. The bottom wall 188 of casting 185 is supported upon supporting plates 135 and 137, the base casting being secured in fixed relationship on the supporting framework by means of cap screws 190 and 191.

An intermediate wall 194 extends between the top and bottom walls and is substantially parallel with the rear and front walls 186 and 187 respectively. A wall 195 extends longitudinally of the apparatus in substantially perpendicular relationship to the walls 186, 187 and 194.

A support bracket 198 is provided with a rear attaching flange 199 and a forward attaching flange 200. Rear attaching flange 199 is secured to the front wall 187 of the main casting by means of cap screws 201.

Can end blank feed means

Figure 18:
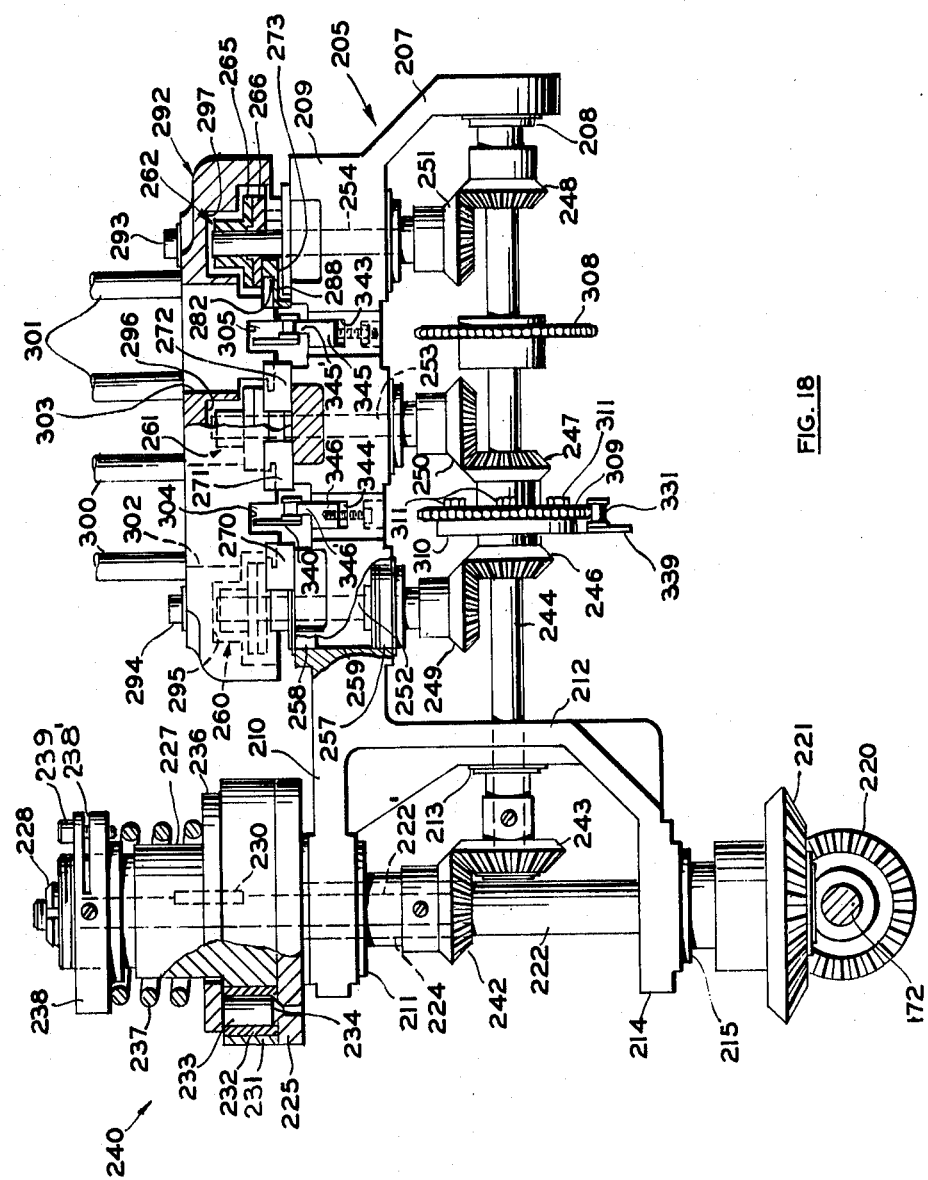
FIG. 18 is an end view partly in section and partially broken away illustrating the can end blank feed mechanism.

A feed support casting 205 is provided with an attaching flange 206 which is secured to the attaching flange 200 of support bracket 198 by means of cap screws 207. As seen in FIG. 18, the feed support casting 205 includes a main body portion 209 and a depending arm 207 extending downwardly therefrom at one end thereof and having a bearing 208 mounted therein. An arm 210 extends laterally from the opposite end of the main body portion 209 of the feed support casting and has a bearing 211 mounted therein. A depending arm 212 extending from the same end of the casting as arm 210 has a bearing 213 mounted therein. The lower end portion 214 of arm 212 extends laterally in substantial parallel relationship with arm 210 and has a bearing 215 mounted therein which is aligned with bearing 211.

A bevel gear 220 is fixed to the outer end of main shaft 172 and as seen in FIG. 18, bevel gear 220 is in meshing engagement with a bevel gear 221 which is fixed to the lower end of a shaft 222. Shaft 222 includes an upwardly extending reduced portion 222' which extends through a bore extending longitudinally through a tubular member 224 which includes a radially extending flange portion 225 at the upper end thereof.

The reduced portion 222' of shaft 222 extends further through a central bore formed in a driving clutch member 227, the upper end of the reduced portion 222' of the shaft being threaded and receiving a lock nut 228 which is drawn up tight against the upper end of driving clutch member 227 for holding the clutch assembly in assembled relationship.

Driving clutch member 227 is connected to the reduced portion 222' of shaft 222 for rotation therewith by means of a key 230, the driving clutch member being rotatable with respect to the flange portion 225 of tubular member 224 which in turn is freely rotatable with respect to shaft 222.

Driving clutch member 227 is provided with a plurality of angularly spaced bores which extend longitudinally therethrough, these bores being formed in the radially outwardly extending portion 231 of the driving clutch member. A suitable hardened bushing 232 is disposed within each of these bores, and each of these bushings slidably receives a pin member 233 which is slidably disposed within the bushing and which includes a lower tapered end portion 234 which is received within a complementary tapered socket formed in the upper surface of the radially extending flange portion 225 of tubular member 224.

A plate 236 bears against the upper ends of the sliding pin members 233, the plate being urged normally in a downward direction as seen in FIG. 18 by a coil compression spring 237 the upper end of which is seated against an adjusting nut 238. Adjusting nut 238 is in turn threaded upon the threaded upper end of the driving clutch member 227.

Members 227 and 225 comprise respectively the driving and driven members of an overload release clutch which is indicated generally by reference numeral 240. It will be apparent that during operation, the drive will be normally transmitted through the pin members 233 from member 227 to the flange portion 225 of tubular member 224. If overload conditions should occur, the tapered surface at the lower portion of the pin members will cooperate with tapered sockets in portion 225 to cause the pin members to be cammed longitudinally away from the driven flange portion 225 such that the pin members will move out of the sockets and thereby release the driving connection between members 227 and 224. The amount of force required to cam the pin members out of driving relationship is governed by the amount of force applied by spring 237 which is in turn controlled by adjustment of the adjusting nut 238.

Adjusting nut 238 may be moved to any desired position for controlling the amount of force maintaining the driving connection in the overload release clutch 240. Adjusting nut 238 has a radially extending slot 238' formed through a minor portion thereof, and a cap screw 239 is utilized for drawing the two portions above and below this slot as seen in FIG. 18 toward one another to effectively lock the adjusting nut in a particular adjusted position.

A miter gear 242 is fixed to the lower end of tubular member 224 and is in meshing engagement with a miter gear 243 fixed to the outer end of a shaft 244 which is rotatably journalled in bearings 208 and 213.

Three spaced miter gears 246, 247 and 248 are fixed to shaft 244, these miter gears being in meshing engagement with miter gears 249, 250 and 251 fixed to the lower ends of shaft 252, 253 and 254 respectively. Each of shafts 252, 253 and 254 are rotatably journalled within a pair of spaced bearings mounted in suitable bores formed in the feed support casting. The support for each of the shafts is substantially identical, and as seen in a broken-away portion of FIG. 18, shaft 252 is rotatably supported within spaced bearings 257 and 258 which are mounted at opposite ends of a bore 259 formed in the feed support casting. It will be understood that shafts 253 and 254 are supported in a similar manner.

Can end blank separator mechanisms 260, 261 and 262 are fixed to the upper ends of shafts 252, 253 and 254 respectively. Each of these separator mechanisms is substantially similar in construction, and referring to separator mechanism 262, it will be seen that each of the separator mechanisms includes an upper member 265 and a lower member 266, these two members being keyed to one another and the associated shaft for rotation in unison. The upper member 265 includes knife edge portions which are adapted to move between portions of adjacent stacked can end blanks so as to separate the lowermost can end blank from those thereabove. After a single can end blank has been separated from the bottom of a stack by member 265, it is guided down into proper relationship with the remaining components of the apparatus by the lower member 266 of the separator mechanism.

It will be noted that miter gears 246–251 are so interrelated with one another that the two shafts 252 and 254 will rotate in the same direction while the intermediate shaft 253 will rotate in an opposite direction to shafts 252 and 254. The separator mechanism 260 and 262 are of identical construction while the construction of separator mechanism 261 is a mirror image of the other separator mechanisms.

Figure 128:
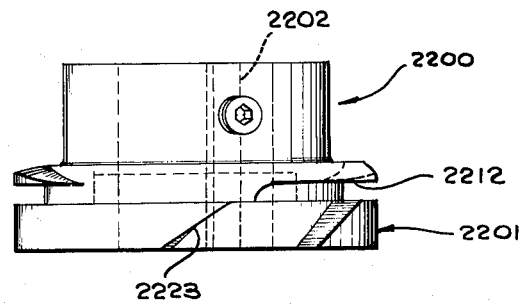
FIG. 128 is an elevation of one of the separator mechanisms according to the present invention.
Figure 129:
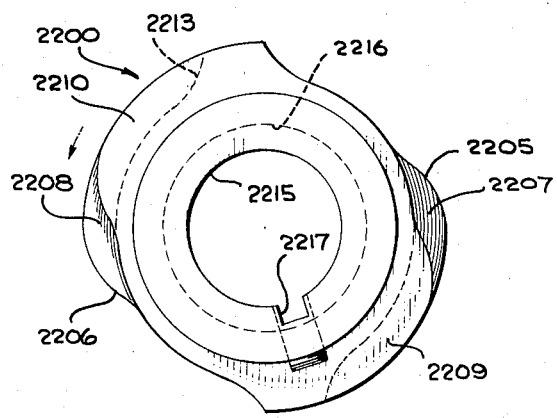
FIG. 129 is a top view of the keeper member of the separator mechanism shown in FIG. 128.
Figure 130:
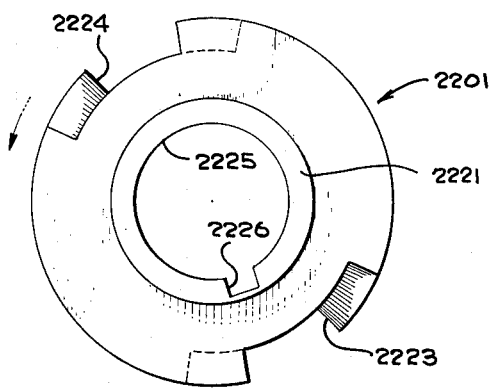
FIG. 130 is a top view of the lower member of the separator mechanism shown in FIG. 128.

Referring now to FIGS. 128–130, the construction of the upper and lower members of each of the separator mechanisms 260 and 262 may be more fully understood. As seen in FIG. 128, the upper member is indicated generally by reference numeral 2200, and the lower member is indicated generally by reference numerals 2201, these two members being keyed for rotation together and with the associated shaft by means of a vertically extending key member 2202 which fits within suitable grooves formed in the wall of the central bores extending through the upper and lower members as will hereinafter appear.

Referring to FIG. 129, a pair of diametrically opposite sharp separating edges 2205 and 2206 are formed on the upper member 2200, each of these sharp separating edges being adapted to move between the curl portions of the two lowermost superimposed can end blanks in the associated stack of associated blanks. Sharp separating edges 2205 and 2206 are joined with upwardly sloping surfaces 2207 and 2208 respectively which in turn fair into flat horizontally extending surfaces 2209 and 2210 respectively.

A pair of circumferentially extending cutout portions 2212 and 2213 are formed in the upper member 2200, these cutout portions extending from a point adjacent the associated sharp separating edges to a point spaced therefrom by an angle of approximately 90° with respect to the longitudinal axis of the upper member.

Upper member 2200 is provided with a central bore 2215, the upper member being counterbored at the lower portion thereof as indicated by reference numeral 2216. A vertically extending groove 2217 is provided in bore 2215 for receiving the key as aforementioned for drivingly interconnecting the upper and lower members with one another and with the associated driving shaft.

As seen in FIG. 128, lower member 2201 includes an enlarged lower portion 2220 and an upwardly extending portion 2221 of reduced dimension which fits within the counter bore formed in the lower portion of the upper member.

As seen particularly in FIG. 130, lower member 2201 is provided with a pair of diametrically opposite sloping guide slots 2223 and 2224, and as seen in FIG. 128, each of these sloping slots slopes from the upper portion thereof downwardly and rearwardly with respect to the direction of rotation as indicated by the arrow in FIG. 128.

Lower member 2201 has a central bore 2225 formed therethrough, and a vertically extending groove 2226 is formed in the wall of the bore for receiving the aforementioned key.

In operation, the sharp separating edges 2225 and 2226 will move between the lowermost can end blank and the can end blank thereabove in the associated stack whereupon further rotation of the separator mechanism will cause the entire stack above the lowermost can end blank to be cammed upwardly along the sloping surfaces 2207 or 2208 as the case may be, while the lowermost can end blank will move along the upper surface of the lower member 2220 until it reaches one of the sloping guide slots 2223 or 2224. Further rotation of the separator mechanism will cause the lowermost can end blank to slide downwardly along one of slots 2223 or 2224 until it reaches the lowermost portion of the slot and then drops downwardly onto suitable guide rails provided beneath the separator mechanisms.

The structure of the separator mechanisms is of a fairly conventional construction and the operation thereof will be well understood by one skilled in the art.

Four spaced guide rails 270, 271, 272 and 273 are provided, these guide rails being secured to the feed support casting by suitable cap screws. As seen in FIG. 18, guide rail 270 is disposed at one side of and beneath separator mechanism 260. The guide rails 271 and 272 are disposed at opposite sides of and beneath separator mechanism 261 and guide rail 273 is disposed at one side of and beneath separator mechanism 262.

Figure 20:
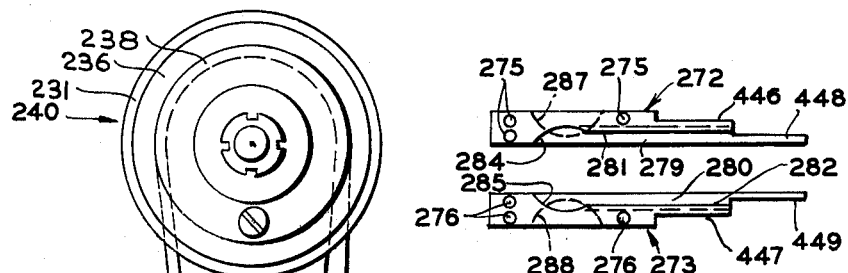
FIG. 20 is a top view illustrating the guide rails associated with the feed mechanism shown in FIG. 19.

Referring now to FIG. 20, guide rails 272 and 273 are shown in plan view. Openings 275 in guide rail 272 and openings 276 in guide rail 273 receive the aforementioned cap screws for securing the guide rails in place on the feed support casting. Guide rails 272 and 273 include can end blank support surfaces 279 and 280 respectively which extend longitudinally of the members. Overhanging lips 281 and 282 are formed on guide rails 272 and 273 respectively, these overhangingly lips extending along and over a portion of the supporting surfaces 279 and 280 and serving the purpose of preventing uplifting and tilting of the can end blanks as they move along the supporting surfaces 279 and 280 as hereinafter described.

Arcuate cut-out portions 284 and 285 are formed in the upper surfaces of guide rails 272 and 273 respectively, these arcuate cut-out portions being complementary to the configuration of the outer periphery of the can end blanks so as to permit the can end blanks to pass downwardly through these cut-out portions and to come to rest on the supporting surfaces 279 and 280. Clearance cut-out portions 287 and 288 are also formed in the lower or under surface of the guide rails for providing clearance with the flange of the adjacent bearings. As seen clearly in FIG. 18 at the righthand portion thereof, clearance cut-out portion 288 is spaced from the adjacent bearing which supports the upper end portion of shaft 254.

It will be noted from an inspection of FIG. 18 that guide rails 270 and 272 are of the same construction while guide rails 271 and 273 are of the same construction so as to properly receive and guide the can end blanks from the associated separator mechanisms.

A cover casting 292 is disposed over and in surrounding relationship to the separator mechanisms, the cover casting being held in place by a first pair of cap screws 293 disposed at one end thereof and a second pair of cap screws 294 disposed at the other end thereof, the cap screws being threaded into suitable openings provided in the feed support casting 205. The cover casting 292 is provided with three clearance bores 295, 296 and 297 which provide clearance between the cover casting and the associated separator mechanisms 260, 261 and 262.

Upwardly extending guide rods 300 and 301 have threads on the lower ends thereof which are threaded in suitable tapped openings provided in the cover casting 292. As seen especially in FIG. 19, four guide rods 300 are provided and four similar guide rods 301 are provided, each of these groups of rods being equally spaced from one another so as to define a space therebetween which is adapted to snugly receive the outer periphery of the can end blanks. It is accordingly apparent that a stack of can end blanks may be disposed within each of the groups of guide rods 300 and 301 whereby the guide rods will serve to maintain the can end blanks in alignment and to permit them to slide downwardly into the feed mechanism.

As seen in FIG. 18, a first bore 302 is provided immediately beneath guide rods 300 while a second bore 303 is provided immediately beneath guide rods 301, each of these bores 302 and 303 receiving the can end blanks and guiding them downwardly into operative relationship with the separator mechanisms disposed at the lower portions of the bores. A pair of clearance grooves 304 and 305 are formed through the lower surface of the cover casting numeral 292, the purpose of these clearance grooves appearing more clearly hereinafter.

*First chain conveyor means*

A first drive sprocket 308 is fixedly secured to shaft 244, and a second drive sprocket 309 is adjustably supported from a plate 310 which is also fixed to shaft 244. Sprocket 309 is provided with a plurality of spaced arcuate substantially circumferentially extending slots through which pass cap screws 311 which are threaded into suitable threaded openings provided in plate 310. With this arrangement, the position of sprocket 309 may be angularly adjusted with respect to plate 310 for accurately timing sprocket 309 with sprocket 308.

Figure 19:
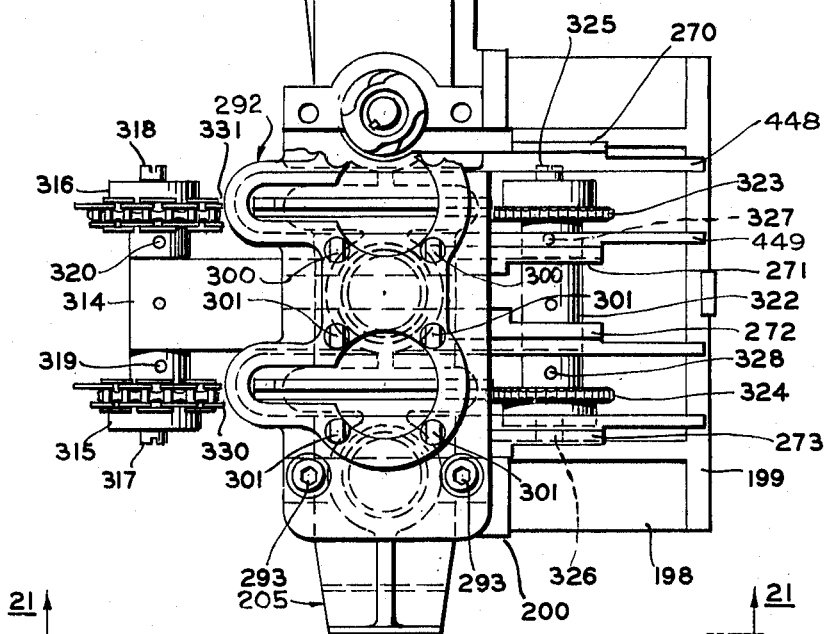
FIG. 19 is a top view of the apparatus shown in FIG. 18, the cover casting being partly broken away for illustrating the underlying separator mechanism.
Figure 21:
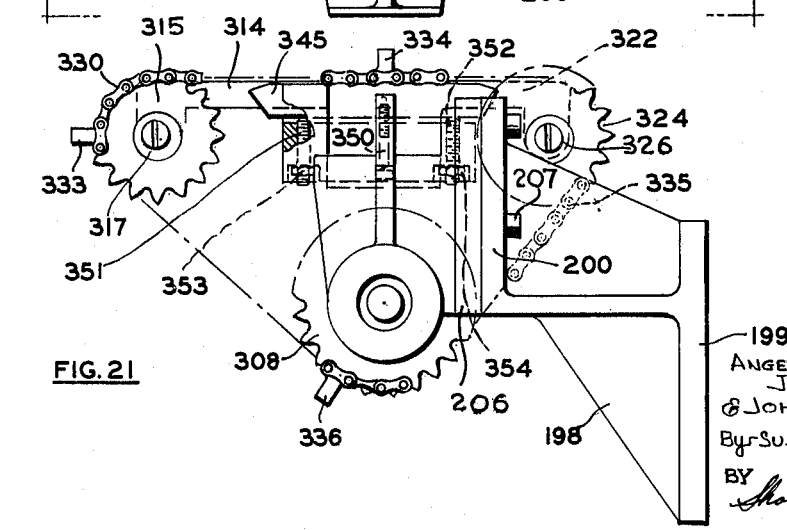
FIG. 21 is a front view partly in section of the apparatus shown in FIG. 19, the cover casting being removed, and certain portions being broken away for the sake of clarity.

Referring to FIGS. 19 and 21, an extension 314 is formed on the feed support casting 205 and extends rearwardly therefrom. A pair of idler sprockets 315 and 316 are rotatably mounted upon eccentric shafts 317 and 318 respectively which are fitted within extension 314. The eccentric shafts 317 and 318 are employed for adjusting the position of sprockets 315 and 316 for accurately positioning the fingers on a conveyor chain trained over the sprockets. Shafts 317 and 318 are retained in their desired adjusted position by means of a pair of set screws 319 and 320 respectively which are threaded through the extension 314 and engage the respective shafts.

An extension 322 is formed at the opposite side of the feed support casting from extension 314. A pair of idler sprockets 323 and 324 are supported upon a pair of eccentric shafts 325, 326 respectively which are fitted within an extension 322. Eccentric shafts 325 and 326 operate in a manner similar to eccentric shafts 317 and 318 for adjusting the position of the associated sprockets and accordingly adjusting the position of the associated chains trained thereover as hereinafter described. The position of eccentric shafts 325 and 326 may be selectively adjusted and then locked in place by means of set screws 327 and 328 which engage shafts 325 and 326 respectively.

A first conveyor chain 330 is trained over sprockets 308, 315 and 324, and a second conveyor chain 331 is trained over sprockets 309, 316 and 323. Each of these chains is provided with a plurality of spaced fingers which are adapted to engage can end blanks as the chains are moved along by the driving sprockets 308 and 309.

As seen in FIG. 21, four spaced fingers 333, 334, 335 and 336 are connected to chain 330. In a similar manner, four spaced fingers are connected to chain 331, two of these hook-like members 339 and 340 being visible in FIG. 18. It will be noted in FIG. 18 that the clearance grooves 304 and 305 are provided for the purpose of permitting fingers to pass through the cover casting as the chains are moved along during operation of the apparatus.

A pair of grooves 343 and 344 are formed through the feed support casting 205, and a pair of adjustable chain guide rails 345 and 346 are slip fitted within these grooves. The two last-mentioned rails including upwardly offset portions 345' and 346' respectively, the upper portions of which are engaged by the side plates of the chain and the offset portions also engage and support the under side of the chain rollers.

The adjustable chain guide rails 345 and 346 are of identical configuration, and it will be noted as seen in FIG. 21 that the opposite ends of the upper supporting surface thereof slope downwardly away from the intermediate portion thereof so as to assure that the chain will be smoothly guided onto and off of the supporting surface of the rails. Means are also provided for adjusting the position of the chain guide rails so as to accurately adjust the height of the fingers attached to the chains relative to the feed line of the machine which is in the plane of the supporting surface of the guide rails 270–273.

The mechanism for adjusting the position of chain guide rail 345 is seen in FIG. 21 and it will be understood that the mechanism for adjusting this guide rail 346 is of similar construction. A cap screw 350 extends through a suitable bore provided in the feed support casting and is threaded into a bore provided in the under surface of chain guide rail 345. A pair of set screws 351 and 352 are threaded through suitable threaded bores formed in the feed support casting and engage at their upper ends against the under surface of guide rail 345. The set screws are locked in operative position by lock nuts 353 and 354 respectively. It is apparent that by suitably adjusting cap screw 350 as well as set screws 351 and 352, guide rail 345 may be moved up and down or tilted within certain limits.

Figure 16:
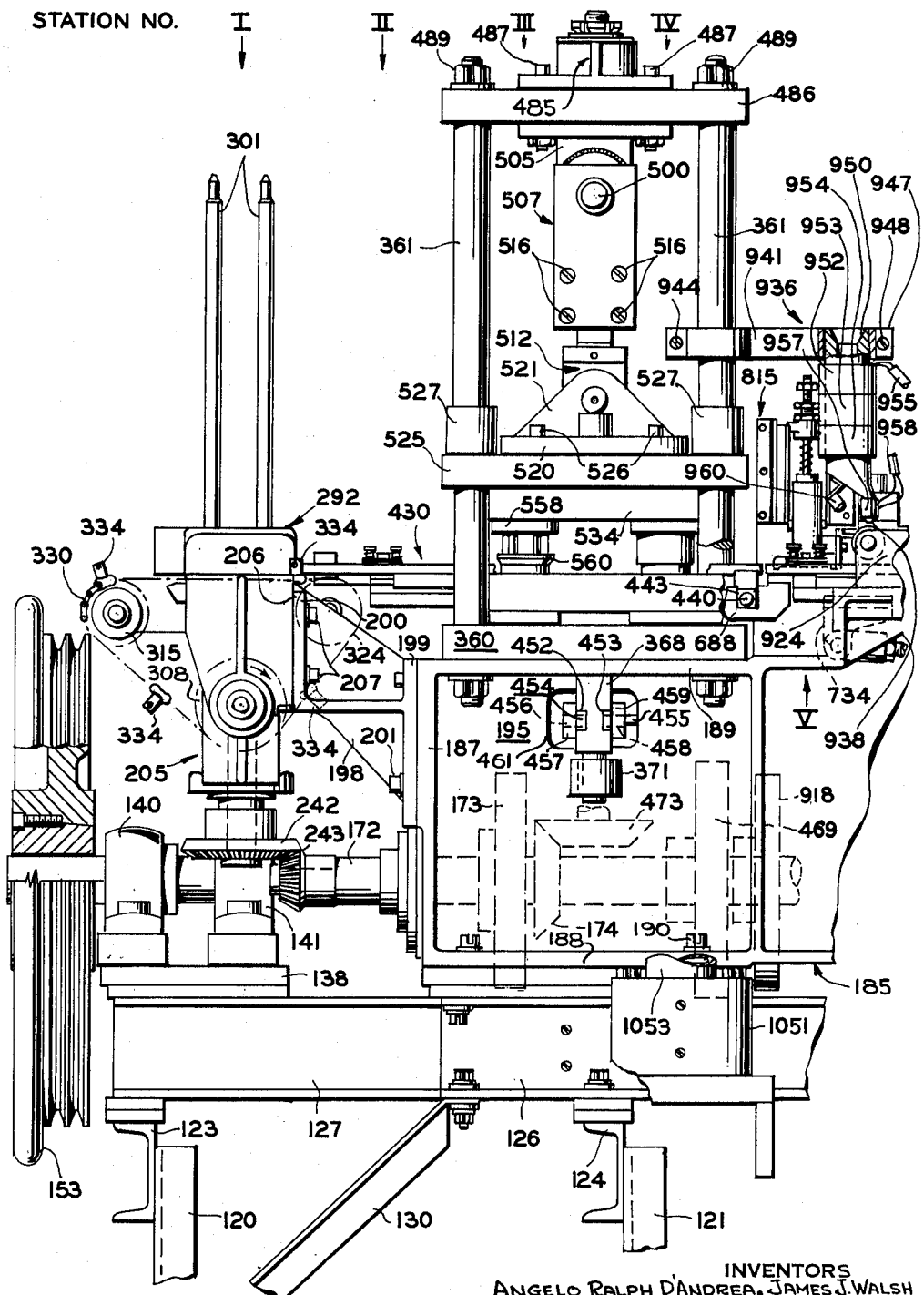
FIG. 16 is an enlarged broken away elevation partly in section of the lefthand portion of the machine as seen in FIG. 14, some of the components being shown in a somewhat schematic manner.
Figure 22:
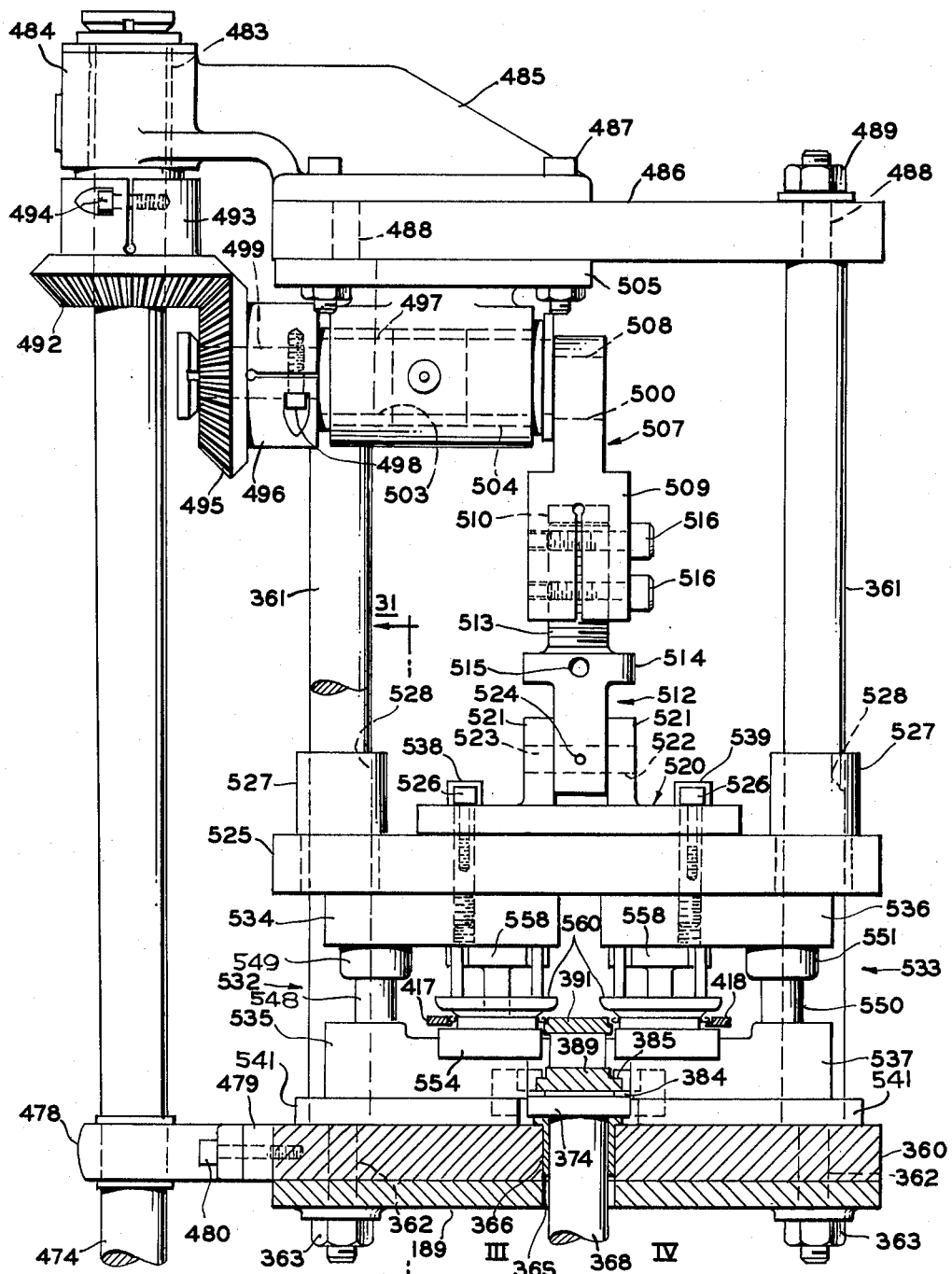
FIG. 22 is a broken away sectional view taken along line 22—22 of FIG. 14 looking in the direction of the arrows.

Referring now particularly to FIGS. 15, 16 and 22, a plate 360 is supported on the upper surface of the top wall 189 of the casting 185. Plate 360 is retained in operative position by four spaced guide posts 361, the reduced lower end portions 362 of which extend through aligned openings formed through plate 360 and the upper wall 189 of casting 185. The lowermost portions of the reduced end portions 362 of guide posts 361 are threaded and nuts 363 are threaded thereon for retaining the components in operative position.

Elevating means for first shuttle bar transfer means

As seen particularly in FIG. 22, a clearance bore 365 is formed through the upper wall 189 of the casting 185 and a bearing bushing 366 is fitted within an aligned bore formed through plate 360. An elevating shaft 368 has the upper portion thereof slidably received within bearing bushing 366, and as seen in FIG. 23, the lowermost portion of elevating shaft 368 is provided with a reduced end portion 369 which is slidably supported within a bearing bushing 360 mounted within a lug 361 formed integral with wall 195 of casting 185. The mechanism for reciprocating elevating shaft 368 in a vertical direction will be more fully hereinafter set forth.

The upper end of elevating shaft 368 includes a reduced portion 372 which is received within a bore formed in the central portion of an elevating support member 374 which is shown in plan view in FIG. 24. Support member 374 is suitably rigidly attached to the upper end of elevating shaft 368 as by welding or the like.

Elevating support member 374 includes an elongated central reduced portion and opposite enlarged end portions 377 and 378. End portion 377 is provided with raised edge portions 377' at opposite sides thereof while end portion 378 is provided with raised edge portions 378' at opposite sides thereof. End portion 378 is also provided with a slot 379 formed in the end thereof. End portion 377 has a plurality of openings 380 formed therethrough while end portion 378 has a plurality of openings 381 formed therethrough. These openings are provided for the purpose of securing suitable bearing members in position on the end portions of the elevating support member.

Referring now to FIG. 25, the bearing members mounted at end portion 377 of the elevating support member 374 are illustrated. A pair of spaced plates 384 are seated on the upper surface of end portion 377, and bearing members 385 are disposed in overlying relationssip to bearing members 384. It will be noted that bearing members 385 include overhanging lip portions which cooperate with the underlying plate members 384 to define channels therebetween for receiving a member hereinafter set forth. Bearing members 384 and 385 are held in operative position by means of cap screws 386 extending through aligned bores formed therein and in the support member 374 as set forth previously, namely openings 380 and 381.

First shuttle bar transfer means

A slide member 389 includes outwardly extending flanges formed along the longitudinally extending lower edges thereof which slidably fit within the channels defined between bearing members 384 and 385 such that the slide member 389 is mounted for sliding movement relative to the elevating support member 374 and is guided for such movement by the bearing members 384 and 385. A central double guide member 391 is supported in spaced relationship from slide member 389 by three spacing members 392, 393 and 394 as seen in FIG. 27. Flat head screws 395, 396 and 397 and suitable keys are employed for retaining members 389 and 391–394 in operative position. It will be noted as seen in FIG. 26 that spacing members 392 and 393 have a width slightly less than that of double guide member 391, while spacing member 394 includes portions which extend a substantial distance laterally of member 391. Spacing member 394 also includes a depending portion 399 which extends downwardly therefrom as seen in FIGS. 27 and 29.

Double guide member 391 comprises a substantially rectangular flat member having clearance cut-outs 400 and 401 formed on opposite sides thereof at the left end of the member as seen in FIG. 26. The opposite longitudinally extending upper edges of member 391 are cut away so as to provide support shoulders 404 and 405 extending along the longitudinal edges thereof. Longitudinally extending lightening slots 407 are formed in member 391 so as to reduce the weight thereof.

A key 410 formed on the upper surface of spacing member 394 fits within a complementary groove formed in the under surface of double guide member 391, and a cap screw 411 is disposed within suitable openings in members 394 and 391 to additionally clamp these two members together.

At the opposite end of double guide member 391, a key 413 is formed on the upper surface thereof which fits within a complementary groove formed in the under surface of a cross member 414. A nut and bolt assembly 415 extends through suitable openings provided in members 391, 392 and 414 for clamping these members together at this end of the mechanism.

A pair of guide members 417 and 418 extend between the end portions of cross member 414 and spacer member 394 as is clearly evident in FIG. 26. The opposite ends of guide member 417 are secured in place by means of nut and bolt assemblies 419 and 420, while the opposite end portions of guide member 418 are secured in position by nut and bolt assemblies 421 and 422. Guide member 417 is provided with a clearance cut-out 424 at the left end portion thereof as seen in FIG. 26, while guide member 418 is provided with a similar clearance cut-out 425, each of these clearance cut-outs facing inwardly toward one another as seen in FIG. 26. Guide members 417 and 418 are provided with longitudinally extending lightening slots 426 and 427 respectively for reducing the weight thereof.

The entire mechanism shown in FIGS. 26 and 27 may be identified as a shuttle bar transfer means, and has been given the general reference numeral 430. The purpose of this shuttle bar means is to pick up the can end blanks from the guide rails and the conveyor chains and fingers of the first chain conveyor means hereinbefore described. The vertical walls adjacent support shoulders 404 and 405 of the double guide member as well as the vertical walls adjacent similar support shoulders 431 and 432 formed along the upper longitudinal edges of guide members 417 and 418 respectively are accurately spaced from one another such that can end blanks are adapted to be snugly received on the pairs of shoulders 404, 431 and 405, 432. In order to retain the can end blanks in position on these shoulders during reciprocating movement of the shuttle transfer means, retaining clip means are provided for clamping the can end blanks in position on the shoulders.

It should first be understood that the depth of shoulders 404, 405, 431 and 432 is less than the depth of the curl formed on the can end blanks such that the retaining clip means hereinafter described is adapted to engage the upwardly facing surface of the curl of the individual can end blanks when the can end blanks are supported on the shoulders.

Three spaced retaining clip means are associated in overlying relationship with each of the shoulders formed on the guide members, these retaining clip means being of an identical construction, and accordingly a description of one of these retaining clip means will suffice for each of them. Referring to FIG. 28, the retaining clip means has been given the general reference numeral 434, and the retaining clip means associated with each of the guide members has accordingly been given the same reference numeral.

Each of the retaining clip means includes a pair of shoulder screws 435 which are threaded into suitably threaded openings formed in the associated guide member. A clip member 436 is associated with each of the pairs of shoulder screws 435, the clip member 436 having a pair of openings formed therein which slidably receive the unthreaded shank portion of the shoulder screws. It will be noted that the under surface of clip member 436 along the longitudinally extending opposite sides thereof is sloping. This sloping surface which overhangs the underlying shoulder which supports the can end blank serves to tend to cam the clip member upwardly when the can end blank is initially moved thereunder.

A coil compression spring 437 is associated with each of the shoulder screws and is seated between the upper surface of clip member 436 and the under surface of the enlarged heads on each of the shoulder screws, springs 437 normally urging the associated clip member in a downward direction as will be apparent. The construction is such that when a can end blank has been moved beneath a clip member, the clip member will exert continuous pressure on the upper surface of the curl portion of the blank so as to retain it in a fixed longitudinal relationship with respect to the supporting shoulders on the guide members.

As seen in FIGS. 27 and 29, a pin 440 extends through a suitable bore provided in the depending portion 399 of spacer member 394, the pin extending laterally outwardly on opposite sides of portion 399. The pin is retained in its operative relationship as shown by a locking member 442 which extends through aligned bores formed in the pin 440 and portion 399.

A pair of bearing members 443 and 444 formed of a suitable material such as bearing bronze each have a bore formed therethrough, this bore receiving opposite portions of pin 440 such that the bearing members are mounted on opposite ends of the pin. Bearing members 443 and 444 have a substantially rectangular configuration as can be seen most clearly in FIG. 16, the purpose of these bearing members being hereinafter fully explained.

Referring back to FIG. 20 of the drawings, it will be seen that guide rail members 272 and 273 include first portions 446 and 447 respectively of reduced width and further portions 448 and 449 respectively of still further reduced width.

As seen in FIG. 15 of the drawings, the shuttle bar means 430 is shown in one limit of movement all the way to the left as seen in this figure, and it will be noted that in this position, the portions 446 and 447 of guide rail members 272 and 273 are received within the clearance cut-outs 401 and 425 of guide members 391 and 418 respectively. In this manner, the shuttle transfer means is able to move sufficiently to the left as seen in FIG. 15 such that the left-hand-most retaining clip means is adapted to grip a can end blank supported on the upper supporting surface of the reduced portions 448 and 449 of the guide rail members. Subsequent movement of the shuttle bar means to the right will then move the gripped can end blank off the supporting surfaces of reduced portions 448 and 449. It will be noted as seen in FIG. 15 that the reduced portions 448 and 449 of the guide rails fit inwardly of the guide members of the shuttle bar means and in no way interfere with the reciprocatory movement of the shuttle bar means. It is of course evident that guide rails 270 and 271 cooperate with the adjacent portions of the shuttle bar means in the same manner.

*Operating means for elevating means*

Referring now to FIGS. 16 and 23, the means for operating the elevating shaft 368 may be seen. Slots 452 and 453 are formed in diametrically opposite portions of elevating shaft 368. These slots receive bearing blocks 454 and 455 respectively. Bearing block 454 is swivelly mounted upon a pin 456 mounted in an arm portion 457. Bearing block 455 is swivelly mounted upon a pin 458 supported in an arm portion 459. As seen particularly in FIG. 23, arm portions 457 and 459 form a bifurcated end of a lever 460 which extends through an opening 461 provided in the central wall 195 of casting 185. Lever 460 includes an intermediate hub portion 463 and a depending lever arm 464 having a cam follower 465 rotatably supported at the outer end thereof.

The hub portion 463 of lever 460 is rotatably supported upon a bracket 467 which is in turn mounted upon supporting plate 137. It is evident from an inspection of FIG. 23 that pivotal movement of lever 460 will produce reciprocation of elevating shaft 368. As seen in FIG. 17, cam follower 465 is operatively associated with a cam 469 which is connected to and rotates with the main shaft 172. As seen in FIG. 30, a cam 469 is provided with a cam groove 470 which receives cam follower 465.

*Die press operating mechanism*

Referring now particularly to FIGS. 16 and 23, the miter gear 174 which is fixed for rotation with main shaft 172 is in meshing engagement with a miter gear 473 fixed to the lower end of a shaft 474 which extends in a vertically upward direction. The lower end of shaft 474 is journalled within a bearing 475 mounted within a hub 476 formed at the upper end of bracket 467.

As seen in FIG. 22, an intermediate portion of shaft 474 is journalled within a pillow block bearing 478 which abuts against a spacer 479, the pillow block bearing 478 and spacer 479 being secured to plate 360 by means of cap screws 480. The upper end of shaft 474 is journalled within a bearing 483 mounted within a hub 484 formed at the upper portion of a bracket 485. Bracket 485 is secured to a plate 486 by means of cap screws 487. Plate 486 is provided with four spaced bores 488 which receives the reduced upper end portions of guide posts 361, plate 486 being retained in position by means of nuts 489 threaded on the upper threaded ends of the guide posts.

A miter gear 492 is provided with an integral split collar 493, collar 493 being secured for rotation with shaft 474 by means of a suitable key and being retained in longitudinal position thereon by means of draw screws 494. Miter gear 492 is in meshing engagement with a miter gear 495 having an integral split collar 496. Gear 495 and its associated collar 496 are fixedly secured for rotation on a shaft 497 by means of a suitable key, the collar being retained in position on the shaft by means of draw screws 498. Collar 496 is secured upon a reduced end portion 499 of the shaft 497, the shaft being provided at its opposite end with an eccentric portion of reduced diameter 500.

Shaft 497 is journalled within spaced bearings 503 and 504 which are mounted within a hub formed at the lower portion of a casting 505 which is secured to the under surface of plate 486 by the aforementioned cap screws 487.

A first connecting member 507 is provided with a bore 508 through the upper portion thereof which receives the eccentric end portion 500 of shaft 497. The lower portion 509 of first connecting member 507 is of enlarged dimension and has an internally threaded bore 510 opening through the lower surface thereof. A second connecting member 512 has a threaded upper end portion 513 which is threadedly received within the bore 510 of the first connecting member 507. Second connecting member 512 also includes an enlarged intermediate portion 514 provided with radially extending openings 515 adapted to receive a spanner wrench or the like for rotating the second connecting member when it is desired to make suitable adjustments thereof.

First connecting member 507 is also provided with four spaced horizontally extending bores, the left portions of which are threaded as seen in FIG. 22, these bores receiving four cooperating cap screws 516. Cap screws 516 are provided for the purpose of clamping the resilient split lower end 509 of the first connecting member in operative position after the second connecting member 512 has been suitably adjusted relative thereto. Connecting members 507 and 512 are adjustable relative to one another for the purpose of adjusting the shut height of the dies hereinafter described.

A bracket member 520 includes a pair of integral upstanding spaced lugs 521 each having a bore 522 extending therethrough. A pin 523 extends through bores 522 formed in lugs 521 and also through an aligned bore formed in the lower end of connecting member 512. A set screw 524 is threaded radially through the lower portion of connecting member 512 and engages pin 523 for retaining it in operative position. Bracket member 520 also includes a laterally extending lower flange portion which is secured to the upper surface of an upper die plate 525 by a plurality of cap screws 526.

Die plate 525 has formed on the upper surface thereof four spaced guide bushings 527 having bores 528 formed therethrough which are aligned with similar bores formed through suitable bushings pressed into openings in die plate 525, these aligned bores receiving the four guide posts 361 such that die plate 525 may be reciprocated up and down and is accurately guided in its movement.

*Die mechanism*

The die mechanism of the apparatus includes a pair of die sets indicated generally by reference numerals 532 and 533, die set 532 including an upper die shoe 534 and a lower die shoe 535, while die set 533 includes an upper die shoe 536 and a lower die shoe 537. Upper die shoes 534 and 536 are secured to the under surface of upper die plate 525 by cap screws 538 and 539 respectively which extend through aligned bores in the lower flange of the bracket 520, the die plate 525 and are threaded into threaded openings provided in the associated die shoes.

A shim plate 541 is provided between the under surface of the lower die shoes 535 and 537 and the upper surface of plate 360. Referring to FIGS. 31 and 32, the mode of attaching the lower die shoes and the shim plate in operative position is illustrated. A pair of shoulder screws are provided with each die set and as seen in these latter-mentioned figures, the shoulder screws 542 extend downwardly through bushings 543 mounted within suitable bores in the lower die shoe 535, through clearance openings provided in the shim plate 541, thence through bushings 545 mounted in bores in the plate 360; and finally the lower threaded ends of the cap screws are threaded into correspondingly threaded openings in plate 360. It is apparent that by tightening up on shoulder screws 542 associated with each die set, the two die sets are securely fixed in position and accurately positioned with respect to plate 360, and the shim plate 541 is clamped between the lower die shoes and plate 360.

A pair of spaced guide pins 548 are affixed to lower die shoe 535 and extend upwardly and have a sliding fit within die bushings 549 affixed to and depending from the upper die shoe 534. In a like manner, a pair of spaced guide pins 550 are affixed to and extend upwardly from lower die shoe 537 and have a sliding fit within die bushings 551 affixed to and depending from upper die shoe 536. Guide pins 548 and 550 cooperate with bushings 549 and 551 respectively to accurately guide vertical movement of the upper and lower die shoes with respect to one another and assure accurate registry of the die mechanism supported thereby.

Each of the die sets 532 and 533 includes an embossing die and a compound die disposed down line of the embossing die. As seen in FIGS. 22 and 32, the embossing die of each die set includes a female die member 554 which is bolted to the die shoe 535 by a plurality of bolts 555. A pair of dowel members 556 are also provided for accurately aligning the female die member on its supporting die shoe.

As seen in FIGS. 16 and 22, each of the embossing dies includes an upper die or punch member 558 which is secured to the under surface of the associated die shoe 534 or 536 by suitable means such as the screw and dowel arrangement shown in connection with the female die members. Each of the upper die or punch members 558 is surrounded by a conventional spring loaded stripper means 560 of well-known construction. The embossing die is of relatively conventional construction, and no further description of the details thereof is considered necessary.

Figure 35:
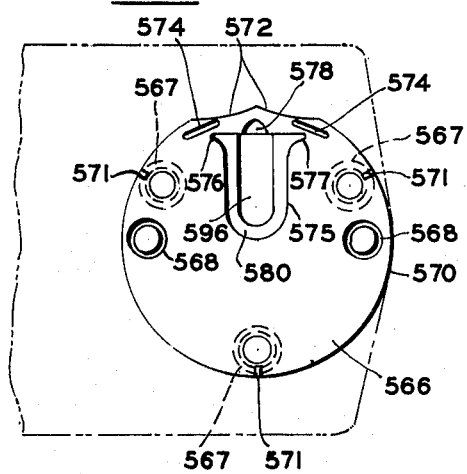
FIG. 35 is a top view of the male die member of the compound die looking down along line 35—35 as indicated in FIG. 33.
Figure 33:
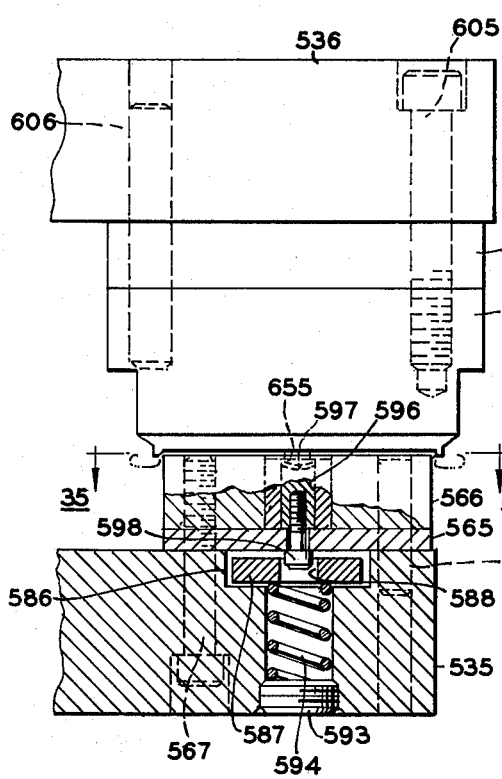
FIG. 33 is a sectional view taken substantially along line 33—33 of FIG. 34 looking in the direction of the arrows.
Figure 34:
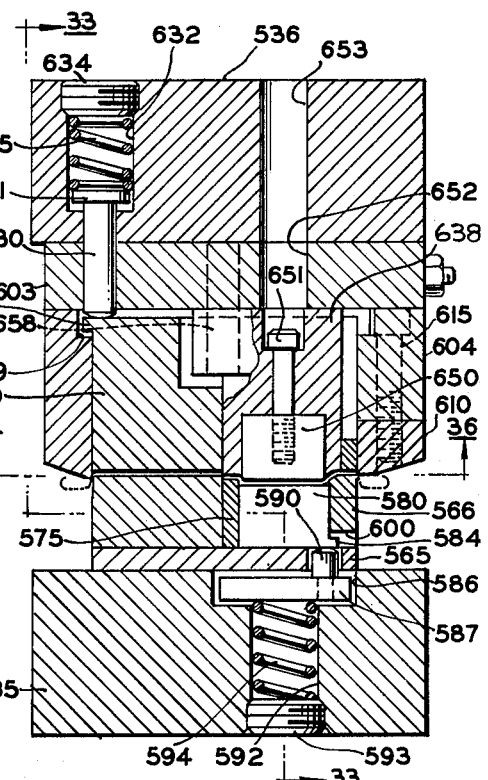
FIG. 34 is a vertical section through one of the compound die sets of the apparatus.

Referring now to FIGS. 33–36 of the drawings, the construction of each of the compound die of the die mechanism will be more clearly understood. Referring particularly to FIGS. 33 and 34, a hardened backing plate 565 is mounted upon the upper surface of the lower die shoe 535, and the male die member 566 is supported on the upper surface of the backing plate 565. The members 535, 565 and 566 are maintained in clamped operative relationship with respect to one another by three cap screws 567 which are equally spaced from one another as seen in FIG. 35, these cap screws being disposed within suitable bores provided in the three members. Proper alignment of these three members is insured by the insertion of a pair of dowels 568 through suitable aligned bores formed in the members.

Referring particularly to FIG. 35, the upper portion of the male die member 566 is visible, and it will be seen that the outer periphery thereof includes a circular cutting edge 570 which is interrupted at three spaced points 571 by cut-away grooves. These cut-away grooves serve to interrupt the cutting edge 570 such that when the male die member cuts into the can end blank, the peripheral portions of the base portion of the can end blank will not be cut adjacent the grooves 571 thereby creating the aforedescribed tie point portions in the finished closure. The upper peripheral cutting edge of the male die member also includes a pair of arcuate cutting edges 572 which join opposite ends of the circular cutting edge 570, the arcuate cutting edges 572 defining the lancing point of the finished closure when these latter arcuate cutting edges cut into the can end blank.

A pair of spaced depressions 574 are formed in the upper surface of the male die member, these depressions cooperating with portions of the opposite die member to produce the reinforcing ribs in the finished closure as previously described which tend to prevent the tab from tearing out of the finished closure.

A cut-out portion 575 extends vertically downwardly through the male die member and is adapted to receive other members therewithin as hereinafter described. As seen in FIG. 35, the lower edge portions of the cut-out portion as viewed from above between points 576 and 577 comprise a cutting edge which is adapted to cut through the can end blank, while the remaining portion of the cut-out, namely that appearing at the upper portion of FIG. 35 does not comprise a cutting edge. A ground-out portion 578 of tapering configuration as seen in FIG. 35 is provided in the upper surface of the male die member, this ground-out portion serving to produce a fairing out of the central reinforcing rib of the tab of the finished closure.

A lower pressure pad member 580 is slidably fitted within the cut-out portion 575 formed in the male die member, and the configuration of pressure pad member 580 may be more clearly seen in FIGS. 37 and 38. As seen in these latter two figures, pressure pad 580 as seen from the top is of substantially U-shaped configuration, the outer dimensions of the member being such as to fit snugly within the cut-out portion formed in the male die member. The opposite leg portions of member 580 terminate in enlarged end portions 581 and 582, these enlarged portions being provided with laterally extending flanges 583 and 584 respectively formed at the lower portion of the pressure pad member as seen most clearly in FIG. 38. The purpose of flanges 583 and 584 will hereinafter be fully described.

As seen particularly in FIGS. 33 and 34, a clearance bore 586 is provided in the upper surface of the lower die shoe 535, a spring plate 587 being positioned loosely within this clearance bore. As seen in FIG. 39, spring plate 587 is of disc-like configuration and has a central opening 588 formed therethrough. Round head pins 590 extend upwardly from the upper surface of spring plate 587, and these pins extend through suitable clearance openings provided in the hardened plate 565, one of the pins being visible as extending through the associated clearance opening in plate 565 as seen in FIG. 34. The upper surfaces of the pins 590 engage spaced portions of the under surface of pressure pad member 580 for normally urging the pressure pad member in an upward direction as hereinafter appears.

A bore 592 is formed through lower die shoe 535 in communication with bore 586 therein, and an adjusting set screw 593 is threaded into the lower threaded end of bore portion 592. A compression spring 594 is seated between the upper surface of the set screw 593 and the under surface of the spring plate 587. It is apparent that spring 594 normally urges spring plate 587 in an upward direction thereby through pins 590 also urging the pressure pad member 580 continuously in an upward direction. It is apparent that the force exerted by spring 594 may be adjusted by suitable adjustment of set screw 593.

As seen particularly in FIGS. 33 and 35, a forming member 596 is provided, the forming member having an outer configuration such that it is snugly received within the two opposite leg portions of the pressure pad member 580 and seats against the forward wall of the cut-out portion 575 formed in the male die member 566. As seen in FIG. 33, the upper surface 597 of forming member 596 is dished so as to provide the desired finished configuration to the reinforcing rib which extends longitudinally of the tab of the finished closure. Forming member 596 is retained in operative position relative to backing plate 565 by means of a cap screw 598 which extends through a suitable threaded bore provided in the forming member itself.

It will be noted that the enlarged head of cap screw 598 fits within the central clearance opening 588 provided through spring plate 587 such that reciprocatory movement of the spring plate is in no way interfered with by the cap screw 598.

As seen particularly in FIG. 34, the male die member 566 is provided with a cut-out portion 600 which receives the flange portions 583 and 584 formed on the lower portions of the pressure pad member 580. The flange members 583 and 584 serve to limit the upper movement of the pressure pad member, and it will be seen that when the upper surface of these flanges engage the under surface of the cutout portion 600, further upward movement of the pressure pad member will be positively prevented.

Referring to FIGS. 33 and 34, a backing plate 603 abuts the under surface of the upper die shoe 536, and the female die member 604 of the compound die abuts against the under surface of the backing plate 603. Members 536, 603 and 604 are retained in operative clamped relationship with respect to one another by a plurality of cap screws 605 which extend through suitable aligned bores provided in these members. These three last-mentioned members are retained in proper aligned relationship by a pair of dowels 606 which extend through aligned openings formed in the members.

Figure 36:
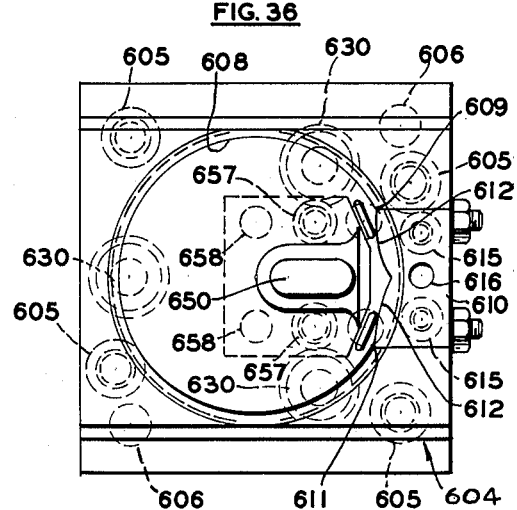
FIG. 36 is a bottom view of the female die member of the compound die set looking up along the line 36—36 as indicated in FIG. 34.

As seen particularly in FIG. 36, the female die member 604 is provided with a cutting edge 608 which is adapted to cooperate with the cutting edge 570 formed on the male die member for cutting the base portion of the can end blank about the outer periphery thereof. The cutting edge 608 extends between points 609 and 611 as seen in FIG. 36. The female die member is also provided with a slot which receives an insert 610, insert 610 having arcuate cutting edges 612 formed thereon which extend between points 609 and 611, cutting edges 612 cooperating with cutting edges 572 formed on the male die member for cutting out the lancing point of the finished closure.

Insert 610 is secured in operative position on the female die member by a pair of cap screws 615 disposed within suitable bores in the male die member and the insert, and the insert is further properly aligned with the female die member by means of a dowel 616 which extends through suitable bores provided in the two members.

As seen in FIG. 34, an upper pressure pad member 620 is slidably received within the female die member 604, the outer periphery of the upper pressure pad member 620 having a configuration such that it is complementary to and fits snugly within the space defined by the inner surface of the female die member 604 and the insert 610.

The upper pressure pad member 620 can be seen more clearly in detail in FIGS. 40 and 41, and as seen in these figures, a first opening 621 is formed through the under surface thereof, this opening having a particular configuration for slidably receiving a member hereinafter described. A clearance cut-out 622 is formed in the upper surface of the upper pressure pad member, this clearance cutout being in communication with the opening 621 formed through the upper pressure pad member.

A pair of clearance slots 624 and 625 also extend through the upper pressure pad member, the purpose of these slots being hereinafter described. A laterally extending flange 627 is formed around the major portion of the outer periphery of the upper pressure pad member at the upper end thereof, and as seen in FIG. 34, this flange 627 is received within an annular groove 629 formed in the upper inner surface of the female die member 604. Flange 627 serves to positively limit the downward movement of the upper pressure pad member by engagement of the under surface of the flange with the upwardly facing surface of the groove 629.

A plurality of pins 630 shown as being three in number extend through suitable bores 632 provided in the upper die shoe 536 and the backing plate member 603, the lower ends of these pins engaging the upper surface of the pressure pad member 620. Each of pins 630 includes an enlarged head portion 631 at the upper end thereof, this enlarged head portion being loosely received within an associated bore formed in the upper die shoe. A set screw 634 is threaded within the threaded upper end of each of bores 632, and a compression spring 635 is seated between the under surface of the set screw and the upper surface of the enlarged head on the pins 630. Springs 635 normally urge the pins 630 in a downward direction thereby exerting force on the upper pressure member 620 so as to normally urge it in a downward direction. The force exerted by spring 635 may be selectively adjusted by threading the set screw 634 in or out as the case may be.

A cutting and support member 638 as seen in FIGS. 42 and 43 includes an enlarged flange portion 639 at the upper end thereof, flange portion 639 having a pair of openings 640 formed therethrough for receiving dowels and a pair of threaded openings 641 for securing cap screws therein as hereinafter set forth. Member 638 also includes a depending portion 642 of reduced dimension.

Portion 642 has a cutting edge 643 formed at the lower end thereof, cutting edge 643 extending to the left as seen in FIG. 43 between points 644 and 645. This cutting edge 643 cooperates with the aformentioned cutting edge 575 as seen in FIG. 35 on the male die member for cutting out the tab in the can end blank.

As seen in FIG. 42, member 638 is provided with a cut-out 647 formed in the lower surface thereof, this cut-out being in communication with a bore 648 formed centrally through the member of reduced dimension, bore 648 in turn being in communication with a bore 649 of slightly greater dimension. As seen in particular in FIGS. 34 and 36, cut-out 647 snugly receives a forming member 650 which is fixed within this cut-out and projects below the under surface of the cutting and support member 638. Forming member 650 is retained in operative position within member 638 by means of a cap screw 651 as seen in FIG. 34 which extends through bore 648 of the cutting and support member 638. It will be noted that access openings 652 and 653 are provided through backing plate 603 and the upper die shoe 536 for gaining access to the cap screw 651.

Forming member 650 is provided with an arcuately shaped under surface which is seen in dotted line in FIG. 33 and is indicated by reference numeral 655. The configuration of the under surface of the forming member 650 is substantially complementary to that of the forming member 596 such that the two forming members cooperate to provide the desired finished configuration of the reinforcing rib which extends longitudinally of the tab of the finished closure.

Cutting and support member 638 is retained in operative position with respect to backing plate member 603 by a pair of cap screws 657 as seen in FIG. 36, and a pair of dowels 658 are provided for properly aligning member 638 with respect to the backing plate. It will of course be understood that cap screws 657 are threaded into the openings 641 in member 638 as previously described, while the dowels 658 fit within the openings 640 of member 638.

Referring now to FIG. 44 of the drawings, a punch member 660 is provided, this punch member being shown in FIG. 44 which is a revolved section for the purpose of clarity. It will be seen that the punch 660 includes a lower working end 662 which extends downwardly through the clearance slot 624 formed in the upper pressure pad member 620. It will be understood, of course, that a similar punch member extends downwardly through the other clearance slot 625.

A flat 664 is formed at an angle along one side of the punch member, this flat being shown as revolved from its true position for the sake of illustration. A set screw 665 is threaded through a suitable threaded opening provided in backing plate 603, the said screw engaging the flat formed on the punch member for locking the punch member in a desired operative position. A lock nut 666 is provided for locking the set screw in position.

Punch member 660 is disposed within suitable bores provided in backing plate 603 and the upper die shoe 536, and is also disposed within a suitable clearance cut-out 661 provided in the cutting and support member 638. The upper portion of the bore formed in the upper die shoe 536 which receives an associated punch member is threaded, and a pair of set screws 669 and 670 are threaded within this portion. The two set screws may be adjusted for effectively locking the punch member in the desired position.

It will be apparent that during operation of the die mechanism, the lower working end of each of the punch members will cooperate with the depressions 574 formed in the upper surface of the male die member so as to form the reforcing ribs in the can end blank which resist tearing out of the tab.

*Second shuttle bar transfer means*

Referring now to FIG. 45 of the drawings, it will be seen that the top wall 189 of the main casting 185 is provided with a longitudinally extending channel 671. A pair of elongated bearing members 672 and 673 of substantially L-shaped cross-sectional configuration are disposed at opposite sides of the longitudinally extending channel and are retained in place by spaced pins 674. A pair of elongated retaining plates 675 and 676 extend longitudinally with respect to the channel and are disposed in overhanging relationship to the bearing members 672 and 673 such that oppositely facing guide tracks are defined between the bearing members and the retaining plates.

The two aforedescribed oppositely facing guide tracks slidably support a slide member 670 which has the opposite lateral portions thereof slidably supported within these guide tracks as seen in FIG. 45. Slide member 670 forms the support for the second shuttle transfer means which is indicated generally by reference numeral 670', in FIGS. 45–49.

An elongated double guide member 678 is supported from and spaced from slide member 670 by a first spacer member 680, a second spacer member 681 and a combined spacer and cross member 682, double guide member 678 being secured in operative position relative to these comopnents by means of three spaced nut and bolt assemblies 683, 684 and 685. Double guide member 678 is provided with a plurality of elongated lightening slots 679 provided for the purpose of reducing the weight of the member.

Spacer and cross member 682 includes a depending central portion 687 which extends forwardly of the member and includes two spaced hook arms 688 and 689 as seen in FIG. 46. Each of these hook arms is provided with a slot extending downwardly through the upper surface thereof, one of these slots 690 being visible in FIG. 47, and it will be noted that the slot is of substantially rectangular configuration. Each of the slots formed in hook arms 688 and 689 receives one of the rectangular bearing members 443 and 444 which are pivotally mounted to the rear portion of the first shuttle bar transfer means 430. This relationship may be seen most clearly in FIG. 16 wherein it will be noted that bearing block 443 is slidably received within the slot 690 formed in hook arm 688 at the forward end of the second shuttle bar transfer means. This interconnection between the two shuttle bar transfer means causes the first shuttle bar transfer means 430 to follow the reciprocatory movement of the second shuttle bar transfer means 670', and at the same time the first shuttle bar transfer means is permitted to raise and lower with respect to the second shuttle bar transfer means. This interaction will be more clearly understood when the operation of the apparatus is described hereinafter.

Support shoulders 692 and 693 are provided along the opposite longitudinal edges of double guide member 678, these shoulders being for the purpose of receiving the peripheral portions of the can end blank in a manner similar to the shoulders described in connection with the first-mentioned shuttle bar transfer means. A plurality of retaining clip means 694 shown as being four in number are disposed in adjacent overlying relationship to each of the longitudinal extending shoulders 692 and 693. The construction and operation of retaining clip means 694 is identical with the retaining clip means described in connection with the first shuttle bar transfer means and shown in particular in FIG. 28, and accordingly, no further description thereof is necessary.

The second shuttle bar transfer means also includes a guide member 696 having elongated lightening holes 697 formed therein for reducing the weight thereof. A longitudinally extending support shoulder 698 is provided along one upper edge portion thereof, and four spaced retaining clip means 699 are provided along the member in overlying relationship to the shouldder 698, the construction of these retaining clip means being identical with those previously described.

Another guide member 700 is provided, this member also being provided with a plurality of elongated lightening holes 701 and having a shoulder 702 formed along one upper longitudinally extending edge thereof. A plurality of spaced retaining clip means 703 are disposed in overlying relationship to shoulder 702 and the construction and operation thereof is identical to that previously described.

The forward ends of guide members 696 and 700 are connected to opposite end portions of the combined spacer and cross member 682 by means of cap screws 705 and 706 disposed within suitable bores in the members. A nut and bolt assembly 707 is also provided for additionally securing the forward end portion of the double guide member 678 to the cross member 682 to provide additional rigidity to the construction.

The various guide members are additionally held together at the rearward portions thereof by a cross member 708 which is secured to members 700, 678 and 696 by cap screws 709, 710 and 711 respectively.

As seen particularly in FIG. 46, the other ends of guide members 696 and 700 are provided with hardened bumper members 713 and 716 while the intermediate guide member 678 is provided with a pair of spaced hardened bumper members 714 and 715. Each of these bumper members is of substantially identical construction, and as seen in FIG. 47, each bumper member is substantially L-shaped in cross sectional configuration and is secured in place by a suitable cap screw 717. The purpose of these hardened bumper members will be fully explained hereinafter.

As seen in FIGS. 46 and 48, a pair of supporting blocks 720 are secured to guide members 696 and 700 at the undersurface thereof by a plurality of flat head screws 721, the supporting blocks 720 extending laterally inwardly of the support members toward one another. Support pins 723 extend inwardly from the ends of each of the supporting blocks 720, and detent lever members 724 as seen in FIG. 50 are pivotally supported on these pins.

Pins 723 extend through suitable openings provided in the bifurcated end portions 725 of each of the lever members 724. A hairpin spring 726 is wrapped around each of pins 723, the hairpin springs including an elongated end portion which bears against the under surface of lever members 724 for normally urging the lever members in an upward direction. A pair of stop pins 727 are secured in suitable openings provided in support members 696 and 700, these stop pins extending inwardly toward one another as seen in FIG. 46.

Referring to FIG. 50, each of lever members 724 is provided with a slot 728 in the upper surface thereof which is adapted to receive one of the associated pins 727. It will be apparent that the pins 727 limit the upward movement of the lever arms under the influence of springs 726.

The outer end of each of lever arms 724 includes a substantially vertically extending surface 730 which is adapted to engage a portion of a can end blank as will be hereinafter described such that the lever arm serves as a detent means during a portion of the operation of the apparatus. The outer end of each of the lever arms 724 is also provided with a sloping cam surface 731, the operation of which will be hereinafter set forth.

As seen in FIG. 47, the under surface of slide member 670 is provided with a recess 733. An attaching lug member 734 is received within recess 733 and is fixedly attached to the slide member by a plurality of cap screws 735. Attaching lug members 734 also includes a depending portion 736 having an opening 737 formed therethrough, the purpose of which will hereinafter appear.

*Reciprocating drive means for first and second shuttle bar transfer means*

Referring now to FIG. 17, a draw bushing 740 is keyed to main shaft 172 by an elongated key 741, the outer surface of the draw bushing having a tapered configuration. A barrel cam 742 is provided with a cam track 743 extending around the peripheral portion thereof, and the barrel cam is keyed to the draw bushing 740 by means of a key 744. Cap screws 745 are provided for drawing the barrel cam up tight on the draw bushing, the barrel cam being provided with a tapered bore therethrough which is substantially complementary to the tapered outer surface of the draw bushing.

Figure 51:
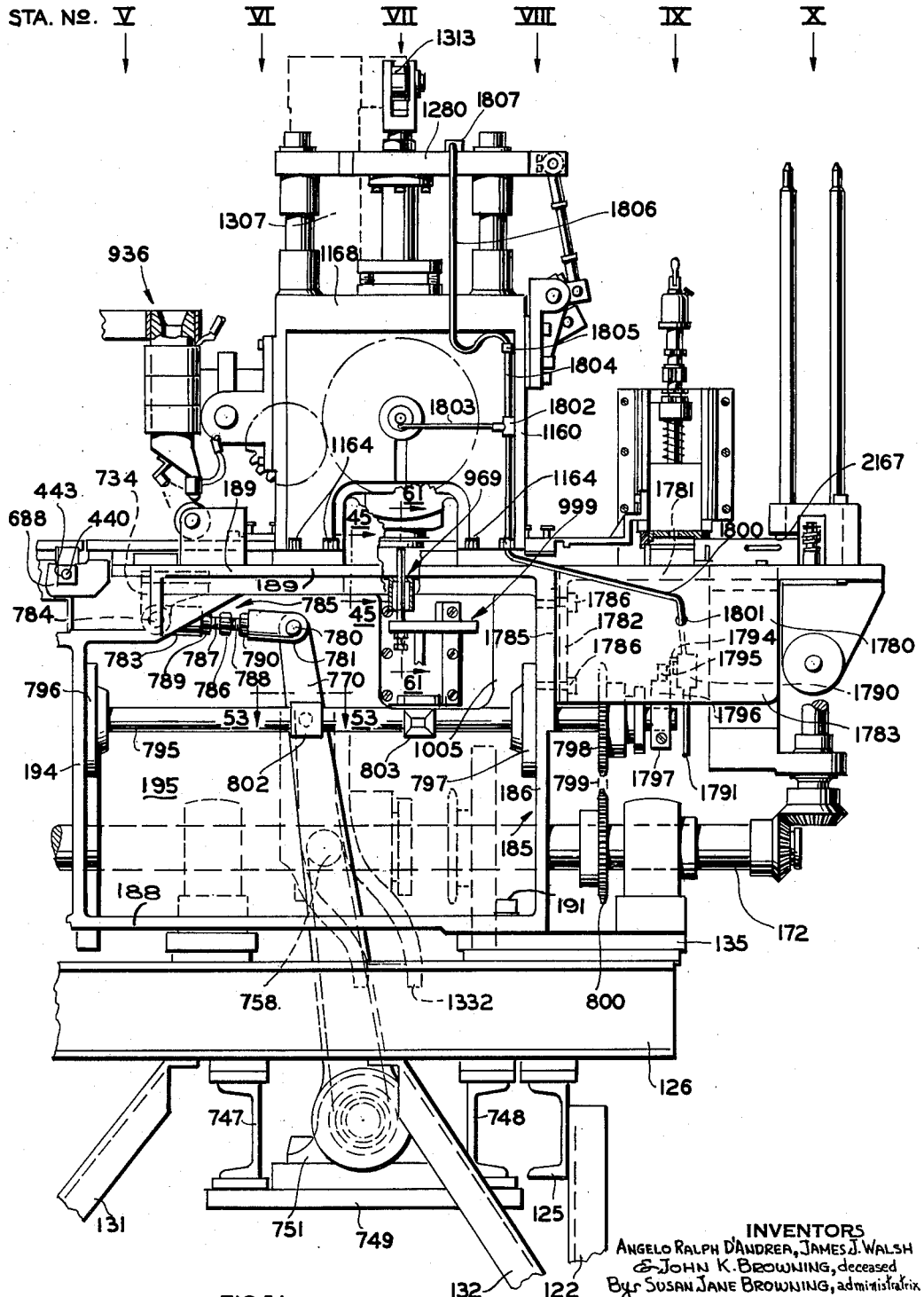
FIG. 51 is an enlarged side elevation of the righthand portion of the apparatus as shown in FIG. 15, as seen along line 51—51 looking in the direction of the arrows, the foil feed mechanism being removed, and certain other components being broken away for the sake of clarity.

Referring now particularly to FIGS. 51 and 52, a pair of beams 747 and 748 are spaced from one another and supported from the under surfaces of beams 126 and 128 and in spanning relationship therewith. A support plate 749 is supported from the under surfaces of beams 747 and 748. A pair of pillow block bearings 750 and 751 are mounted upon spacers 750' and 751' respectively which are in turn supported on the support plate 749.

A rocker shaft 752 is rotatably journalled in the spaced pillow block bearings 750 and 751 as most clearly seen in FIG. 52, and a cam lever arm 753 having a split hub 754 at the lower end thereof is attached to the rocker shaft 752 and is keyed thereto by a suitable key means.

Lever arm 753 has a hub 755 formed at the upper end thereof, the hub having an opening formed therethrough which snugly receives a pin 756 which is retained in operative position by means of a set screw 757. A cam follower roller 758 is rotatably mounted on the outer end of pin 756, follower roller 758 being received within the cam track 743 of the barrel cam 742. It will be apparent that as the barrel cam rotates, lever 753 will be caused to reciprocate in accordance with the shape of the barrel cam track, this reciprocation in turn being transferred into oscillation of the shaft 752 as will hereinafter more clearly appear.

Shaft 752 is provided with a reduced end portion 752' upon which is mounted a shouldered sleeve 760. Sleeve 760 is fixed for rotation with the reduced end portion of the shaft by means of a key 761, the sleeve being retained on the end of the shaft by means of a washer 762 which is held in place by a cap screw 763 threaded into a suitably threaded bore provided in the outer end of the shaft.

A ball cage member 765 is secured for rotation with the sleeve 760 by means of a key 766. A plurality of hardened balls 767 are supported within hardened bushings 768 mounted in bores formed through cage member 765, these bores being disposed in angularly spaced relationship about the cage member.

An elongated lever member 770 is provided with a hub portion 771 which is rotatably journalled on the outer surface of the sleeve 760. A plate 772 is secured to the inner portion of hub 771 and is retained in position by a plurality of flat head screws 773. Plate 772 is provided on the righthand surface thereof as seen in FIG. 52 with a plurality of spaced recesses 774, each of these recesses being adapted to receive one of the hardened balls 767 mounted in the cage member. The engagement of the balls with the recesses 774 provides a driving interconnection between the sleeve 7600 and the lever arm 770.

A plate 775 engages the righthand portion of the balls as seen in FIG. 52, plate 775 being normally urged to the left by a spring 776 so as to thereby urge the balls into seating relationship within the recesses provided in plate 772. An adjusting nut 777 is threaded on the threaded outer end of sleeve 760 and may be adjustably positioned for varying the force that the spring 776 exerts on the plate 775 to thereby selectively adjust the amount of force required to cam the balls out of the recesses in plate 772 upon the occurrence of an overload condition. Adjusting nut 777 includes a split flange portion through which a locking screw 778 extends for selectively locking the adjusting nut in a particular position.

It is apparent from the foregoing description that the driving interconnection between sleeve 760 and lever arm 770 comprises an overload release clutch which is adapted to release the driving connection when an excessive overload occurs.

A pin 780 extends through a bore provided in the upper end of lever arm 770, pin 780 extending laterally to either side of the lever arm. As seen in FIG. 51, a first substantially U-shaped connecting member 781 has suitable bores provided through the opposite leg portions thereof which receive pin 780 such that U-shaped member 781 is pivotally supported upon pin 780, suitable snap rings 782 being provided for retaining the U-shaped member 781 and pin 780 in operative position. A similar U-shaped member 783 is mounted in the identical manner upon a pin 784 extending through the opening 737 provided in the depending portion 736 of attaching lug 734 secured to the slide member of the second shuttle bar transfer means previously described.

An adjustable connecting means 785 is provided between the two connecting members 781 and 783. The base portions of each of U-shaped members 781 and 783 are provided with openings therethrough having threads of opposite hand. Means 785 is provided at the central portion thereof with a hex nut portion 786 which enables adjustment of this means. Means 785 also includes oppositely extending thread shank portions 787 and 788 which have opposite hand threads formed thereon which, of course, cooperate with the opposite hand threads provided in the two U-shaped members 781 and 783. It is apparent that adjustable means 785 permits accurate positioning of the second shuttle bar transfer means as well as the first shuttle transfer means with respect to the upper end of the lever member 770.

As seen in FIG. 52, a locator pin 793 is secured to an intermediate portion of lever arm 770 and extends laterally therefrom. Locator pin 793 has a cylindrical outer surface and cooperates with suitable locating means described hereinafter.

Referring now to FIG. 51, a locator shaft 795 is rotatably journalled within bearings 796 and 797 which are mounted upon the walls 194 and 186 respectively of the main casting 185. A sprocket 798 is fixed adjacent the outer end of shaft 795 and is drivingly connected through a chain 799 to a sprocket 800 which is fixed for rotation with the main shaft 172.

A pair of locator members 802 and 803 are fixed to spaced portions of locator shaft 795, these locator members serving the purpose of accurately locating the position of lever arm 770 at the opposite limits of its movement. Locator members 802 and 803 are of substantially identical construction and may extend outwardly from substantially diametrically opposite points of shaft 795. The construction of each of locator members 802 and 803 may be more fully understood from an inspection of FIGS. 53 and 53a.

Locator members 802 and 803 are of identical construction, and locator member 802 will now be described in detail, it being understood that member 803 is of the same construction and operates in a similar manner.

As seen in detail in FIG. 53a, locator member 802 is a split member which is wrapped around shaft 795 and is secured thereto by a pair of cap screws 805 which serve to draw the two halves of the locator member toward one another.

Locator member 802 includes a working end portion 806, the upper and lower edges or surfaces 807 and 808 thereof as seen in FIG. 53a tapering toward one another. The working end portion of the locator means has a slot 810 which extends completely therethrough and which is adapted to have a snug sliding fit with the locator pin 793 on lever arm 770 at one limit of movement of the lever.

A pair of cam surfaces 811 and 812 slope downwardly from the upper edge 807 of the locator member and intersect intermediate portions of slot 810 formed through the working end of the locator member. A similar pair of cam surfaces 813 only one of which is visible in FIG. 53a are also formed from the lower edge surface 808 of the working end of locator member 802 and slope upwardly to intersect intermediate portions of the slot 810. As seen in FIGS. 53 and 53a, the cam surfaces 813 serve to cam the locator pin 793 toward the center of the slot 810 if the locator pin should be slightly out of alignment with the slot. Cam surfaces 811 and 812 serve no purpose in locator 802, but the locator member is of this construction such that it may be interchangeable with locator member 803.

The locator members are provided for very accurately positioning the lever arm 770 at the opposite limits of its stroke, and compensate for any wear which may occur in the cam 742 and its follower 758 as well as in the overload release clutch previously described connecting shaft 752 with lever member 770.

*Positioning means for idling stations V and VI*

Referring now to FIGS. 54, 55 and 56, a positioning means is indicated generally by reference numeral 815 and includes a support and guiding bracket 816 which is secured to the upper wall 189 of the main casting 185 by a plurality of cap screws 817.

A vertically extending groove 818 is formed in casting 816 and as seen particularly in FIG. 55, a pair of retaining plates 819 and 820 are secured to the casting by means of cap screw 821 and 822 respectively, the lateral portions of the retaining plates 819 and 820 overlapping the lateral portions of the groove 818 to thereby define with the groove a trackway.

A pair of bearing members 825 and 826 of substantially L-shaped cross sectional configuration are seated in opposite lateral portions of the groove 818 and it will be seen that a slide member 828 is mounted between the bearing members 825 and 826 and the retaining plates 819 and 820 such that slide member 828 is adapted to be reciprocated in a vertical direction.

Slide member 828 is connected by means of cap screws 830 to a member 831, the outer end of which is bifurcated as seen in FIG. 55. A pin 832 is supported by the bifurcated end portion of member 831 and is retained in place by suitable snap rings. The upper end of a connecting link 833 is pivotally connected to pin 832, connecting link 833 being adjustable in length and being of a well-known construction.

A casting 835 is secured to slide member 828 by a plurality of cap screws 836. As seen particularly in FIG. 56, casting 835 includes a pair of integral bosses 838 and 839 which have bores 838' and 839' respectively formed completely therethrough. Casting 835 also includes integral bosses 840 and 841 which respectively have threaded bores 840' and 841' formed completely therethrough.

A pair of tubular members 844 are provided with threads on the external surfaces thereof which mesh with the threads in each of openings 840' and 841'. It will be understood that the construction of the two tubular members 844 associated with each of the bosses 840 and 841 are identical, the tubular members 844 having hex-heads 845 thereon for facilitating adjustment thereof. A lock nut 846 is threaded on the external threads of tubular members 844 for locking them in a desired adjusted position. Each of tubular members 844 also includes a bore 847 extending completely therethrough.

Casting 835 is further provided with a central reinforcing rib 849 which serves to increase the rigidity and strength of the casting.

A pair of shafts 850 and 851 are provided, the upper ends of the shafts being of reduced diameter as seen in FIG. 56, and the lower portions 850' and 851' respectively being of enlarged diameter. The reduced upper end portions of the shafts are slidably received within the bores formed through the tubular members 844, and the uppermost portions of the shafts are threaded. Castellated nuts 853 and 854 are threaded on the upper threaded ends of shafts 850 and 851, the castellated nuts being retained in operative position by pins 855 and 856 respectively. The nuts 853 and 854 limit the downward movement of shafts 850 and 851 respectively.

Coil compression springs 858 and 859 are disposed in surrounding relationship to shafts 850 and 851 respectively, each of these coil springs being seated at one end against the lower ends of tubular members 844 and at the opposite ends against the upwardly facing annular surfaces of the enlarged portions of the shafts.

A pair of spaced bearings 861 and 862 are mounted within boss 838, and a similar pair of spaced bearings 863 and 864 are mounted within boss 839. These last-mentioned bearings serve to slidably support shafts 850 and 851 within bosses 838 and 839 respectively for vertical reciprocation relative thereto.

Slots 866 and 867 are formed in the bottom surfaces of the bosses 838 and 839, these slots receiving respectively enlarged portions 868 and 869 of shafts 850 and 851 respectively. Enlarged portions 868 and 869 are provided with flat side surfaces and are snugly slidably received within slots 866 and 867 for permitting reciprocation of the shafts 850 and 851 while preventing them from rotating during operation.

Further enlarged portions 870 and 871 are formed at the lowermost ends of shafts 850 and 851 respectively, portions 870 and 871 being the actual positioning members which are adapted to engage the can end blanks as they pass through the machine. Members 870 and 871 are of identical construction, and accordingly member 871 will only be described in detail, this description applying equally as well to member 870.

Referring now to FIG. 54, it will be seen that positioning member 871 includes depending end portions 873 and 874 including laterally extending flat surfaces 876 and 877 which extend substantially normally to the direction of feed of the cam end blanks through the machine. When a positioning member is moved downwardly over a can end blank, the can end blank will be received between flat surfaces 876 and 877 and will be maintained in such position until the positioning member again raises vertically out of engagement with the cam end blank to permit the cam end blank to move further along the machine.

Depending end portions 873 and 874 of the positioning member also include sloping surfaces 879 and 880 which intersect the flat vertical surfaces 876 and 877. The purpose of sloping surfaces 879 and 880 is to serve substantially as a cam means for moving a can end blank into a centered position relative to member 871 to ensure that flat surfaces 876 and 877 will clear the side edge portions of the can end blank such that the can end blank may be received in the recess under portion 875 of positioning member 871.

A bridge casting 883 is of substantially H-shaped configuration as seen in plan view in FIG. 55 and includes opposite side portions 884 and 885 medially interconnected by a cross portion 886. It will be noted as seen in FIG. 54 that cross portion 886 extends between the upper portions of side portions 884 and 885 for providing clearance for other components of the apparatus as hereinafter described.

Bridge casting 883 is secured to portions 868 and 869 of shafts 850 and 851 by cap screws 887 and 888 which extend through suitable openings provided in side portion 884 of the casting and into tapped openings formed in the aforementioned lower portions of the shafts.

A second pair of positioning members 890 and 891 are supported from the opposite side portion 885 of the bridge casting by means of cap screws 890' and 891' respectively disposed within suitable openings in the respective members. As seen in FIG. 54, the construction of each of positioning members 890 and 891 is similar to that of the positioning members 870 and 871 previously described. It will be noted that as seen in FIG. 54, positioning member 891 includes depending side portions 892 and 893 which have flat surfaces 894 and 895 respectively for receiving a can end blank, sloping surfaces 896 and 897 being adapted to accurately center the can end blank as previously discussed.

*Operating means for positioning means for idling stations V and VI*

Referring to FIG. 47, castings 902 and 903 are provided with bosses 906 and 907 respectively at the outer ends thereof, and a shaft 908 is rigidly supported between the bosses 906 and 907.

A lever member indicated generally by reference numeral 910 includes an integral boss 911 having a bore 912 formed therethrough. A pair of spaced bushings 913 and 914 are fitted within longitudinally spaced portions of bore 912 and serve to rotatably journal the lever member 910 upon the fixed shaft 908. Lever member 910 includes a first arm 915 and a second arm 916 extending angularly to the first arm 915. Arm 916 is pivotally connected at the outer end thereof to the lower end of the connecting link 833.

Referring again to FIG. 17, a face cam 918 is keyed to the main shaft 172, and as seen in FIG. 59, cam 918 is provided with a cam track 919. A cam follower 920 is rotatably supported at the outer end of the arm 915 of lever member 910, cam follower 920 being received within the cam track 919 of cam 918 whereby lever member 910 will be reciprocated during operation as the cam follower follows the track in the associated cam.

*Adhesive applying mechanism*

As the can end blanks are moved by the second shuttle bar transfer means from idling station V to idling station VI, a suitable adhesive is applied to the upwardly facing portions of the base portion of the can end blank, and the construction of this adhesive applying mechanism may be most clearly understood with reference to FIGS. 15, 16 and 60. With reference to these last-mentioned figures, a pair of supporting blocks 923 and 924 are supported at opposite sides of the upper wall 189 of the main casting 185, the supporting blocks being retained in operative position by a plurality of cap screws 925 and 926 respectively. An axle 927 has the opposite end portions thereof fitted within suitable bores provided in the supporting blocks, the axle being held against rotation by suitable means such as set screws or dowels as the case may be.

A pair of adhesive applying rollers 928 and 929 are rotatably supported on spaced portions of axle 927, these rollers being formed of a suitable material which will retain heat and which are adapted to readily transfer the adhesive from the roller to the can end blank upon contact with the upwardly facing portions of the can end blank as they pass therebeneath. For example, the rollers 928 and 929 may be formed of hardened steel or other similar materials.

Rollers 928 and 929 are provided with bores 928' and 929' respectively which extend completely therethrough, each of these last-mentioned bores being counterbored at the opposite ends thereof for receiving suitable bearing members. As shown, a pair of sealed ball bearings 930 are disposed within the opposite counter-bored ends of roller 928, and a pair of sealed ball bearings 931 are provided within the opposite counterbored ends of roller 929. Roller 928 is retained in operative position by a pair of snap rings 932 at opposite ends thereof, and roller 929 is retained in operative position by a pair of snap rings 933 at the opposite ends thereof.

As seen in FIG. 60, can end blanks which are supported by the second shuttle bar transfer means will have the upwardly facing surfaces of the base portions thereof brought into contact with the under surfaces of the rollers 928 and 929 as the can end blanks are moved between stations V and VI. It will be noted that rollers 928 and 929 are disposed over the center lines of the path of movement of the can end blanks as they move along the machine.

A pair of adhesive reservoirs indicated generally by reference numerals 935 and 936 are disposed in overlying relationship to the adhesive applying rollers 928 and 929 respectively, the reservoirs 935 and 936 including dispensing end portions 937 and 938 respectively. Thee dispensing end portions each include a narrow elongated slot which is disposed directly over the center line of the associated roller and is spaced very closely thereto. In a typical example, there may be a clearance of approximately $5/1000$ to $10/1000$ of an inch between the open dispensing end and the outer surface of the adjacent roller.

Reservoirs 935 and 936 are retained in operative position above the rollers by means of a pair of support arms 940 and 941 respectively, arm 940 being broken away as seen in FIG. 15 for the sake of clarity of the underlying components. Arms 940 and 941 are adjustably mounted upon the guide posts 361, the arms being provided with split end portions 942 and 943 which are clamped in desired position on guide posts 361 by means of nut and bolt assemblies 944 and 945 respectively. It is evident that the vertical position of the supporting arms upon the guide posts may be adjusted as desired.

The opposite ends of arms 940 and 941 are also split such that they may be mounted in surrounding relationship to the upper ends of the reservoirs 935 and 936 respectively. As seen especially in FIG. 16, the opposite split end portion 947 of arm 941 is wrapped around the upper end of the reservoir 936, and the reservoir is maintained in operative position within this split end of the arm by means of clamping nut and bolt assembly 948, as will be well understood.

Reservoir 936 is provided with an open upper end 950 through which a suitable adhesive may be introduced into the hollow interior of the reservoir, it being understood that the reservoir is completely hollow from the top portion thereof down to the lower discharge end thereof. The construction of reservoir 935 is identical. The adhesive utilized in the present invention should, of course, be non-toxic when it is intended to be used with consumable foodstuffs, and furthermore, the adhesive must provide a high peel strength bond between the foil and the can end blank, or in other words, it is very difficult to peel the foil from the can end blank, and the peel strength is high enough so that during normal removal of the closure from an associated container, there is no possibility of the foil peeling away from the removable portion of the can end blank. For example, the adhesive may comprise a hot-melt resin base adhesive which has sufficiently low viscosities so that it will readily flow from the discharge end of the reservoirs at a temperature of approximately 225° F.

Since it is contemplated that a hot-melt adhesive will be utilized in the present invention, it is necessary to provide suitable means for heating the adhesive to the desired operating temperature. For this purpose, a plurality of band heaters may be provided around the outer periphery of each of the reservoirs, and in the present example, three band heaters 952, 953 and 954 are illustrated as mounted about reservoir 936, and electrical lead 955 being provided in operative connection with the band heaters to provide the necessary source of electricity. Suitable thermocouples and controls of a conventional nature are employed for maintaining the band heaters at the desired operating temperatures. By providing a plurality of band heaters, a number of different zones of heat may be provided of various magnitudes. For example, band heater 952 may operate at the lowest temperature while band heater 953 may operate at a higher temperature and band heater 954 may operate at a still higher temperature.

A further band heater 957 is also provided about the lower discharge end of the reservoir, an electrical lead 958 being connected to band heater 957 for supplying it with the necessary electrical current. It is contemplated that band heater 957 will operate at the highest temperature of the various band heaters employed within a particular reservoir. It will, of course, be understood that the construction and operation of the components associated with the other reservoir 935 which is not visible in FIG. 16 will be identical with that discussed above.

An infrared lamp 960 is suitably supported from the reservoir 936 and is so mounted that the heat rays therefrom will be directed on the outer surface of the adjacent adhesive applying roller 929. The infrared lamp will serve to heat the outer surface of the roller thereby ensuring that the adhesive will be maintained in a fluid condition and that it will be uniformly distributed over the roller. A similar infrared lamp is, of course, mounted from reservoir 935 for a similar purpose in connection with the other adhesive applying roller 928.

Referring to FIGS. 131-133, a modified form of adhesive-applying mechanism is illustrated, and this mechanism is shown as mounted upon the die press mechanism of the apparatus. In this modification, a reservoir 2230 is attached to plate 486 of the die press mechanism by means of a pair of studs 2231 and 2232 which have the inner ends thereof threaded within suitable tapped openings provided in plate 486, the reservoir being maintained in position by a plurality of nuts 2233 which are threaded upon the opposite threaded end portions of the studs. A suitable adhesive substance may be filled through the open upper end of the reservoir and a pair of openings 2235 and 2236 are provided through the oppositely sloping lower wall portions of the reservoir. A pair of strip heaters 2240 and 2241 are secured to two lower wall portions of the reservoir, these strip heaters being connected to a suitable source of electrical power for heating the adhesive substance in the lower portion of the reservoir and maintaining the substance at a sufficient viscosity to readily flow downwardly by gravity.

As seen in FIG. 132, a pair of flexible conduits 2245 and 2246 are connected by fittings 2247 and 2248 respectively with the openings 2235 and 2236 formed in the lower portion of the reservoir. Conventional heating cables 2250 and 2251 are wrapped around conduits 2245 and 2246 respectively for heating the conduits and maintaining the adhesive substance at a suitable viscosity as it flows downwardly through the conduits.

A mounting bracket 2255 is secured to the upper die plate 525 of the die press mechanism by means of a pair of cap screws 2257 disposed in suitable openings provided in the mounting bracket and the upper die plate.

A heat insulating member 2258 formed of asbestos or similar material is provided between the mounting bracket and upper die plate. As seen particularly in FIG. 133, bracket 2255 is provided with a plurality of cutout portions 2260 which minimize the amount of heat which is conducted from the adhesive applying mechanisms through the bracket and to the upper die plate. The mounting bracket includes a pair of bosses 2262 and 2263 which are provided with vertically extending central bores 2264 and 2265 which extend completely therethrough. A pair of cylindrical pot members 2267 and 2268 having a loose slidable fit with the bores 2264 and 2265 respectively are provided such that the pot members are adapted to slide up and down within these bores during operation.

Each of these cylindrical pot members is open at the upper and lower ends thereof, cap members 2270 and 2271 being threaded upon the upper threaded ends of the pot members 2267 and 2268 respectively. Cap members 2270 and 2271 include fittings 2272 and 2273 respectively which are connected with the lower ends of flexible conduits 2245 and 2246 respectively, whereby the adhesive substance stored within reservoir 2230 is fed downwardly through the conduits by gravity into the hollow interior of the pot members.

Each of the cap members also includes a pair of fittings, a first fitting of each cap member being operatively connected with a vacuum line 2275 and 2276 respectively which is connected with a suitable source of vacuum, and the cap members also include second fittings which are connected with pressure lines 2277 and 2278 which are connected with suitable sources of fluid pressure.

Referring particularly to FIG. 131, a longitudinal section is shown through pot member 2267. The cap member 2270 is provided with a bore 2280 through which a thermocouple 2281 extends, the thermocouple being held in place by a set screw 2282 threaded within a suitable laterally extending threaded bore which intersects bore 2280.

A threaded bore 2285 is also formed through cap member 2270, and the upper threaded end portion of a heat transfer member 2286 is threaded within this threaded bore and retained in operative position by a lock nut 2287. Heat transfer member 2286 is formed of a suitable material such as aluminum which readily transfers heat, and is provided with a central bore 2290 within which is seated an electric heating element 2291.

Heating element 2291 is connected with a suitable source of electrical energy through a control means in the form of a thermoplastic switch or the like (not shown), the thermoplastic switch in turn being connected with the thermocouple 2280 and operated thereby. It is apparent that thermocouple thereby controls the operation of the thermoplastic switch to maintain the temperature within the pot member 2267 at a substantially constant level as predetermined by maintaining a sufficient degree of viscosity of the adhesive substance disposed within the pot member.

A porous dispensing member 2293 is disposed at the lower end of the pot member, the dispensing member being provided with a radially outwardly extending shoulder 2294 and the lower end of the pot member being spun over as indicated at 2295 to retain the dispensing member in operative position. Dispensing member 2293 must be sufficiently porous to permit the adhesive substance to be extruded therethrough under pressure during operation, and for example may comprise a body formed of sintered bronze or similar material.

Referring to FIG. 133, the openings formed in cap member 2270 are illustrated, and bore 2280 previously discussed in connection with FIG. 131 is also visible in this view, as well as the threaded central bore 2285. The bores 2297 and 2298 are adapted to receive the fittings connected with the vacuum and pressure lines respectively, and the kidney-shaped opening 2299 is adapted to be in communication with the associated flexible conduit for receiving a supply of adhesive substance.

The interior of the pot members is normally under a light vacuum as applied to the aforementioned vacuum conduits, and upon the downstroke of the die plate 525 of the die mechanism, the dispensing member at the lower end of the pot members will engage the upwardly facing surfaces of the base portions of the can end blanks a little before the upper die member reaches the bottom of its stroke. Accordingly, the pot members will slide upwardly within the bosses of the support bracket. Fluid pressure is then introduced into the pot members through the fluid pressure lines under the control of a suitable camming and switch mechanism (not shown) connected so as to operate in timed relationship with the movement of the die press mechanism.

The application of fluid pressure to the interior of the pot members will produce extrusion of a layer of adhesive substance through the dispensing member 2293 onto the base portion of an associated can end blank. The fluid pressure is then interrupted and the interior of the pot member then subjected to a vacuum whereupon the die press mechanism moves upwardly and the upper portions of the bosses engage the under surfaces of the cap members on the associated pot members thereby moving the pot members upwardly away from the underlying can end blanks.

It will be understood that the continuous application of a light vacuum to the pot members serves to prevent the adhesive substance from flowing downwardly through the lower dispensing end portions of the pot members and thereby prevent undesired dripping of the adhesive substance onto any underlying components of the apparatus, and furthermore, the vacuum serves to assist the flow of adhesive downwardly through the flexible conduits connected with the reservoir.

It is apparent that this modified form of adhesive applying mechanism should operate upon the can end blanks when the blanks are at rest in contrast to the first described adhesive mechanism which operates on the can end blanks as they move between stations V and VI. Accordingly, the adhesive applying mechanism as shown in FIGS. 131, 132 and 133 is so constructed and arranged that the lower dispensing end portions of the pot members engage the base portions of the can end blanks while the can end blanks are at rest at station V of the machine. It should be understood that when utilizing the adhesive applying mechanism as shown in FIGS. 131, 132 and 133, the positioning means at station V must be of a modified construction (not shown) such that the dispensing end portion of the pot members can gain access to the upwardly facing base portions of the can end blanks at this station.

*Can end blank aligning means*

A can end blank aligning means is provided for properly aligning the can end blanks with the turret mechanism hereinafter described. This aligning means as seen in FIG. 61 includes a pair of hollow bushings 963 and 964 which are fitted within suitable bores provided in the channel portion 671 provided in the upper wall 189 of the main casting 185. The upper ends of the bushings 963 and 964 are closed while the lower ends thereof are open, and the two bushings are retained in operative position by means of snap rings 965 and 966 respectively. A pair of aligning plungers 968 and 969 are provided, plunger 968 including an elongated shank portion 970 and enlarged disc-like head portion 971 at the upper end thereof. Plunger 969 also includes an elongated shank portion 972 with an enlarged disc-like head portion 973 at the upper end thereof. Shank portions 970 and 972 of the two plungers extend through openings provided in the top walls of each of the bushings 963 and 964. Snap rings 975 and 976 are secured to the lower portions of the shank portions 970 and 972 respectively of the two plungers, these snap rings bearing against the under surface of sliding bushings 977 and 978 respectively. Bushings 977 and 978 are disposed in surrounding relationship to the shanks of the associated plungers and are slidably fitted within the hollow bore formed within the bushings 963 and 964.

Coil compressions springs 980 and 981 are disposed within the hollow bores of bushings 963 and 964 respectively, each of the coil springs bearing against the closed upper wall of the bushing and bearing at the opposite ends of the springs against the upper surface of the sliding bushings 977 and 978. It is apparent that the coil compression springs 980 and 981 will each serve to normally urge the associated aligning plunger in a downward direction at all times.

*Operating means for can end blank aligning means*

As seen in detail in FIGS. 62 and 63, a support bracket casting 984 includes a generally horizontal extending portion 985 and a generally vertically extending portion 986 which extends normally to portion 985. Portion 985 is secured to the under surface of the top wall 189 of the main casting by means of a plurality of cap screws 987 which are disposed within suitable aligned bores formed in portion 985 and the top wall of the casting. A vertically extending groove 988 is formed in the surface of the vertically extending portion 986.

A pair of vertically extending elongated retaining plates 990 and 991 are secured in operative position by a plurality of cap screws 992 and 993, these retaining plates extending laterally in overlying relationship to the opposite portions of the groove 988 as is seen most clearly in FIG. 63. A pair of elongated bearing members 995 and 996 of substantially L-shaped cross-sectional configuration are disposed in opposite sides of the groove 988. It will be evident that bearings 995 and 996 cooperate with the retaining plates 990 and 991 to provide a pair of trackways which receive oppositely directed portions of a slide member 998 which is adapted to reciprocate in a vertical direction and is guided in such movement by the aforementioned trackways.

A supporting means indicated generally by reference numeral 999 includes a substantially vertically extending plate 1000, a substantially horizontally extending plate 1001, and a reinforcing gusset 1002 connected between plates 1000 and 1001. The three plates 1000, 1001 and 1002 are suitably welded together to form a rigid unit. Plate 1000 is attached to the slide member 998 by a plurality of cap screws 1004 disposed within suitable openings provided in the members.

A cut-out 1005 is provided in the central wall portion 195 of the main casting, and horizontally extending plate 1001 extends through this cut-out portion whereby the support means is adapted to reciprocate up and down. As seen in FIG. 63, plate 1001 has a substantially U-shaped configuration as seen in plan view, and includes opposite leg portions 1007 and 1008.

Threaded bores are provided through the outer ends of leg portions 1007 and 1008, these bores receiving adjustable contact members 1010 and 1011 which are shown in the form of conventional cap screws, these cap screws having nuts 1012 and 1013 threaded thereon which serve as lock nuts for locking the cap screws in a desired operative position.

Referring again to FIG. 61, it will be seen that the upper ends of the adjustable contact members 1010 and 1011 bear against the lowermost end portions of the shanks 970 and 972 of the aligning plungers 968 and 969 respectively. It is apparent that by adjusting the position of contact members 1010 and 1011, the upward limit of movement as well as the downward limit of movement of the aligning plungers may be adjusted.

Referring again to FIG. 62, the lower end of the slide member 998 is secured to a connecting block 1014 by a plurality of cap screws 1015, connecting block 1014 including a laterally extending attaching lug 1016. Attaching lug 1016 is pivotally connected to the lower bifurcated end portion 1017 of a conventional adjustable link indicated generally by reference numeral 1018 and being of conventional construction.

The upper end of adjustable link 1018 is pivotally connected to the outer end of an arm 1020 of a lever member 1021 which also includes a downwardly extending arm 1022. As seen in FIG. 57, lever member 1021 includes an integral hub portion 1025 having a bore 1026 formed therethrough. A pair of spaced bushings 1027 and 1028 are disposed within bore 1026 and serve to rotatably journal the hub on the fixed shaft 908.

Referring to FIG. 17, a face cam 1030 is keyed to the main shaft 172, and as seen in FIG. 64, cam 1030 includes a cam track 1031. A cam follower 1032 is rotatably supported at the outer end of arm 1022 of lever member 1021, cam follower 1032 fitting within the cam track 1031 of face cam 1030. It is apparent that during operation, lever member 1021 will be reciprocated upon rotation of cam 1030.

*Sheet feed system*

For the purposes of illustration in the present application, the thin layer of frangible material of the finished closure in the present invention is aluminum foil, and the following description will be directed to the use of aluminum foil, it being understood that various other suitable materials could as well be employed for this purpose. A thin sheet of aluminum foil is fed across the machine at an angle of approximately 60° to the line of travel of the can end blanks through the machine, the direction of feed appearing most clearly in FIG. 15.

The over-all feed system is illustrated somewhat schematically in FIG. 65, and as seen in this figure, reel 1035 of aluminum foil is supported upon a rotatable spindle 1036. The foil is fed between power-driven driving rollers 1037 and 1038, the foil then forming a depending loop which cooperates with two pairs of photoelectric cells 1039 and 1040 which are adapted to maintain the loop within certain predetermined limits. The foil then passes through a hitch feed mechanism 1042, and finally is taken up on a power driven take-up reel 1043.

Referring particularly to FIGS. 66 and 67, a support bracket means indicated generally by reference numeral 1045 includes a central plate 1046 which has laterally outwardly extending plates 1047 and 1048 welded to the opposite ends thereof. Plate 1046 is rigidly attached to beam 126 of the supporting framework by means of cap screws 1049 extending through suitable openings provided in the members, and it will be noted that the outer ends of each of plates 1047 and 1048 provide flat upper supporting surfaces.

A plate 1050 is supported upon the flat outer surfaces of plates 1047 and 1048 and is rigidly secured thereto as by welding. A supporting block 1051 is supported on the upper surface of plate 1050 and is secured thereto by a plurality of cap screws 1052. Block 1051 is provided with a central cylindrical bore therethrough, a tubular supporting post 1053 being snugly fitted within this bore and suitably secured in position by means of set screws or the like.

As seen particularly in FIG. 68, a spindle and drive roller support means 1055 is provided with a split block 1056 which is adapted to receive the upper end of the support post 1053. A pair of cap screws 1057 are disposed within suitable bores provided in the split block 1056 for tightening the block about the upper end of the supporting post 1052 for clamping the support means 1055 in supported position on the post. A split collar 1058 is also provided, a cap screw 1059 being disposed within suitable bores provided in split collar 1058. Collar 1058 is provided for ensuring that the entire support means will not slip downwardly along the post should the cap screws 1057 be loosened for the purpose of rotating the support means.

Support means 1055 comprises a rear plate 1060 and a front plate 1061, these plates being interconnected by vertically extending members 1062, 1063, and 1064 as seen in FIG. 69. Members 1060–1064 are all welded together to form a rigid structure.

Spindle means

As seen particularly in FIG. 66, a flanged spindle member 1065 has the laterally extending flange portion thereof rigidly attached to the front plate 1061 of the support means by means of a plurality of cap screws 1066 disposed within suitable bores in the members.

An annular plate 1070 is supported upon an annular shoulder portion 1071 of the flanged spindle member, plate member 1070 having an annular outwardly facing groove formed therein within which is disposed a brake lining 1072, the brake lining extending beyond the outer face of the plate member for providing a predetermined amount of drag on the rotating sleeve member hereinafter described.

A tubular sleeve member 1075 is provided with a bore 1076 therethrough, the sleeve member being counterbored at the opposite ends thereof and receiving ball bearings 1077 and 1078 which are supported on the outer surface of the flanged spindle member hereinbefore described. The ball bearings 1077 and 1078 may be pre-loaded by a washer 1079 which bears against ball bearing 1078, the washer being urged to the left as seen in FIG. 66 by means of a nut 1080 threaded upon the reduced threaded end portion 1068 of the flanged spindle member 1065.

The lefthand end portion of sleeve 1075 as seen in FIG. 66 is provided with an annular radially outwardly extending flange 1081, the lateral face of which is adapted to engage the brake lining 1072 supported by plate 1070. A plurality of adjusting screws 1083 which may for example be three in number and only one of which is seen in FIG. 66 extends through clearance openings in plate 1061 and are threaded within suitable threaded openings provided in the peripheral flange of the flanged spindle. These adjusting screws engage plate 1070, and it is evident that by adjusting the position of screws 1083, the amount of frictional drag applied by the brake lining 1072 to the tubular sleeve 1075 may be selectively adjusted. Adjusting screws 1083 may be locked in a desired adjusted position by means of lock nuts 1084 threaded on the outer ends thereof.

A cap 1086 is secured to the outer end of hollow sleeve 1075 by a plurality of cap screws 1087 which fit within counterbored portions of the cap and extend into suitable bores provided in member 1075. The cap 1086 is counterbored to provide clearance with the outer reduced end 1068 of the flanged spindle. It will be noted that the outer surface of cap 1068 extends substantially flush with the outer surface of tubular sleeve 1075, and the reel 1035 of aluminum foil is supported upon these flush surfaces as indicated in phantom line in FIG. 66.

A latch means is provided for positively locking the reel 1035 on the sleeve member 1075 and the cap 1086. This latching means includes as seen particularly in FIG. 70 a slot 1090 formed in the side of the cap member and extending through a major portion thereof, this slot being adapted to slidably receive a flat latching member 1091 which is substantially semi-circular in plan configuration. Latching member 1091 is swingably supported upon a shoulder screw 1092 which is disposed within suitable bores provided in the latching member and in the cap member.

Latching member 1091 is so configured that when it is swung inwardly to its fullest extent within the slot 1090, the outer surface thereof will not extend out beyond the outer surface of the cap member, whereas when it is swung outwardly into its latching position as shown in FIG. 70, it will be seen it will be apparent that the outer periphery of the latching member extends radially outwardly of the outer surface of the cap member. When the latching member is in the position as shown in full lines in FIG. 70, it is apparent that as associated reel of aluminum foil can not be removed from the tubular sleeve 1075 since the outer periphery of the latching member will engage the innermost portion of the reel.

Referring to FIGS. 70 and 71, an operating arm 1093 is fixed to the latching member 1091 and extends normally therefrom. This operating arm is disposed within an arcuate slot 1094 formed through cap 1086, slot 1094 being in communication with the slot 1090 in the cap. As seen particularly in FIG. 71, the upper surface of the latching member 1091 as seen in this figure is provided with a pair of spaced recesses 1095 and 1096. Each of these recesses is adapted to receive a detent means indicated by reference numeral 1097 and including a spring-pressed detent member 1098 which is normally urged in a downward direction so as to seat within one of the recesses. The detent means 1097 is threaded within a suitable bore provided in the cap 1086 and is of a well-known conventional construction. The detent means 1097 cooperates with the recesses 1095 and 1096 to retain the latching member 1091 either in its inner position where it does not perform a locking function or in its outer position wherein it positively prevents the reel from being removed from the sleeve member 1075 as will be well understood.

Driving roller means

Referring now particularly to FIGS. 66, 68, 69 and 72, a supporting framework for the driving rollers includes a substantially vertically extending plate 1100 which is secured to the plate 1061 of support means 1055 by four cap screws 1101 disposed within suitable bores provided in plates 1100 and 1061. Welded to the outer face of plate 1100 and extending laterally outwardly thereof are a pair of connecting arms 1102 and 1103 and a reinforcing gusset 1104. An outer frame member 1105 is welded in spanning relationship between the outer ends of connecting arms 1102 and 1103.

Referring particularly to FIG. 72, the upper edge of plate 1100 is of a particular configuration including an upstanding portion 1107, a rectangular cut-out portion 1108 being formed in the upper edge of the plate adjacent to upstanding portion 1107, and a further semi-circular cut-out portion 1109 being provided in the upper edge of the plate in spaced relationship to the cut-out portion 1108. Three tapped openings 1110 and 1111 and 1112 are also provided in the upper edge of the plate. In addition, a laterally extending bore 1113 is formed through the side of the plate and is in communication with the cut-out portion 1108 formed in the upper portion of the plate. The construction of the outer frame member 1105 is identical with that discussed in connection with the upper portion of plate 1100 such that the opposite end portions of the supporting framework from the rollers are symmetrical.

A first driving roller 1115 is provided with reduced spindle portions 1116 and 1117 which extend longitudinally from opposite ends thereof, these spindle portions being seated within bearings 1118 and 1119 which are in turn supported within the semi-circular cut-out portions formed in the upper portions of plate 1100 and the outer frame member 1105 respectively. The outer end of spindle 1116 is connected to a flexible coupling 1120 of conventional construction which is in turn driven through a gear box 1121 by a conventional electric motor 1122.

A second driving roller 1124 is provided with reduced spindle portions 1125 and 1126 extending longitudinally from the opposite end portions thereof, spindle portions 1125 and 1126 being journalled respectively in journal blocks 1127 and 1128. Each of journal blocks 1127 and 1128 are of substantially rectangular configuration, and as seen particularly in FIG. 72, the journal blocks have clearance in a lateral direction with the associated rectangular cut-out portions in the upper portions of plate 1100 and outer frame member 1105. This permits the journal blocks to have relative movement laterally from side to side with respect to the associated supporting members. It is accordingly apparent that roller 1124 is mounted for reciprocable movement toward and away from the other roller 1115.

Compression springs 1130 and 1131 are disposed in the laterally extending bores provided in the upper portions of plate 1100 and the outer frame member 1105, and as seen in FIG. 72, each of these compression springs bears against a lateral surface of the associated bearing block. The springs 1130 and 1131 are retained in their bores by retaining plates 1132 and 1133 which are respectively held in operative position by pairs of cap screws 1134 and 1135 respectively.

A pair of bearing retainer members 1136 and 1137 are respectively secured to the upper portions of plate 1100 and outer frame member 1105 by a first plurality of cap screws 1138 and a second plurality of cap screws 1139 respectively. As seen particularly in FIG. 72, the under surface of each of the bearing retainer members includes a cut-out portion 1140 such that it is adapted to slidably receive the upper portion of the associated journal block; and further, the under surface of each of the bearing retainer members is provided with a semi-circular cut-out portion 1141 which cooperates with the semi-circular cut-out portion in the underlying member to provide a seat for the bearings 1118 and 1119. It is of course understood that suitable counterbored openings are provided in the bearing retainer members for receiving the cap screws 1138 and 1139 which secure the bearing retainer members in operative position.

Referring again particularly to FIG. 66, gears 1143 are secured to the opposite spindle portions 1116 and 1117 of the first driving roller, only one of these gears being visible in FIG. 66. In a like manner, gears 1144 are secured to the opposite spindle portions 1125 and 1126 of the second driving roller 1124, only one of these gears 1144 being visible in FIG. 66. The gears 1143 and 1144 of the two driving rollers are in meshing engagement with one another whereby the drive which is transmitted to roller 1115 through the flexible coupling 1120 will in turn be transmitted to driving roller 1124 which will, of course, be driven in an opposite direction such that the two rollers cooperate to feed the thin sheet of aluminum foil therebetween during operation of the apparatus.

A cam member 1145 is secured to each of the gears 1143 longitudinally outwardly thereof by a plurality of flat head screws 1146, only one of these cam members being visible in FIG. 66. In a similar manner, a cam member 1147 is secured to each of gears 1144 longitudinally outwardly thereof by a plurality of flat head screws 1148, only one of cam members 1147 being visible in FIG. 66. As seen in FIG. 69, the outer periphery of the cam members 1145 and 1147 are eccentric with respect to the axes of rotation $x$ and $y$ of the respective rollers 1115 and 1124. The purpose of this construction will be explained fully hereinafter.

*Photoelectric cell control means*

Referring particularly to FIGS. 65 and 68, a support bracket for the photoelectric cell assembly of the foil feed assembly is illustrated generally by reference numeral 1150 and includes a substantially horizontally extending member 1151 having a split end portion which is wrapped around the post 1053 and which is clamped in place by a suitable cap screw (not shown). A pair of support members 1152 and 1153 are secured to spaced portions of member 1151 in laterally spaced relationship to the post 1053, members 1152 and 1153 extending vertically upwardly. As seen in FIG. 68, one of the support members 1152 supports in vertically spaced relationship one one of the photoelectric cells 1039 and another photoelectric cell 1040. The opposite support member 1153 supports in vertically spaced relationship the companion photoelectric cells 1039 and 1040. Either of the photoelectric cells of each pair of cells 1039 and 1040 may be the light transmitting cell while the opposite cell will, of course, be the receiving cell. It will be noted that the opposite cells of each pair of cells 1039 and 1040 are slightly vertically offset with respect to one another to ensure that the thin sheet of foil will effectively break the light means as it passes between the cells since the entire width of the foil will be effective for this purpose with this offset arrangement.

The photoelectric cells 1039 and 1040 are connected in a suitable conventional electrical network (not shown) which is in turn connected with the electric motor 1122 which drives the driving rollers. The network is so arranged that when the strip of foil breaks the light beam between cells 1039, the electric motor is started so as to feed more foil downwardly through the driving rollers. On the other hand, when the foil is in such a position that it breaks the light beam between the cells 1040, the electric motor is stopped, and the rollers will, of course, cease to feed the foil until the motor is again started. It is accordingly clear that the photoelectric cell means will operate to maintain a loop of foil from the driving rollers within certain predetermined limits. As seen in FIG. 69, the foil which passes downwardly through the driving rollers forms a loop and is then fed onto a supporting surface member 1155. The phantom lines 1156 and 1157 respectively represent the limits of the loop, line 1156 indicating the smallest loop which will be formed and line 1157 indicating the largest loop which will be formed between the driving rollers and the supporting surface 1155.

*Sheet feed means (first modification)*

Figure 73:
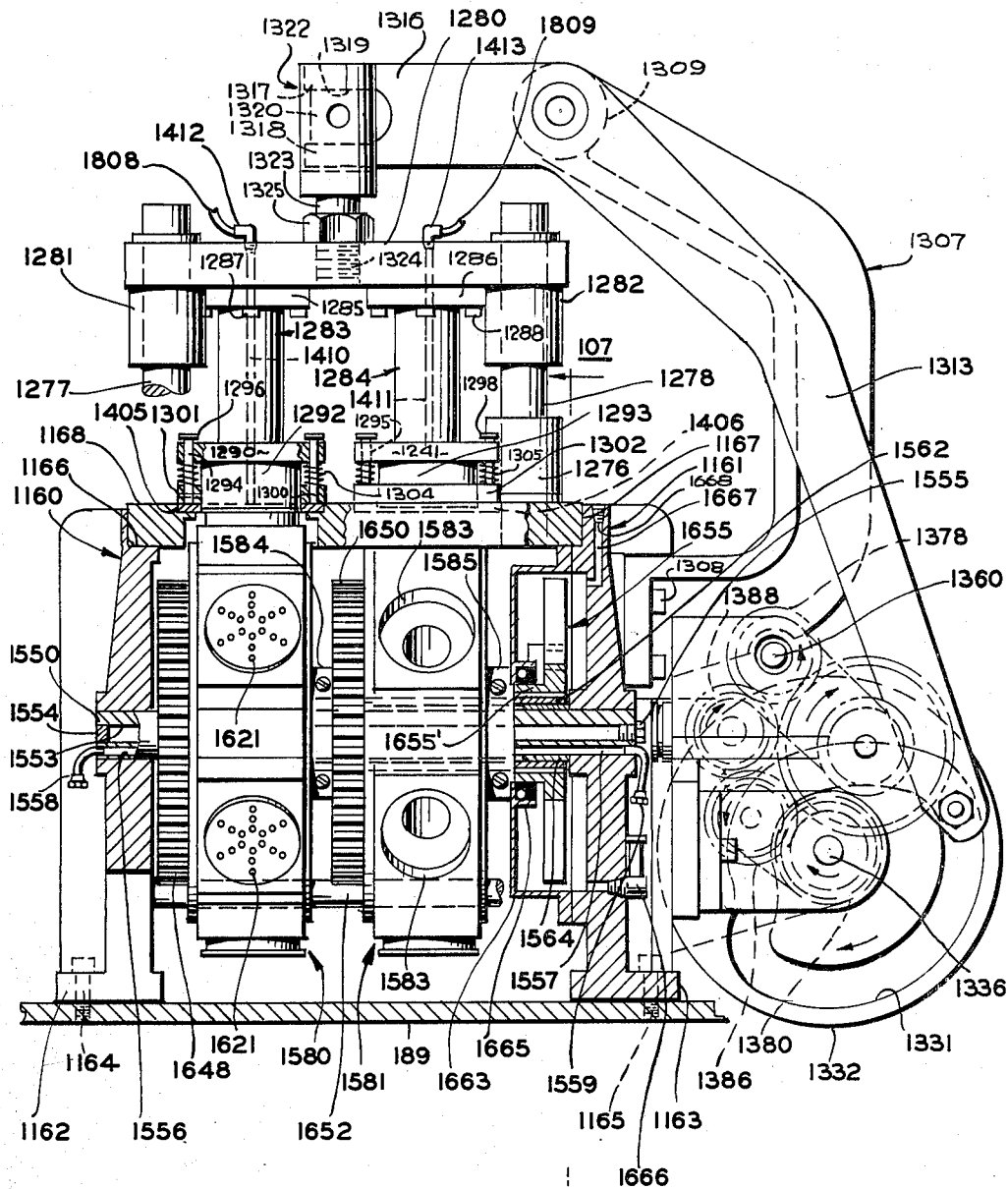
FIG. 73 is a view partially broken away and partially in section illustrating the turret mechanism and the frangible material die mechanism disposed thereabove as seen from the stacking bend of the machine with the sheet fed structure removed.

Referring particularly to FIG. 73, a pair of castings 1160 and 1161 are disposed in spaced relationship to one another and are supported upon the upper surface of the top wall 189 of the main casting 185. The castings 1160 and 1161 have laterally extending flanges 1162 and 1163 respectively formed at the lower portions thereof, these flanges being secured to the upper wall of the main casting by cap screws 1164 and 1165 respectively. Castings 1160 and 1161 also have shoulders 1166 and 1167 formed respectively thereon, these shoulders facing one another as seen in FIG. 73, whereby a lower die plate 1168 may be supported upon the oppositely facing shoulders.

Figure 74:
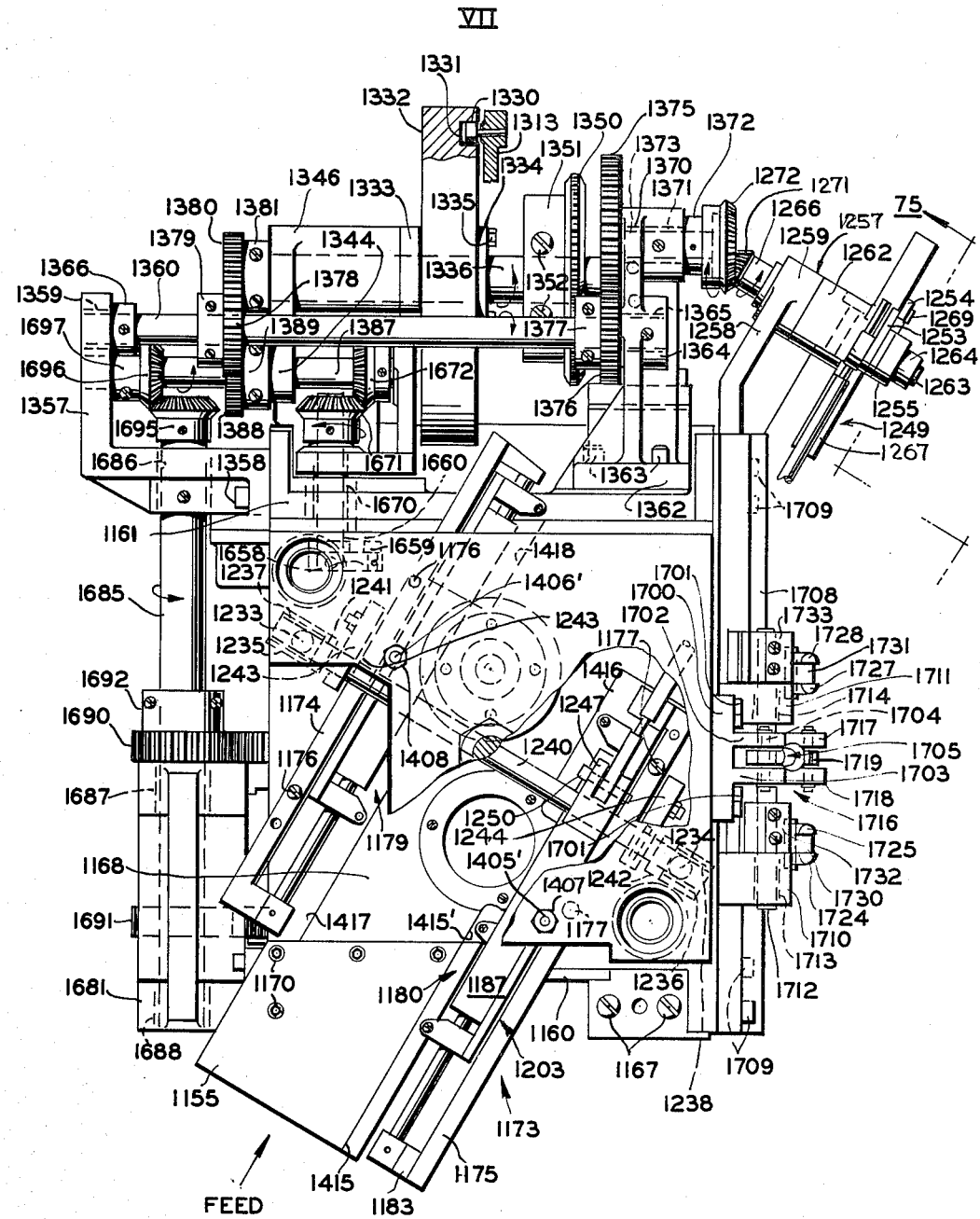
FIG. 74 is a top view of the turret mechanism illustrating the drive means for the turret mechanism as well as a portion of the sheet feed mechanism, the view being partially broken away for the sake of clarity with certain parts removed.

As seen in FIG. 74, the supporting surface member 1155 is secured to the upper surface of the casting 1160 by means of flat head screws 1170, it being understood that the upper surface of member 1155 is flush with the die plate 1168, thereby providing a smooth surface over which the foil can pass through the hitch feed mechanism.

Referring particularly to FIG. 74, the hitch feed mechanism is indicated generally by reference numeral 1173 and includes a left-hand support yoke 1174 and a right-hand support yoke 1175, each of these support yokes being substantially U-shaped as seen from above, the yokes being secured to the underlying die plate 1168 by cap screws 1176 and 1177 respectively. Support yokes 1174 and 1175 each support reciprocating and oscillating gripper means which are indicated generally by reference numerals 1179 and 1180, the details of construction of these gripper means appearing hereinafter. These gripper means are adapted to grip the opposite edge portions of the strip of aluminum foil as it is fed through the apparatus and serve to advance the strip of foil in a step-by-step fashion.

The support yokes as well as the gripper means at each side of the hitch feed means are of identical construction except that one is disposed in the reverse arrangement to the other. Accordingly, a description of the support means and reciprocating and oscillating gripper means at one side of the hitch feed means will suffice for describing the mechanism at the opposite side of the feed means as well. Referring now to FIGS. 76–84, the support yoke 1175 and the gripper means 1180 are illustrated in detail.

Referring particularly to FIGS. 76–78, support yoke 1175 includes laterally extending portions 1182 and 1183 at opposite ends thereof. These laterally extending end portions taper upwardly to a greater vertical dimension as seen in FIG. 78, and each of the end portions is provided with a pair of vertically spaced bores formed therethrough. An upper guide rod 1184 has the opposite ends thereof disposed within the upper bores formed in each end portion of the support yoke 1175, and a lower guide rod 1185 has the opposite end portions thereof disposed within the lower bores formed in each of the end portions, the rods being held in place within the bores by suitable means such as a set screw or the like.

A sliding block 1187 is slidably mounted upon the upper and lower guide rods 1184 and 1185, and as seen in FIG. 80, sliding block 1187 has formed completely through the length thereof a first bore 1188 through which the upper rod 1184 extends, and a second bore 1189 which receives the lower rod 1185. The upper bore 1188 is counterbored at the opposite ends thereof and receives ball bearing bushings 1190 and 1191 within these counterbored portions as seen most clearly in FIG. 77. The remainder of bore 1188 has a slight clearance with the outer surface of rod 1184.

As seen in FIG. 79, the under surface of sliding block 1187 is provided with a pocket 1192, this pocket receiving a ball bearing bushing 1193 as seen in FIG. 77, lower rod 1185 fitting through bearing 1193, and the remainder of the bore 1189 being spaced from the outer surface of lower rod 1185. Bearings 1190 and 1191 support the sliding block for sliding movement along the upper rod 1184, while the other ball bearing bushing 1193 prevents the sliding block from revolving about the longitudinal axis of the upper shaft 1184.

As seen in FIGS. 79 and 80, sliding block 1187 includes a laterally extending cut-out portion 1195 formed in the lower major portion thereof for a purpose which will hereinafter appear. The under surface of sliding block 1187 also includes a longitudinally extending cut-out portion 1196 along one edge thereof as seen particularly in FIG. 80.

The diagonally opposite edge from said one edge is also cut away to form a shoulder 1197 and a stop surface 1198, these surfaces also extending longitudinally of the block. As seen in FIG. 79, the sliding block is provided with three substantially vertically extending bores 1200. As seen in FIG. 77, three spring pressed plungers 1201 are mounted within the bores 1200, these spring pressed plungers being of conventional construction and being normally urged in an upward direction by the associated spring means.

Referring to FIG. 82, a pressure bar means indicated generally by reference numeral 1203 includes an elongated upper portion 1204 from which depend three leg portions 1205, 1206 and 1207. As seen in FIG. 77, leg portions 1205 and 1207 are positioned beyond the opposite ends of the sliding block 1187, the laterally outward-most portions of these legs extending laterally beyond the sliding block. Leg portion 1206 of the pressure bar means extends through the cut-out portion 1195 formed in the sliding block, thrust bearing washers 1208 and 1209 being disposed between opposite sides of the leg portion 1206 and the adjacent walls of the cut-out portion 1195 such that movements of the sliding block will be transmitted through these thrust bearing members to the pressure bar means in a longitudinal reciprocating direction.

As seen in FIG. 82, leg portions 1205 and 1206 and 1207 are respectively provided with bores 1205′, 1206′ and 1207′ formed therethrough. As seen in FIG. 77, a ball bearing bushing 1210 is received within bore 1205′ and a ball bearing bushing 1211 is received within bore 1207′. Rod 1185 extends through ball bearing bushings 1210, 1211 and also extends through the clearance bore 1206′ provided in leg 1206 of the pressure bar means.

Referring to FIG. 83, the relative relationship of the sliding block and the pressure bar means is apparent, and it will be noted that the resilient plunger means 1201 mounted in the sliding block engages against the under surface of the upper portion 1204 of the pressure bar means to normally rotate the pressure bar means in a clockwise direction as seen in FIG. 83, thereby causing the upper portion 1204 to engage against the stop surface 1198 formed on the sliding block 1187.

As seen in FIGS. 77 and 83, the outermost portions of leg portions 1205, 1206 and 1207 have vertically extending bores formed therethrough within which are mounted conventional adjustable ball detent means 1213 having spring loaded hardened balls 1214 projecting therebeneath. The hardened balls are adapted to engage the upper surface of the strip of foil when feeding the strip through the hitch feed mechanism.

Referring to FIG. 84, a finger plate member 1215 includes three laterally extending leg portions 1216, 1217 and 1218 which are adapted to underlie respectively the leg portions 1207, 1206 and 1205 of the pressure bar means. Leg portions 1216, 1217 and 1218 each include a depression 1216′, 1217′ and 1218′ respectively formed in the upper surface thereof which is adapted to cooperate with the ball detent means of the pressure bar means for securely gripping the aluminum foil therebetween. The longitudinally extending main body portion of finger plate 1215 is received within the cut-out portion 1196 formed in the under surface of sliding block 1187, finger plate 1215 being provided with three spaced openings 1220 for receiving flat head screws which extend through these openings and up into suitable bores provided within the sliding block for securing the finger plate to the under surface of the sliding block. The finger plate is also provided with three spaced cut-outs 1221, 1222 and 1223 which are respectively formed for providing clearance with the leg portions 1207, 1206 and 1205 of the pressure bar means.

As seen in FIGS. 76, 77 and 81, a support yoke 1175 is provided with a longitudinally extending slot 1225 through which extends a pin 1226, the inner end 1227 of which is secured to sliding block 1187. The outer end 1228 of the pin is threaded, and a rectangular bearing member 1229 is provided having a bore therethrough which receives the outer portion of the pin, nut 1230 being threaded on the threaded outer end of the pin 1226 for retaining the bearing member 1229 on the pin.

*Reciprocating operating means for sheet feed means (first modification)*

Referring particularly to FIGS. 74 and 75, a pair of support post 1233 and 1234 has a press fit within suitable bores provided in die plate 1168, support posts 1233 and 1234 extending vertically upwardly from the die plate and having bearing blocks 1235 and 1236 mounted on the upper ends thereof. The bearing blocks are provided with suitable bores extending laterally therethrough which respectively receive bearing bushings 1237 and 1238 which rotatably journal the opposite ends of a cross shaft 1240. Shaft 1240 has collars 1241 and 1242 removably secured thereto, these collars serving to hold the shaft in operative position as seen particularly in FIG. 74.

A pair of spaced fork levers 1243 and 1244 are pinned to the shaft for rotation therewith, and as seen especially in FIG. 75, the lower end of fork lever 1244 is provided with a longitudinally extending slot 1245 which slidably receives the bearing block 1229 secured to the outer end of pin 1226 which is in turn fixed to the sliding block 1187. It will be understood that the opposite fork lever 1243 is connected with the sliding block of its associated reciprocating and oscillating gripper means in a similar manner.

A lever arm 1247 is also pinned to cross shaft 1240 intermediate the fork levers 1243 and 1244, and as seen in FIG. 75, the lower portion of lever arm 1247 is provided with an elongated slot 1248. An adjustable link 1249 has one end portion thereof pivotally connected to the lower end of lever arm 1247 by a shoulder screw and nut assembly 1250 which may be selectively adjusted for adjusting the position of the end portion of link 1249 in the slot 1248 thereby adjusting the relative position of the lever arm 1247 and adjustable link 1249.

The opposite end of the adjustable link 1249 is pivotally connected to a lever member 1252 including an upwardly extending arm 1253 and a downwardly extending arm 1254, the link 1249 being connected to the arm 1253. Lever member 1252 also includes an integral hub portion 1255.

A bracket 1257 is secured to casting 1161 by means of cap screws 1257', bracket 1257 including a laterally extending portion 1258 which includes at the outer end thereof an integral hub portion 1259. An upwardly extending portion 1260 is formed integral with the laterally extending portion 1258, and a hub 1262 is formed at the upper end thereof. A pin 1263 is mounted within hub 1262, and the hub 1255 of lever member 1252 is journalled on pin 1263, the lever member being held in assembled relationship by means of a retaining collar 1264 threaded on the threaded outer end of pin 1263.

A shaft 1266 is journalled in the hub portion 1259, and a free cam 1267 is keyed to shaft 1266. Cam 1267 is provided with a cam track 1268 within which is received a cam follower 1269 rotatably mounted on the lower end of arm 1254 of lever member 1252. It is apparent that during operation of the machine and rotation of cam 1267, lever member 1252 will be oscillated so as to oscillate the cross shaft 1240 previously described.

As seen in FIG. 74, a bevel pinion 1271 is integral with the outer end of shaft 1266 and meshes with an internal bevel gear 1272, the driving connection thereto being hereinafter described.

*Die mechanism for frangible material*

Referring now to FIG. 85, a pair of spaced bushings 1275 and 1276 are fixed to the upper surface of the lower die plate 1168. A pair of upstanding guide posts 1277 and 1278 are fixed within bushings 1275 and 1276 respectively. An upper die plate 1280 is provided with a pair of spaced stepped bushings 1281 and 1282 within which the guide posts are slidably received in a well-known manner such that the upper die plate is accurately guided in perfect registry with the lower die plate at all times.

Referring particularly to FIG. 73, punch members 1283 and 1284 are provided with enlarged radially extending flanges 1285 and 1286 at the upper portions thereof, these flange portions being secured to the under surface of the upper die plate 1280 by means of cap screws 1287 and 1288 respectively. Punch members 1283 and 1284 include radially outwardly extending enlarged flanges 1290 and 1291 at an intermediate portion thereof, and the lowermost portions of these punch members comprise the punch portions 1292 and 1293 respectively, the lower peripheral edge of these punch portions forming the cutting edges for cooperating with the die rings hereinafter described supported by the lower die plate for cutting out discs of foil which is fed through the apparatus.

Each of the enlarged flange portions 1290 and 1291 is provided with a plurality of circumferentially spaced vertically extending bores, these bores being indicated by reference numerals 1294 formed through flange 1290 and 1295 formed through flange 1291. The bores receive respectively a first plurality of plungers 1296 associated with the first plunger member 1283 and a second plurality of plungers 1298 associated with the second punch member 1284. The lower end portion of each of the plungers 1296 is received within a suitable bore provided in a pressure and stripper ring 1300 and is pinned thereto by means of a pin 1301. In a like manner, the lower end portions of each of plungers 1298 is attached to a pressure and stripper ring 1302.

A compression spring 1304 is disposed around each of plungers 1296, and similar compression springs 1305 are disposed around each of plungers 1298, the compression springs in each case being seated between the under surface of the enlarged intermediate flange on the associated punch member and seating at the other end against the upper surface of the associated pressure and stripper ring whereby the pressure and stripper ring in each case will be normally urged downwardly to its limit of movement as determined by the enlarged heads formed on each of the associated plungers.

*Operating means for die mechanism for frangible material*

As seen particularly in FIG. 73, a support bracket 1307 has the lowermost portion thereof secured to casting 1161 by means of cap screws 1308, bracket 1307 being substantially U-shaped and extending upwardly and having an integral hub 1309 formed at the upper end thereof. As seen especially in FIG. 85, a pin 1310 extends through a suitable lateral bore formed in hub 1309 and is retained in position by means of a set screw 1311.

A lever 1313 has a laterally extending integral boss 1314 which as seen in FIG. 85 is juxtaposed with boss 1309 formed on bracket 1307. A bearing 1315 is received within a laterally extending bore formed through boss 1314, and pin 1310 extends within bearing 1315 whereby lever 1313 is pivotally supported from the hub 1309 of bracket 1307.

The upper end of lever 1313 is bifurcated to provide a pair of spaced leg portions 1317 and 1318 defining a slot 1319 therebetween. A bearing block 1320 of substantially rectangular cross section is slidably received within the slot 1319.

A connector member 1322 includes a reduced shank portion 1323 which is externally threaded and which is threaded into a threaded bore 1324 provided in the upper die plate 1280. A lock nut 1325 is threaded on shank portion 1323 for locking it in a desired adjusted position. The upper portion of connector member 1322 is bifurcated and includes opposite leg portions 1326 and 1327 which define a slot therebetween receiving the outer end portion 1316 of lever 1313.

A pin 1328 extends through aligned bores provided in bearing block 1320 and the opposite leg portions 1326 and 1327 of the connector member 1322, the pin being retained in operative position by means of snap rings or the like mounted on the opposite ends thereof.

At the opposite lower end of lever 1313, a cam follower 1330 is rotatably mounted and this cam follower is disposed within a cam track 1331 formed in one face of the face cam 1332. Cam 1332 is provided with a hub 1333 having a tapered bore formed therethrough which cooperates with a tapered draw bushing 1334 which is drawn up by means of cap screws 1335 to lock the cam on a shaft 1336, the cam also being keyed to this shaft.

Figure 86:
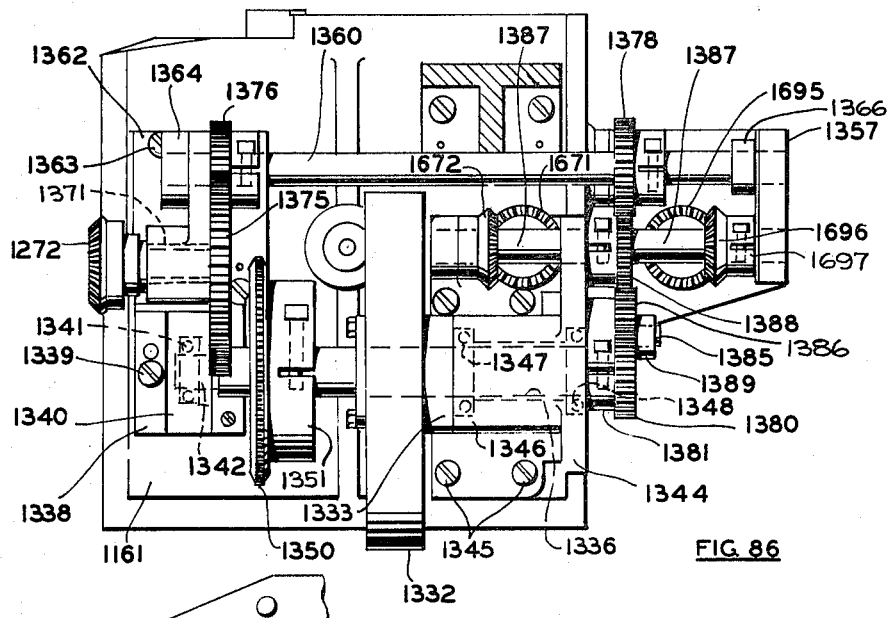
FIG. 86 is a back view of the turret mechanism illustrating the turret driving means.

Referring now to FIG. 86, a bearing support casting 1338 is supported from the casting 1161 through the intermediary of cap screws 1339. Casting 1338 includes an outwardly projecting portion 1340 having a laterally extending bore formed therein within which is mounted a ball bearing 1341. The reduced end portion 1342 of shaft 1336 is rotatably journalled within ball bearing 1341.

Another bearing support casting 1344 is also secured to casting 1161 by means of cop screws 1345 extending through the base flange portion of this casting. Casting 1344 includes an integral hub portion 1346, hub portion 1346 having a bore formed laterally therethrough which is counterbored at the opposite ends thereof to receive the spaced ball bearings 1347 and 1348 which rotatably support the opposite end of shaft 1336.

Figure 87:
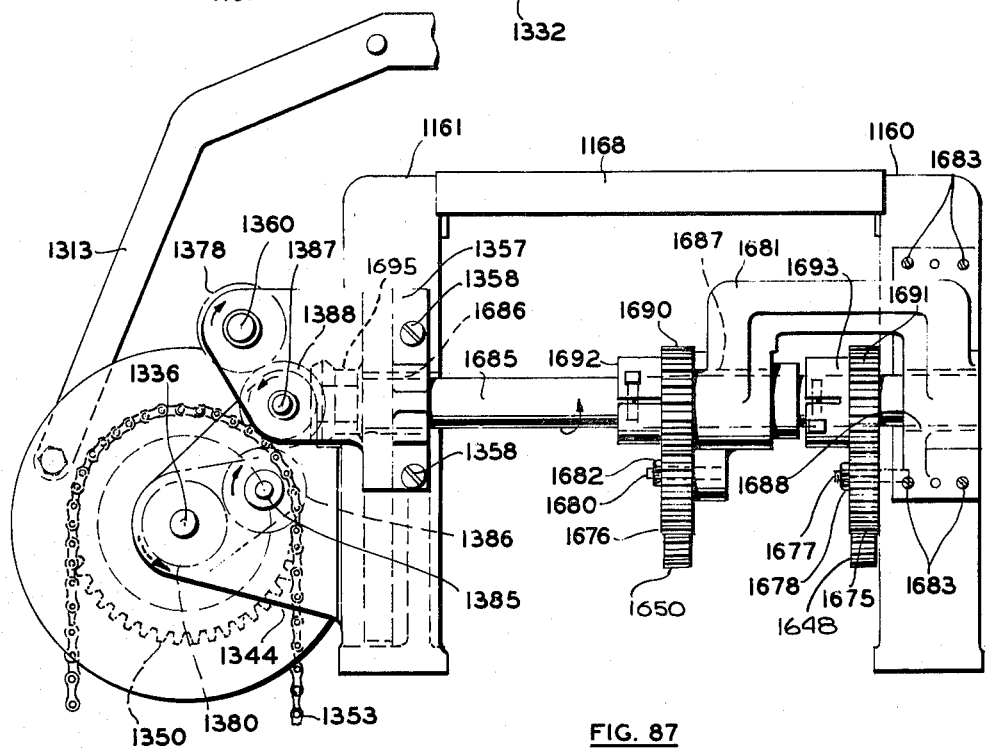
FIG. 87 is a side view of the structure shown in FIG. 86 illustrating the drive means for the turret mechanism with the turret mechanism removed.
Figure 122:
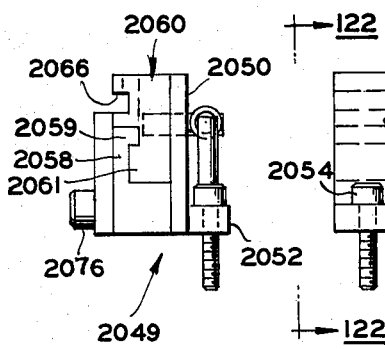
FIG. 122 is an end view of the structure shown in FIG. 121 as seen along line 122—122 looking in the direction of the arrows.

Referring particularly to FIGS. 74 and 87, a sprocket member 1350 is provided with a split hub 1351 which is attached to shaft 1336 by means of a pair of cap screws 1352, the hub also being keyed to shaft 1336 for rotation therewith. A chain 1353 is trained over sprocket 1350 and also over a sprocket 1354 as seen in FIG. 17 which is fastened to cam 1030 by means of cap screws 1355 for rotation with the cam and with the main shaft 172.

As seen particularly in FIG. 74, a casting 1357 of generally L-shaped configuration is secured to the casting 1161 by means of cap screws 1358. The outer end of casting 1357 has a bore formed therethrough within which a bearing 1359 is provided, one end portion of a countershaft 1360 being supported within bearing 1359. A cast-in 1362 is also secured to casting 1161 by means of cap screws 1363, casting 1362 having a first integral hub portion 1364. Hub portion 1364 has a laterally extending bore formed therethrough and a bearing 1365 fitted therewithin which supports the opposite end of countershaft 1360. A split retaining collar 1366 is mounted upon countershaft 1360 adjacent to the casting 1357 and suitable cap screws are associated with the split collar for drawing it up tightly on the countershaft to assist in retaining the countershaft in proper operative position.

Casting 1362 also includes a second hub portion 1370, this hub portion being provided with a laterally extending bore within which it is seated in bearing 1371. The internal bevel gear 1272 previously described is provided with an integral hub portion 1372 which is pinned to the outer end of a shaft 1373 which is rotatably journalled within bearing 1371. A spur gear 1375 is fixed to the opposite end of shaft 1373, gear 1375 being in meshing engagement with a spur gear 1376 mounted upon countershaft 1360. Gear 1376 is provided with a split hub 1377 which is clamped to the countershaft 1360 by means of suitable cap screws, the hub also being keyed to counter shaft 1360.

A spur gear 1378 is provided with a split hub 1379 which is clamped to countershaft 1360 by means of suitable cap screws, the hub also being keyed to shaft 1360. Gear 1378 is in meshing engagement with a spur gear 1380 which is in turn provided with a split hub 1381 which is clamped upon shaft 1336 by means of suitable cap screws and keyed thereto.

An idler shaft 1385 is supported by bracket 1344, the idler shaft having a press fit in this bracket. An idler gear 1386 is rotatably journalled on shaft 1385 and is in meshing engagement with gear 1380. As seen in FIG. 86, a locking collar 1389 is secured to the outer end of idler shaft 1385 for retaining the idler gear 1386 on the idler shaft. A turret gear shaft 1387 has one end portion thereof rotatably journalled in the bracket 1357, and an intermediate portion of shaft 1387 is journalled within bracket 1344. A spur gear 1388 is fixed to shaft 1387 and is in meshing engagement with the idler gear 1386 as well as gear 1378. It is accordingly apparent that gear 1378 is driven from gear 1380 through the intermediary of gears 1386 and 1388. Gear 1388 has an integral split collar 1389 which is drawn up by suitable cap screws for securing gear 1388 for rotation with shaft 1387, the gear also being keyed to shaft 1387.

*Take-up mechanism*

Referring to FIG. 65, a base structure 1392 is mounted on any suitable supporting surface, and a torque motor 1393 is supported upon the base structure 1392. A driving pulley 1394 is driven by the torque motor A hub portion 1395 is formed on the base structure and a supporting post 1396 is supported by the hub and extends substantially vertically upwardly therefrom. A supporting bracket 1397 is suitably secured to the upper end of supporting post 1396 and extends laterally therefrom. Supporting bracket 1397 rotatably supports a hub 1398 having four equally spaced radially outwardly extending spokes 1400 formed at either end thereof. Hub 1398 is substantially cylindrical in configuration and is adapted to receive the layer of aluminum foil after it leaves the hitch feed mechanism. The spokes 1400 will, of course, aid in guiding this strip properly onto the hub portion 1398 and will serve to retain the reel of material as the aluminum foil accumulates on the hub 1398. One of the spoke assemblies 1400 is removable from one end of the hub to enable the removal of the reel of used aluminum foil after it has accumulated to a substantial size on the hub.

A driven pulley 1401 is drivingly connected with the hub 1398 and is connected through a suitable driving connection such as a V-belt 1402 with the pulley 1394 connected with the torque motor. It is evident that during operation, motor 1393 may be continuously driven to apply a predetermined amount of torque to the pulley 1401 thereby tending to take up the strip of frangible material onto the hub portion 1398. The apparatus accordingly serves as a take-up mechanism for continuously storing the foil scrap skeleton after it leaves the sheet feed mechanism.

*Oscillating operating means for sheet feed means (first modification)*

Referring to FIGS. 74 and 75, a pair of depending posts extend downwardly from the upper die plate 1291, one of these posts 1405 being visible in FIG. 75, and an opposite post being hidden from view but being of identical construction. As seen in FIG. 75, the upper portion of post 1405 is reduced and has external threads formed theeron. The upper die plate has threaded openings formed therein adapted to receive the reduced threaded end portions of the posts whereby the posts may be adjusted. As seen in FIG. 75, a lock nut 1407 is provided for locking post 1405 is operative position. As seen in FIG. 74, a lock nut 1408 is mounted on the reduced upper end portion 1406' of the associated post.

Each of the depending posts has a bifurcated lower end portion which serves to rotatably support a roller, and as seen in FIG. 75, a roller 1409 is rotatably supported at the lower end of post 1405. It will be understood that a corresponding roller is supported from the other post (not seen). Each of the rollers supported at the lower ends of the depending posts are adapted to engage the upper surface of the associated pressure bar means, and as shown in FIG. 75, roller 1409 is in engagement with the upper edge of pressure bar means 1203.

The rollers supported at the lower ends of the posts as well as the upper surfaces of the pressure bar means are hardened so as to prevent excessive wear, and it will be noted that when the upper die plate 1291 descends, the rollers will engage the upper surfaces on the pressure bar means which in turn will serve to pivot the pressure bar means about the associated guide rods. This mode of operation will be discussed more fully hereinafter.

*Further details of die mechanism for frangible material*

Referring to FIG. 73, a pair of hardened die rings 1405 and 1406 are supported by the lower die plate 1168 and are adapted to cooperate with the punch portions 1292 and 1293 of the punch members 1283 and 1284 respectively previously described.

Each of the die rings is of identical construction and mounted in a similar manner. As seen in FIG. 88, the die ring 1405 is received within a shallow bore 1405' formed in the upper surface of the lower die plate 1168, the die ring 1405 being retained in operative position by a plurality of circumferentially spaced flat head screws 1407. The upper inner peripheral edge 1408 of the die ring forms the cutting edge thereof and cooperates with the lower peripheral cutting edge on the associated punch member for cutting out thin discs of aluminum foil as will hereinafter become apparent. It should be understood that the other die ring 1406 is mounted and operates in an identical manner.

Referring again to FIG. 73, vertically extending bores 1410 and 1411 are formed through each of the punch members 1283 and 1284, the lower ends of the bores opening through the bottom surfaces of the punch portions 1292 and 1293. The upper ends of the bores are threaded and respectively receive fittings 1412 and 1413 which are connected with suitable gas pressure lines connected to a suitable source of gas under pressure. The purpose of the gas pressure introduced through the bores in the punch members will appear hereinafter.

As seen particularly in FIG. 74, the upper surface of support member 1155 is provided with a longitudinally extending cut-out portion 1415, and the upper surface of the lower die plate 1168 is provided with a cut-out portion 1415' immediately adjacent to cut-out portion 1415. The upper surface of lower die plate 1168 is also provided with a cut-out portion 1416. The purpose of these cut-out portions is to provide clearance with the leg portions 1216, 1217 and 1218 of the finger plate member 1215 illustrated in FIG. 84. The upper surface of lower die plate 1168 is also provided with cut-out portions 1417 and 1418 on the opposite side thereof to provide clearance with the leg portions of the finger plate of the gripper means on the opposite side of the plate in the same manner.

*Sheet feed means (second modification)*

Referring now to FIGS. 89–91, a modified form of the sheet feed mechanism is illustrated which is very similar to that previously described. As seen in FIG. 89, a first support yoke 1420 is provided which may be substituted for support yoke 1175 as seen in FIG. 74, in the same orientation with respect to the supporting surface member 1155 and the lower die member 1168. The other support yoke 1421 as seen in FIG. 89 may replace the yoke member 1174 as seen in FIG. 74, except for the fact that its orientation will be altered such that it will be in the relationship as shown in FIG. 89, wherein the two members are parallel with one another and coextensive in a longitudinal direction. That is to say, the forward and rear ends of the two yoke members 1420 and 1421 will be directly opposite to one another relative to the direction of feed through the sheet feed means. The construction of each of yoke members 1420 and 1421 is identical with the construction of yoke members 1175 and 1174 respectively.

Each of yoke members 1420 and 1421 supports a pair of vertically spaced guide rods identical with those described in connection with the previously described sheet feed means, the two uppermost rods 1422 and 1423 being visible in FIG. 89. As seen in FIG. 90, the lowermost rod 1424 on one side of the mechanism is shown spaced vertically below rod 1422. The sliding blocks 1424 and 1425 are identical with the sliding blocks previously described and are slidably mounted upon the two vertically spaced horizontally extending rods.

The pressure bar means at opposite sides of the modified sheet feed means are similar to the pressure bar means previously described, but the pressure bar means of the present modification differs from that previously disclosed in that this modification incorporates two laterally extending leg portions, and the third laterally extending leg portion corresponding to the leg portion 1205 as seen in FIG. 82 has been eliminated. A pair of spaced laterally extending leg portions 1426 and 1427 are formed integrally with a longitudinally extending body portion 1428 of one of the pressure bar means, and another pair of laterally extending leg portions 1429 and 1430 are spaced from one another and extend laterally from a main body portion 1431 of the opposite pressure bar means.

A first bar 1434 is disposed in spanning relationship to the outer ends of leg portions 1426 and 1427, while another bar 1435 is disposed in spanning relationship between the outer ends of laterally extending leg portions 1429 and 1430. Each of these bars has a substantially flat under surface and each of the bars is secured to the under surfaces of the associated leg portions by means of flat head screws 1436 and 1437 respectively. It is accordingly evident that the flat bars 1434 and 1435 of the present modification replace the ball detent means 1213 utilized in the previous modification.

The finger plate means 1438 particularly as seen in FIG. 91 has also been modified, and in the present modification, a pair of openings 1439 are provided for securing the finger plate means to the under surface of the associated sliding block with the elongated flat portion 1440 thereof disposed immediately beneath the flat plate thereabove. As shown, the portion 1440 of finger plate means 1438 would be immediately beneath bar 1434 whereby the strip of aluminum foil may be gripped between the under surface of member 1434 and the upper surface of portion 1440.

The upper surface of the finger plate means 1438 is also provided with cut-out portions 1441 and 1442 to provide clearance with the leg portions 1426 and 1427 to permit oscillating movement of the adjacent pressure bar means.

The die rings 1405 and 1406 have been shown schematically in phantom lines in FIG. 89 in order to illustrate the orientation of the gripper means with respect to the remaining components of the apparatus. It will be understood that the reciprocating and oscillating gripper means as shown in FIG. 89 may be operated in the same manner as the corresponding components of the previously described modification.

*Modified die mechanism for frangible material*

Referring now to FIGS. 92–94 of the drawings, a lower die plate 1168' similar to the lower die plate 1168 previously described is illustrated, this lower die plate being in the same location as that previously mentioned. The under surface of the lower die plate 1168' is provided with an arcuate cut-out portion 1445' similar to an arcuate cutout portion 1445 to the under surface of die plate 1168 to provide clearance with the turret mechanism hereinafter described. The upper surface of the lower die plate 1168' is provided with a substantially rectangular pocket 1446 which receives a plate 1447, plate 1447 having an arcuate cutout portion 1448 formed in the under surface thereof also for the purpose of providing clearance with the turret mechanism hereinafter described. Plate 1447 is also provided with a bore 1449 extending therethrough, this bore being counterbored adjacent the top surface of the plate, and a hardened die ring 1450 is fitted within this counterbored portion. This die ring is of identical construction with the die ring 1405 previously described.

An upper die plate 1280' is of a similar construction to the upper die plate 1280 previously described, and is disposed in the same orientation with the other components of the apparatus previously described. As seen particularly in FIG. 92, upper die plate 1280' is provided with a central bore 1451 having internal threads formed therein. A bushing 1452 is provided with a threaded outer surface which is threaded into bore 1451, the bushing 1452 also being provided with a bore extending longitudinally therethrough and being threaded in an opposite manner to the threads formed on the outer surface thereof. The shank portion 1453 is similar to the shank portion 1323 previously described and comprises a portion of a bifurcated connecting member as previously described for connecting the upper die plate with a reciprocating lever similar to lever 1313 as set forth hereinbefore. The lower end of shank portion 1453 is threaded and is threaded within the internally threaded bore of bushing 1452. A lock nut 1454 is also threaded on the lower threaded end of shank portion 1453 for locking the apparatus in a desired adjusted position.

Referring now to FIGS. 93 and 94, a pair of spaced elongated rail members 1457 and 1458 are supported on the upper surface of the lower die plate 1168' and extend longitudinally of the direction of movement of feed of the foil through the apparatus. Rail 1457 is maintained in operative position by means of a cap screw 1459 and a pin 1460, these members being disposed within suitable bores provided in rail 1458 and the die plate.

It will also be noted as seen in FIG. 93 that a second hardened die ring 1450' similar to die ring 1450 is mounted in plate 1447 in the same manner.

A die plate 1464 as particularly seen in FIG. 95 is substantially rectangular in plan configuration and is supported on the upper surface of the two rails 1457 and 1458 by a plurality of cap screws 1465 and dowels 1466. A pair of substantially vertically extending guide posts 1467 and 1468 are press-fitted within suitable bores provided through die plate 1464 and extend upwardly therefrom. It will be noted as seen in FIG. 92 that the diameter of guide post 1468 is greater than that of guide post 1467 to ensure that the components can only be assembled in the proper operative relationship with respect to one another.

A pair of arcuate cutout portions 1470 and 1471 are formed in the opposite sides of die plate 1464 to provide clearance with the cap screws 1459 and 1461 previously described. A pair of punch guide bushings 1472 and 1473 are press-fitted within suitable bores formed through die plate 1464, guide bushings 1472 and 1473 having a central bore formed therethrough, each of which is adapted to slidingly receive an associated punch member.

A pair of substantially cylindrical punch members 1475 and 1476 are secured to the under surface of the upper die plate 1280' by a plurality of cap screws 1477 and 1478 respectively. A pair of bores 1480 and 1481 are formed vertically through the upper die plate, each of these bores being threaded at the upper portion thereof for receiving a fitting whereby gas under pressure may be supplied to the die mechanism.

Referring to FIG. 94, it will be seen that each of the punch members is provided with a bore therethrough as indicated by reference numeral 1482, this bore extending vertically downwardly through the center portion of the punch member 1475 and terminating in a portion of reduced diameter 1483 at the lower end thereof. Four diagonally extending ducts 1484 are disposed at equally angularly spaced portions of each punch member, these ducts intersecting bore 1482 and opening at the lower ends thereof through the bottom of the punch member. It is apparent that gas under pressure introduced through bore 1482 will be distributed by conduit portions 1483 and 1484 so as to apply pressure more or less uniformly over the under surface of the punch members.

A pressure and stripper ring is slidably disposed about the lower portions of each of the punch members, and as seen in FIG. 94, a pressure and stripper ring 1485 is provided, this member having three angularly spaced vertically extending bores 1486 formed in the upper surface thereof and being threaded for each receiving the threaded lower reduced end portion of a rod 1487, the uppermost threaded end portions of these rods extending through suitable bores provided in the upper die plate 1280'.

Each of rods 1487 is provided with an enlarged collar 1488 at an intermediate portion thereof, and a compression spring 1489 bears against this collar and is seated within a suitable cavity 1490 formed in the under surface of the upper die member 1280'. It is apparent that the compression springs 1489 will urge each of the rods 1487 in a downward direction. A nut 1491 threaded on the upper end of each of the rods limits its downward movement, and a locking nut 1492 is provided for retaining nut 1491 in adjusted position.

A pair of guide bushings 1493 and 1494 are provided, each of these guide bushings being stepped so as to provide a reduced portion which is press fitted within suitable bores provided through the upper die plate 1280'. Each of guide bushings 1493 and 1494 is provided with a longitudinally extending bore which is adapted to slidably receive one of the guide posts 1467 and 1468, whereby travel of the upper die plate 1280' is accurately guided with respect to the lower die plate and the mechanism supported thereby.

*Sheet feed means (third modification)*

Referring now to FIGS. 96–100, a further modified form of sheet feed means is illustrated including a base member 1497 having four spaced openings 1498 formed therethrough for receiving suitable attaching means whereby the base member may be secured to a supporting structure. A pair of spaced support members 1500 and 1501 are supported on the under surface of base member 1497, the support members extending laterally across the base member relative to the direction of feed through the device, the support members 1500 and 1501 being retained in operative position by cap screws 1502 and 1503 respectively disposed within suitable bores in the associated members.

Support members 1500 and 1501 are provided with elongated slots 1505 and 1506 respectively which extend completely therethrough, slot 1506 providing a feed inlet through which the strip of foil is fed, and slot 1505 providing the feed outlet through which the foil scrap skeleton is fed out of the feed mechanism.

Support member 1500 is provided in the upper portion thereof with a pair of spaced threaded openings 1507 each of which receives a threaded stop screw 1508 which is retained in operative position by means of a stop nut 1509. In a like manner, support member 1501 is provided in the upper portion thereof with spaced threaded openings 1510, each of which receives a threaded stop screw 1511 which is retained in operative position by a stop nut 1512.

Support member 1500 is provided with a pair of spaced bores 1515 which are counterbored adjacent one surface thereof, and support member 1501 is likewise provided with a pair of spaced bores 1516 which are counterbored in the surface facing the opposite support member 1500, and accordingly, the two counterbore portions face one another. A pair of identical cylindrical guide rods 1517 have the opposite end portions thereof seated within the counterbore portions of bores 1515 and 1516. Guide rods 1517 are also provided with threaded openings which extend longitudinally thereof and which open through the opposite end portions thereof, these threaded openings receiving threaded cap screws 1519 which extend through the bores 1515 and 1516. It is apparent that cap screws 1519 will retain the support members 1500 and 1501 as well as the guide rods 1517 in assembled relationship so as to provide a rigid framework.

A carriage 1522 as seen in FIG. 99 has a substantially U-shaped configuration with a pair of vertically upstanding spaced leg portions 1523 and 1524. A pair of spaced bores 1525 and 1526 are provided through the carriage member for receiving suitable bearing means, and as seen in FIG. 98, a ball bearing bushing indicated generally by reference numeral 1528 of conventional construction is disposed within each of the bores formed through the carriage member whereby the carriage member is slidably supported upon guide rods 1517. The ball bearing bushings are retained in operative position by conventional retainer plates 1529 which are suitably secured to the carriage member as by means of flat head screws 1530, the retainer plates of course engaging opposite ends of the ball bearing bushing as clearly seen in FIG. 98.

A gripper block 1530 which is formed of a relatively heavy material such as steel or the like is provided, this block having a rectangular configuration and fitting freely between the opposite leg portions 1523 and 1524 of the carriage with clearance therebetween such that the gripper block is adapted to rise and fall without interference. The gripper block has a flat under surface which is adapted to cooperate with the adjacent flat upper surface of the carriage for gripping the strip of aluminum foil between the two flat surfaces, the foil being retained between the surfaces as the carriage reciprocates along the guide rods due to the weight of the gripper block.

The gripper block is provided with a first pair of bores 1531 formed in one side surface thereof and a second pair of bores 1532 formed in the opposite side surface thereof, a first pair of pins 1533 of substantially cylindrical cross section being press-fitted within openings 1531, and a second pair of similar pins 1534 being pressed within openings 1532, the pins extending laterally outwardly of the gripper block.

The upper surface of each of the leg portions 1523 and 1524 of the carriage are of identical configuration, and as seen in FIG. 96, the upper surfaces of each of these leg portions are provided with a pair of spaced clearance cut-out portions 1536, an arcuate cradle cut-out portion 1537 being disposed adjacent to each of the cut-out portions 1536. Each pair of cut-out portions 1536 and 1537 are connected with one another by a sloping cam surface 1538.

When the gripper block is in its lowered gripping position as seen in FIG. 96, the pins 1534 will be disposed within the clearance cut-out portions 1536, and the under surface of the gripper block will clamp the strip of foil against the upper surface of the carriage. On the other hand, when the pins 1534 are seated within the cradle cut-out portions 1537 as seen in FIG. 100, the under surface of the gripper block will be spaced from the upper surface of the carriage and the strip of aluminum foil will not be clamped between these members. The gripper block is moved to its released position and to its clamping position by engagement with the stop screws 1508 and 1511 as will be clearly set forth hereinafter.

As seen in FIG. 97, carriage 1522 is provided with a threaded bore 1540 in one side portion thereof, this threaded bore receiving the reduced threaded outer end portion of a pin member indicated generally by reference numeral 1541. The pin member includes a substantially cylindrical bearing surface 1542 adapted to be operatively connected with a suitable actuating means for reciprocating the carriage back and forth. The outer end 1543 of the pin member is also threaded and receives a nut 1544 for retaining the actuating means in operative position. It will be understood that the actuating means for the carriage may take the form of the actuating means previously discussed for reciprocating the sheet feed mechanism, or any other suitable actuating means may be provided as long as it reciprocates the carriage in proper timed relationship to the movement of the other components of the machine.

The sheet feed mechanism as illustrated in FIGS. 96–100 may be utilized with either of the previously described die mechanisms for the frangible material, but is particularly adapted for use with the second such mechanism described. It should be understood, however, that the sheet feed mechanism as shown in FIGS. 96–100 cannot be disposed in coextensive relationship to the die mechanism for the frangible material as were the previously described sheet feed mechanisms due to the fact that the carriage as well as the gripper block extends laterally across the feed mechanism. Accordingly, when employing this last-described feed mechanism, it must be offset laterally with respect to the associated die mechanism, or in other words, it must be down line of the die mechanism for the frangible material relative to the direction of feed of the strip of foil through the die mechanism and the feed mechanism. For example, if the feed mechanism as shown in FIGS. 96–100 were incorporated in the structure as seen in FIG. 74 in place of the feed mechanism shown in this latter figure, the feed mechanism of FIGS. 96–100 would appear in FIG. 74 above and to the right of the feed mechanism as shown in this figure.

*Turret mechanism*

Referring now to FIGS. 73, 85 and 88 and 101–105, the turret mechanism is shown in detail. As seen especially in FIG. 73, a tubular member 1550 is provided, the opposite ends of this tubular member being fitted within bores formed through the central portions of castings 1160 and 1161. The tubular member is retained in operative position by a set screw 1551 fitted within suitable openings provided in the casting and the tubular member and held in position by means of a locking nut 1552 as seen in FIG. 85. A central bore 1553 extends longitudinally through the tubular member 1550, a plug member 1554 being fitted at one end of this bore for closing one end and the opposite end of the bore being provided with a fitting 1555 which is adapted to be connected to a suitable source of vacuum for a purpose hereinafter described.

A pair of longitudinal bores 1556 and 1557 are formed in the wall of tubular member 1550 at the opposite ends thereof and extending along a minor portion of the length of the tubular member. The ends of fluid conduits 1558 and 1559 are fitted within bores 1556 and 1557 respectively and are secured in place by soldering or the like, these fluid conduits being adapted to be connected with a suitable source of fluid under pressure for a purpose hereinafter described.

A tubular sleeve member 1562 is rotatably supported upon tubular member 1550 by a pair of spaced bearings 1563 and 1564. As seen in FIGS. 88 and 101, a sealing member 1566 formed of a suitable bearing material such as Teflon is provided between tubular member 1550 and sleeve 1562 for providing an air-tight seal therebetween, the sealing member being secured to the sleeve by means of screws 1567.

As seen especially in FIG. 101, tubular member 1550 is provided with three substantially radially extending passages 1568, 1569 and 1570, each of which intersects the central bore 1553 of the tubular member at the inner ends thereof, the outer ends of these three radially extending passages each intersecting a circumferentially extending groove 1571 formed in the outer surface of the tubular member and extending through an arc of approximately 150 degrees. Three substantially radially extending passages 1572, 1573 and 1574 are formed through sleeve member 1562 and are substantially aligned with the radial passages formed in the tubular member.

A radially extending passage 1575 is also provided through tubular member 1550 and intersects bore 1556 formed in the tubular member. A radially extending bore 1576 is provided through sleeve 1562 in radial alignment with the passage 1575. It will be noted that sealing member 1566 is also provided with openings which are in radial alignment with passages 1572, 1573 and 1574 and 1576. It should be understood that the construction shown in FIG. 101 is duplicated adjacent the inner end portion of the bore 1557 formed at the opposite end of tubular member 1550.

A pair of chuck supporting castings 1580 and 1581 are provided, these castings being of identical construction and preferably being of a light-weight material such as aluminum or the like. The castings are provided with six individual chuck mechanisms extending radially of the castings and slidably supported therein. As seen in FIG. 85, each of these latter castings is provided with six radially outwardly extending bosses indicated by reference numerals 1582 in this figure. As seen in FIG. 73, the outer surface of each of the bosses 1582 is provided with a cylindrical recess which is adapted to slidably receive the enlarged upper portion of one of the chuck mechanisms hereinafter described. The castings 1580 and 1581 are secured to sleeve 1562 by means of flanged castings 1584 and 1585 respectively. Since the construction of the two rotatable castings 1580 and 1581 as well as their relationship to the supporting sleeve are identical, reference is now made to FIG. 88 wherein casting 1580 is shown in detail, it being understood that the details of construction of the casting 1581 are identical.

Flanged collar 1584 is provided with an inner hub portion 1587 which is keyed to sleeve 1562 and which is clamped in place thereon by a plurality of cap screws 1588, the hub portion being split for this purpose. Flanged collar 1584 is also secured to the casting 1580 by means of six circumferentially spaced cap screws 1590 which extend laterally through suitable bores provided in the casting intermediate the chuck supporting portions, the cap screws being retained in operative position by means of nuts 1591 threaded on the outer ends thereof, the nuts being received within cavities 1592 formed in one face of the casting.

As mentioned previously, the casting is provided with six equally spaced cavities 1583, and as seen in FIG. 88, each of these cavities is in communication with a radially extending bore 1593 of a lesser diameter, the radially inward portions of bore 1593 tapering to a still smaller bore 1594 which opens through the inner surface of the casting and is adapted to be in communication with the aforementioned radial passages formed through sleeve 1562. A first cylindrical bearing bushing 1596 is press-fitted within cavity 1583, a second cylindrical bearing bushing 1597 being press-fitted in the upper portion of bore 1593, and a third cylindrical bearing bushing 1598 being press-fitted within the inner portion of bore 1593, these three bearings serving to slidably journal the chuck mechanism hereinafter set forth.

The chuck mechanism includes a chuck member which is indicated generally by reference numeral 1600 having an outer enlarged cylindrical portion 1601 with an outwardly projecting lip 1602 at the uppermost portion thereof, and the chuck mechanism also includes a substantially cylindrical shank portion 1603 of reduced diameter, it being apparent that the enlarged portion 1601 is slidably received within bearing bushing 1596, and the shank portion 1603 is slidably received within bearing bushing 1597 and 1598. The outer portion of enlarged portion 1601 of the chuck member is provided with a substantially cylindrical cavity 1605 which opens through the outer portion of member 1600; and a bore 1606 is in communication with cavity 1605 and is tapered at its lower end into communication with a pair of smaller bores 1607 as seen in FIG. 103 which opens through the inner end of the shank portion 1603.

A plunger 1610 includes an enlarged outer portion 1611 and a shank portion 1613 of reduced diameter extending therefrom. The inner side edge portions of outer enlarged portion 1611 are cut away as indicated by reference numerals 1612 for a purpose hereinafter described. It will be noted that the enlarged outer portion 1611 of the plunger is slidably received within the cavity 1605 while the shank portion 1613 of the plunger is slidably received within the bore 1606.

The plunger 1610 is provided with a central bore 1615 extending vertically therethrough, the outer end of this bore being closed by a plug member 1616. A radially extending passage 1617 is formed through the shank portion 1613 of the plunger and at its inner end intersects the bore 1615. The outer end of passage 1617 is in communication with a circumferentially extending groove 1618 formed in the outer surface of the shank portion. A radially extending passage 1619 is provided through the wall of the shank portion 1603 of the chuck member, and in the normal out position of the plunger as seen in FIG. 88, passage 1619 is substantially aligned with passage 1617.

Referring to FIGS. 102 and 103, six equally angularly spaced radially extending passages 1620 are provided in the outer enlarged portion 1611 of the plunger, each of passages 1620 at its inner end intersecting the bore 1615 formed through the plunger. Three spaced vertically extending openings 1621 are associated with each of the radially extending passages 1620, the vertically extending openings 1621 intersecting the radially extending passages 1620 and opening through the outer surface of the plunger thereby providing communication from the central bore in the plunger through the radially extending passages and thence outwardly to the outer surface of the plunger.

Three shoulder screws 1623 are provided, these screws extending through bores 1624 formed in the outer enlarged portion 1601 of the chuck member and being threaded within suitable threaded bores provided through the plunger. A compression coil spring 1625 is disposed in surrounding relationship to the intermediate shank portion of each of shoulder screws 1623, the lower portion of each of these springs being seated within a counter bore 1626 formed in portion 1601 of the chuck member, and the upper portions of each of springs 1625 being seated within cut-out portions 1627 formed in the under surface of the enlarged portion 1611 of the plunger. It is apparent that the compression springs 1625 normally urge the plunger 1610 outwardly to its outer limit as determined by the enlarged heads of the shoulder screws 1623.

Referring to FIG. 104, a stepped guide bushing 1630 is press-fitted within a correspondingly shaped bore provided through the enlarged portion 1601 of the chuck member. Bushing 1630 has a central cylindrical bore 1631 formed therethrough which is adapted to receive a portion of a guide pin indicated generally by reference numeral 1632. Guide pin 1632 includes an upper portion 1633 which has been relieved in such a manner as to provide two diametrically opposite arcuate bearing portions which are adapted to engage opposite portions of the internal surface of bore 1631 of the guide bushing. Pin 1632 also includes a radially outwardly extending enlarged portion 1634 which is fitted loosely within a cavity 1635 formed in casting 1580. The guide pin also includes a depending shank portion 1636 of reduced diameter which is press-fitted within a suitable bore provided within the casting. The guide pin and guide bushing serve to cooperate in such a manner as to prevent rotation of the chuck member with respect to the casting.

It will be noted as seen in FIG. 104 that radially extending passages 1617 and 1619 as well as the circumferential groove 1618 provide fluid communication between the bore 1615 of the plunger and the interior of cavity 1583 provided in the casting 1580. The relieved portions of the upper port 1633 of the guide pin 1632 in turn provide fluid communication between cavity 1583 through the interior of the guide bushing 1630 and thence to the under surface of the plunger. The cut-away edge portions 1612 of the upper portion of the plunger in turn provide fluid communication with six passages 1638 which as seen in FIG. 103 extend angularly outwardly from the inner wall of cavity 1605, and the upper portion of each of passages 1638 opens through the outer surface of the periphery of enlarged portion 1601 of the chuck member. The uppermost open ends of the passages 1638 can be seen most clearly in FIG. 102.

As seen in FIG. 88, a threaded stud 1640 is threaded within a suitable laterally extending threaded opening provided in the shank portion 1603 of each of the chuck mechanisms, the stud 1640 extending laterally of the associated shank portion and a conventional cam follower 1641 is rotatably mounted on the outer end of the stud. Stud 1640 is retained in operative position by means of a locking pin 1642 which is disposed within a central bore 1643 extending longitudinally through the plunger mechanism, the pin 1642 also passing through a suitable bore provided within the stud.

A face cam 1645 is rotatably journalled upon a cylindrical bearing 1646 supported by sleeve 1562. As seen in FIG. 106, cam 1645 is provided with a cam track 1647 within which the cam follower 1641 is received. Cam 1645 is fixed to a spur gear 1648 by a plurality of cap screws 1649 disposed within suitable bores provided in the gear and cam member, gear 1648 also being rotatably journalled on bearing 1646. The shank portion of stud 1640 extends through an elongated slot 1644 provided in the wall of casting 1580 such that as the cam follower 1641 moves within the cam track of the associated cam, the chuck mechanism secured to the stud 1640 may reciprocate in a radial direction. In addition, the casting is provided with a cutout portion 1644' to provide clearance for the cam follower 1641.

It will, of course, be understood that the mechanism shown in detail in FIG. 88 is duplicated for each of the chuck mechanisms, and accordingly, there are six cam followers provided in the portion of the turret mechanism as seen in FIG. 88, each of which is associated with one of the chuck mechanisms. As pointed out previously, the construction of the other half of the turret structure is identical, and accordingly, referring back to FIG. 73, it will be evident that a total of twelve chuck mechanisms are provided, the two castings 1580 and 1581 rotating in unison and providing a plurality of pairs of chuck mechanisms which operate simultaneously during operation. A gear 1650 is identical with the gear 1648, the gear 1650 serving to drive the cam means of the associated structure in the same manner as discussed in connection with gear 1648. A pair of tie rods 1652 and 1653 are provided, the opposite ends of each of the tie rods being of reduced diameter and being threaded and extending through suitable bores provided in the castings 1160 and 1161, nuts being threaded on the outer ends of the tie rods for retaining them in operative position. The tie rods are provided for the purpose of rigidifying the turret mechanism structure as discussed above.

Turret mechanism driving means

The chuck supporting castings 1580 and 1581 are advanced intermittently in a rotary direction during operation, and a suitable indexing mechanism is provided for this purpose. In the presently illustrated example, a more or less conventional Geneva movement is employed for this indexing function. The structure of the Geneva mechanism can be seen most clearly in FIGS. 73 and 107. A Geneva wheel is indicated generally by reference numeral 1655 and includes a hub portion 1655' which is secured for rotation to the end of sleeve 1562 by a pair of pins 1654 disposed within suitable grooves formed in the hub of the Geneva wheel and the outer surface of sleeve 1562.

As seen in FIG. 106, the Geneva wheel 1655 includes six spaced locking cuts 1656 and six spaced indexing cuts 1657, the construction of the wheel being conventional and of a well-known design, such that the sleeve and the associated castings 1580 and 1581 are rotated through an angle of 60 degrees for each complete cycle of revolution of the driving Geneva arm 1658 as will be well understood. The Geneva arm has a follower 1659 rotatably supported at the outer end thereof and extending laterally therefrom, the opposite end of the Geneva arm being keyed to a shaft 1660.

An oil pan 1663 is secured to the inner surface of casting 1161 by means of a plurality of cap screws 1664, and a seal 1665 is provided between the inner portion of the oil pan and the outer surface of the hub of the Geneva wheel. A slight gage 1666 is disposed in fluid communication with the interior of the oil reservoir defined between the inner surface of casting 1161 and the oil pan for observing the level of the oil within this reservoir. A filling conduit 1667 for introducing oil into the oil reservoir is provided within the wall of casting 1161, the upper end of the conduit being closed by conventional plug 1668. Shaft 1660 which drives the Geneva arm is journalled within a bearing 1670 mounted within bracket 1344, and a miter gear 1671 is pinned to the outwardly projecting end portion of shaft 1660, miter gear 1671 being in meshing engagement with a miter gear 1672 which is pinned to shaft 1387 previously described.

As seen in FIG. 87, the gears 1648 and 1650 which are connected with the cams of the associated turret mechanisms are in meshing engagement with a pair of idler gears 1675 and 1676 respectively. Idler gears 1675 is rotatably supported upon a stud 1677 the inner portion of which is threaded into a suitably threaded bore provided in casting 1160, a nut 1678 being threaded on the outer end of stud 1677 for retaining gear 1675 in operative position. Idler gear 1676 is rotatably journalled on a stud 1680 which is threaded into a suitably threaded opening provided in a casting 1681, a nut 1682 being threaded on the outer end of a stud 1680 for retaining idler gear 1676 in operative position. Casting 1681 is secured to casting 1160 by a plurality of cap screws 1683.

A shaft 1685 is journalled within a first bearing bushing 1686 mounted in a suitable bore provided through bracket 1357, the shaft also being journalled in a second bearing bushing 1687 disposed within a suitable bore provided in casting 1681, and finally the shaft 1685 is journalled at its opposite end within a bearing bushing 1688 disposed within a suitable bore provided through casting 1681. A pair of spur gears 1690 and 1691 are in meshing engagement with idler gears 1676 and 1675 respectively, gears 1690 and 1691 having split hub portions 1692 and 1693 respectively which are keyed for rotation with shaft 1685 and which are drawn up tight on the shaft for retaining the gears in desired operative position.

A miter gear 1695 is pinned to the outer end of shaft 1685, miter gear 1695 being in meshing engagement with a miter gear 1696. Gear 1696 is provided with a split hub 1697 which is keyed to shaft 1387 and is drawn up tight thereon to retain gear 1696 in proper operative position.

Frangible material forming means

Referring particularly to FIGS. 74 and 85, a casting 1700 is secured to a side edge portion of the upper die plate 1280 by a plurality of cap screws 1701. Casting 1700 includes a pair of spaced laterally projecting arms 1702 and 1703, a pin 1704 being supported by said arms and extending through suitable bores provided in the arms. The pin is held in operative position by suitable means such as snap rings or the like.

An adjustable link 1705 is provided, the upper end of this link being provided with a ball bearing rod end which is journalled on the cross pin 1704.

A casting 1708 has the opposite end portions thereof supported by lateral portions of the castings 1160 and 1161, casting 1708 being retained in operative position by a plurality of cap screws 1709 disposed within suitable bores formed in the respective members. Casting 1708 includes a pair of spaced laterally extending lugs 1710 and 1711 and a shaft 1712 is rotatably journalled by bearings 1713 and 1714 disposed within suitable bores formed through the lugs 1710 and 1711 respectively. A connecting lever indicated generally by reference numeral 1716 includes a bifurcated end portion comprising a pair of spaced arm portions 1717 and 1718. A cross pin 1719 extends through suitable bores provided in the arm portions 1717 and 1718 and is held in place by suitable means such as snap rings or the like. The cross pin 1719 is journalled within the lower ball bearing rod end of the adjustable link 1705. The end portion of connecting lever 1716 opposite the bifurcated end thereof is fixed to shaft 1712, and accordingly, vertical reciprocatory movement of the upper die plate 1280 will produce oscillations of shaft 1712 through the intermediary of adjustable link 1705 and the connecting lever 1716.

Casting 1708 includes a pair of angularly disposed bosses 1721 and 1722 as seen in FIGS. 85 and 107, these bosses being provided with bores therethrough which slidably support forming punch members 1723 and 1726 respectively, the forming punch members including cylindrical shank portions which are slidably received within the bores in the bosses. The upper outer end portion of forming punch member 1723 is bifurcated to provide two arm portions 1724 and 1725, and the upper outer end portion of forming punch member 1726 is also bifurcated to provide two spaced portions 1727 and 1728. A pair of connecting levers 1730 and 1731 have split end portions 1732 and 1733 respectively which are disposed in surrounding relationship to the oscillating shaft 1712, the split end portions being tightly drawn onto the shaft for rotation therewith by a plurality of cap screws.

The lower or opposite end portions of connecting levers 1730 and 1731 are also bifurcated such that the lower end of connecting lever 1730 is provided with spaced portions 1735 and 1736 while the lower end of connecting lever 1731 is provided with spaced portions 1737 and 1738. A first bearing block 1740 is slidably positioned between portions 1735 and 1736 of connecting lever 1730, the bearing block being pivotally supported upon a pin 1741 which is supported by the spaced portions 1724 and 1725 of the punch forming member 1723. A bearing block 1742 is slidably received between the spaced portions 1737 and 1738 of connecting lever 1731, this bearing block being pivotally supported upon a pin 1743 which is supported between the spaced portions 1727 and 1728 of the punch forming member 1726. It is accordingly evident that oscillating movement of shaft 1712 will produce reciprocatory movement of the punch forming members 1723 and 1726 within the bores of the bosses 1721 and 1722, bearing bushings 1745 and 1746 being provided within the bores of the respective bosses for slidably supporting the punch forming members.

The mechanism supported at the working end of each of the forming punch members is identical, and accordingly, a description of one of these end portions of the forming punch members will suffice for both of them. Accordingly, reference is made to FIG. 104 wherein the details of construction of the end portion of the forming punch member 1723 is illustrated. The lower end portion of forming punch member 1723 comprises an enlarged radially extending portion 1750 having a substantially cylindrical outer surface which is adapted to fit within the upper portion of the cavity 1605 provided within one of the chuck members by depressing the associated plunger 1610. The forming punch member 1723 is shown at the downward limit of its stroke in FIG. 104 wherein it is partially disposed within the cavity of the adjacent chuck member.

A disc-like spring retainer plate 1752 has a central opening 1753 formed therethrough which fits snugly about the reduced shank portion of the forming punch member 1723. Spring retainer plate 1752 is secured to the upper surface of the enlarged portion 1750 of the forming punch member by four spaced flat head screws 1754 which may be seen most clearly in FIG. 105. Plate 1752 is also provided with three angularly spaced radially extending slots 1755 which extend inwardly from the outer periphery thereof as seen in FIG. 105.

A substantially tubular draw ring 1758 is disposed in surrounding relationship to the enlarged portion 1750 of the forming punch member and is slidable with respect thereto. The draw ring includes a radially outwardly extending annular lip 1759 at the lower end thereof. It will be noted that the under surface of the draw ring is adapted to engage the upper annular portion of the adjacent chuck member as seen in FIG. 104. A compression spring 1760 has one end thereof bearing against the upper surface of the annular lip 1759 on the draw ring, the opposite end of the spring bearing against the under surface of the spring retainer plate 1752 whereby the spring constantly urges the draw ring in a downward direction as will be apparent.

The draw ring 1758 also includes three angularly spaced upwardly extending lugs 1762 which as seen in FIG. 105 fit through the slots 1755 provided in the spring retainer plate 1752. The three lugs 1762 bear against the under surface of a washer 1763 having a central opening 1764 disposed therethrough which fits loosely about the reduced shank portion of the forming punch member 1723. Casting 1708 is provided with a pair of spaced bores 1765 and 1766, an adjustable stop screw 1768 being threaded within bore 1765 and held in place by a locking set screw 1769, while a stop screw 1770 is threaded within bore 1766 and is held in place by a locking set screw 1771. The adjustable stop screws 1768 and 1770 extend beyond the casting 1708 and are adapted to be adjusted in such a manner as to engage the washer 1763 at a desired position.

As seen in FIG. 105, three angularly spaced radially extending threaded bores 1774 are formed in the enlarged end portion 1750 of the forming punch member. A conventional spring loaded detent mechanism 1775 is adjustably threaded within each of bores 1774 such that it may be adjusted in or out as desired, each of these ball detent mechanisms including an outwardly extending ball 1776 of a well-known construction. The balls 1776 are adapted to seat within a circumferentially extending groove 1777 formed around the inner surface of the draw ring 1758. The function of the ball detent means and circumferential groove will be explained fully hereinafter.

Fluid pressure system

As seen in FIGS. 51 and 108–110, an auxiliary support casting 1780 is provided, this casting including an upper wall 1781, a forward depending wall 1782, and a pair of depending side walls 1783 and 1784. End wall 1782 is secured to the adjacent end wall 186 of the main casting by means of a key 1785 and a plurality of cap screws 1786 disposed within suitable bores provided in the castings.

A valve 1790 is secured in a suitable manner to the side wall 1783 of casting 1780, the valve being connected with a conduit 1791 which in turn is connected with a suitable source of fluid pressure (not shown). Valve 1790 is of a conventional construction and is normally spring biased to a closed positon. The valve is operated by a lever actuator 1794, the lever having a roller 1795 rotatably supported on the outer end thereof.

A trip dog 1796 has a split inner end 1797 which is disposed about shaft 795 and is drawn up tight thereon such that the trip dog rotates with the shaft. The trip dog is adapted to engage roller 1795 once during each cycle of rotation of shaft 795 to open valve 1790 at a predetermined time.

The outlet of vave 1790 is connected with a conduit 1800 which extends through an opening 1801 provided through the side wall 1783 of casting 1780. Conduit 1800 may be formed of a suitable material such as copper tubing, and the conduit extends upwardly to a four-way fitting 1802, a branch conduit 1803 extending from the fitting 1802 to the conduit 1558 which supplies fluid pressure to the chuck mechanisms mounted within the casting 1580. A similar conduit which is hidden from view extends from fitting 1802 to the conduit 1559 which supplies fluid pressure to the chuck mechanisms mounted within the casting 1581.

A conduit 1804 extends upwardly from fitting 1802 and is connected by means of a fitting 1805 to a flexible conduit 1806 which in turn is connected with a junction box 1807 mounted on the upper surface of the upper die plate 1280. As seen particularly in FIG. 15, a pair of conduits 1808 and 1809 extend from the junction box 1807 to the fittings 1412 and 1413 which provide fluid communication with the interior of the punch members mounted on the under surface of the upper die member.

*Frangible material pressing mechanism and locator mechanism*

Referring to FIG. 15, a pair of foil pressing and locator mechanisms indicated generally by reference numerals 1812 and 1813 are provided forwardly of the turret mechanism described above in relation to the direction of feed, the two mechanisms 1812 and 1813 being of identical construction, one of these mechanisms being a mirror image of the other. The mechanism 1812 will be described in detail, it being understood that the description is equally applicable to the opposite mechanism 1813.

Referring now to FIGS. 111, 112 and 113, a casting 1815 is provided, the lower portion of the casting being secured to the upper wall 1781 of the casting 1783 by means of a plurality of cap screws 1816 disposed within suitable bores provided in the members. Casting 1815 includes an upstanding vertical portion 1817 provided with a stepped groove 1818 in the lateral surface thereof, the upstanding vertical portion including a back wall portion 1820 and a pair of outwardly laterally projecting side wall portions 1821 and 1822.

A pair of retaining plates 1825 and 1826 are of elongated construction and are secured to the outer portions of the leg portions 1821 and 1822 by a plurality of cap screws 1827 and 1828 respectively. It will be noted as seen in FIG. 112 that the retainer plates overlie a portion of the groove and that elongated bearings 1829 and 1830 of substantially L-shaped cross sectional configuration are disposed in opposite sides of the groove such that the bearings 1829 and 1830 define in cooperation with retaining plates 1825 and 1826 respectively a pair of track ways which slidably receive and guide the opposite lateral portions of a slide member 1831.

A guide casting 1832 is provided with a vertically extending groove 1833 formed in the lateral face thereof, groove 1833 receiving an outwardly projecting vertically extending rib 1834 formed on the front face of the slide member 1830. Casting 1832 is secured to the slide member 1830 by three vertically spaced cap screws 1836 which are disposed within suitable openings provided in the associated members. As seen in FIG. 111, casting 1832 is more or less U-shaped in configuration and includes a laterally extending upper support portion 1838 and a laterally extending lower support portion 1839.

As shown in FIGS. 111 and 113, a locator arm 1840 includes a vertically extending portion 1841 which is secured to one side surface of the lower portion 1839 of casting 1832 by a plurality of cap screws 1842. Locator arm 1840 extends longitudinally of the machine and extends directly over the feed line of the can end blanks as they move longitudinally of the apparatus. The outer end of locator arm 1840 includes depending portions 1844 and 1845, the lower-most inner surfaces of the depending portions being tapered as indicated at 1846 and 1847 for centering a cam end blank as the locator arm descends in a vertical direction, and the vertical surfaces 1848 and 1849 provided on depending portions 1844 and 1845 respectively are adapted to loosely engage diametrically opposite portions of the cam end blank for locating the can end blank and retaining it in place during an idling cycle.

It should be noted as seen in FIG. 113 that another locator arm has been indicated in phantom lines and has been given a reference numeral 1850. This locator arm is shown in phantom lines to indicate the construction of the mechanism 1813 on the other side of the machine, it being noted that if mechanism 1813 were viewed from the inside looking out from the apparatus, it would appear as seen in FIG. 113 with a locator arm projecting to the rght thereof as indicated by the phantom line 1850.

As seen in FIG. 113, the lower portion 1839 of casting 1832 is provided with a central bore 1853 extending downwardly from the upper surface thereof, this bore being in communication with a still larger bore 1854 which opens through the lower surface of portion 1839.

A pressing member indicated generally by reference numeral 1855 includes an intermediate substantially cylindrical portion 1856 which is slidably journalled within a bearing 1857 fitted in the upper portion of bore 1853. Pressing member 1855 includes an upwardly extending shank portion 1860 of reduced diameter which extends through the central bore formed through a bushing 1861. Bushing 1861 is provided with external threads and is threaded into a vertically extending threaded bore 1862 formed through the portion 1838 of casting 1832. A stop nut 1863 is threaded on the outer periphery of bushing 1861 for maintaining the bushing in desired operative position. A compression spring 1864 has the upper end thereof bearing against the under surface of bushing 1861, and the lower end of the compression spring 1864 bears against the upper surface of the enlarged portion 1856 of the pressing member such that the pressing member is normally urged in a downward direction by the spring 1864.

An enlarged radially outwardly extending portion 1866 is formed at the lower end of pressing member 1855, and the under surface of the enlarged portion 1866 is relieved as indicated by reference numeral 1867 so as to clear the base portion of a can end blank which may be disposed therebeneath. A downwardly projecting annular flange portion 1868 is provided, the lowermost edge of this flange portion serving as an annular pressing surface which is adapted to press the outwardly projecting peripheral flange of the formed foil blank into the sealing compound disposed within the channel portion of the can end blank. In addition, the undersurface of the enlarged portion 1866 which is defined by the relieved portion serves to press down upon the foil overlying the base portion of the can end blank to ensure that the adhesive is uniformly distributed over the base portion of the can end blank and that the formed foil blank will be uniformly bonded to the base portion of the can end blank.

The upper exterior surface of the shank portion 1860 of the pressing member is threaded, and a stop nut 1874 is adjustably threaded on this portion for limiting the downward movement of the pressing member under the influence of spring 1864.

A central bore 1870 extends longitudinally through the interior of the pressing member, the lower end of the bore being closed by a plug 1871. The internal surface of the upper end of bore 1870 is threaded, and a conventional lubricating fitting 1872 is threaded into the upper end of the bore. The lubricating fitting 1872 includes a reservoir 1873 containing a liquid which tends to prevent an adhesive substance from sticking to a surface, this liquid being for example a silicone lubricant or the like.

A plurality of angularly spaced laterally extending passages 1876 are formed through the lower portion of the pressing member, the inner ends of passages 1876 being in communication with the central bore 1870 whereby the liquid contained in reservoir 1873 will flow downwardly through the central bore and thence outwardly through passages 1876. A plurality of radially outwardly extending grooves 1877 are formed in the upper surface of the lower enlarged portion 1866 of the pressing member in alignment with the passages 1876 for conducting the liquid outwardly along the enlarged lower end of the pressing member. A plurality of vertically extending passages 1878 are formed through the outer portion of the lower enlarged portion 1866 and intersect the outer ends of grooves 1877.

It is apparent that passages 1876 and 1878 as well as grooves 1877 will serve to conduct lubricating liquid from the reservoir 1873 downwardly over the lowermost portions of the pressing member to thereby provide a coating of liquid on such surfaces at all times. This liquid coating serves to prevent any adhesive from sticking to the surfaces in the event that some of the sealing compound in the can end blank or some of the adhesive coated on the can end blank should be in the position to be engaged by the lowermost surface of the pressing member. It is obviously desirable that these lowermost surfaces on the forming member be free of any sort of adhesive material.

A locator plunger indicated generally by reference numeral 1880 is of a width substantially equal to the width of the locator arm 1840 previously described, plunger 1880 including depending portions 1881 and 1882 similar to the depending portions 1884 and 1845 at the outer end of the locator arm 1840. The lower inner surfaces of depending leg portions 1881 and 1882 are cut away as indicated by reference numerals 1883 and 1884 respectively, these tapered portions serving to cam the can end blank into a centered position as will be well understood. It will be noted that the undersurface of locator plunger 1880 is recessed sufficiently to provide clearance with the lower enlarged end portion 1866 of the pressing member 1855.

An upwardly extending tubular shank portion 1886 is formed integrally with the locator plunger 1880, the tubular shank portion 1886 being slidably disposed within a bearing 1887 fitted within the bore 1854 of the casting portion 1839. It will be noted that a central opening extends upwardly through the central portion of the locator plunger, and a bearing 1888 is fitted within this opening and serves to slidably journal the lower portion of the intermediate portion 1856 of the pressing member.

A pair of shoulder screws 1891 extends through suitable bores provided in the locator plunger 1880, the shoulder screws each including an enlarged lower head portion 1891 disposed within a counterbored portion of the locator plunger, the upper end portion 1892 of each of the shoulder screws being threaded within suitable threaded bores provided in the portion 1839 of the casting. A compression spring 1894 is disposed in surrounding relationship to the intermediate portions of each of shoulder screws 1890, the compression springs fitting within counterbored portions formed in the casting portion 1839. The upper end portion of each of the springs bears against the casting portion, and the lower portion of each of these springs bears against the upper surface of the locator plunger 1880 whereby the locator plunger is normally urged in a downward direction.

As seen in FIG. 111, a pair of locator blocks 1896 and 1897 is disposed beneath the pressing mechanism for supporting the can end blank while the foil is being pressed into the sealing compound and the base portion is being firmly bonded to the foil. Supporting blocks 1896 and 1897 are secured to the upper wall 1781 of the casting 1780 by means of cap screws 1898 and 1899 respectively, disposed within suitable bores formed in the associated members. It will be noted that the block 1896 is of substantially rectangular cross-sectional configuration, while block 1897 is of substantially L-shaped cross-sectional configuration and includes a cutout portion 1900 for providing clearance with a chain hereinafter described. It will of course also be noted that the lateral portions of the two supporting blocks 1896 and 1897 are spaced from one another, this space accommodating movement of fingers secured to the aforesaid chain.

*Actuating means for pressing mechanism and locator mechanism*

The two pressing and locator mechanisms 1812 and 1813 are driven through a driving train which originates at the main shaft 172, and accordingly the following description will follow this drive train from the main shaft 172 to each of the individual pressing and locator means 1812 and 1813.

Referring particularly to FIGS. 110 and 114, a miter gear 1905 is keyed to the reduced portion 1906 of the main shaft 172, and is held in place by means of a nut 1907 which is threaded on the threaded outer end of portion 1906. A casting 1909 is secured to the side wall 1784 of casting 1780, casting 1909 including an upper laterally extending lug 1911, and a lower laterally extending lug 1912 therebeneath.

A shaft 1915 is rotatably journaled within spaced cartridge bearings 1916 and 1917 which are respectively pressed into bores 1918 and 1919 formed through the upper lug 1911 and lower lug 1912 respectively, the bearings also being held in place by suitable means such as snap rings or the like.

A draw nut 1921 is threaded on the reduced threaded upper end portion of shaft 1915 and serves to draw bearing 1916 and a miter gear 1922 up tightly, miter gear 1922 being keyed to shaft 1915. A miter gear 1924 is also keyed to the lower end of shaft 1915 and drawn up tightly thereon by means of a split hub 1925, miter gear 1924 being in meshing engagement with miter gear 1905 fixed to the main shaft 172.

As seen particularly in FIG. 110, a casting indicated generally by reference numeral 1925 is of substantially U-shaped configuration and includes an upper portion 1926 and a pair of depending portions 1928 and 1929. The upper portion 1926 of casting 1925 is secured to the under surface of the upper wall 1781 of casting 1780 by means of a plurality of cap screws 1927 passing through suitable openings provided in the associated members. A pair of bearings 1931 and 1932 are fitted within suitable bores provided through the depending portions 1928 and 1929, these bearings being retained in operative position by means of a snap ring or the like. A shaft 1933 has the opposite end portions thereof rotatably journalled within bearings 1931 and 1932, a miter gear 1934 being keyed to the outer end of shaft 1933 for rotation therewith and being held in operative position by means of a nut 1935 threaded on the outer threaded end portion of the shaft. Miter gear 1934 is in meshing engagement with the miter gear 1922 fixed for rotation with shaft 1915. A spur gear 1936 includes an integral hub 1937 which is keyed to the reduced end portion of shaft 1933, and a spacer 1938 is disposed between hub portion 1937 and a shoulder formed on the shaft 1933.

Referring now to FIGS. 117 and 118, a pair of castings 1940 and 1941 are provided, these castings being of similar construction and being mirror images of one another. The castings have a more or less triangular shape as seen from the side in FIG. 118, and the castings are secured to the under surface of the upper wall 1781 of casting 1780 by a plurality of cap screws 1942 as seen in FIG. 108, the cap screws being disposed within suitable openings provided in the associated members.

A shaft 1945 is journalled at one end portion thereof within a cartridge bearing 1946 fitted within a suitable bore provided in casting 1940, and an intermediate portion of the shaft 1945 is journalled within a cartridge bearing 1947 fitted within a suitable bore provided through casting 1941, the two cartridge bearings 1946 and 1947 being retained in operative position by suitable means such as snap rings or the like. A spur gear 1948 is provided with a split hub 1949 which is keyed to the outer end of shaft 1945, and is drawn up tightly thereon to retain the gear in operative position. Gear 1948 is in meshing engagement with the gear 1936 which is secured for rotation with shaft 1933.

Referring now to FIGS. 115 and 116, a pair of castings indicated generally by reference numerals 1951 and 1952 are provided, each of these castings being of substantially L-shaped configuration and including inner arm portions 1953 and 1954 respectively and outwardly projecting arm portions 1955 and 1956 respectively. The inner arm portions 1953 and 1954 are secured to the rear wall 1782 of casting 1780 by cap screws 1957 and 1958 respectively. Cartridge bearings 1960 and 1961 are fitted within suitable bores provided in the arm portion 1955 and 1956 of the castings, and a shaft 1962 is rotatably journalled in these cartridge bearings. A pair of face cams 1965 and 1966 are provided with split hubs 1967 and 1968 respectively which are keyed to shaft 1962 for rotation therewith and which are drawn up tightly on the shaft to retain the cams in operative position. Cams 1965 and 1966 are also provided with cam tracks 1969 and 1970 respectively, the configuration of cam track 1970 being seen clearly in FIG. 116.

A spur gear 1972 has an integral split hub 1973, the hub being keyed to shaft 1962 and being drawn up tightly thereon to retain the spur gear in operative position. Spur gear 1972 is in meshing engagement with spur gear 1948 such that shaft 1962 is continuously driven from shaft 172 through the gear train including the spur gears 1936, 1948 and 1972 as seen in FIG. 109.

Castings 1951 and 1952 are provided respectively with bosses 1975 and 1976, these bosses having bores formed therein within which are fitted suitable pins. A first pin 1977 having an enlarged head 1978 formed on the outer end thereof is secured within the bore formed in boss 1975 and is retained in operative position by a locking pin 1979. A second pin 1980 is fitted within the bore provided within boss 1976, pin 1980 having an enlarged head 1981, and the pin being retained in position by a locking pin 1982.

A pair of levers 1985 and 1986 are provided, lever 1985 having a bearing 1987 fitted within a bore formed therein, this bearing serving to rotatably journal the lever on pin 1977. Lever 1986 is provided with a bore within which is fitted a bearing 1988 which serves to rotatably journal the lever on the pin 1980.

Each of levers 1985 and 1986 is substantially L-shaped and includes a long generally horizontal arm and a depending shorter arm, the depending arms having cam followers 1990 and 1991 rotatably supported thereon respectively, the cam followers extending laterally of the levers and being received within the cam tracks 1969 and 1970 respectively.

The outer ends of the horizontally extending arms of each of the levers are forked such that the outer end of the horizontally extending arm of lever 1985 forms spaced portions 1993 and 1994, while the outer ends of the horizontally extending arm of lever 1986 forms spaced portions 1995 and 1996. A headed pin 1997 extends through suitable bores provided in the spaced portions 1993 and 1994, and a similar headed pin 1998 extends through suitable bores provided in the spaced portions 1995 and 1996, the pins being retained in operative position by suitable means such as a snap ring or the like.

Pin 1998 extends through a rod end bearing provided at the lower end of an adjustable link 2000 while the pin 1997 extends through a rod end bearing provided at the lower end of a similar adjustable link 2000'. Referring to FIGS. 111 and 112, a casting 2002 is secured by means of cap screws 2003 to the slide member 1831, the cap screws being disposed within suitable bores provided in the associated members. As seen in particular in FIG. 112, the outer end of casting 2002 is split to provide spaced portions 2004 and 2005, a pin 2006 extending through suitable bores provided in these spaced portions and being retained in position as by snap rings. The pin 2006 extends through a rod end bearing provided at the upper end of the adjustable link 2000.

Referring to FIG. 108, it will be seen that the mechanism at the opposite side of the machine is identical, and a casting 1815' similar to casting 1815 is provided. The associated casting 2002' similar to casting 2002 is also provided with a pair of spaced portions 2004' and 2005' which support a pin 2006' extending through bores provided in the spaced portions and retained in position by suitable means. The pin 2006' extends through a rod end bearing provided at the upper end of an adjustable link 2000'. It will also be noted that a locator arm 1840' which is similar to the locator 1840 shown in FIG. 113 is secured to and extends laterally from the slide member associated with the pressing and locator mechanisms 1813 as seen in FIG. 108.

*Second chain conveyor means*

Referring to FIGS. 117 and 118, a pair of drive sprockets 2010 and 2011 are provided with split hubs 2012 and 2013 respectively which are keyed to shaft 1945 and are drawn up tightly thereon to retain the drive sprockets in operative position.

Casting 1940 is provided with a boss 2015 having a bore formed therein. A pin 2016 is provided with a first substantially cylindrical surface 2017 and a second substantially cylindrical surface 2018 which is eccentric to the surface 2017. Surface 2017 of the pin is disposed within the bore formed in boss 2015 and is retained in operative position by a plurality of locking set screws 2019. An idler sprocket 2020 has a bore formed therethrough which receives ball bearings 2021, the inner races of which are supported by the surface 2018 of the pin 2016. The ball bearings are retained in operative position by retainer plates 2022 and 2023. It is apparent that the position of the sprocket 2020 may be adjusted by rotating pin 2016 due to the eccentric surfaces 2017 and 2018 formed on the pin.

A boss 2025 is formed integral with the opposite end of casting 1940, and a pin 2026 identical to pin 2016 is supported by boss 2025. An idler gear 2027 identical with idler gear 2020 is mounted in a similar manner upon the pin 2026 as will be well understood. A driving chain 2029 is trained over the sprockets 2010, 2020 and 2027, the chain 2029 being provided with four equally spaced upstanding fingers 2030, one of which is visible in FIG. 117, the fingers being disposed at equal intervals along the chain 2029.

Casting 1941 is provided with a boss 2032 identical with boss 2015 of the opposite casting, a pin 2033 similar to pin 2016 being supported in boss 2032, and an idler sprocket 2034 similar to idler sprocket 2020 is journalled on pin 2033. A boss 2035 similar to boss 2025 is provided at the opposite end of the casting 1941, a pin 2036 similar to pin 2026 being supported in boss 2035, and idler sprocket 2037 similar to idler sprocket 2027 is rotatably supported upon pins 2036. A driving chain 2038 is trained over the sprockets 2011, 2034 and 2037, the driving chain being provided with four equally spaced upstanding fingers 2039 as clearly seen in FIG. 118.

The orientation of the sprockets and driving chains of the second chain conveyor means may be seen most clearly in FIG. 109 with respect to the remaining components of the adjacent apparatus, and it should be understood that the fingers on the chains lie directly along the feed line of the apparatus, the can end blanks being advanced directly along the feed lines as heretofore mentioned. The idler sprockets of the second chain conveyor means as well as the uppermost portion of the chains trained thereover extends above the level of the upper wall 1781 of casting 1780, and as seen in FIG. 119, the upper wall 1781 is provided with a pair of elongated cutouts 2042 and 2043 which extend longitudinally of the machine. The upper portion of these cutouts as seen in FIG. 119 serve to provide clearance with the sprockets and driving chain, while the lower arcuate portions of these cutouts as seen in FIG. 119 serve a purpose hereinafter set forth.

It will be noted as seen in FIG. 109 that the chain 2038 passes beneath an overhanging portion of supporting block 1897 and has clearance with the cutout portion 1900 as described in connection with FIG. 111. The finger members 2039 supported from chain 2038 will pass between the spaced opposing lateral surfaces of the supporting blocks 1896 and 1897. A pair of supporting blocks 1896′ and 1897′ identical in construction with supporting blocks 1896 and 1897 respectively are also provided, supporting blocks 1896′ and 1897′ being associated with the driving chain 2029 and providing clearance therewith in the same manner as discussed above.

Slide rail mechanism

As seen in FIG. 109, the driving chains 2029 and 2038 will move the can end blanks off of the supporting blocks 1896, 1897 and 1896′, 1897′ forwardly to the right as seen in this figure, and as the can end blanks move off of the supporting blocks, they are picked up by a plurality of slide rail mechanisms indicated generally by reference numerals 2046, 2047, 2048 and 2049. The slide rails mechansims 2046 and 2047 will support the opposite side portions of one completed enclosure while the slide rail mechanisms 2048 and 2049 will support the opposite side portions of another complete enclosure as it moves off of the associated supporting blocks. The various slide rail mechanisms are of similar construction, the slide rail mechanisms which pick up opposite sides of a particular closure of course being substantially mirror images of one another. Actually the only difference in construction of the various slide rail mechanisms is that the rails may be of slightly different length in order to slidably support an associated closure and guide it as near as possible to the stacking mechanism hereinafter described.

Since the various slide rail mechanisms are of substantially identical construction, one of these mechanisms will be described in detail, it being understood that the other slide rail mechanisms are of substantially identical construction. The slide rail mechanism 2049 is shown in detail in FIGS. 120–123, and includes a flat supporting plate 2050 extending substantially vertically and including a pair of integral laterally extending lugs 2051 and 2052 at the lower edge thereof. Cap screws 2053 and 2054 extend through suitable bores provided in lugs 2051 and 2052 respectively, the cap screws extending into threaded bores provided in the upper wall 1781 of the casting 1780.

A body member 2056 is secured to the inner face of the upstanding plate 2050 by means of three cap screws 2057 disposed within suitable bores provided in the associated members. Body member 2056 is substantially coextensive longitudinally with the plate 2050, and as seen particularly in FIGS. 122 and 123, the body member includes a vertically upstanding edge portion 2058 which terminates in a laterally extending lip portion 2059 which extends longitudinally of the body member thereby defining a trackway. A sliding rail member 2060 includes a laterally extending portion 2061 at the lower portion thereof which extends into the trackway defined by the body member whereby the sliding rail member is slidably supported for longitudinal reciprocation within the body member.

Figure 121:
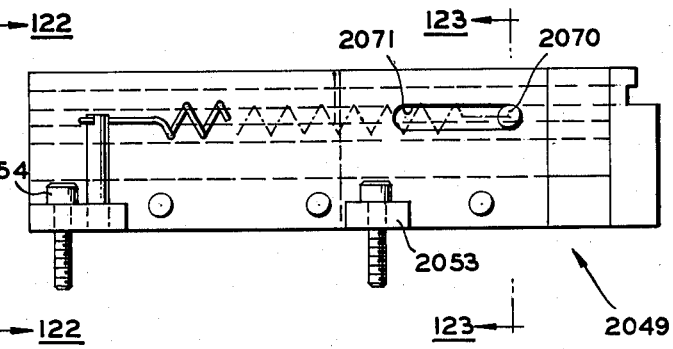
FIG. 121 is a side view of the structure shown in FIG. 120.
Figure 120:
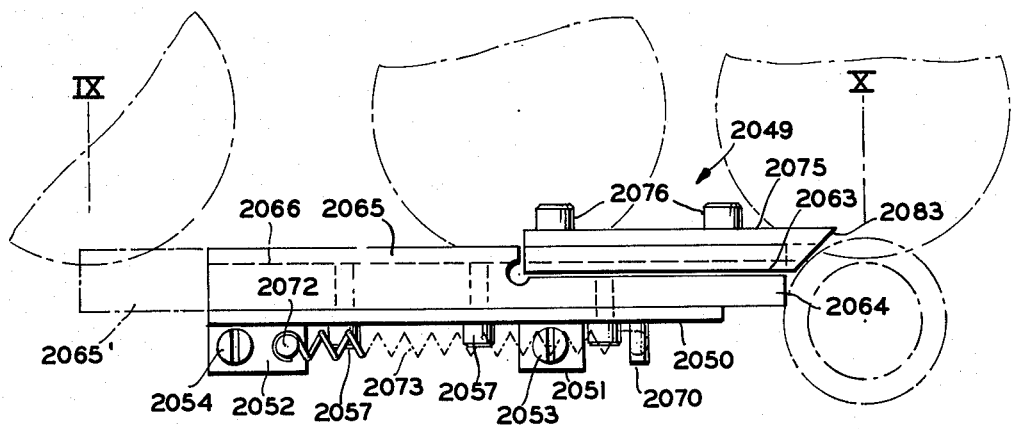
FIG. 120 is a top view of the sliding rail and associated fixed rail mechanisms.
Figure 123:
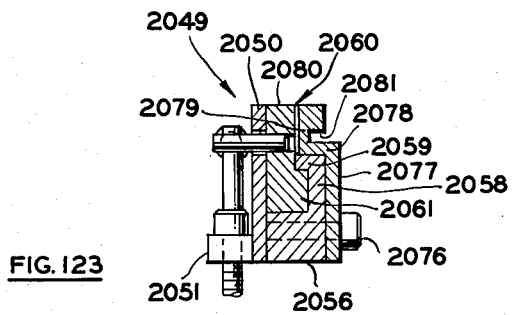
FIG. 123 is a sectional view taken substantially along the line 123—123 of FIG. 121 looking in the direction of the arrows.

As seen particularly in FIG. 120, a sliding rail member is provided with a cutout portion 2063 extending longitudinally thereof to define a first narrow longitudinally extending portion 2064 and a second wider longitudinally extending portion 2065. A longitudinally extending groove 2066 is provided in the side surface of the enlarged width portion 2065 of the sliding rail member, this groove being adapted to receive the curl of a finished closure. A pin 2070 is fixed to the sliding rail member and extends laterally therefrom through an elongated slot 2071 formed through the side wall of plate 2050. A post 2072 extends vertically upwardly from lug 2052, and a coiled tension spring 2073 has the opposite ends thereof connected to the post 2072 and the pin 2070. This arrangement is such that the tension spring normally urges the sliding rail member 2060 rearwardly to the left as seen in FIGS. 120 and 121 to a limit of movement as determined by the engagement of the pin 2070 with the end of slot 2071.

A fixed guide rail 2075 is secured to the body member 2056 by a pair of cap screws 2076 which are disposed within suitable openings provided in the respective members. As seen particularly in FIG. 123, the fixed guide rail 2075 includes an upstanding portion 2077 which is fitted against the outwardly facing surface of the body member 2056, upstanding portion 2077 being connected with a laterally extending portion 2078 which lies over the lip portion 2059 of the body member. An upstanding portion 2079 extends upwardly from the outer end of portion 2078 of the fixed guide rail, and is disposed adjacent to the sliding rail member 2060. An outwardly projecting portion 2080 extends outwardly from the upper part of the upstanding portion 2079, and a groove 2081 is defined between the horizontally extending portions 2080 and 2078, this groove being adapted to receive the curl of a finished closure for guiding movement of the closure longitudinally of the apparatus. It will be noted as seen in FIG. 120 that the outer end of the fixed guide rail 2075 is cut away obliquely along a line 2083 in order to provide clearance with the stacking screws hereinafter described and to ensure that the finished closures are supported to a point as near as possible to the stacking screws.

Referring again to FIG. 109, it will be seen that the various slide rail mechanisms indicated by reference numerals 2046, 2047 and 2048 include slide rail members 2065′ substantially identical with slide rail 2065 discussed in connection with FIGS. 120–123 biased to the left by the associated tension springs 2073′ similar to spring 2073 previously described. Also, the various fixed guide rail members 2075′, which are similar to member 2075 discussed above extend longitudinally to a point adjacent the stacking screws hereinafter described and are cut away on a bias for the purpose as mentioned hereinbefore.

Stacking mechanism

Referring particularly to FIGS. 110 and 124–126, three miter gears 2086, 2087 and 2088 are provided respectively with split hubs 2089, 2090 and 2091, these hubs being keyed to shaft 1933 and being drawn up tightly thereon to retain the miter gears in operative position. Miter gears 2086, 2087 and 2088 are in meshing engagement with miter gears 2093, 2094 and 2095 respectively, these latter miter gears having split hubs 2096, 2097 and 2098 which are respectively keyed to and drawn up tightly on shafts 2100, 2101 and 2102 respectively.

Casting 1925 is provided with three upstanding integral bosses 2105, 2106 and 2107, these castings fitting within the arcuate cutout portions 2108, 2109 and 2110 provided through the upper wall 1781 of casting 1780 as seen particularly in FIG. 119. The bosses 2105, 2106 and 2107 are provided with three central bores 2112, 2113 and 2114 respectively, the bosses being provided with upper counterbores 2115, 2116 and 2117 respectively, and the casting 1925 being provided with lower counterbores 2118, 2119 and 2120.

Cartridge bearings 2123, 2124 and 2125 are disposed within the lower counterbores 2118, 2119 and 2120 respectively, the cartridge bearings being held in operative position by means of snap rings 2126, 2127 and 2128 respectively. Sealed ball bearings 2130, 2131 and 2132 are disposed within the upper counterbores 2115, 2116 and 2117 respectively. Shaft 2100 is rotatably journalled within bearings 2123 and 2130 and extends upwardly thereabove. Shaft 2101 is rotatably journalled in bearings 2124 and 2131 and extends upwardly thereabove, and in a like manner shaft 2102 is journalled within bearings 2125 and 2132 and extends thereabove.

Spacers 2135 and 2136 are disposed about the shafts 2100 and 2102 and rest upon the ball bearings 2130 and 2132 respectively. Tubular members 2137 and 2138 are fitted about the upper ends of shafts 2100 and 2102 and keyed thereto for rotation therewith, the tubular members 2137 and 2138 each having a helical thread formed on the outer surface thereof. It will be evident as seen in FIG. 124 that the helical threads formed on members 2137 and 2138 are of the opposite hand. Tubular members 2137 and 2138 are held in operative position by means of lock nuts 2139 and 2140 which are respectively threaded upon the upper threaded end portions of shafts 2100 and 2102.

A spacer 2143 is disposed about shaft 2101 and rests upon the ball bearing 2131, a spur gear 2144 being disposed immediately above spacer 2143 and being keyed to the shaft 2101. A tubular member 2145 is in turn keyed to the upper portion of shaft 2101, tubular member 2145 having a helical thread formed on the outer surface thereof, this helical thread being similar to that formed on tubular member 2138. Tubular member 2145 is retained in operative position by means of a lock nut 2146 which is threaded on the upper threaded end portion of shaft 2101. A tangential cross pin 2147 extends through suitable bores provided through gear 2144 and the tubular member 2145 for locking the gear to the tubular member for rotation with the tubular member and shaft 2101.

As seen in FIGS. 110 and 124, a shoulder screw 2150 is provided with a reduced threaded lower end portion 2151 which is threaded within a suitable threaded bore provided within boss 2106. The upper end of shoulder screw 2150 is provided with an enlarged head portion 2152, and a tubular member 2153 is counterbored at opposite ends thereof to receive a pair of sleeve bearings 2154 and 2155 which serve to rotatably journal the tubular member on the shoulder screw. Tubular member 2153 is provided with a helical thread on the outer surface thereof, this helical thread being similar to that provided on tubular member 2137.

A spur gear 2157 is disposed in surrounding relation to the lower portion of tubular member 2153, spur gear 2157 being in meshing engagement with spur gear 2144 previously described. A spacer 2158 is disposed in surrounding relationship to the lower portion of the shoulder screw and the sleeve bearing 2155 rests upon spacer 2158. A tangential cross pin 2156 extends through suitable bores provided in the spur gear 2157 and the tubular member 2153 for locking the spur gear and tubular member together for rotation together. In this manner, it is apparent that tubular member 2153 will be driven by shaft 2101 through the intermediary of the two spur gears 2144 and 2157.

It will be noted that the tubular members 2137 and 2145 form a first pair of stacking screw members and the tubular members 2138 and 2153 form a second pair of stacking screw members. The individual stacking screw members of each cooperating pair of stacking screw members rotate in opposite directions in such a manner as to draw the finished closures into the associated pair of stacking screw members whereupon the helical threads thereon will tend to move the closures in an upward direction.

A pair of stacking blocks 2162 and 2163 are secured to the upper surface of the upper wall 1781 of casting 1780 by means of cap screws 2164 and 2165 respectively. Stacking blocks 2162 and 2163 are provided with longitudinally extending cutouts 2167 and 2168 to provide clearance with the adjacent fixed guide rails and to permit the finished closures to enter the blocks. Block 2162 is provided with a pair of substantially cylindrical cutout portions 2170 and 2171 which are in communication with the longitudinal cutout 2167 and which provide clearance with the tubular members 2138 and 2153 respectively. In a like manner, block 2163 is provided with a pair of substantially cylindrical cutout portions 2172 and 2173 which are in communication with the longitudinal cutout 2168 and which provide clearance with the tubular members 2145 and 2137 respectively.

A pair of cylindrical bores 2175 and 2176 are formed vertically entirely through the blocks 2162 and 2163 respectively, these vertically extending bores having a small clearance with the finished closures and serving to guide the finished closures in a vertically upward direction of movement as produced by the helical threads formed on the tubular members. As the finished closures are drawn into the stacking mechanisms by the action of the finger members on the driving chains as well as the helical threads on the tubular members, the finished closures will contact the rear wall of the associated stacking blocks, and this rear wall will serve to accurately position the finished closures, whereupon the helical threads on the tubular members will urge the closures in an upward direction.

Four spaced upwardly extending guide rods 2180 have the lower ends thereof threaded within suitable tapped openings formed in the upper surface of stacking block 2162, and four similar spaced guide rods 2181 have the lower ends thereof threaded within suitable tapped openings formed in the upper surface of stacking block 2163. It is apparent that each of the sets of guide rods 2180 and 2181 will serve as a cage means for guiding the closure members upwardly out of the stacking blocks, and as the helical threads of the tubular members move the closure members consecutively upwardly, the closure members thereabove will be slidingly moved upwardly between the associated guide rods.

*Operation of the machine*

Figure 127:
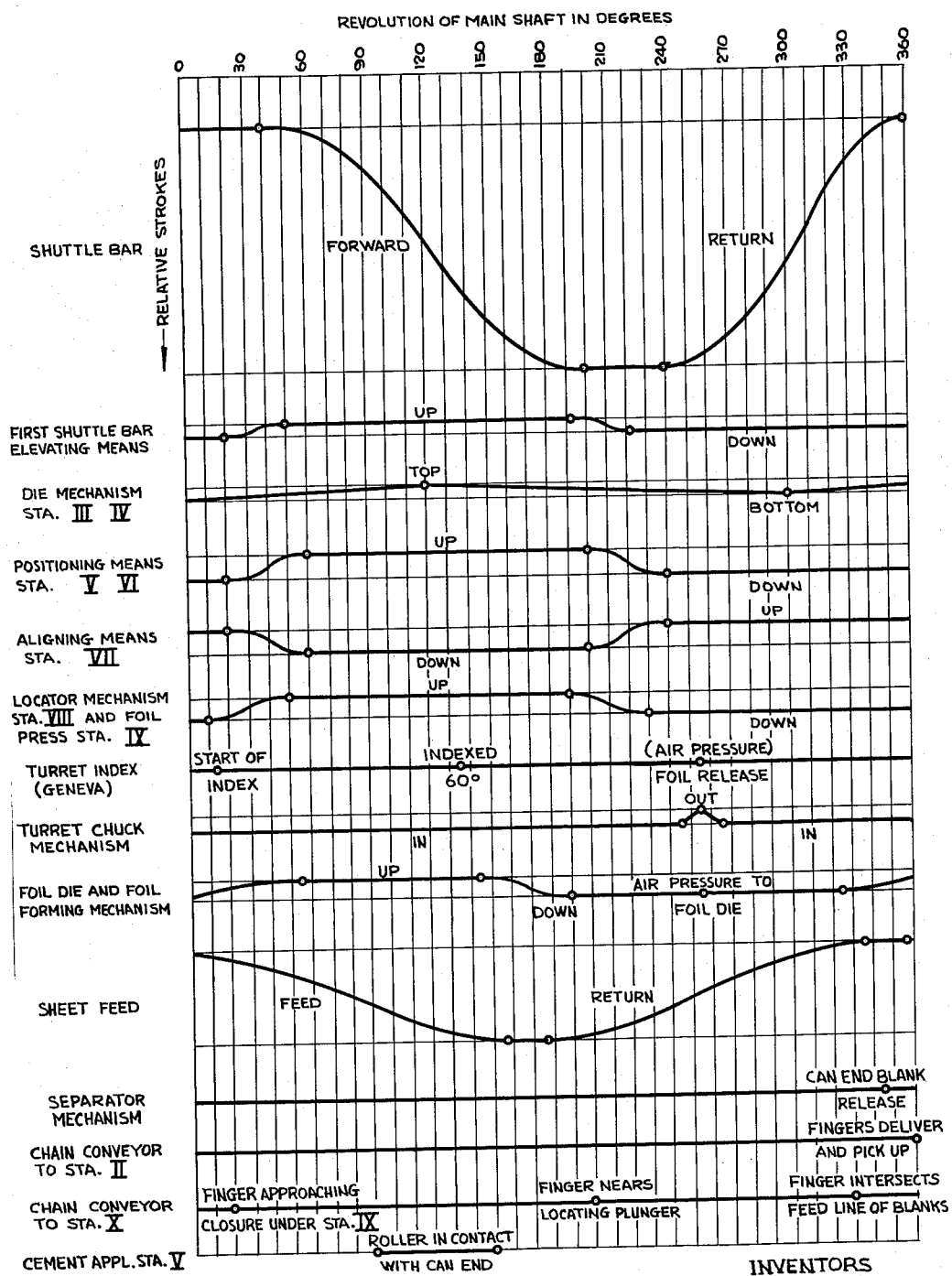
FIG. 127 is a timing chart illustrating the relative movement of certain components of the apparatus through a revolution 360 degrees of the main shaft of the device, or in other words, through one complete cycle of operation of the apparatus.

In considering the operation of the machine, reference is first made to FIG. 13, wherein the various steps performed by the apparatus are indicated schematically and wherein the stations are identified by Roman numerals. These Roman numerals have also been applied to various other of the figures to indicate the approximate locations in the structure of the machine wherein the operations indicated schematically in FIG. 13 are carried out. Reference is also made to FIG. 127 which is a timing chart indicating the relative movement of the components at the various operating stations and of the components which convey the blanks between the stations. The chart is divided into 10 degree increments along the axis of abscissas and indicates degrees of rotation of the main shaft 172.

Each rotation of the main shaft 172 through one complete rotation of 360 degrees represents one cycle of the apparatus, and it should be understood that for each cycle of the apparatus, a blank is advanced one station. In other words, as seen in FIG. 13, during each 360 degrees of rotation of the main shaft 172, a can end blank will be fed from station I to station II at the feed end of the apparatus, and a finished closure will be advanced from station IX to station X at the stacking end portion of the apparatus. The lines on FIG. 127 indicating the movement of the various mechanisms are suitably identified by wording to indicate the position of the parts in order that the relative motion of the various components may be understood.

During operation, the driving motor 156 continuously rotates the fly wheel 153 through the intermediary of the driving belt 157. Fly wheel 153 is in turn secured to shaft 152 having a driving clutch member 154 fixed thereto which is also continuously rotated. A coupling member 162 fixed to a driven shaft 160 is selectively controlled to either couple the coupling member to a fixed brake member 161 or the driving clutch member 154. Obviously when the coupling member is coupled to the fixed brake member 161, the apparatus is at rest, and no drive is transmitted to the various components. When it is desired to operate the device, a suitable switch is actuated for energizing the electromagnetic clutch such that coupling member 162 is coupled to the driving clutch member 154 thereby driving the driven shaft 160.

A spur gear 182 is fixed to shaft 160 and is in meshing engagement with a spur gear 173 secured to the main shaft 172 thereby causing the main shaft 172 to be continuously rotated during operation of the apparatus. As seen in FIG. 18, gear 220 fixed to the main shaft 172 meshes with gear 221 which in turn is fixed to shaft 222 coupled with an overload release clutch 240. The overload release clutch is coupled with a gear 242 which meshes with gear 243 driving shaft 244 which in turn through suitable gearing as seen in FIG. 18 drives the various separator mechanisms 260, 261 and 262 which as previously mentioned are of conventional construction.

Feed mechanism operation

It will be noted that the separator mechanism which is continuously rotating actually releases a can end blank at the 345 degree mark on the timing chart, the can end blank being released so as to rest upon the supporting surfaces 279 and 280 of guide rails 272 and 273 as shown especially in FIG. 20 of the drawings. It will be understood that the next can end blank will be subsequently released by the separator mechanisms after a complete cycle of the apparatus and again at the 345 degree mark on the timing chart.

The first chain conveyor means comprising the conveyor chains 330 and 331 are continuously moving over the associated sprockets, and certain of the upstanding fingers associated with the driving chains are continuously moving along the feed lines extending longitudinally of the machine.

As indicated in the timing chart shown in FIG. 127, the fingers of the first chain conveyor means deliver and pick up a can end blank at the 360 degree mark on the timing chart. This means that one of the fingers delivers a can end blank to the spring clip retaining means of the first shuttle bar transfer means, and the next finger member along the chain is picking up a can end blank which is supported on the guide rails 272 and 273. It is apparent that the fingers on the chains will engage the lateral surface of the curl on a can end blank, and as the conveyor chain moves along, the fingers will force the can end blank to slide along the supporting rails. The first chain conveyor means accordingly is provided for moving the can end blanks from the separator mechanism to the adjacent retaining clip means on the first shuttle bar transfer means.

The various stations of the machine are spaced equidistantly from one another, and in a typical example, the centers of the adjacent stations may be spaced approximately six inches apart. In such a case, it will be noted that the leading edges of the fingers of the conveyor chain means are also spaced six inches apart so as to accurately space the can end blanks from one another.

As mentioned previously, the eccentric shafts 317 and 318 may be employed for adjusting the position of sprockets 315 and 316, and these sprockets may be adjusted for accurately timing the movement of the leading edges of the finger members of the chain relative to the time at which the separator mechanisms release the can end blanks and further with respect to the back stroke of the first shuttle bar transfer means.

The cap screw 350 and set screws 351 and 352 are utilized for the purpose of adjusting the vertical height of the guide rail 345 thereby adjusting the height of the fingers on the chain with respect to the height of the supporting guide rails.

Shuttle bar means operation

As the chain conveyor moves the can end blanks into the station II position, it will be seen from the timing chart of FIG. 127 that the shuttle bar means has reached the limit of its return stroke at the 360 degree mark. Accordingly, as the chain moves the can end blank down-line of the machine and the shuttle bar means moves up-line in its return stroke, the can end blanks will be moved into clamped position under the retaining clip means 434 of the shuttle bar means as seen particularly in FIG. 26, one can end blank being supported upon shoulders 431 and 404, and the other can end blank being supported on the shoulders 405 and 432. Accordingly, the can end blanks are then clamped into position upon the left-hand-most set of retaining clip means as seen in FIG. 26.

As seen in FIG. 127, the shuttle bar means then remain stationary during 40 degrees of rotation of the main shaft, and accordingly the can end blanks will be idling during this portion of rotation of the main shaft. At the same time, the fingers on the chains which deliver the can end blanks to the shuttle bar means will pass downwardly out of the feed line of the machine and thence around the lower sprocket of the chain drive means. It will be noted in the timing chart that the shuttle bar elevator means was down when the can end blank was picked up by the retaining clip means at the lefthand portion of shuttle bar means 430, and that while the shuttle bar is stationary during the first 40 degrees of rotation of shaft 172 on the timing chart, the shuttle bar elevator means starts to move the shuttle bar in an upward direction.

The raising and lowering movement of the first shuttle bar means 430 is produced by the can 469 which actuates a lever 460 connected to the lower end of a vertically extending shaft 368 which in turn is connected to the elevating support member 374 within which the first shuttle bar means is slidably supported. Cam track 470 is of course designed to secure the movement as indicated on the timing chart for the shuttle bar elevating means.

The shuttle bar means is moved in an advancing forward stroke from the 40 degree mark to the 200 degree mark whereupon the can end blank has been moved to station III of the apparatus. During this forward stroke, the first shuttle bar means 430 has been in an elevated position as shown by the diagram of the shuttle bar elevating means movement in FIG. 127, and the shuttle bar has just started moving down before reaching the 200 degree mark. The forward and return strokes of the shuttle bar means is of course determined by the shape of the barrel cam 743 which produces reciprocation of a lever arm 753 which in turn through an overload release clutch oscillates a lever member 770 which is connected through an adjustable connecting means 785 to the attaching lug 734 of the second shuttle bar means. The second shuttle bar means is connected through the intermediary of the sliding block bearing 443 with the first shuttle bar means 430.

Embossing die mechanism operation

After the shuttle bar means have reached their forward limit of movement at the 200 degree mark on the timing chart, the shuttle bar means remain stationary for 40 degrees of rotation, and during this stationary movement, the elevating means lowers the first shuttle bar means 430 into its down position at approximately the 225 degree mark. At this point in the operation of the appaartus, the can end blank has been lowered over the female die 103 at station III. It will also be noted that the die mechanism had reached the top of its movement at the 120 degree mark and has started down at the time when the can end blank is deposited over the female die 103.

At the 240 degree mark on the timing chart the shuttle bar means start their return strokes, the first shuttle bar means 430 remaining in its down position until it again reaches the 20 degree mark. The die mechanism continues its downward movement until it reaches the bottom of such movement at the 300 degree mark. When the shuttle bar means start their return movement at the 240 degree mark, the die mechanism has descended sufficiently that the can end blank is securely retained between the upper and lower portions of the die, and accordingly there is no possibility that the shuttle bar means will carry the can end blanks back toward the feed end of the apparatus. It is of course evident that when the die mechanism has bottomed at the 300 degree mark, the instructions will be embossed or debossed in the can end blank.

It will be noted in the timing chart that after the 300 degree mark, further rotation of the main shaft causes the die mechanism to move upwardly. As the die mechanism moves upwardly, the shuttle bar means are in their return stroke, and as the shuttle bar mechanism approaches the 360 degree mark, the intermediate set of retaining clip means as seen in FIG. 26 will pick up the can end blank which is in position on the female die at station III. The die mechanism upon rotation of the main shaft then clears the can end blank and will continue to move upwardly until it reaches the top of its stroke at the 120 degree mark.

Further rotation of the main shaft 172 causes the shuttle bar means to again remain stationary through the first 40 degrees of rotation, and at the same time the first shuttle bar means 430 starts to move upwardly. As the shuttle bar means again commence their forward stroke, the shuttle bar means 430 moves upwardly to its uppermost position thereby lifting the can end blank off of the female die and raising it to such a level that it can freely move longitudinally above the feed line of the machine. The shuttle bar means will then complete their forward stroke at the 200 degree mark at which time the can end blank is disposed along the center line of station IV.

*Compound die mechanism operation*

At the same time, the shuttle bar elevating means has started to lower shuttle bar means 430 and as the shuttle bar means remain stationary from the 200 degree mark to the 240 degree mark, the shuttle bar means 430 is again lowered to its down position whereupon the can end blank is lowered over the male die member 566. The die mechanism at station IV is descending at such time, and continues to descend to a point where it holds the can end blank in place as the shuttle bar means start their return movement. The shuttle bar means then again move in the return stroke, releasing the can end blanks at station IV, and the die mechanism continues to move downwardly at station IV until it reaches the bottom of its stroke at the 300 degree mark on the timing chart.

The die mechanism is continuuosly raised and lowered as indicated on the timing chart by means of a gear 473 in meshing engagement with a gear 174 on the main shaft, gear 473 driving a vertically extending shaft 474 which in turn is drivingly connected with a shaft 499 having an eccentric outer end thereof which is connected through connecting members 507 and 512 to the upper die plate 525. The die mechanism is of course supported from the under surface of this upper die plate.

The operation of the compound die mechanism may be most clearly understood from a consideration of FIG. 34. As the upper half of the die set moves downwardly, the forming member 650 will first engage the base portion of the can end blank, and the pressure pad member 580 will start to move downwardly against the resilient spring force exerted by spring 594. The pressure pad member 620 then engages the base portion of the can end blank and resiliently presses the can end blank against the upper face of the male die member 566. The upper half of the die set then continues to move downwardly and all of the various cutting edges cooperate to cut out the tab and the peripheral portions of the can end blank as previously described. As the top half of the die set bottoms, the longitudinally extending rib in the tab is completely formed, and the reinforcing ribs have also been completely formed by the punch members.

The upper half of the die set then starts to move upwardly, and as the two halves of the die set separate, the pressure pad member 620 will serve to strip the can end blank out of the female die member, and the lower pressure pad member 580 so as to strip the can end blank away from the tab forming portions of the male die member.

Referring again to the time chart of FIG. 127, as the die mechanism starts to move upwardly from the 300 degree mark, it will be noted that the shuttle bar means is again in its return stroke, and that the first shuttle bar means is in the down position. Accordingly, as the die mechanism moves up, the shuttle bar means 430 will move to the left as seen in the drawings and the right-handmost set of retaining clip means 434 will pick up the can end blank overlying the male die member of the compound die at approximately the 360 degree mark of the timing chart.

The shuttle bar means will again then idle for 40 degrees while the shuttle bar means 430 starts to lift up at approximately the 20 degree mark, and as the shuttle bar means starts to again move forwardly toward the starting end of the machine, the shuttle bar means 430 is elevated so that the can end blank will clear the lower half of the die set, and accordingly, the shuttle bar means can move the can end blanks forwardly without any interference. The shuttle bar means will then move forwardly until the 200 degree mark is reached at which time the can end blanks will arrive at the midpoint of station V which is an idling station.

*Positioning means operation*

As seen on the timing chart of FIG. 127, the positioning means which is indicated generally by reference numeral 815 on the drawings is in up position at the 200 degree mark. As the shuttle bar means idle from the 200 to the 240 degree marks, it will be noted that the positioning means moves from its uppermost position to its lowermost position at the 240 degree mark. When the positioning means has reached its downward limit of movement, it will retain the can end blank in an idling position by positively engaging the can end blank during 140 degrees of movement of the main shaft, that is until the shaft reaches the 20 degree mark on the chart. As the can end blanks are retained in position by the positioning means, the shuttle bar means will again move from the 240 degree mark in their return strokes until at the 360 degree mark, the can end blanks will be centered in the first retaining clip means of the second shuttle bar means indicated generally by reference numeral 671. In other words, referring particularly to FIG. 46, at the 360 degree mark, the can end blanks at station V will be clamped in position on the second shuttle bar means 671 by the retaining clip means 699, 694 and 703.

After the second shuttle bar means 671 has picked up the can end blanks at station V, the shuttle bar means will idle for the first 40 degrees of the timing chart, and the positioning means 815 starts to move up at the 20 degree mark and reaches its uppermost limit at the 60 degree mark. Accordingly, as the shuttle bar means again start their forward movement, the positioning means will clear the can end blanks at station V so as to permit the second shuttle bar means 671 to move the can end blanks to station VI. As the second shuttle bar means reaches the 200 degree mark on the timing chart, the can end blanks will arrive at the center line of station VI, and as the shuttle bar means then idle through an angle of 40 degrees, the positioning means 815 will again lower so as to engage and hold the can end blanks in position at station VI during the next complete cycle of the machine.

The positioning means 815 as seen in FIGS. 54–56 comprise the pairs of positioning members 870, 871 and 890 and 891 as previously described which are reciprocated in an up and down direction. These positioning members are reciprocated by a link 833 connected with a lever 910, the oscillation of which is in turn governed by the cam 918. The cam track 919 as shown in FIG. 59 is so constructed as to provide the desired movement of the positioning means as indicated on the timing chart of FIG. 127.

*Adhesive applying mechanism operation*

As the can end blanks are moved from station V to station VI by the lefthand-most set of retaining clip means of the second shuttle bar means 671, the can end blanks pass beneath the rollers 928 and 929 of the adhesive applying mechanism, and accordingly the adhesive is applied to the upwardly facing portions of the base portions of the can end blanks. It will be noted as seen in FIG. 127 that the rollers of the cement applicator are in contact with the upper portions of the base portions of the can end blank during the forward stroke of the feed bars between the 90 degree marks and the 150 degree marks on the chart as seen in FIG. 127.

As the second shuttle bar means 671 is moved in its forward stroke, the detent lever members 724 pivotally supported on opposite side portions of the shuttle bar means are normally urged in an upward direction by the associated hairpin springs 726, and the outer ends of each of the lever arms includes a vertically extending surface 730 which engages the can end blank supported within the retaining clip means, and ensures that the can end blanks held by the retaining clip means will not move out of position from underneath the retaining clip means due to the frictional contact with the adhesive applying rollers. On the other hand, when the shuttle bar means are moving in the return strokes, it will be noted that the outer ends of the detent lever arms are sloping such that they will be cammed downwardly by engagement with a can end blank being held at station V by the positioning means at such time.

After the can end blanks have arrived at station VI, the shuttle bar means will again remain stationary for 40 degrees of movement of the main shaft, and the positioning means will again descend to hold the can end blanks in place at station VI until the 20 degree mark is again reached on the chart. As the shuttle bar means move on their return strokes, the retaining clip means second from the left of the second shuttle bar means 671 as seen in FIG. 46 will pick up the can end blanks at approximately the 360 degree mark on the timing chart while the positioning means still remains down. The shuttle bar means then complete the return stroke, and as the return stroke is completed, the positioning means starts to move up so as to release the can end blanks. When the shuttle bar means again start their forward stroke at the 40 degree mark, the positioning means has released the can end blanks, and as the shuttle bars move forward to the 200 degree mark, the can end blanks are advanced to the center line of station VII.

*Aligning means operation*

As the can end blanks reach the center line of station VII, the aligning means is moved upwardly, and as seen in FIG. 127, the aligning means moves upwardly during the 40 degrees of movement of the main shaft while the shuttle bars remain stationary, and the aligning means reaches its upper limit of movement at the 240 degree mark. As seen in FIG. 61 the aligning means comprises plungers 968 and 969 having enlarged disc-like head portions 971 and 973 at the respective upper ends thereof adapted to fit within the countersink of the can end blanks. It is apparent that when these enlarged head portions are moved upwardly into the countersinks, the can end blanks will be securely retained against longitudinal movement with the shuttle bar means.

*Sheet feed system operation*

The reel of aluminum foil 1035 is supported upon a rotatable spindle 1036, the brake lining 1072 bearing against the tubular sleeve member 1075 to prevent free wheeling of the spindle. The strip of aluminum foil extends between the drive rollers 1115 and 1124, these rollers being power driven so as to positively draw the strip of aluminum off of the reel.

Roller 1124 is supported for lateral movement toward and away from roller 1115, roller 1124 being resiliently urged toward shaft 1116 as will be clearly understood from an inspection of FIG. 72.

The eccentric cam members 1145 and 1147 may be rotatably adjusted with respect to one another by jumping the gear teeth of the gears 1143 and 1144 at opposite ends of the driving rollers. The cams can be so adjusted relative to one another that as the gears cause the driving rollers to rotate in opposite directions, the cam surfaces will urge the driving rollers away from one another. The amount of movement of the driving rollers away from one another and the time during which they remain separated can be adjusted within certain limits by relative movement of the cam members.

The purpose of causing the two driving rollers to separate periodically is to permit the strip of foil passing therebetween to assume a central position since there is normally a tendency for such a strip going between a pair of driving rollers to move laterally to one side which is undesirable.

As mentioned previously, the photo-electric cells are mounted so as to start and stop the driving motor for the rollers and thereby control the size of the loop depending from the driving rollers.

The strip of foil then travels through the sheet feed mechanism, and the first modification of this feed mechanism is illustrated particularly in FIGS. 74 and 75. As seen in these figures, a pair of spaced reciprocating and oscillating gripper means 1179 and 1180 are disposed at opposite sides of the lower die member plate 1168 over which the strip of foil travels. Each of these reciprocating and oscillating gripper means includes three spaced leg portions which are adapted to engage the upper surface of the foil, and three corresponding spaced leg portions are disposed therebeneath which are adapted to engage the under surface of the foil.

The gripper means are oscillated back and forth in the direction of movement of the strip of foil by means of levers 1243 and 1244 which are connected with a link 1249 which is in turn connected to a lever member 1252, the oscillations of which are controlled by a face cam 1267. The cam tracks 1268 of cam 1267 will produce continuous oscillation of lever 1252 and accordingly the gripper means 1179 and 1180 will be continuously moved back and forth along the path of movement of the strip of foil. The gripper means are normally urged into gripping engagement with the foil, and during the feed stroke of the gripper means, or in other words during its movement down line of the direction of feed of foil, it is in gripping engagement with the foil.

When the gripper means has reached the forward end of its stroke in the direction of feed of the foil, the rollers at the lower ends of members 1405 and 1406 engage the upper surface of the pressure bar means of the gripper means, and further downward movement of the upper foil die plate 1291 causes the pressure bar means and its associated leg portions to be pivoted up away from the underlying leg portions thereby releasing the foil.

The pressure bar means are retained in this released position by the rollers at the lower ends of members 1405 and 1406 during the return stroke of the gripper means in a direction reverse to that of the feed of the foil, and the upper foil die plate 1291 then moves upwardly to allow the pressure bar means to pivot back into gripping relationship when the gripper means reaches the end of its return stroke such that it again grips the foil during its forward stroke to advance the foil. It is apparent that this sequence of events will produce an intermittent feed of the strip of foil across the foil die mechanisms.

As seen in FIG. 65, the foil skeleton is then taken up on a reel indicated by reference numeral 1043. The first modified foil feed means as shown in FIG. 89 operates in an identical manner to that described in connection with FIGS. 74 and 75 above, the only difference in the operation being that in the case of the modification shown in FIGS. 89–91, the foil is gripped between a pair of bars rather than by three spaced leg portions.

Referring now to FIGS. 96–100, the third modified form of foil feed means is illustrated, and the direction of feed through this mechanism is illustrated by the arrow in FIG. 98. In this modification, the foil is gripped between the upper surface of the carriage 1522 and the under surface of the gripper block 1530. Suitable means is connected with the pin member 1541 for oscillating the carriage back and forth along its associated guide rods.

As the carriage reaches its limit of movement in the direction of feed, the gripper block 1530 engages the stop screws 1508 and is moved by such stop screws into engagement with the cam surfaces 1538 as seen in FIG. 96 and thence into the cradle cutout portions 1537. When the block is in this position as shown in FIG. 100, the block 1530 is spaced from the carriage 1522, and the foil is released.

The carriage is then moved in its return stroke in the direction reverse to that of the direction of foil feed while the carriage and block member are separated from one another. When the carriage reaches the limit of its return stroke, the block will engage the stop screws 1511 which forces the pins 1533 and 1534 of the block out of the cradle cutout portions 1537 such that the block again drops down upon the upper surface of the foil to clamp the foil between the block and the carriage. Subsequent movement of the carriage in the forward direction will then of course pull the strip of foil through the feed mechanism.

*Frangible material die mechanism operation*

The frangible material die mechanism operation may be most clearly understood from an inspection of FIG. 73, and it will be seen from this figure that the upper die plate 1280 includes the depending punches 1283 and 1284, these punches cooperating with the die rings 1405 and 1406 which are supported in the upper plate 1168 of the turret mechanism for punching out the circular discs of frangible material which are in turn picked up and held in place by the underlying chuck mechanisms of the turret. The upper die plate 1280 is operated by the lever 1313 which in turn is oscillated by the cam 1332. Cam 1332 is fixed to shaft 1336 upon which a sprocket 1350 is keyed, the sprocket being driven from the main shaft 172 through the intermediary of the chain 1353 trained over a sprocket 1354 fixed on the main shaft.

It will be understood that as the upper die plate 1280 descends, the punches 1283 and 1284 will pass downwardly within the confines of the die rings 1405 and 1406, and that when the upper die plate again raises in a vertical direction, the stripper rings 1301 and 1302 associated with the punches will serve to strip the frangible material scrap skeleton from the punches.

Fluid pressure is applied to the central bores 1410 and 1411 at the bottom limit of the punch strokes, the trip dog 1796 on locator shaft 795 opening valve 1790 in timed relationship such that fluid pressure is introduced through the valve and through the conduits 1800, 1803, 1804, and 1806, the junction box 1807 and the conduits 1808 and 1809 to the interior of the punches. It will, of course, be understood that such fluid pressure will tend to force the cutout discs of frangible material away from the bottom of the punches at such time.

The timing of the vertical reciprocation of the punches as determined by the shape of the cam track 1331 is such that as seen in the timing chart of FIG. 127, the frangible material die mechanism is up while the frangible material is being fed and while the sheet feed mechanism is moving in its return stroke, the die mechanism is in the down position. It will be noted that the foil die mechanism starts its vertical upward movement about 30 degrees before the sheet feed stroke starts, and that the die mechanism starts to move downwardly just slightly before the sheet feed stroke stops, and the die mechanism does not approach the bottom of its vertical movement until a substantial period after the sheet feed stroke has completely stopped.

The modified frangible material die mechanism as shown in FIGS. 92–95 operates in the same manner as the aforementioned die mechanism, the primary distinction of the modified die mechanism being in the fact that the punches are guided by bearing bushings 1472 which are arranged to be as close as possible to the cutting edges of the die ring thereby reducing the lateral deflection of the punches to a minimum and increasing the life of the punches. For simplicity in the following description, the frangible material will be referred to as foil.

*Turret mechanism operation*

The turret mechanism including the two chuck supporting castings 1580 and 1581 is indexed to 60 degrees during each cycle of the machine, the chuck mechanisms being spaced 60 degrees apart thereby causing a different chuck mechanism to be aligned with the foil punches during every cycle of operation and also causing different chuck mechanisms to be aligned with the underlying can end blanks. The mechanisms for indexing the chuck supporting castings 1580 and 1581 includes the Geneva movement shown in FIG. 107 of conventional construction which produces rotation of the sleeve 1656 to which the castings 1580 and 1581 are connected. The Geneva arm 1658 is keyed to shaft 1660, shaft 1660 being connected with the miter gear 1671 which is driven through the gear train seen clearly in FIG. 74 from the sprocket 1350 which is in turn driven by the main shaft 172. It is accordingly clear that during operation, the Geneva arm will be continuously rotated and will serve to index the turret castings 1580 and 1581 sixty degrees during each cycle of operation.

As seen in the timing chart of FIG. 127, the turret mechanism starts to index at approximately the 15 degree mark and completes its 60 degrees of indexing movement at the 135 degree mark. It will be noted that the foil die mechanism starts to move downwardly slightly after the turret mechanism has been indexed such that the foil die mechanism moves downwardly while the turret mechanism is at rest. It will also be noted that the aligning means at station VII moves upwardly after the turret mechanism has been indexed, and accordingly, this upward movement of the aligning means also occurs while the turret mechanism is at rest.

The chuck members 1600 supported within each of the turret castings 1580 and 1581 are mounted for radial reciprocation relative to the supporting castings. As seen in FIG. 88, the pins 1640 connected with the cam follower 1641 are adapted to move the chuck mechanisms in and out in accordance with the shape of the cam track 1647 of the face cam 1645.

Cam 1645 is continuously rotated by spur gear 1648, the spur gears connected to the cams for operating the chuck mechanisms being driven through the two driving gears 1690 and 1691 as seen in FIG. 74 which are fixed to shaft 1685, these latter-mentioned driving gears in turn being driven through the gear train shown in FIG. 74 by the sprocket 1350 which is drivingly connected with the main shaft as heretofore described.

The cam 1645 is accordingly continuously rotated during operation of the device, and the shape of the cam track 1647 as seen in FIG. 106 is such that the chuck mechanisms are in the radially inward position during the major portion of the cycle of the machine as indicated on the timing chart of FIG. 127, and it will be noticed that the cam track 1647 will cause all of the chucks to move out in unison when approximately the 250 degree mark is reached on the timing chart, the chuck mechanisms reaching their outermost point at approximately the 255 degree mark and then again being moved back radially inwardly to their innermost positions at approximately the 265 mark on the timing chart.

The cam 1645 as shown in FIG. 106 as well as the other cam associated with the other supporting casting 1581 are so designed that they make one complete revolution for each three cycles of the machine.

*Frangible material forming means operation*

The operation of the foil forming mechanism may be most clearly understood from an inspection of FIG. 104, and as seen in this figure, a forming punch member 1750 is surrounded by a pressure ring 1758 normally biased to its outermost position. As seen in FIG. 127, the operation of the foil forming mechanism is coincident with the movements of the foil die mechanism due to the fact that the foil forming mechanism operating linkage as seen in FIG. 85 is connected with and is operated by the upper die plate of the foil die mechanism. It will accordingly be seen that the foil forming mechanism is moved to its outermost position at the 190 degree mark on the timing chart, and it remains in this outermost position until the 325 degree mark whereupon it starts its return stroke.

It will be noted that while the foil forming mechanism is in its outermost or down position, the chuck mechanisms are moved out to the outermost position thereof at the 255 degree mark. When the chuck mechanisms are so moved outwardly, they assume the position as seen in FIG. 104 at which time the discs of foil which are disposed on the outer portions of the chuck mechanisms are formed into the desired cup-shaped configuration by the cooperation of the chuck mechanisms and the foil forming mechanisms.

As seen in FIG. 104, the portion 1601 of the chuck mechanism serves as a female forming die and portion 1750 of the associated forming punch cam member comprises the male forming die which moves into the female forming die 1601. As the male forming die 1750 moves into the position shown in FIG. 104, the plunger 1610 will be moved downwardly as shown in FIG. 104 against the force of the springs 1625, and the pressure ring 1758 will be moved upwardly against the force of the spring 1760. It is apparent that the members as shown in FIG. 104 will produce the desired configuration of the foil blank as indicated by reference numeral 80 in FIG. 10 of the drawings.

As the chuck mechanism is then withdrawn to its innermost position at the 260 degree mark on the timing chart, the lip 1602 of the chuck mechanism will be spaced from the draw ring 1758 since the draw ring is now maintained in its position by engagement of the spring ball detent 1776 in the peripheral groove 1777. The plunger 1610 will be urged outwardly as the chuck mechanism is withdrawn whereby the plunger will retain the formed foil blank clamped between it and the male die portion 1750.

As the chuck mechanism reaches the innermost point, the plunger as well as the chuck mechanism moves away from the male die portion 1750, and at this point, the chuck mechanisms and the foil forming mechanism are spaced from one another. The foil forming mechanism starts its return stroke at approximately the 325 degree mark on the timing chart and reaches the limit of its return stroke at aproximately the 55 degree mark. As the foil forming mechanism returns, the plate 1763 as seen in FIG. 104 will strike the stop screws 1768 and 1770 which will then cause the draw ring to be released from the ball detent 1776 whereupon the spring 1760 urges the draw ring 1758 to the outermost limit of its movement.

It should be understood that the foil is retained on the chuck mechanisms which are mounted within the outwardly extending bosses identified as A, B and C in FIG. 85 by vacuum which is applied to the surface of the chuck mechanisms. This vacuum system as seen in FIG. 73 includes a fitting 1555 which is connected continuously to a suitable source of vacuum which is then applied to the bore 1553 to the center of the turret mechanism. As seen in FIG. 101, this central bore 1553 is in communication with three radially extending bores 1568, 1569 and 1570 which in turn are in communication with a circumferentially extending groove 1571 formed in the outer surface of the tubular supporting member 1550. Vacuum is applied in turn to the bores 1572, 1573 and 1574 formed through the sleeve 1562 to the interior of the chuck mechanisms. As seen in FIG. 103, the vacuum is then applied through the radially outwardly extending passages 1607 of the chuck mechanisms, thence to the bore 1615 formed through the center of the plunger and outwardly through the radially extending passages 1620 in the outermost enlarged portion of the plunger and through the openings 1621 to the surface of the chuck mechanism.

The holes 1621 formed through the outer end of the plunger are uniformly distributed over the surface thereof, and as seen in FIG. 102, additional openings 1638 are provided around the periphery for retaining the outermost portion of the foil disc securely on the chuck mechanism. Vacuum is applied to the opening 1638 as seen in FIG. 104 through the radial passages 1617 and 1619, and thence into the cavity 1583 and through the bore 1631 of the guide bushings 1630 about the flat sided guide pin 1632. The vacuum is then applied from the under surface of the plunger through the openings 1638.

It will accordingly be apparent that as the foil disc is first cut out by the foil dies, it will be retained on the chuck mechanism shown in the position A of FIG. 85 by the vacuum applied to this chuck mechanism. The foil disc will then be retained on the chuck mechanism as it is indexed to the position shown by B in FIG. 85 at which position the foil is formed into the desired configuration. When the chuck mechanism moves away from the foil forming mechanism as discussed in connection with FIG. 104, it will be apparent that the vacuum applied to the chuck mechanism will serve to strip the formed foil blank away from the foil forming mechanism. The vacuum will then further retain the formed foil blank in the position of a chuck mechanism as it moves to the position indicated by C in FIG 85. It will be noted as seen in FIG. 101 that the circumferentially extending groove 1571 terminates at a point 1571', and accordingly, the vacuum will be cut off from the chuck mechanism after one of the radial passages formed through the sleeve 1562 has passed beyond point 1571' of the circumferential groove 1571. A sufficient amount of residual vacuum will then be present in the chuck mechanism to retain the foil on the chuck mechanism until the chuck mechanism reaches the vertically downwardly facing position in overlying relationship to a can end blank.

*Formed foil blank release operation*

When the chuck mechanism is in the position within the boss indicated by leter D of FIG. 85, the chuck mechanism moves out to its outermost limit of movement at the 255 degree mark on the timing chart shown in FIG. 127, and air pressure is applied through the same bores that the vacuum was previously applied to the chuck mechanism, the air pressure coming from the same source which supplies the air pressure to the foil dies, and in fact the air pressure at the foil dies and the air pressure at the lowermost chuck mechanism is applied simultaneously, it being apparent that such air pressure applied through the chuck mechanism will force the formed foil blank downwardly onto the underlying can end blank. The air pressure is introduced into the tubular member 1550 through the conduits 1558 and 1559 as shown in FIG. 73, these conduits being in communication with the radial passages formed through the sleeve when the chuck mechanism is in the position indicated by letter D in FIG. 85, whereupon the air pressure will be applied through the radial passage 1575 as indicated in FIG. 101, and thence through the aligned radial passage in the sleeve and the aforementioned bores of the chuck mechanism.

*Aligning means operation*

As pointed out previously, when the shuttle bar means advances the can end blank to station VII, and it has reached the limit of its forward stroke at the 200 degree mark, the aligning means starts to move up and has reached its full up position at the 240 degree mark whereupon the shuttle bar means starts its return stroke. The aligning means then remains up until the 20 degree mark, and shortly after the aligning means has reached its full up position at the 240 degree mark, the formed foil blank is released at approximately the 255 degree mark while the can end blank is retained in place by the aligning means. The shuttle bar means will pick up the can end blank retained by the aligning means in its up position at approximately the 360 degree mark and the can end blank at station VII will be picked up by the third set of retaining clip means from the left of the shuttle bar means 671 as seen in FIG. 46. It will be seen that the aligning means starts to move downwardly at the 20 degree mark, and has moved down sufficiently by the time the shuttle bar means starts its forward stroke at the 40 degree mark that the aligning means clears the associated can end blanks. The aligning means then continues downwardly to the lowermost point of its movement at the 60 degree mark, and the shuttle bar means continues to move the can end blanks forwardly of the machine, until at the 200 degree mark, the can end blank has been moved to the center of station VIII.

The aligning plungers 968 and 969 are normally urged downwardly by the springs 980 and 991, and are periodically urged upwardly by the adjustable screws 1010, and 1011 which are secured to a bracket 999 which is reciprocated in a vertical direction through a linkage connected with a lever member 1021 as seen in FIG. 62, the lever member being oscillated by a cam 1030, the cam having a cam track 1031 of the configuration shown in FIG. 64 for obtaining the desired movement of the aligning means as indicated on the timing chart.

*Frangible material pressing and locator mechanism operation*

When the can end blanks have been moved to the center line of station VIII, they are retained in such position at station VIII by the positioning means 1840 and 1850 which are actuated in unison with the foil pressing mechanism. The locator arms 1840 and 1850 as indicated in FIG. 113 are adapted to move down vertically such that the depending portions thereof can fit about opposite portions of the can end blanks for retaining them in position during the idling cycle.

As seen in the timing chart, the locator mechanism at station VIII is up as at the 190 degree mark as the shuttle bar approaches the limit of its forward stroke. The locator mechanism starts to move down at the 190 degree mark, and the shuttle bar means reaches the limit of its forward stroke at the 200 degree mark. The locator mechanism at station VIII then moves down to the bottom of its movement at the 230 degree mark, and the shuttle bar means starts its return stroke at the 240 degree mark. The locator mechanism remains down while the shuttle bar means is completing its return stroke at the 360 degree mark such that the can end blanks are retained in station VIII until the right-hand-most set of retaining clip means of the shuttle bar means 671 seen in FIG. 46 pick up the can end blanks at station VIII as held in position by the locator mechanism.

After the can end blanks have been picked up at station VIII by the right-hand-most set of retaining clip means of the second shuttle bar means 671, the shuttle bar means will remain stationary from the zero to 40 degree mark of the time chart, and during this time, the locator mechanism starts its upward movement at the 10 degree mark and completes its upward movement at the 40 degree mark. At the 30 degree mark when the shuttle bar means again starts its forward stroke, the locator mechanism has cleared the can end blanks such that the shuttle bar means can carry the can end blanks forwardly from the center line of station VIII. The shuttle bar means then again moves through its forward stroke until at the 200 degree mark the can end blanks have been moved to the center of station IX.

As the can end blank reaches the center line of station IX at the 200 degree mark, the foil pressing mechanism as shown in detail in FIGS. 111–113 has just started its downward movement at the 190 degree mark, and while the shuttle bar means remains at rest from the 200 degree mark to the 240 degree mark, the foil pressing mechanism moves to its lowermost position at the 230 degree mark.

As seen particularly in FIG. 113, the foil pressing mechanism includes a locator plunger 1880 which descends upon vertical downward movement of the slide member 1831 from which it is supported. The tapered inner corners 1883 and 1884 of the locator plunger 1880 will pick up the side edges of the can end blank and accurately center the can end blank beneath the pressing mechanism, the can end blank being supported upon the supporting blocks 1896 and 1897. As the foil pressing mechanism continues to move downwardly, the pressing member 1855 is urged downwardly through the intermediary of spring 1864, the lowermost surface 1868 of the pressing member engaging the upper surface of the flange formed on the foil blank to thereby press the foil blank into the sealing compound disposed within the annular channel of the can end blank. Also, the under surface of the enlarged end portion 1866 of the pressing member will engage the base portion of the foil blank to urge it into intimate contact with the base portion of the underlying can end blank. In this manner, the foil blank is securely bonded to the can end blank. It will be noted that the locator plunger 1880 is resiliently urged downwardly by springs 1894 and is adapted to give vertically upwardly when it engages the associated can end blanks.

The foil pressing mechanism at station IX as well as the locator mechanism for station VIII is vertically reciprocated by the slide members supporting these portions, the slide members being moved in a vertical direction by vertically extending links 2000 and 2001 which are in turn connected with levers 1986 and 1985, these levers being oscillated by engagement of the cam followers mounted thereon with the cam tracks formed in cams 1966 and 1965 respectively. These cam tracks are designed to produce vertical reciprocation of the locator mechanism and foil pressing means indicated on the timing chart of FIG. 127.

*Second chain conveyor means operation*

After the completion of the pressing operation at station IX, the closure is finished, and it remains necessary to transport the first closure to the stacking mechanism. For this purpose, the second chain conveyor means as shown in detail in FIGS. 117 and 118 is employed. This second chain conveyor means includes the four spaced fingers on each of the chains which are adapted to engage a side edge portion of the finished closure and move the finished closures off of the supporting blocks 1896, 1897, 1896' and 1897' as seen in FIG. 109 onto the sliding rail mechanisms 2065 and 2065' as seen in this figure.

The conveyor chains of the second chain conveyor means are continuously driven as are the cams 1965 and 1966 for actuating the foil pressing means and the locator mechanism of station VIII, this continuous drive being provided through the gear train including gears 1936, 1948 and 1972 as seen in FIG. 109. The fingers on the driving chains 2009 and 2038 are suitably spaced from one another so as to accurately time the pick-up of the can end blanks.

As seen in the timing chart of FIG. 127, one of the fingers of a driving chain approaches the finished closure at station IX as the locator plunger 1880 moves up away from the closure therebeneath. It will be noted that the foil pressing means starts to move upwardly at the 10 degree mark and reaches the upward limit of its movement at the 50 degree mark of the timing chart as the finger on the chain approaches the finished closure at the 20 degree mark. The finger on the chain will then pick up the closure and advance the closure in a forward direction down-line of the machine, and at the 200 degree mark as indicated in FIG. 127 the finger clears the locator plunger 1880 of the pressing means, and the foil pressing means has just started its downward movement at the 190 degree mark. Accordingly, as the foil pressing means then continues to descend to its lowermost position at the 230 degree mark, the finger on the underlying conveyor chain has cleared the pressing means and has moved the finished closure down-line of the pressing mechanism toward station X.

As seen in FIG. 127, the leading edge of a finger on the chain conveyor intersects the feed line of the blanks at approximately the 330 degree mark on the timing chart. This can be understood most clearly by reference to FIG. 118 wherein a finger 2039 is indicated schematically as intersecting the feedline indicated by the line x—x.

The fingers on the driving chains of the second conveyor means then continue to move the finished closures down-line until the finished closures have been moved to station X, whereupon they are picked up by the helical threads on the outer surface of the tubular members 2137, 2138, 2145 and 2153 as seen most clearly in FIG. 124. These stacking screw means then will serve to force the finished closures upwardly into the cages defined by the guide rods 2180 and 2181 as aforedescribed. The stacking screw means are continuously rotated by the driving gear train as seen in FIG. 124. It is apparent that the position of the helical screws must be properly timed so as to receive the finished closures properly, and it will be further apparent that after the fingers on the driving chains have delivered the finished closures to the stacking mechanism the fingers will drop down below the feed line of the machine and thence pass about the sprockets of the chain driving mechanism to again pick up another finished closure at station IX.

*Sliding rail operation*

As mentioned previously, the fingers of the driving chains of the second conveyor means move the can end blanks off of the supporting blocks 1896, 1897, 1896' and 1897' onto the sliding rail members 2065 and 2065'. The sliding movement of these rail members and their intercooperation with the shuttle bar means will now be described.

Referring particularly to FIGS. 109 and 120, it will be noted that the sliding rail members are directly aligned longitudinally of the apparatus with the bumper members as seen in FIG. 46 numbered 1713, 1714, 1715 and 1716 which extend forwardly of the support portions of the second shuttle bar means 671. These bumper members are adapted to engage the end portions of the sliding rail members and urge them forwardly of the machine in the direction of movement of the can end blanks as hereinafter described.

As indicated by dotted line 2065' in FIG. 120, the sliding rail 2065 is retracted to its left-hand-most limit of movement by the spring 2073, and at this position it will be noted that the outer end portion of the sliding rail extends beyond the center line of station IX. As the shuttle bar means moves forwardly in its forward stroke, the bumpers at the forward end of shuttle bar means 671 engage the outermost end portions of the retracted sliding rails at the 160 degree mark to the 200 degree mark, the shuttle bar means will move the sliding bars to the right as seen in FIG. 109 until at the 200 degree mark the sliding bars have been moved to the full line positions shown in FIGS. 109 and 120.

The sliding bars will then remain in this forwardmost position until the 240 degree mark on the timing chart, at which time the shuttle bar means starts its return stroke, and the shuttle bar means as well as the sliding rail means will move to the left as seen in FIGS. 109 and 120 until the sliding rails again reach their outermost retracted position at the 280 degree mark on the timing chart.

As the shuttle bar means delivers the can end blank to the center line of station IX, the pressing means shown in FIG. 113 descends vertically, and the locator plunger 1880 retains the can end blank in position from the 230 degree mark until the 10 degree mark as shown on the timing chart during which time the shuttle bar means is moving in its return stroke. Accordingly, the can end blank which is delivered to station IX remains at station IX while the shuttle bar means returns and the sliding rails move into the dotted line position as shown in FIG. 120. Accordingly, at the 280 degree mark on the timing chart, the sliding rails have moved to their fully retracted position beyond the center line of station IX, and the curl of the can end blank which is positioned along the center line of station IX is received within the supporting groove portion of the sliding rail members.

At approximately the 20 degree mark on the timing chart, the finger on the associated conveyor chain will then pick up the can end blank which is now supported within the groove in the sliding rail members, and the fingers will move the can end blank relative to the sliding rail member which is then stationary, and the can end blank will move to an intermediate portion of the supporting grooves in the associated slide rail members.

After the can end blank has been so moved to an intermediate portion of the associated supporting rail members, the bumpers on the end of the shuttle bar means 671 will again engage the sliding rail members and urge the sliding rail members into the full line position shown in FIGS. 109 and 120. The shuttle bar means then remains stationary, and the finger on the associated conveyor chain continues to move the can end blank relative to the sliding rail member until the can end blank is then transferred from the supporting grooves in the sliding rail members into the aligned supporting grooves formed in the fixed rail members adjacent to the sliding members and disposed down-line thereof. The shuttle bar means will then start to move in its return stroke, and the sliding rail members will again move outwardly toward their retracted position, the can end blanks then being supported in the fixed rail members. The finger members on the associated conveyor chains will then move the finished closures along the supporting grooves in the fixed rail members until the finished closures are picked up by the stacking mechanism.

It is apparent from the foregoing that there is provided a new and novel method for manufacturing frangible closures for containers wherein a first blank of non-frangible material is provided with a removable portion and a manually graspable portion, and a second blank of frangible material is provided, and a novel method is employed for securing the first and second blanks in operative relationship with respect to one another and particularly such that the portion of frangible material which underlies the removable portion of the non-frangible means is securely bonded to such removable portion.

A novel machine is provided incorporating a feed means for intermittently advancing can end blanks from station to station in the machine. Novel compound die means is provided for substantially simultaneously performing the various functions on the base portion of the can end blank, and adhesive mechanism is provided for applying a uniform coating of an adhesive substance to a portion of the blanks. Pressing mechanism is also provided for ensuring that a good bond is obtained between each can end blank and the associated blank of frangible material.

The novel sheet feed system of the present invention is particularly suitable for feeding a very thin strip of flexible and frangible material. This sheet feed system incorporates a novel spindle means for supporting a reel of flexible material with means for locking or releasing the reel. Driving roller means is also provided in the sheet feed system and includes means for ensuring that the sheet remains in centered position between the rollers. The sheet feed means of the sheet feed system engages the opposite side edge portions of the sheet of frangible material and advances it in intermittent step-by-step fashion through the machine. Die mechanism is also provided for cutting out pieces of frangible material and incorporates fluid pressure means for assisting in removing these cutout pieces from the punches of such die mechanism. The turret mechanism of the machine through its indexing rotary movement serves to transfer the cutout pieces of frangible material firstly to the forming means whereat the forming means cooperates with the punch mechanisms for providing a desired particular finished configuration to the frangible material blanks, and the turret mechanism then further transfers the formed blanks of frangible material to a position in overlying relationship to a can end blank. Means is also incorporated in the turret mechanism for releasing the formed blanks of frangible material into operative relationship with a can end blank.

The slide rail mechanism of the machine effectively serves to provide a continuous guide and support means for the finished closures as they are transferred from the reciprocating second shuttle bar means to the continuously driven second chain conveyor means and thereby supports the finished closures in their movement between the last two stations of the machine.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:
1. A machine for manufacturing closures comprising means for feeding can end blanks through the machine, cutting means for completely severing spaced portions of each of said can end blanks to provide a completely removable portion in each of said can end blanks and which removable portion is attached at other spaced unsevered points to the associated can end blank, separate means for cutting out blanks of frangible material and forming such blanks of frangible material into a desired complementary configuration, and means for securing at least a portion of each of said blanks of frangible material to the removable portion of one of said can end blanks.

2. Apparatus as defined in claim 1 including a sheet feed system, said sheet feed system including a driving roller means engaging a continuous sheet of frangible material and drivingly moving the sheet of material, and a sheet feed means for engaging the sheet of frangible material and moving it intermittently through the machine.

3. Apparatus as defined in claim 1 wherein said means for securing at least a portion of each of said blanks of frangible material to the removable portion of one of said can end blanks includes means for applying adhesive to the removable portion of some of said blanks, and means for disposing each of said blanks of frangible material in contacting relation with the removable portion of one of said can end blanks whereby each blank of frangible material is adhesively secured to the removable portion of an associated can end blank.

4. Apparatus as defined in claim 3 including pressing mechanism for pressing each of said blanks of frangible material and an associated can end blank toward one another for securing the contacting blanks to one another.

5. Apparatus as defined in claim 1 including means for intermittently feeding a substantially continuous strip of frangible material through the machine, said means for securing at least a portion of each of said blanks of frangible material to the removable portion of one of said can end blanks comprising means for applying adhesive to an upwardly facing portion of the removable portion of each of said can end blanks, means for placing each of said blanks of frangible material in contact with one of said can end blanks, and pressing mechanism for applying pressure to each pair of contacting blanks to ensure that the contacting blanks are securely bonded to one another.

6. A machine for manufacturing frangible closures comprising feed means for moving a plurality of can end blanks sequentially through the machine, die press mechanism including a compound die means for engaging each of the can end blanks, said compound die means including a male die member and a female die member having cutting edges thereon for cutting portions of each can end blank, a first pressure pad member slidably supported within said male die member, a second pressure pad member slidably disposed within said female die member, resilient means engaging each of said pressure pad member, and a forming member supported within said female die member, whereby when the portions of said compound die means are brought together, a can end blank is cut so as to form a removable portion and a manually graspable tab, means for making a plurality of blanks of frangible material, and means for disposing each of said blanks of frangible material in operative relationship to one of said can end blanks.

7. A machine for manufacturing frangible closures for containers and the like comprising feed means for moving can end blanks intermittently from point to point along the machine, means for forming a removable portion in each of said can end blanks, means including forming means for making blanks of frangible material, said forming means including a forming punch member having a working end portion, a draw ring disposed in surrounding relationship to said working end portion, resilient means normally urging said draw ring to an outermost position, means limiting the outermost movement of said draw ring, and detent means engaging said draw ring for retaining the draw ring in a particular position, and means for disposing each of said blanks of frangible material in operative relationship to one of said can end blanks.

8. A machine for manufacturing closures for containers and the like comprising means for moving a plurality of can end blanks through the machine, means for forming a removable portion in each of said can end blanks, and means for making blanks of frangible material, said last-mentioned means including a sheet feed system, die means and forming means, said sheet feed system including means for engaging a substantially continuous sheet of frangible material for moving the sheet of material through the machine in a step-by-step manner, said die means including punch members for engaging the sheet of frangible material and punching out pieces of frangible material, said forming means including forming members for engaging the individual pieces of frangible material and forming them into the desired configuration, and means for positioning each of said formed frangible material blanks in operative relationship relative to one of said can end blanks.

9. A machine for making frangible closures comprising feed means for moving a plurality of can end blanks in a step-by-step manner from one operating station to another in the machine, means for engaging each of said can end blanks for forming a removable portion therein, a sheet feed system for feeding a continuous strip of frangible material through the machine, said sheet feed system including driving roller means engaging said strip of material and sheet feed means for intermittently moving said strip of material through the machine, die mechanism for engaging said frangible material and including upper and lower die portions cooperating to punch out pieces of frangible material, turret mechanism slidably supporting a plurality of chuck mechanisms, said chuck mechanisms being adapted to carry said pieces of frangible material from one position to another, means for indexing said turret mechanism in timed relationship to the movement of can end blanks through the machine, and forming means including forming punch members adapted to cooperate with said chuck mechanisms for forming the pieces of frangible material into formed blanks, and means for disposing each of said formed blanks of frangible material in contacting relationship with one of said can end blanks.

10. A machine as defined in claim 9, wherein a source of fluid pressure is operatively connected with said turret mechanism and the interior of said die means, a valve for controlling flow of fluid pressure to said die means and turret mechanism, and means for operating the valve in timed relationship to the movement of the other components of the machine.

11. A machine for manufacturing closures for containers and the like comprising feed means for intermittently moving can end blanks from station to station in the machine, a first die mechanism for engaging said can end blanks, said first die mechanism including male and female die members having cutting edges for cutting each of said can end blanks and forming a removable portion therein, first and second pressure pad members slidably supported within said said male and female die members respectively, and forming means supported within one of said die members, means for intermittently feeding a substantially continuous strip of frangible material through the machine, second die means including upper and lower die portions adapted to engage the strip of frangible material for cutting out pieces of material, turret mechanism slidably supporting a plurality of chuck mechanisms, said chuck mechanisms including means for retaining a piece of frangible material thereon, means for periodically indexing said turret mechanism so as to move it in timed relationship to the movement of can end blanks through the machine, forming means cooperating with said chuck mechanisms and engaging the pieces of frangible material supported on the chuck mechanisms for forming the pieces of frangible material into a finished configuration, and means for disposing each of said formed frangible material blanks over a portion of an associated can end blank.

12. A machine for making frangible closures comprising a first and second chain conveyor means for moving can end blanks through a portion of the machine, first and second shuttle bar means for carrying and moving can end blanks in a step-by-step manner from station to station through another portion of the machine, means for periodically elevating said first shuttle bar means, means adjacent one of shuttle bar means for engaging each of the can end blanks passing through the machine and forming a removable portion therein while the blank is carried by one of said shuttle bar means, means for making a plurality of blanks of frangible material of a desired configuration, and means adjacent the other of said shuttle bar means for disposing each of said blanks of frangible material in operative relationship to one of said can end blanks.

13. A machine for making frangible closures comprising can end blank feed means for feeding can end blanks one at a time into a portion of the machine, first chain conveyor means for engaging the can end blanks fed into the machine by the can end blank feed means, first shuttle bar means for engaging each of the can end blanks fed from said first chain conveyor means, second shuttle bar means for engaging each of the can end blanks fed from said first shuttle bar means, second chain conveyor means for engaging each of the can end blanks fed from the second shuttle bar means, and means for removing each of the can end blanks from said second chain conveyor means, means for engaging each of said can end blanks for forming a removable portion therein, means for making a plurality of blanks of frangible material of a desired configuration, and means for disposing each of said blanks of frangible material in operative relationship one one of said can end blanks.

14. A machine for manufacturing frangible closures for containers and the like comprising feed means for moving can end blanks intermittently from point to point along the machine, means for forming a removable portion in each of said can end blanks, means including forming means for making blanks of frangible material, said forming means including a forming punch member having a working end portion, a draw ring disposed in surrounding relationship to said working end portions, resilient means normally urging said draw ring to an outermost position, means limiting the outermost movement of said draw ring, detent means engaging said draw ring for retaining the draw ring in a particular position, and means for securing each of said blanks of frangible material to one of said can end blanks, said last-mentioned means comprising adhesive applying mechanism for applying an adhesive substance to some of said blanks, and pressing mechanism engaging and urging each blank of frangible material and the associated can end blank toward one another to ensure that the associated blanks are securely bonded to one another.

15. A machine for manufacturing closures comprising means for feeding can end blanks through the machine, means for cutting each of said can end blanks to form a removable portion therein, means for making blanks of frangible material including a sheet feed system and forming means, said means for making blanks of frangible material also including die means including punch members for engaging the sheet of frangible material and punching out pieces of frangible material, said forming means including means for deforming portions of the punched out pieces of frangible material into the desired configuration, said sheet feed system including a driving roller means engaging a continuous sheet of frangible material and drivingly moving the sheet of material, a sheet feed means for engaging the sheet of frangible material and moving it intermittently through the machine, and means for securing each of said blanks of frangible material to one of said can end blanks, said last-mentioned means comprising adhesive applying mechanism for applying an adhesive substance to some of said blanks, and pressing mechanism engaging and urging each blank of frangible material and the associated can end blank toward one another to ensure that the associated blanks are securely bonded to one another.

16. A machine for manufacturing closures for containers and the like comprising means for moving a plurality of can end blanks through the machine, means for forming a removable portion in each of said can end blanks, and means for making blanks of frangible material, said last-mentioned means including a sheet feed system, die means and forming means, said sheet feed system including means for engaging a substantially continuous sheet of frangible material for moving the sheet of material through the machine in a step-by-step manner, said die means including punch members for engaging the sheet of frangible material and punching out pieces of frangible material, said forming means including forming members for engaging the individual pieces of frangible material and forming them into the desired configuration, and means for securing each of said blanks of frangible material to one of said can end blanks, said last-mentioned means comprising adhesive applying mechanism for applying an adhesive substance to some of said blanks, and pressing mechanism engaging and urging each blank of frangible material and the associated can end blank toward one another to ensure that the associated blanks are securely bonded to one another.

17. A machine for making frangible closures comprising feed means for moving a plurality of can end blanks in a step-by-step manner from one operating station to another in the machine, means for engaging each of said can end blanks for forming a removable portion therein, a sheet feed system for feeding a continuous strip of frangible material through the machine, said sheet feed system including driving roller means engaging said strip of material and sheet feed means for intermittently moving said strip of material through the machine, die mechanism for engaging said frangible material and including upper and lower die portions cooperating to punch out pieces of frangible material, turret mechanism slidably supporting a plurality of chuck mechanisms, said chuck mechanisms being adapted to carry said pieces of frangible material from one position to another, means for indexing said turret mechanism in timed relationship to the movement of can end blanks through the machine, and forming means including forming punch members adapted to cooperate with said chuck mechanisms for forming the pieces of frangible material into formed blanks, and means for securing each of said blanks of frangible material to one of said can end blanks, said last-mentioned means comprising adhesive applying mechansim for applying an adhesive substance to some of said blanks, and pressing mechanism engaging and urging each blank of frangible material and the associated can end blank toward one another to ensure that the associated blanks are securely bonded to one another.

18. A machine for manufacturing closures for containers and the like comprising feed means for intermittently moving can end blanks from station to station in the machine, a first die mechanism for engaging said can end blanks, said first die mechanism including male and female die members having cutting edges for cutting each of said can end blanks and forming a removable portion therein, first and second pressure pad members slidably supported within said male and female die members respectively, and forming means supported within one of said die members, means for intermittently feeding a substantially continuous strip of frangible material through the machine, second die means including upper and lower die portions adapted to engage the strip of frangible material for cutting out pieces of material, turret mechanism slidably supporting a plurality of chuck mechanisms, said chuck mechanisms including means for retaining a piece of frangible material thereon, means for periodically indexing said turret mechanism so as to move it in timed relationship to the movement of can end blanks through the machine, forming means cooperating with said chuck mechanisms and engaging the pieces of frangible material supported on the chuck mechanisms for forming the pieces of frangible material into a finished configuration, and means for securing each of said blanks of frangible material to one of said can end blanks, said last-mentioned means comprising adhesive applying mechanism for applying an adhesive substance to some of said blanks, and pressing mechanism engaging and urging each blank of frangible material and the associated can end blank toward one another to ensure that the associated blanks are securely bonded to one another.

19. A machine for making frangible closures comprising a first and second chain conveyor means for moving can end blanks through the machine, first and second shuttle bar means for moving can end blanks in a step-by-step manner from station to station within the machine, means for periodically elevating said first shuttle bar means, means for engaging each of the can end blanks passing through the machine and forming a removable portion therein, means for making a plurality of blanks of frangible material of a desired configuration, and means for securing each of said blanks of frangible material to one of said can end blanks, said last-mentioned means comprising adhesive applying mechanism for applying an adhesive substance to some of said blanks, and pressing mechanism engaging and uring each blank of frangible material and the associated can end blank toward one another to ensure that the associated blanks are securely bonded to one another.

20. A machine for making frangible closures comprising can end blank feed means for feeding can end blanks one at a time into a portion of the machine, first chain conveyor means for engaging the can end blanks fed into the machine by the can end blank feed means, first shuttle bar means for engaging each of the can end blanks from said first chain conveyor means, second shuttle bar means for engaging each of the can end blanks fed from said first shuttle bar means, second chain conveyor means for engaging each of the can end blanks fed from the second shuttle bar means, and means for removing each of the can end blanks from said second chain conveyor means, means for engaging each of said can end blanks for forming a removable portion therein, means for making a plurality of blanks of frangible material of a desired configuration, and means for securing each of said blanks of frangible material to one of said can end blanks, said last-mentioned means comprising adhesive applying mechanism for applying an adhesive substance to some of said blanks, and pressing mechanism engaging and urging each blank of frangible material and the associated can end blank toward one another to ensure that the associated blanks are securely bonded to one another.

21. A machine for manufacturing frangible closures for containers and the like comprising can end blank feed means for feeding can end blanks one at a time into the feed end of the machine, first chain conveyor means for engaging each of the can end blanks fed into the machine from the can end blank feed means, first shuttle bar means for engaging each can end blank fed by said first chain conveyor means, means for periodically raising and lowering said first shuttle bar means, first die mechanism for engaging each of said can end blanks for cutting a portion of the can end blanks to form a removable portion therein, second shuttle bar means for engaging each of said can end blanks fed by said first shuttle bar means, means for applying adhesive to a portion of each of said can end blanks, a sheet feed system for intermittently feeding a substantially continuous strip of frangible material into the machine, second die means for engaging said strip of frangible material and cutout pieces of frangible material, turret mechanism including a plurality of chuck mechanisms for engaging said pieces of frangible material and moving said pieces of frangible material from one position to another, forming means cooperating with said chuck mechanisms for engaging said pieces of frangible material to form the pieces of frangible material into a finished blank configuration, means for disposing each of said formed blanks of frangible material in operative relationship on one of said can end blanks, pressing mechanism engaging each of said blanks of frangible material for urging the frangible material toward the associated can end blank to securely bond the associated blanks to one another, second chain conveyor means for engaging each of the can end blanks fed by said second shuttle bar means, slide rail mechanism supporting said can end blanks for movement by said second chain conveyor means, and stacking mechanism receiving the finished closures from the slide rail mechanism and stacking the finished closures.

22. A machine for making frangible closures comprising means for feeding a plurality of can end blanks through the machine, means for engaging each of said can end blanks and forming a removable portion therein, means for making a plurality of blanks of frangible material of a desired finished configuration and means for positioning each of said formed blanks of frangible material over one of said can end blanks, said last-mentioned means including an aligning means comprising a plunger adapted to engage the downwardly facing portion of a can end blank for centering the can end blank, means normally resiliently urging said plunger in a downward direction and operating means for engaging said plunger and moving said plunger in an upward direction.

23. A machine for manufacturing closures for containers and the like comprising means for feeding can end blanks through the machine, slide rail mechanism for supporting said can end blanks during a portion of their movement through the machine, said slide rail mechanism including a cooperating pair of slide rail means for engaging opposite sides of a can end blank, each of said slide rail means including a fixed guide rail and a sliding guide rail, said guide rails having aligned grooves formed in the side portions thereof for receiving a portion of a can end blank, and resilient means normally biasing the sliding rail member away from the associated fixed rail, means for engaging each of said can end blanks for forming a removable portion therein, means for making a plurality of blanks of frangible material in a desired configuration, and means for disposing each of said blanks of frangible material in operative relationship to one of said can end blanks.

24. A machine for making frangible closures for containers and the like comprising means for moving a plurality of can end blanks intermittently from station to station through said machine, positioning means for engaging said can end blanks and holding said can end blanks in position at two consecutive stations, said positioning means including a vertically reciprocable slide member, a pair of vertically reciprocable shafts supported from said slide member, said shafts being resiliently urged in a downward direction and having positioning members at the lower ends thereof, said positioning members being spaced from one another and including depending portions for engaging opposite sides of a can end blank, means for engaging each of said can end blanks for cutting the can end blanks and forming a removable portion therein, means for making a plurality of blanks of frangible material of a particular configuration, and means for securing each of said blanks of frangible material to one of said can end blanks.

25. A machine for manufacturing frangible closures comprising means for intermittently feeding can end blanks from station to station in the machine, said feed means including first and second shuttle bar means, means for periodically raising and lowering said first shuttle bar means, driving means for reciprocating said first and second shuttle bar means back and forth relative to the machine, said drive means including a reciprocating lever member having a locator pin fixed thereon, locating means including a pair of locator members having slots formed therein for receiving said locator pin and accurately positioning said shuttle bar means at the opposite limits of movement thereof, means for engaging each of the can end blanks for forming a removable portion therein, means for making a plurality of blanks of frangible material of a desired configuration, and means for disposing each of said blanks of frangible material in operative relationship to one of said can end blanks.

26. A machine for manufacturing frangible closures comprising means for feeding a plurality of blanks from point to point through the machine, means for forming a plurality of blanks of frangible material of a desired configuration, said forming means including a forming punch member having a working end portion, a draw ring disposed in surrounding relationship to said working end portion, resilient means normally urging said draw ring to its outermost position, means for limiting the outward movement of said draw ring, detent means for retaining said draw ring in a particular position during a portion of the operation of the forming means, and means for securing each of said formed blanks of frangible material to one of said can end blanks.

27. A machine for manufacturing frangible closures for containers and the like comprising means for feeding a plurality of can end blanks through said machine, a sheet feed system for feeding a substantially continuous strip of frangible material through the machine, said sheet feed system including sheet feed means having a reciprocating and oscillating gripper means which intermittently engages the strip of frangible material for gripping and moving the strip of frangible material, means for making a plurality of blanks of frangible material from said strip of frangible material, and means for forming said blanks of frangible material into a desired finished configuration, and means for securely bonding a portion of each of said blanks of frangible material to one of said can end blanks.

28. A machine for making frangible closures comprising a feed means for moving a plurality of can end blanks from point to point in the machine, a sheet feed system for feeding a substantially continuous strip of frangible material through the machine, said sheet feed system including driving roller means engaging said strip of material, sheet feed means including reciprocating and oscillating gripper means for intermittently gripping and moving said strip of material, die means for engaging said strip of frangible material and punching out pieces of frangible material, forming means engaging said pieces of frangible material for forming the pieces of frangible material into a formed blank, and means for securing each of said formed blanks of frangible material to one of said can end blanks.

References Cited by the Examiner

UNITED STATES PATENTS

| | | | |
|---|---|---|---|
| 1,259,613 | 3/1918 | Garver | 100—54 |
| 1,292,217 | 1/1919 | Zelma | 100—54 |
| 1,811,571 | 6/1931 | Ackerman | 83—682 |
| 1,942,145 | 1/1934 | Knight | 83—682 |
| 2,017,124 | 10/1935 | Johnson | 156—514 |
| 2,035,374 | 3/1936 | Phillips | 118—209 |
| 2,035,375 | 3/1936 | Phillips | 118—209 |
| 2,549,808 | 4/1951 | Heinle et al. | 156—586 |
| 2,608,341 | 8/1952 | Eckman | 156—257 X |
| 2,646,104 | 7/1953 | Hawkes | 156—354 |
| 2,710,702 | 6/1955 | Gamble | 156—354 |
| 2,778,766 | 1/1957 | Kloote et al. | 156—256 |
| 2,788,834 | 4/1957 | Slaughter | 156—256 |
| 2,934,812 | 5/1960 | Allen | 29—42 |
| 2,995,358 | 8/1961 | Peyrebrune et al. | 271—3 |
| 2,995,805 | 8/1961 | Kling et al. | 29—42 |
| 2,999,531 | 9/1961 | Acton | 156—256 |
| 3,020,188 | 2/1962 | Zompa | 156—257 X |
| 3,051,477 | 8/1962 | Pavlic | 271—3 |
| 3,052,588 | 9/1962 | Anderson et al. | 156—514 |
| 3,061,502 | 10/1962 | MacDonald | 156—256 |

EARL M. BERGERT, *Primary Examiner.*

HAROLD ANSHER, ALEXANDER WYMAN,
*Examiners.*